US012748882B2

(12) United States Patent
Yeo et al.

(10) Patent No.: US 12,748,882 B2
(45) **Date of Patent: *Sep. 29, 2026**

(54) ENCRYPTED SEARCH CLOUD SERVICE WITH CRYPTOGRAPHIC SHARING

(71) Applicant: Google LLC, Mountain View, CA (US)

(72) Inventors: Kevin Yeo, Mountain View, CA (US); Sarvar Patel, Montville, NJ (US); Giuseppe Persiano, New York, NY (US)

(73) Assignee: Google LLC, Mountain View, CA (US)

( * ) Notice: Subject to any disclaimer, the term of this patent is extended or adjusted under 35 U.S.C. 154(b) by 67 days.

This patent is subject to a terminal disclaimer.

(21) Appl. No.: 18/923,613

(22) Filed: Oct. 22, 2024

(65) Prior Publication Data

US 2025/0045448 A1 Feb. 6, 2025

Related U.S. Application Data

(63) Continuation of application No. 18/159,674, filed on Jan. 25, 2023, now Pat. No. 12,141,315, which is a (Continued)

(51) Int. Cl.
*H04L 29/06* (2006.01)
*G06F 21/62* (2013.01)
(Continued)

(52) U.S. Cl.
CPC ........ *G06F 21/6227* (2013.01); *H04L 9/0631* (2013.01); *H04L 9/0819* (2013.01); (Continued)

(58) Field of Classification Search
CPC . G06F 21/6227; H04L 9/0631; H04L 9/0819; H04L 9/085; H04L 9/0866; (Continued)

(56) References Cited

U.S. PATENT DOCUMENTS 5,123,045 A 6/1992 Ostrovsky et al.
8,291,509 B2 * 10/2012 Kerschbaum ......... H04L 9/3073 713/185
(Continued)

FOREIGN PATENT DOCUMENTS

AT 512289 B1 7/2013
CN 103329184 A * 9/2013 ............ G06F 21/62
(Continued)

OTHER PUBLICATIONS

"A Survey and Analysis of Solutions to the Oblivious Memory Access Problem" by Erin Elizabeth Chapman, 2012.
(Continued)

*Primary Examiner* — Shawnchoy Rahman
(74) *Attorney, Agent, or Firm* — Honigman LLP; Brett A. Krueger

(57) ABSTRACT

A method for sharing read access to a document stored on memory hardware. The method includes receiving a shared read access command from a sharor sharing read access to a sharee for a document stored on memory hardware in communication with the data processing hardware, and receiving a shared read access request from the sharee. The shared read access command includes an encrypted value and a first cryptographic share value based on a write key, a read key, a document identifier, and a sharee identifier. The method also includes multiplying the first and second cryptographic share values to determine a cryptographic read access value. The cryptographic read access value authorizes read access to the sharee for the document. The method also includes storing a read access token for the sharee including the cryptographic read access value and the encrypted value in a user read set of the memory hardware.

20 Claims, 63 Drawing Sheets

Related U.S. Application Data continuation of application No. 17/446,456, filed on Aug. 30, 2021, now Pat. No. 11,574,073, which is a continuation of application No. 16/781,169, filed on Feb. 4, 2020, now Pat. No. 11,126,742, which is a continuation of application No. 15/878,871, filed on Jan. 24, 2018, now Pat. No. 10,592,685.

(60) Provisional application No. 62/597,781, filed on Dec. 12, 2017, provisional application No. 62/508,523, filed on May 19, 2017, provisional application No. 62/508,374, filed on May 18, 2017, provisional application No. 62/490,804, filed on Apr. 27, 2017.

(51) Int. Cl.

| | |
|---|---|
| ***H04L 9/06*** | (2006.01) |
| ***H04L 9/08*** | (2006.01) |
| ***H04L 9/32*** | (2006.01) |
| ***H04L 9/40*** | (2022.01) |

(52) U.S. Cl.

CPC ............ *H04L 9/085* (2013.01); *H04L 9/0866* (2013.01); *H04L 9/0894* (2013.01); *H04L 9/3234* (2013.01); *H04L 63/0435* (2013.01); *H04L 63/062* (2013.01); *H04L 63/10* (2013.01); *H04L 63/08* (2013.01)

(58) Field of Classification Search

CPC . H04L 9/0894; H04L 9/3234; H04L 63/0435; H04L 63/062; H04L 63/10; H04L 63/08

See application file for complete search history.

(56) References Cited

U.S. PATENT DOCUMENTS

| | | | |
|---|---|---|---|
| 9,077,525 B2 * | 7/2015 | Chandran | H04L 9/088 |
| 2007/0235517 A1 | 10/2007 | O'Connor et al. | |
| 2010/0208889 A1 * | 8/2010 | Humphrey | H04L 9/0894 380/278 |
| 2014/0007250 A1 | 1/2014 | Stefanov et al. | |
| 2015/0310188 A1 | 10/2015 | Ford et al. | |
| 2015/0310431 A1 * | 10/2015 | Lakshmanan | G06Q 20/3823 705/71 |
| 2016/0105279 A1 | 4/2016 | Zheng et al. | |
| 2016/0330180 A1 | 11/2016 | Egorov et al. | |
| 2017/0185534 A1 | 6/2017 | Wagh et al. | |

FOREIGN PATENT DOCUMENTS

| | | | |
|---|---|---|---|
| CN | 105610793 | A | 5/2016 |
| CN | 107346401 | A | 11/2017 |
| DE | 60220918 | T2 | 2/2008 |
| EP | 0976049 | B1 | 6/2005 |
| JP | 2004112250 | A | 4/2004 |
| JP | 2014-044551 | A | 3/2014 |
| JP | 2016-081522 | A | 5/2016 |
| WO | 2011/013490 | A1 | 2/2011 |
| WO | 2014151157 | A2 | 9/2014 |

OTHER PUBLICATIONS

"Remote Oblivious Storage: Making Oblivious RAM Practical" Boneh et al, Mar. 30, 2011.

"The Melbourne Shuffle: Improving Oblivious Storage in the Cloud" Ohrimenko et al., Feb. 22, 2014.

International Search Report and Written Opinion for the U.S. Appl. No. 15/878,871 dated Apr. 6, 2018.

Li U Chang et al: "Search pattern leakage i n searchable encryption: Attacks and new construction", I Information Sciences, vol. 265, Nov. 27, 2013 (Nov. 27, 2013), pp. 176-188, XP028605568, ISSN: 0020-0255, DOI: 10.1016/J.I NS.2013.11. 021 Abstract, Sect i on 5.

Peter Williams et al : "PrivateFS", Proceedings of The 2012 ACM Conference on Computer and Communications Security, CCS '12, Oct. 16, 2012 (Oct. 16, 2012) , pp. 977-988, XP055500903, New York, New York, USA DOI: 10.1145/2382196.2382299 ISBN: 978-1-4503-1651-4 Abstract, Secti ons 2-5.

International Search Report and Written Opinion for the Application No. PCT/US2018/013469 dated Jan. 12, 2018.

JPO, Office Action relating to Application No. 2021-112628, dated Jun. 14, 2022.

Chinese Office Action for the related Application No. 201880037200.0 dated Dec. 14, 2022, 14 pages.

* cited by examiner

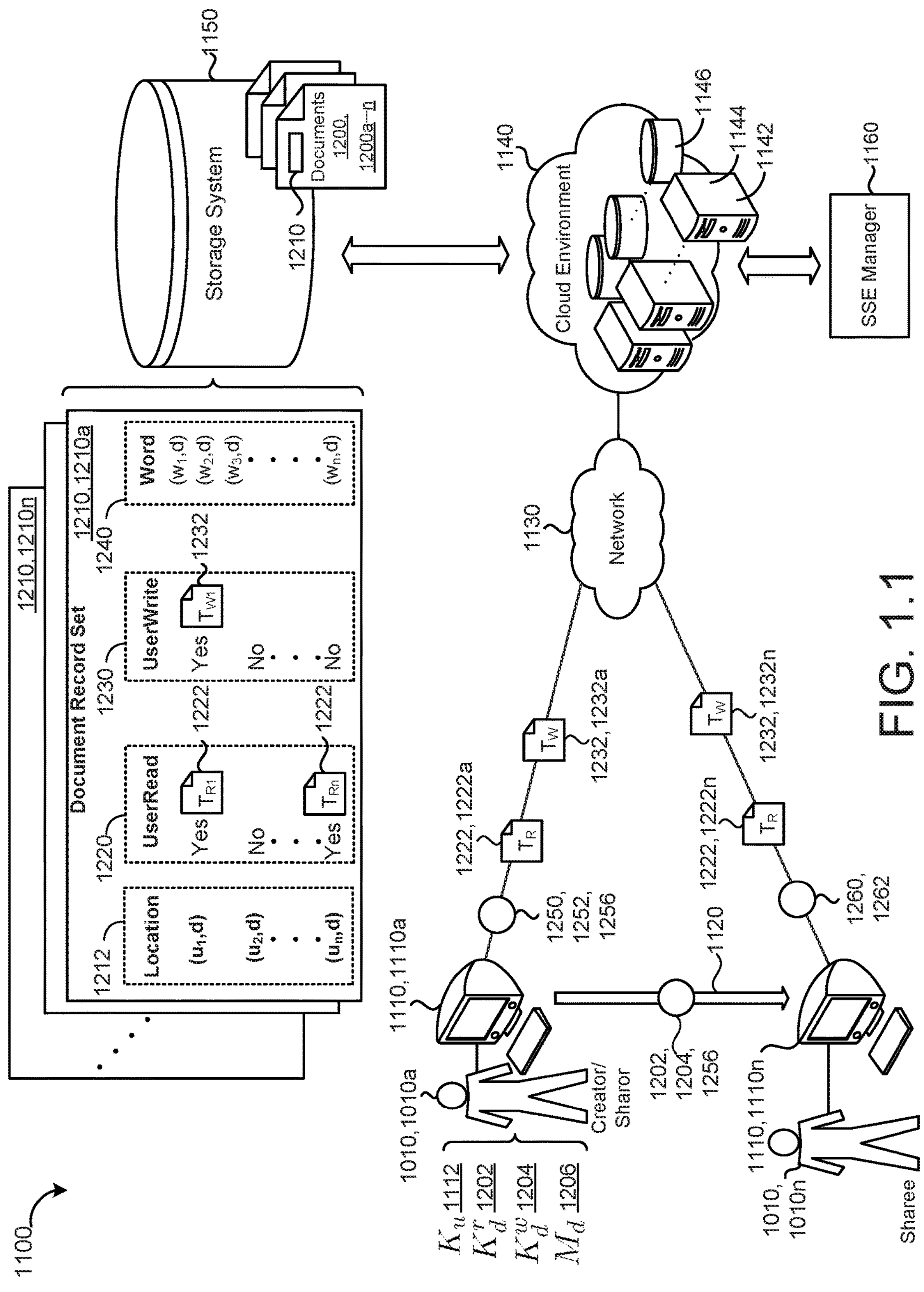
FIG. 1.1

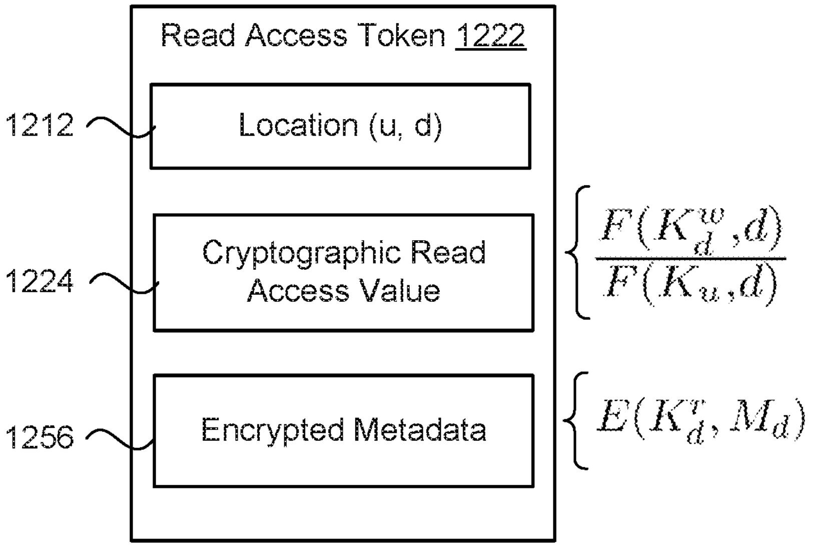
FIG. 1.2A
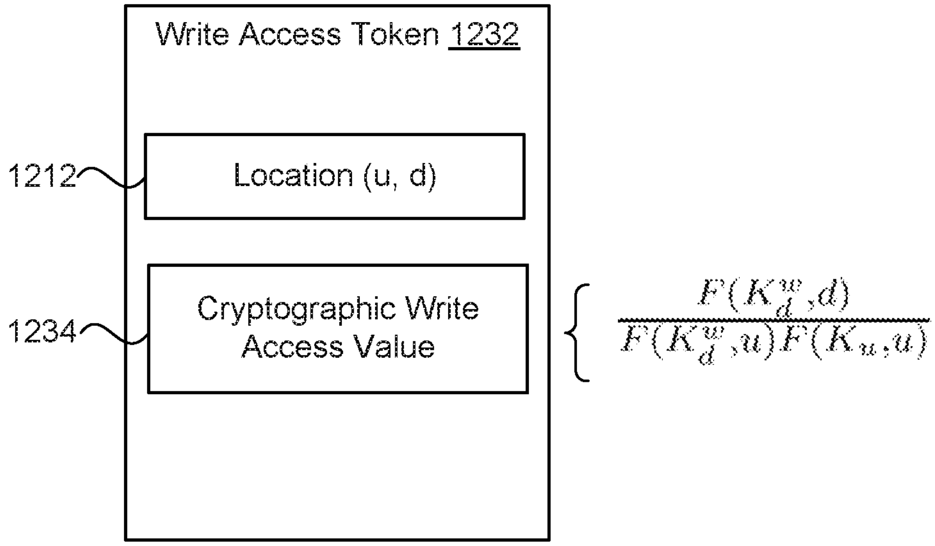
FIG. 1.2B

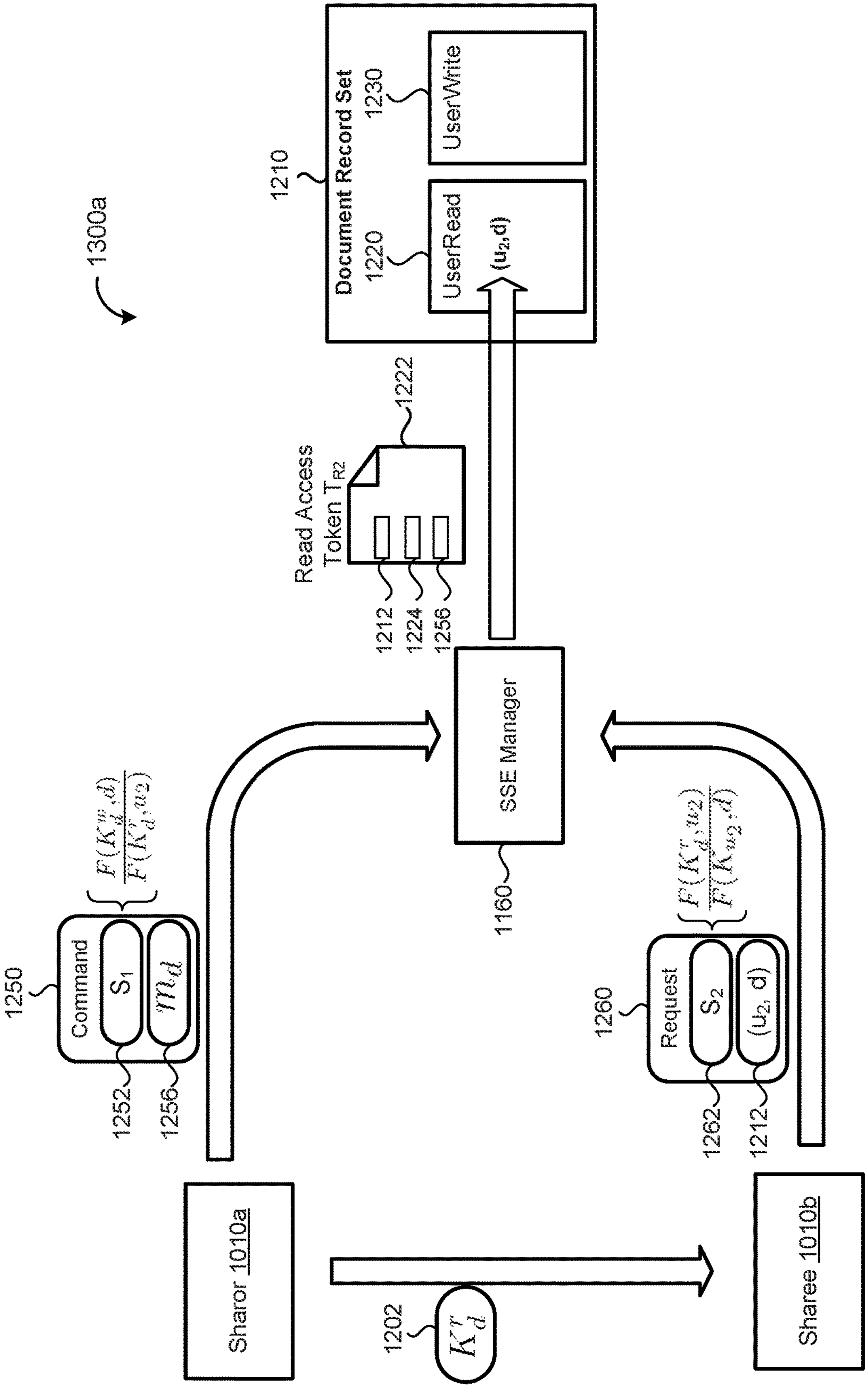
FIG. 1.3A

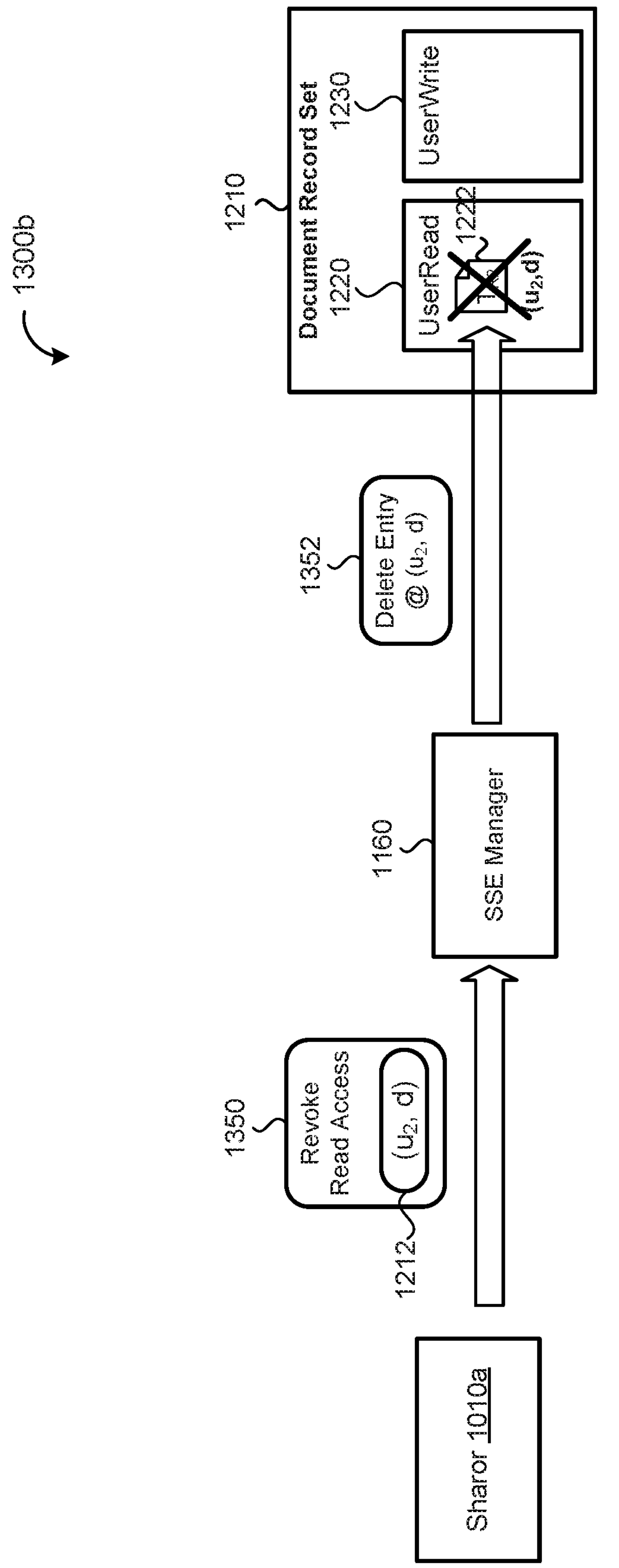
FIG. 1.3B

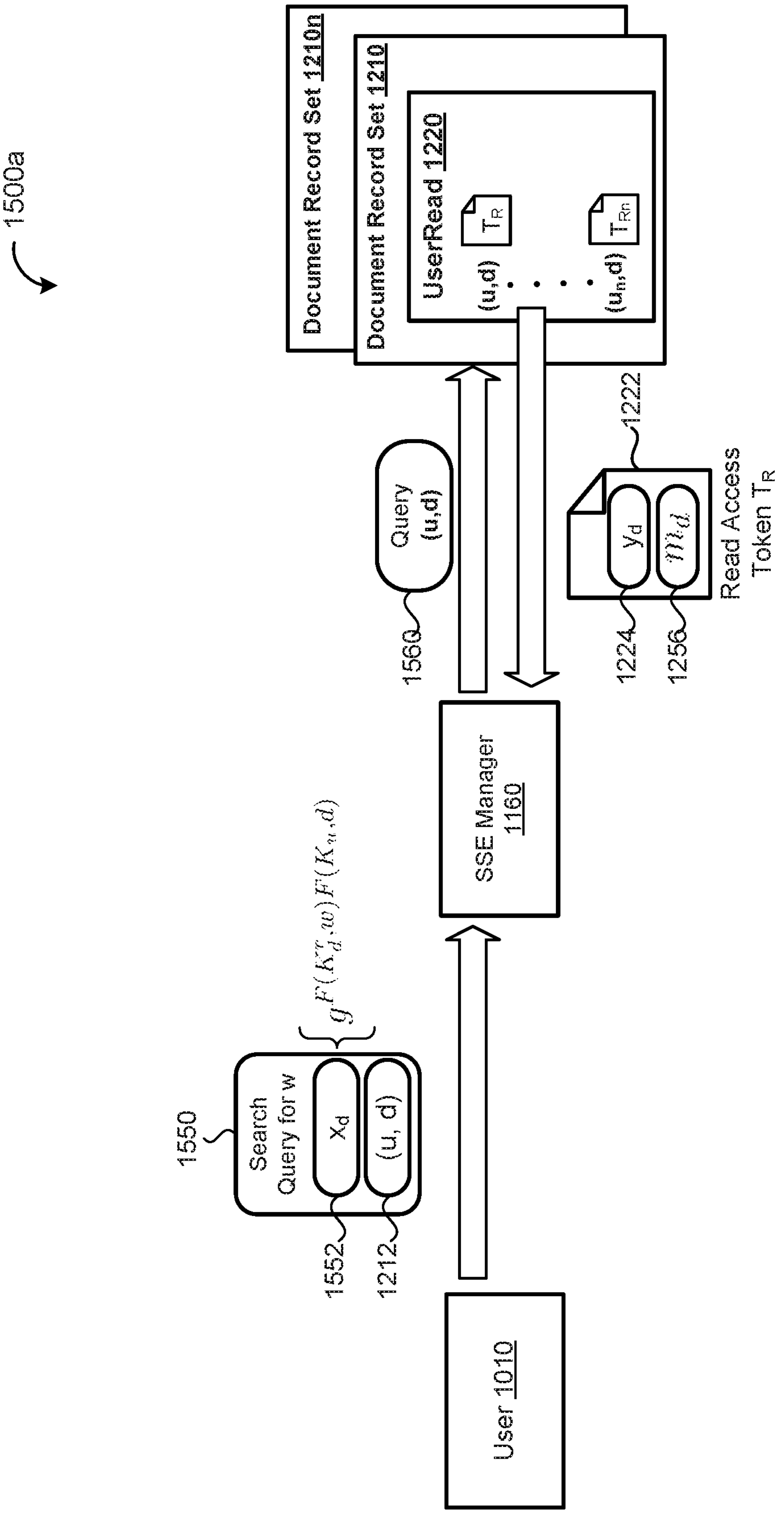
FIG. 1.5A

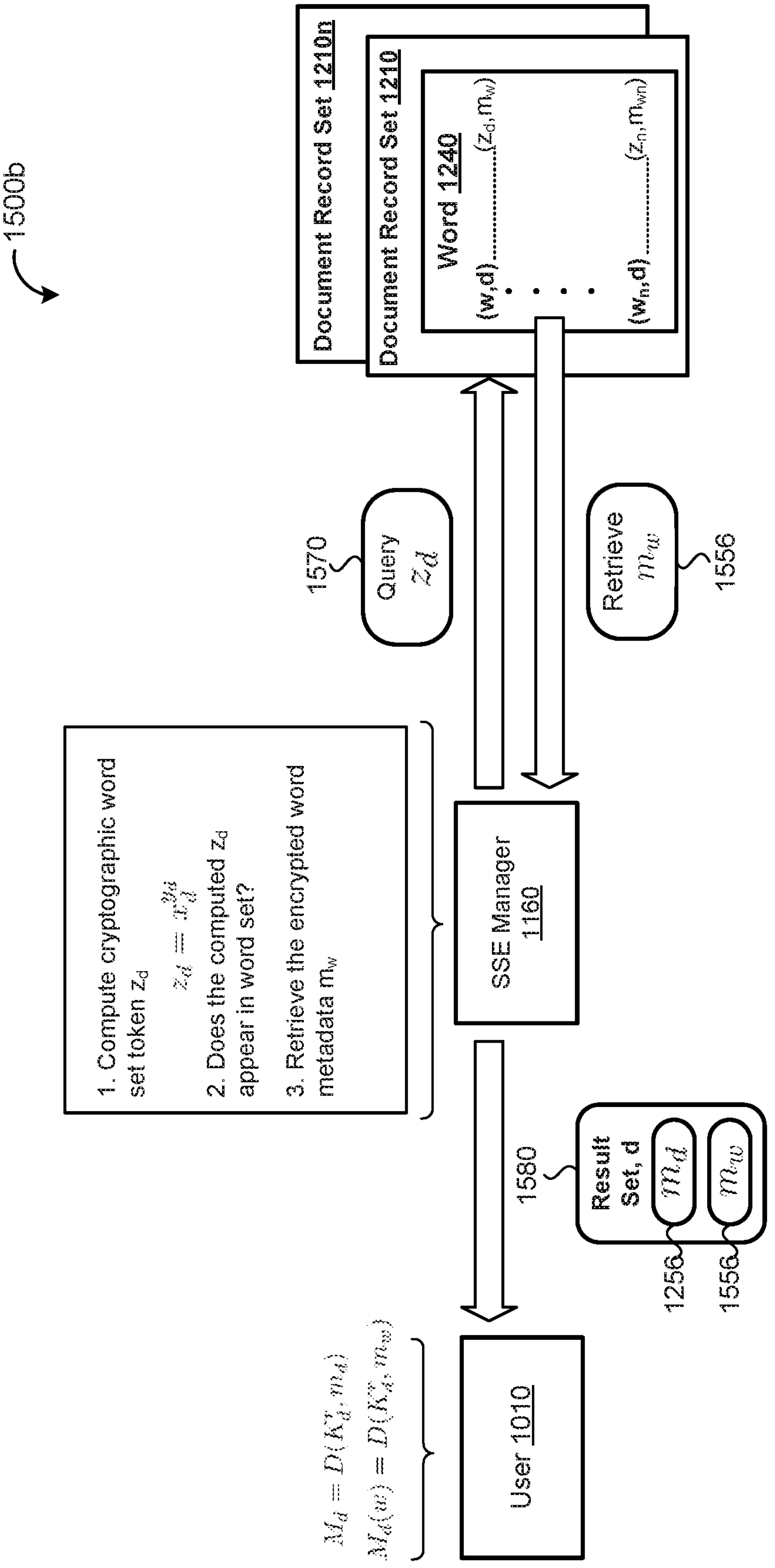
FIG. 1.5B

1500c

Search($u$, $w$)

User $u$ performs a search for keyword $w$. Let $U_r(u)$ be the set of documents that $u$ has read access to.

First, $u$ does the following

1. For each $d \in U_r(u)$, compute $x_d = g^{F(K_d^s, w)F(K_u, d)}$.
2. Send server $u, (d, x_d)_{d \in U_r(u)}$ Then, the server does the following 1. Receives $u, (d, x_d)_{d \in U_r(u)}$ from $u$.
2. Set $A = \emptyset$.
3. For each $d \in U_r(u)$, retrieve $(y_d, m_d)$ from location $(u, d)$ in UserReadSet. Note that $m_d$ is the encryption of $M_d$.
4. For each $d \in U_r(u)$ such that $(u, d)$ exists in UserReadSet, compute $z_d = x_d^{y_d}$. If $z_d$ appears in WordSet, retrieve the encryption of $M_d(w)$, denote $m_w$. Insert $(d, m_d, m_w)$ into $A$.
5. Return $A$ to $u$.

Finally, $u$ does the following

1. Receives $A$ from the server.
2. For each $a \in A$, compute $M_d = D(K_d^r, m_d)$ and $M_d(w) = D(K_d^s, m_w)$.
3. Using $M_d$ and $M_d(w)$, sort and show the search results.

FIG. 1.5C

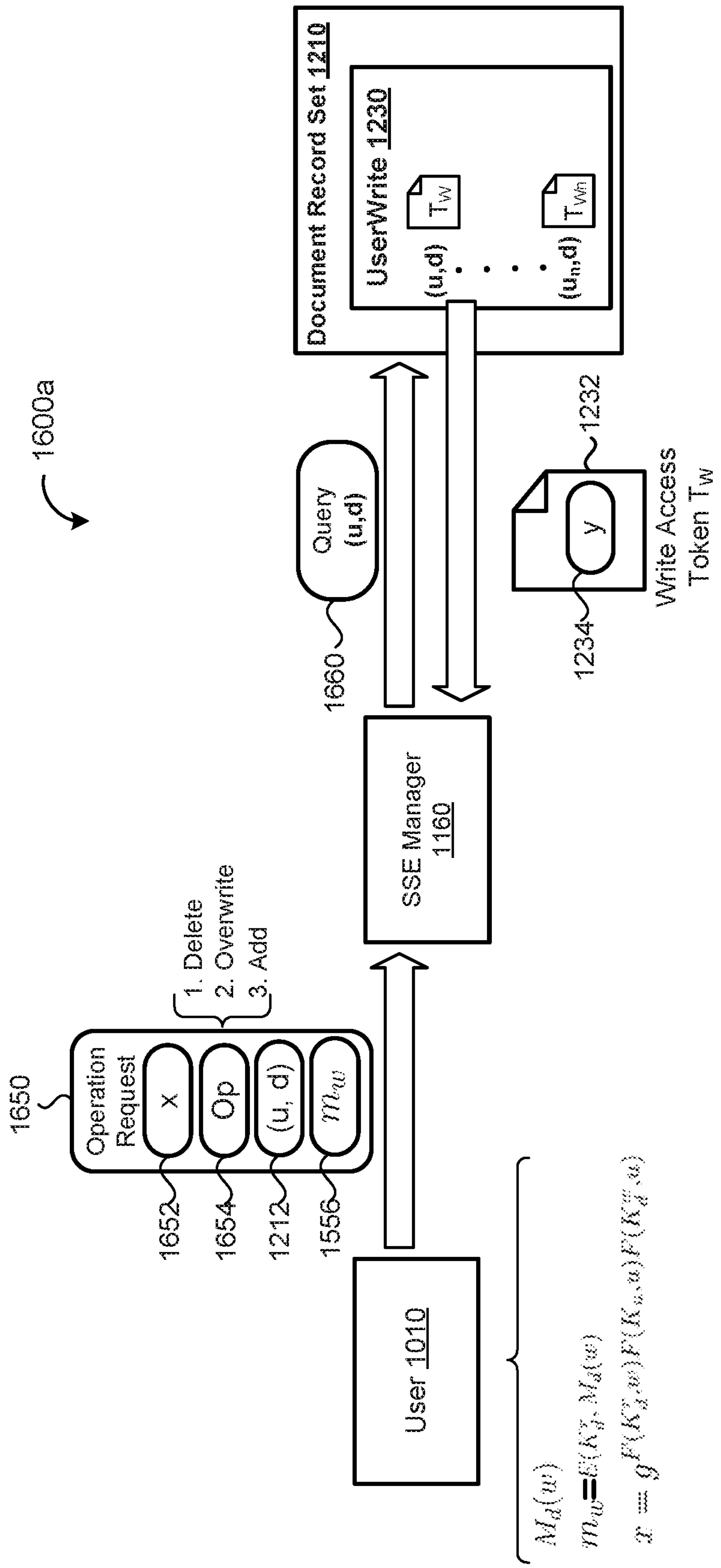
FIG. 1.6A

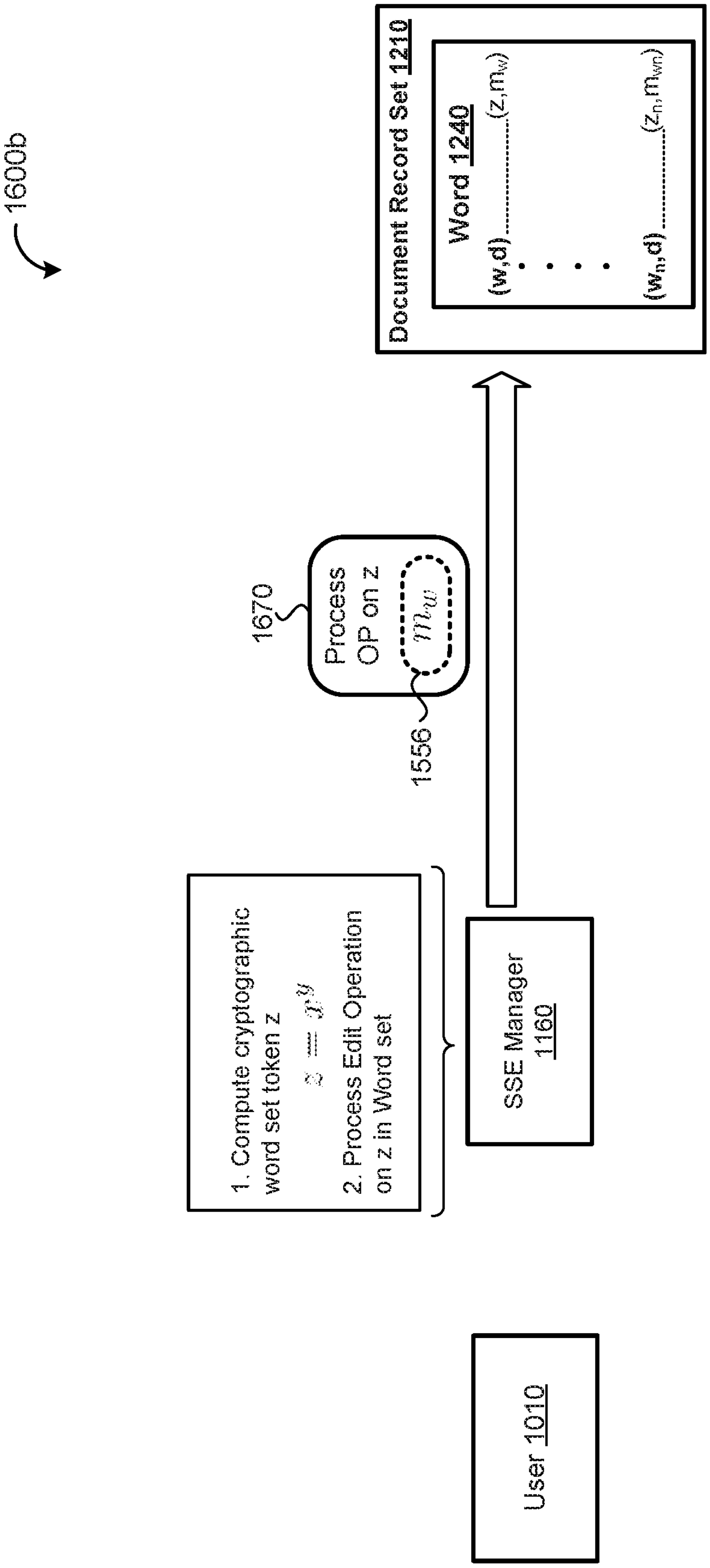
FIG. 1.6B

1600c

Edit$(op, u, w, d)$
User $u$ performs $op \in \{\text{add}, \text{overwrite}, \text{delete}\}$ on $w$ in document $d$.

First, $u$ does the following

1. Create $M_d(w)$, the metadata for document $d$ in regards to word $w$.
2. Compute $x = g^{F(K_d^t, w)F(K_u, w)F(K_d^w, w)}$.
3. Send server $(op, x, m = E(K_d^t, M_d(w)), u, d)$.

Then, the server does the following

1. Receives $(op, x, m, u, d)$ from $u$.
2. Retrieve $y$ from location $(u, d)$ into UserWriteSet.
3. Compute $z = x^y$.
4. Perform $op$ on $z$ in WordSet. If $op =$ delete, then delete $z$ from WordSet. If $op =$ add or $op =$ overwrite, add/overwrite the entry at $z$ with $(z, m)$.

FIG. 1.6C

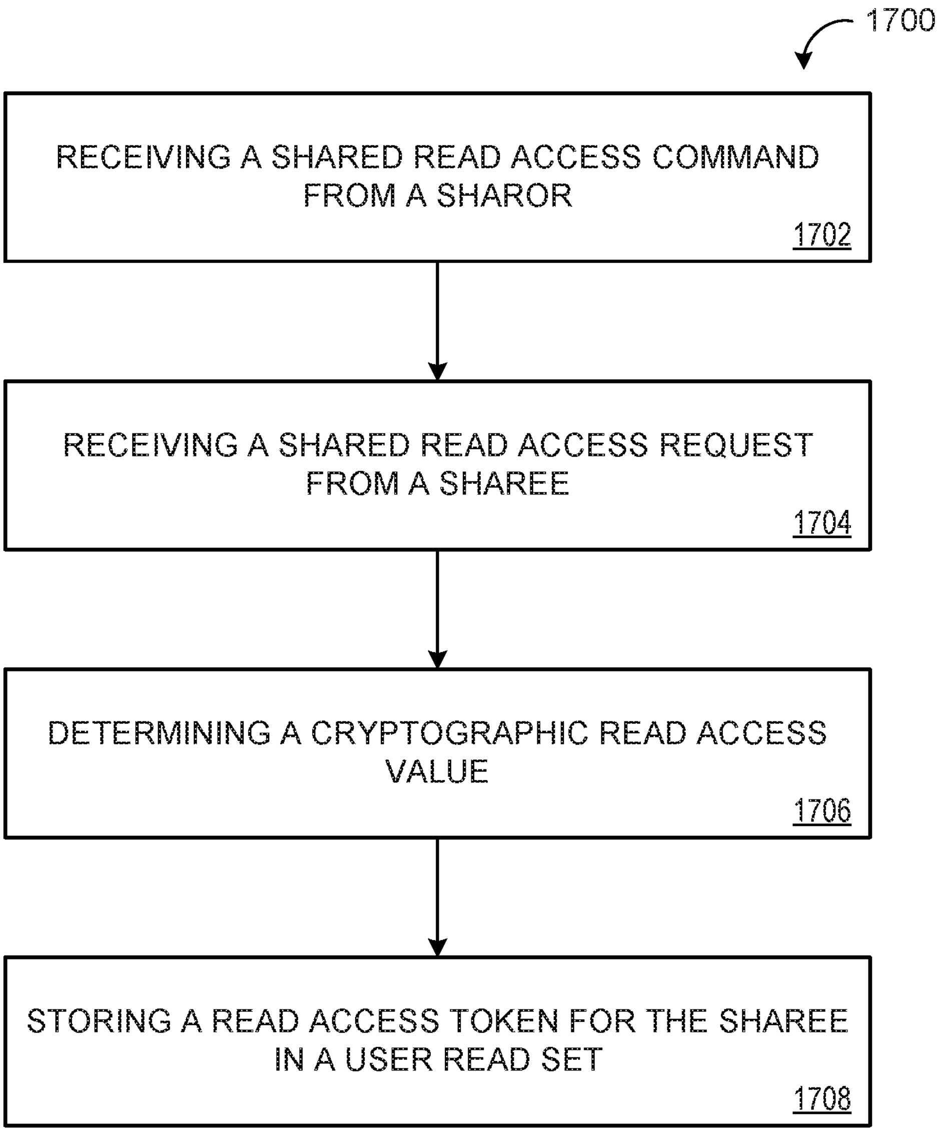
FIG. 1.7

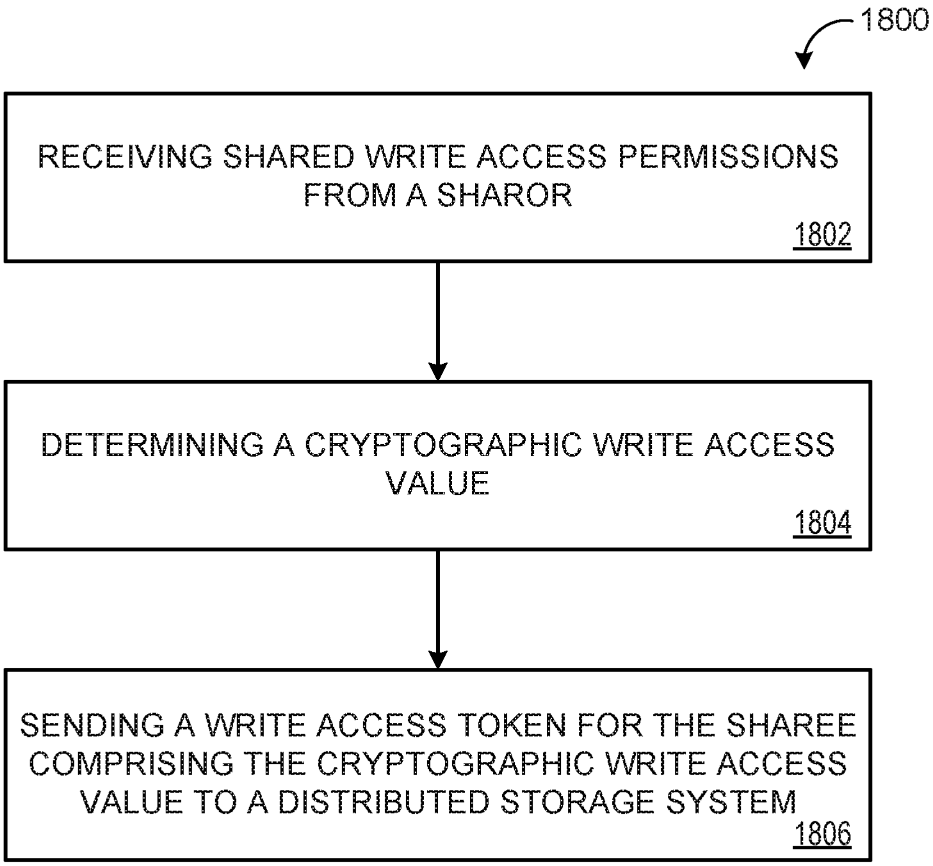
FIG. 1.8

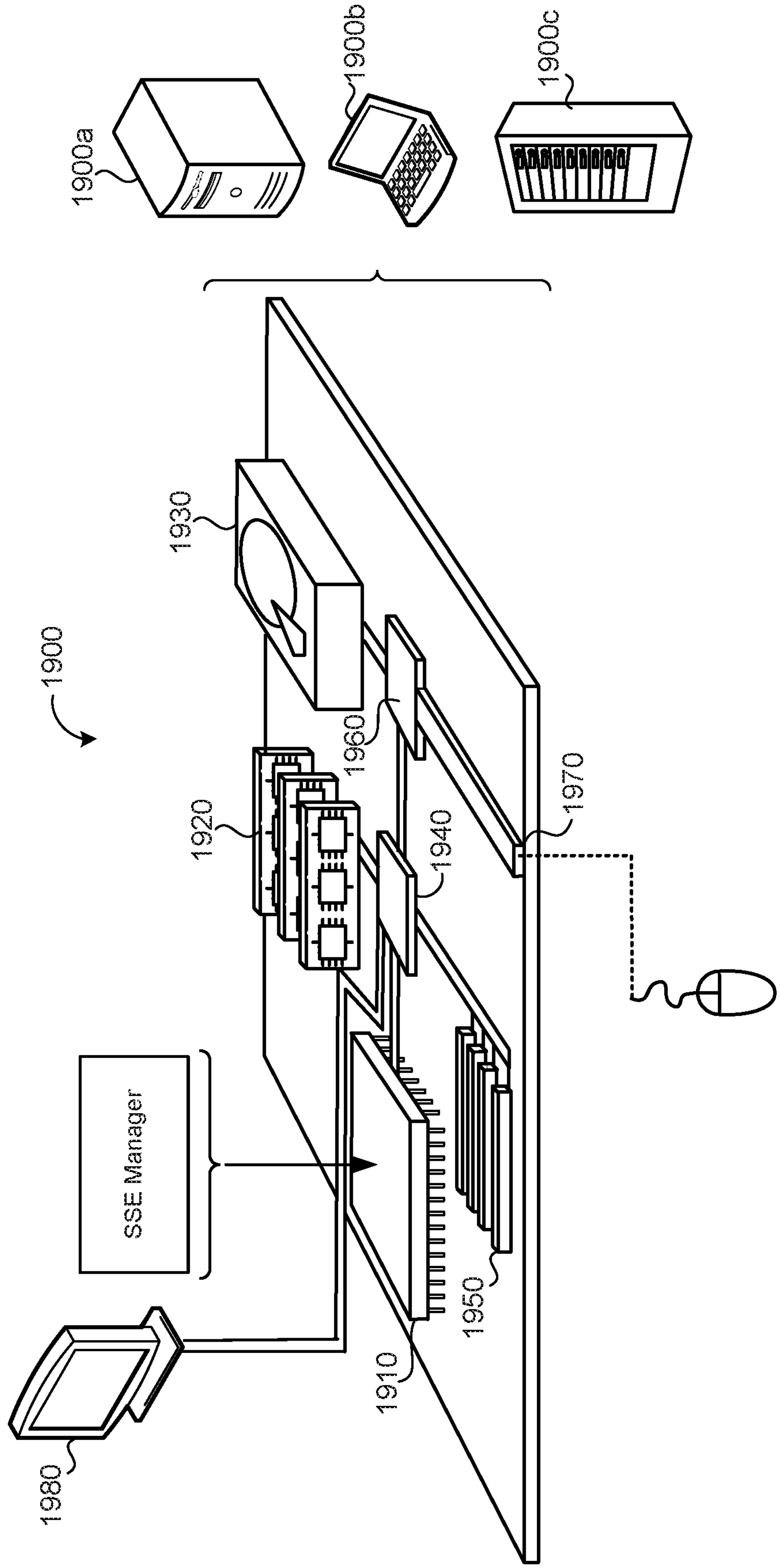
FIG. 1.9

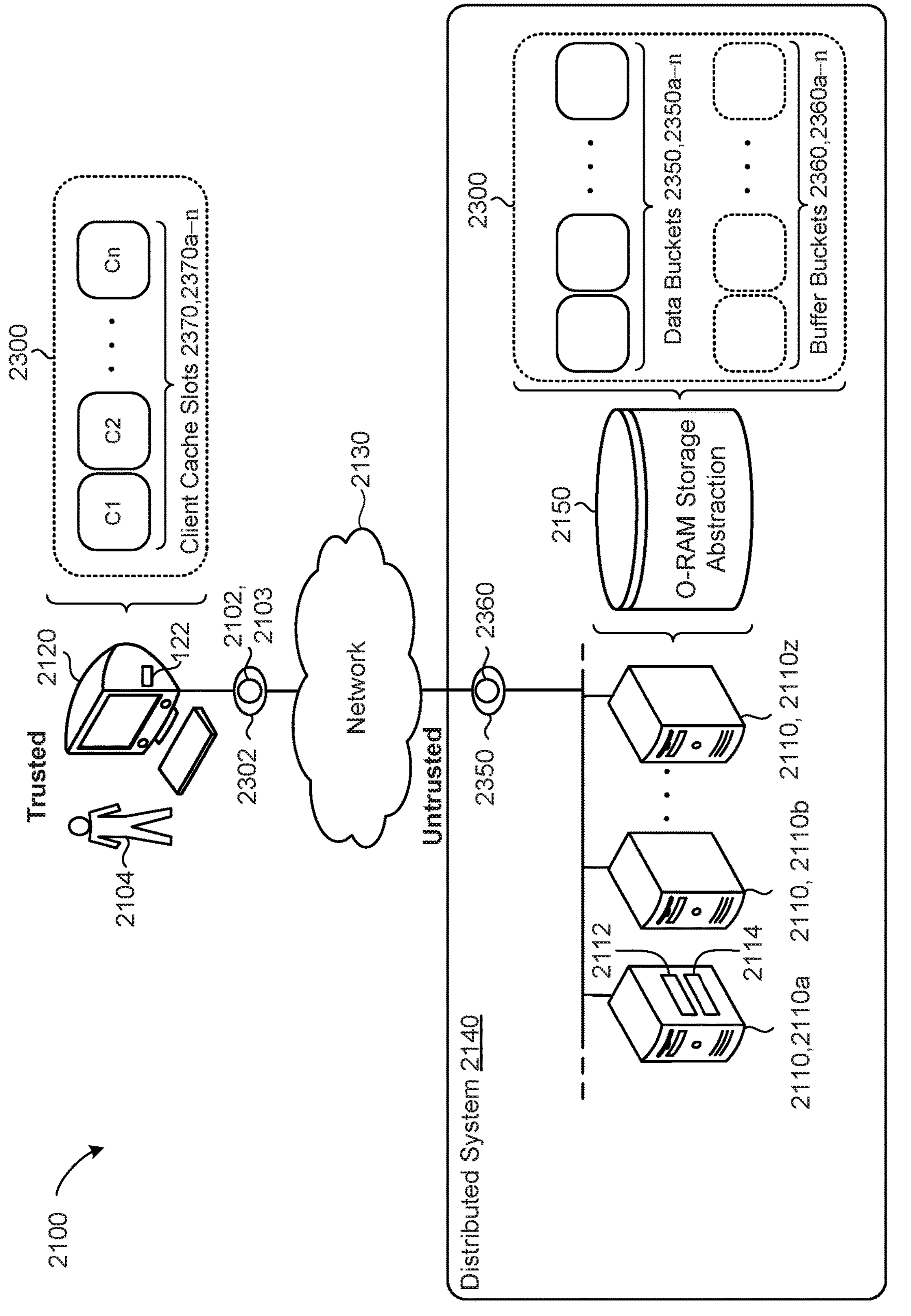
FIG. 2.1

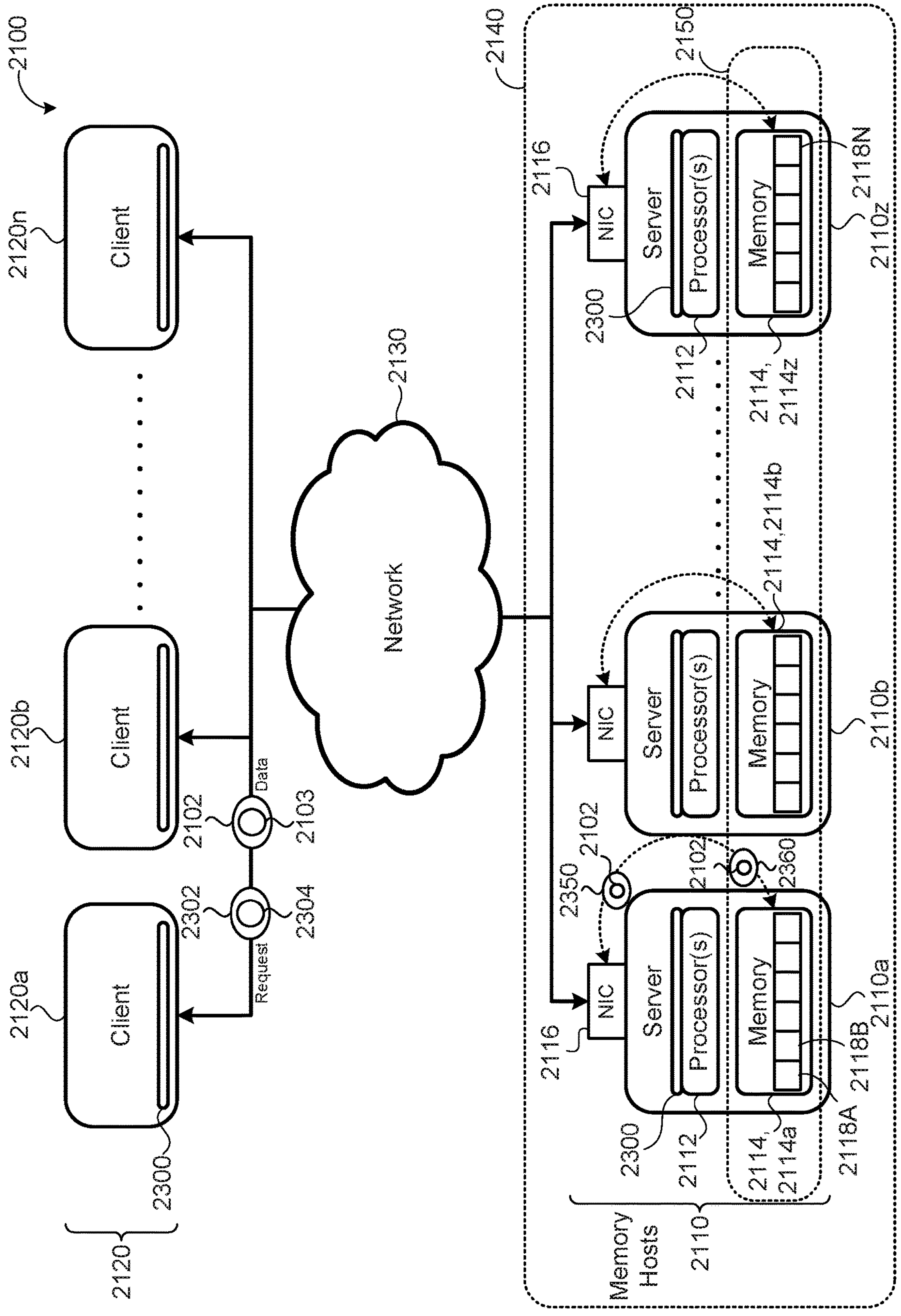
FIG. 2.2

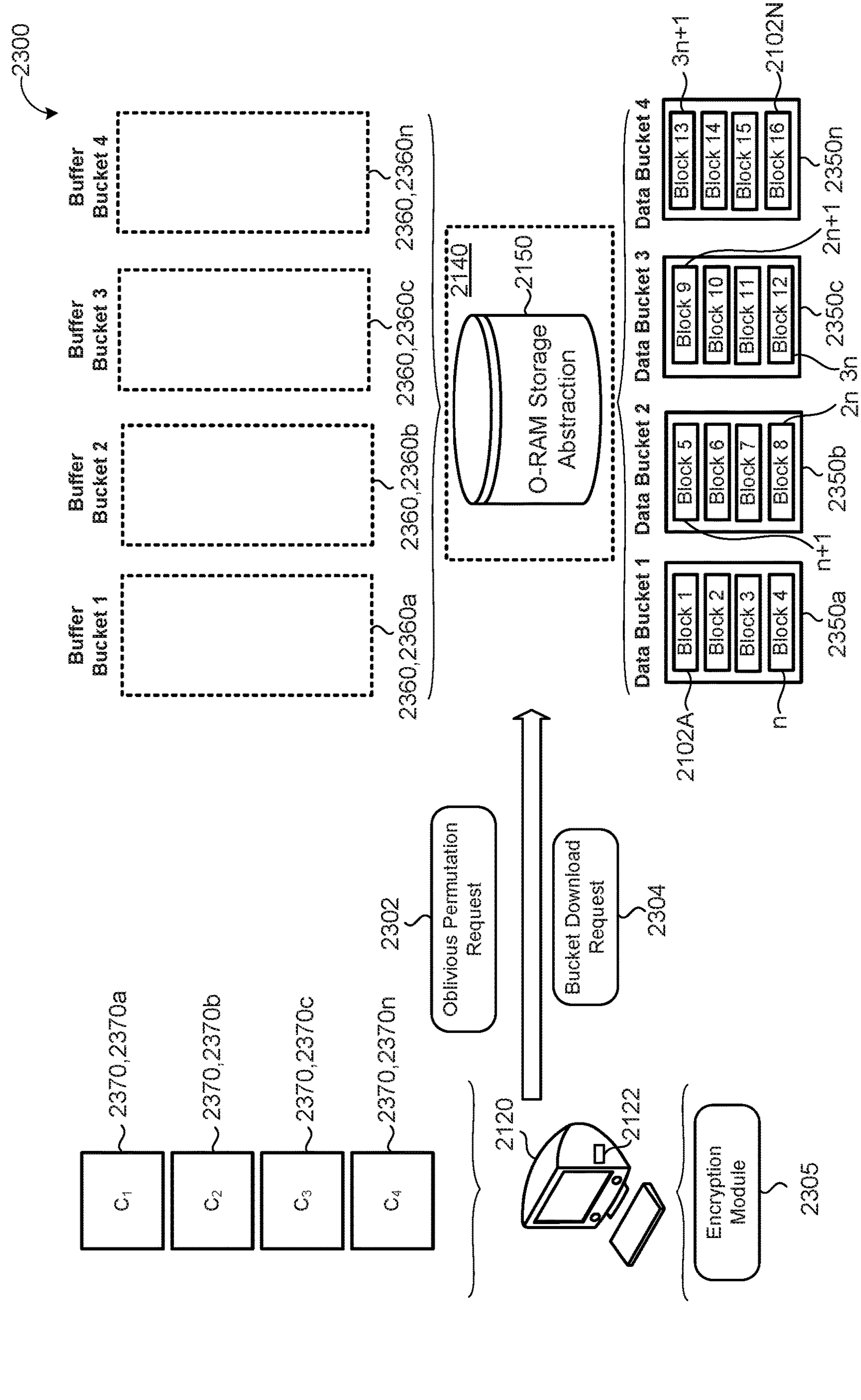
FIG. 2.3A

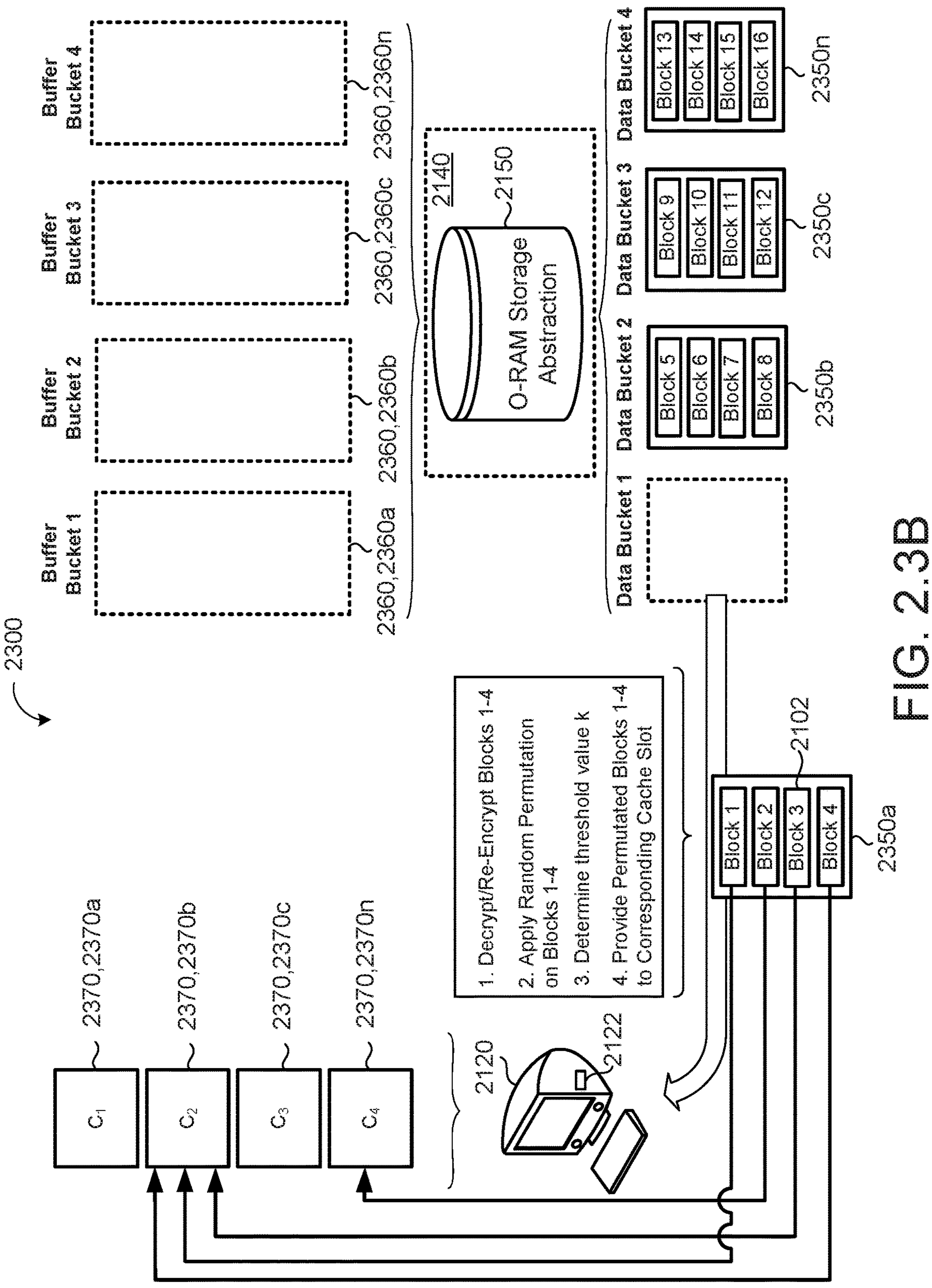
FIG. 2.3B

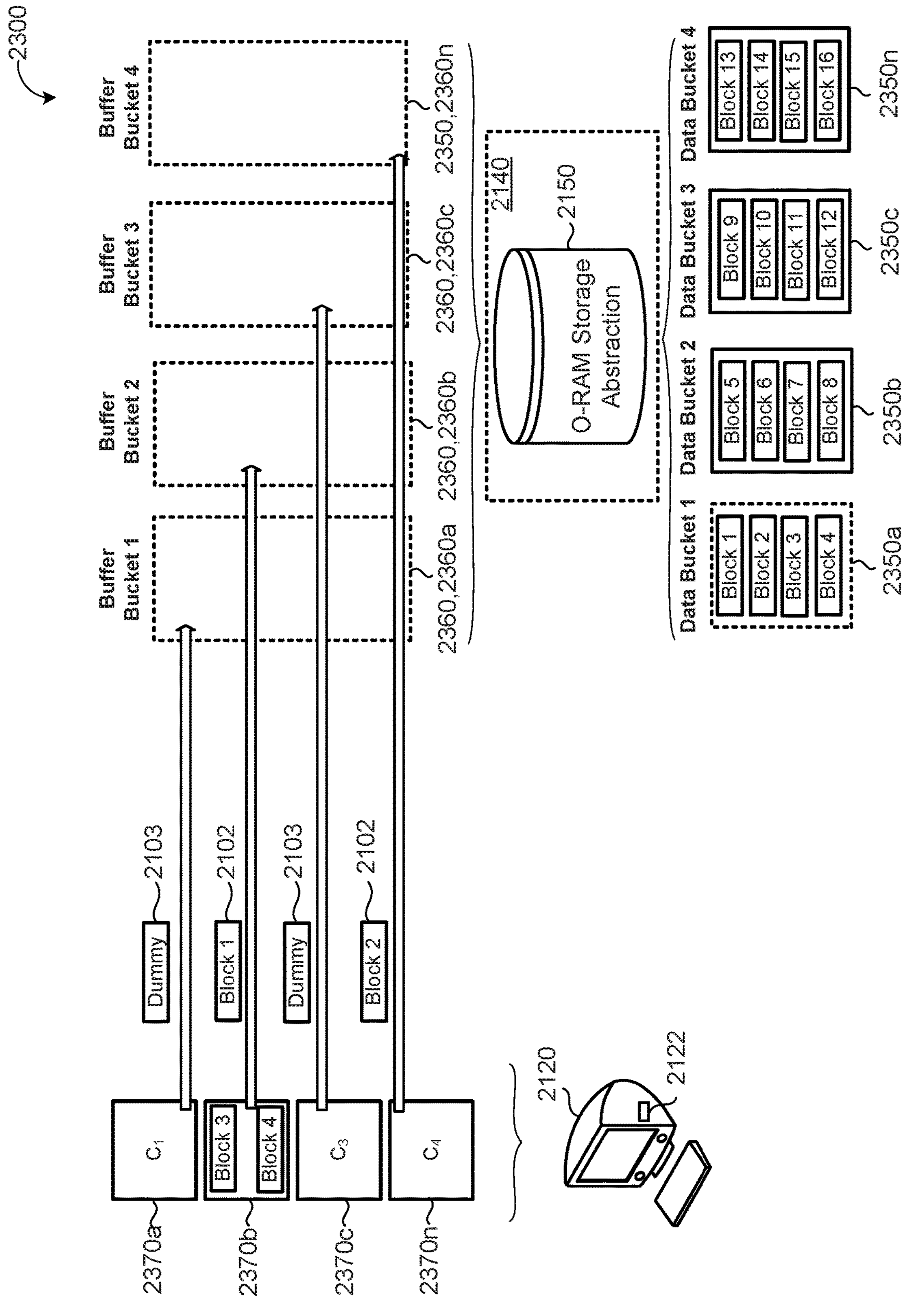
FIG. 2.3C

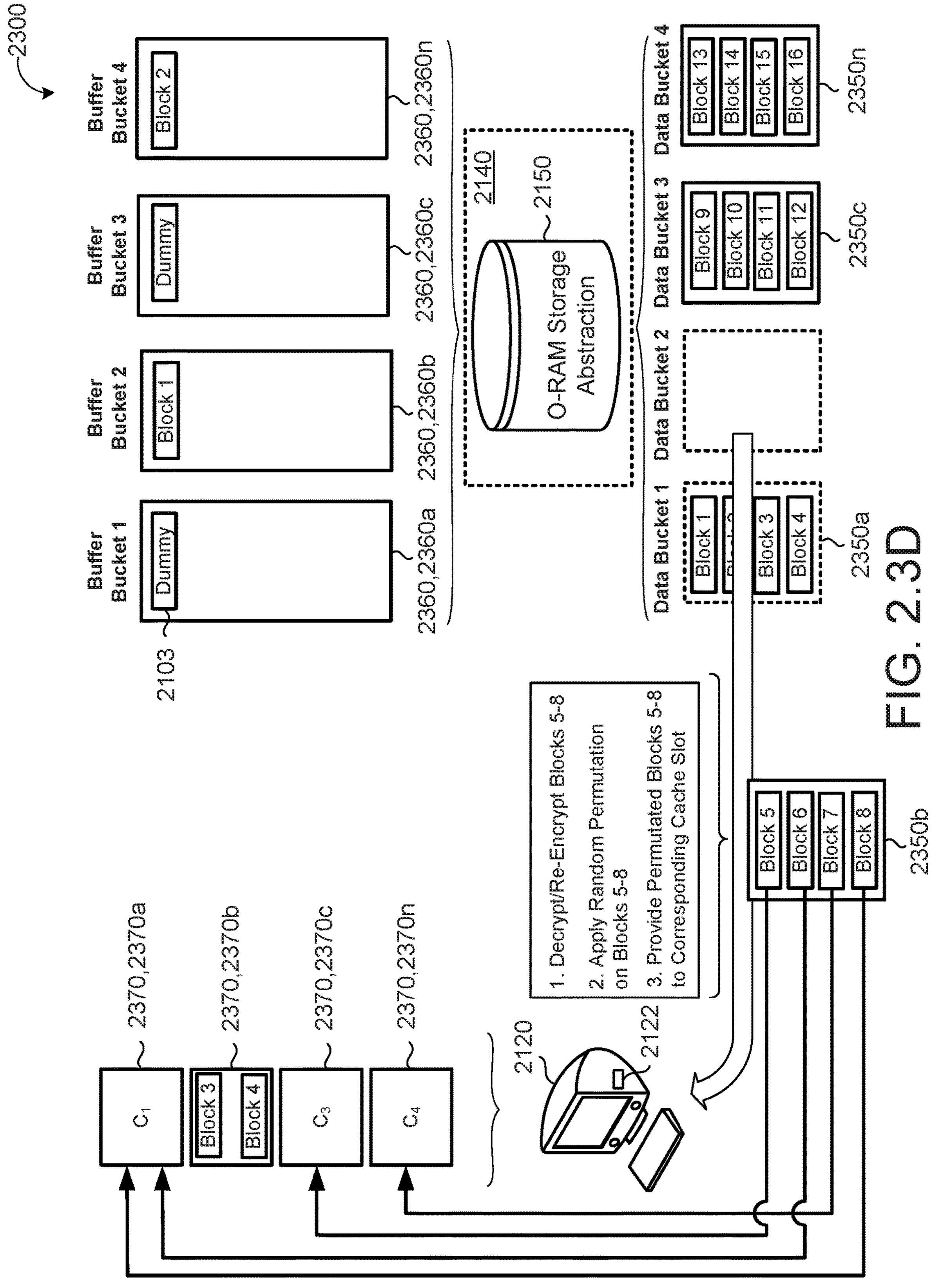
FIG. 2.3D

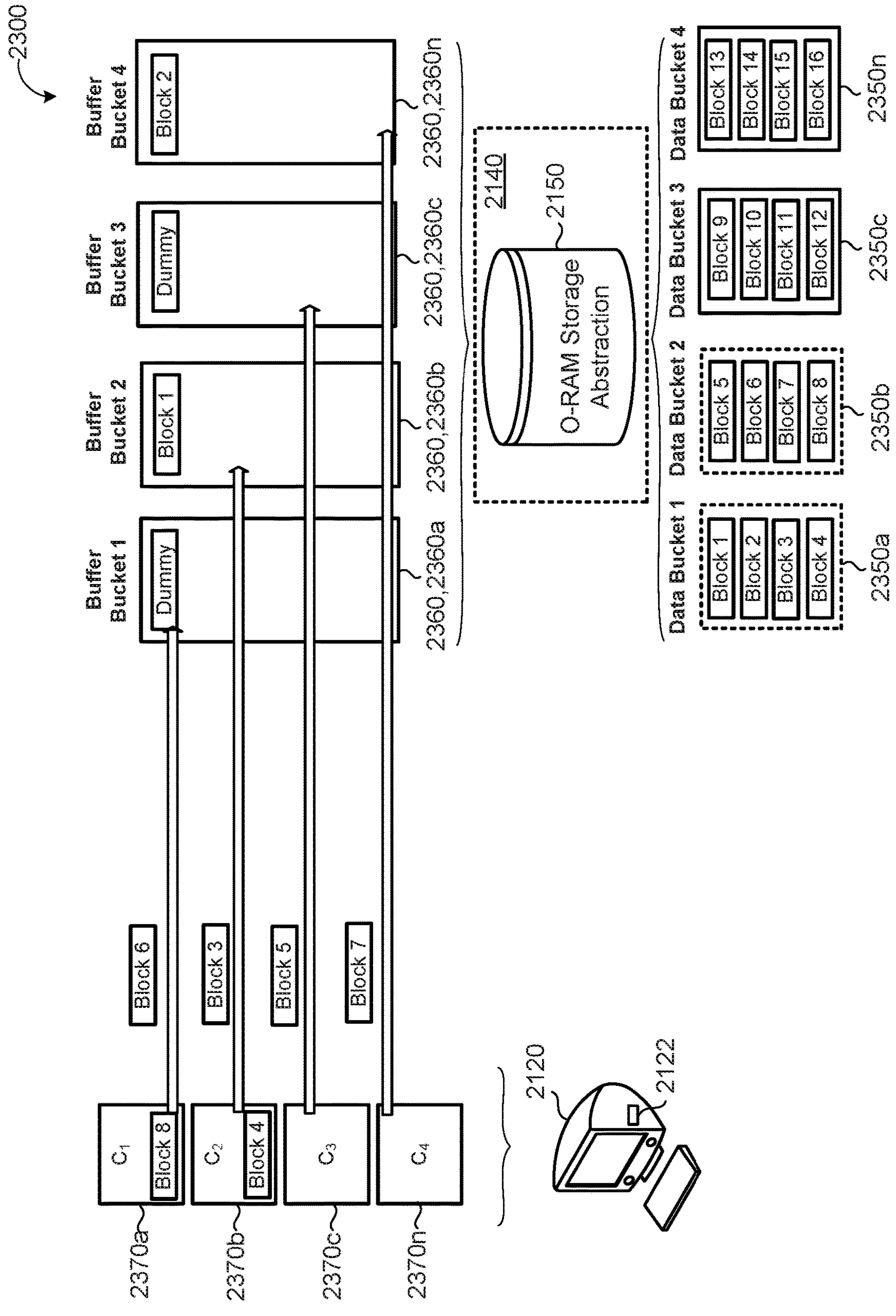
FIG. 2.3E

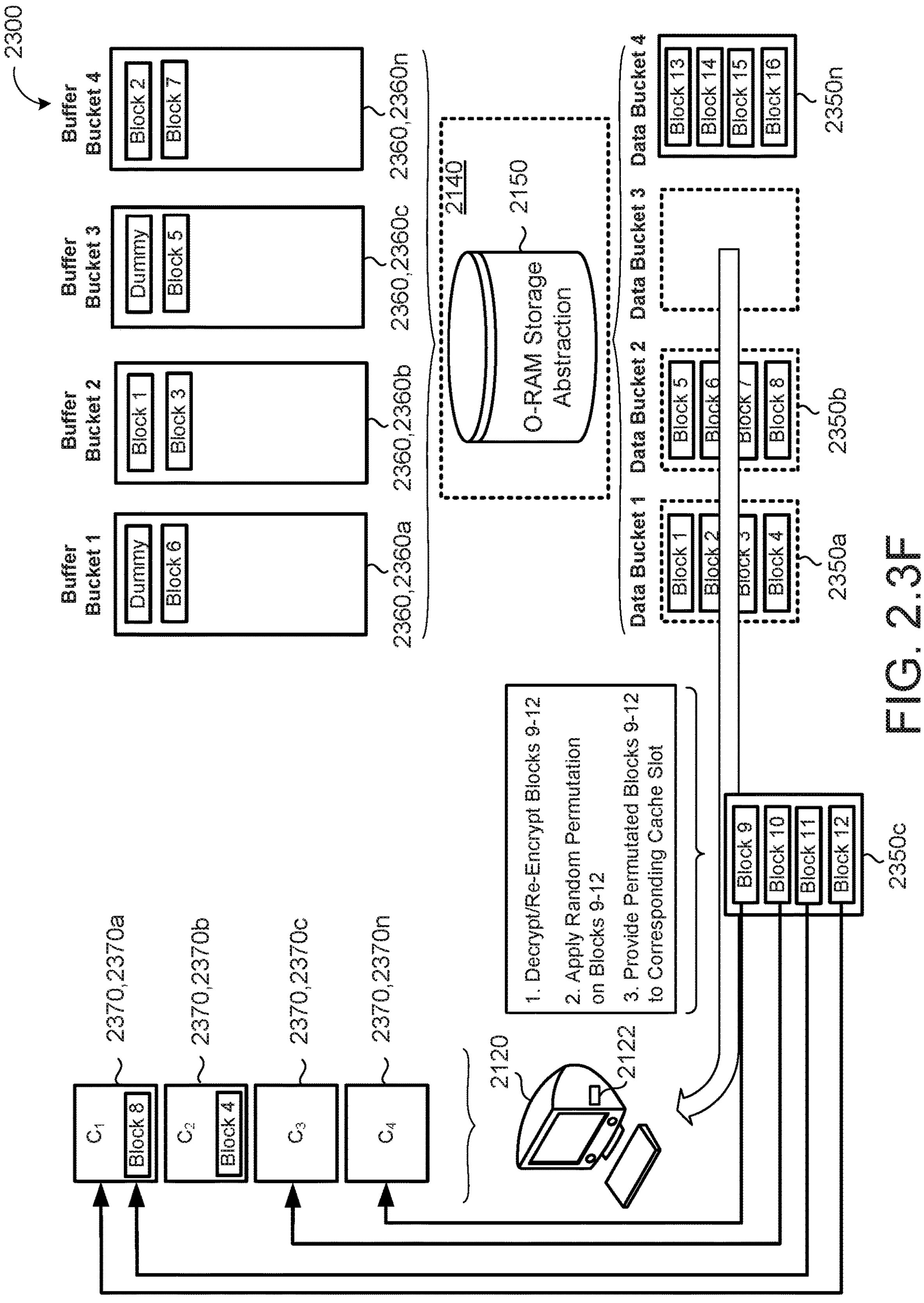
FIG. 2.3F

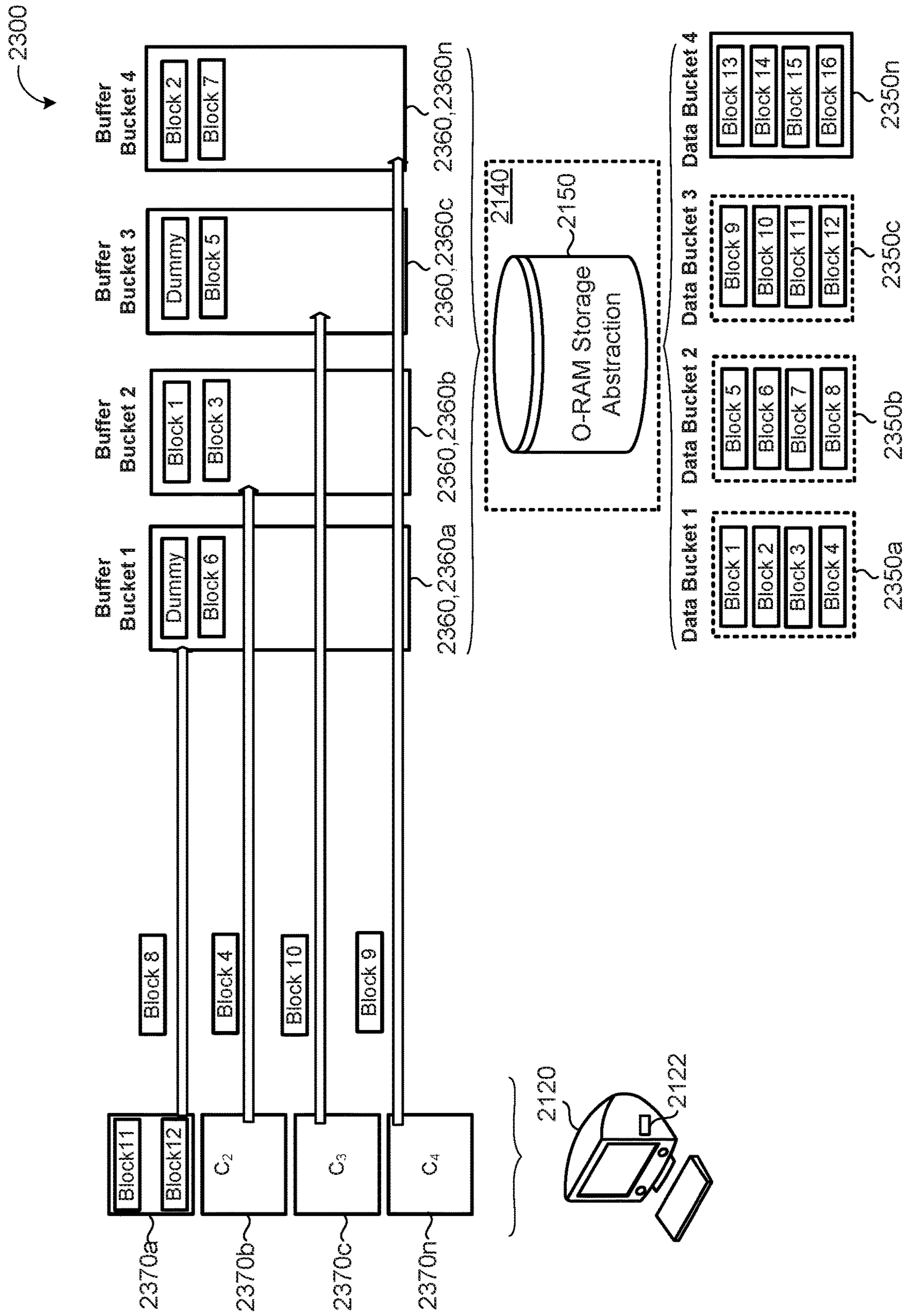
FIG. 2.3G

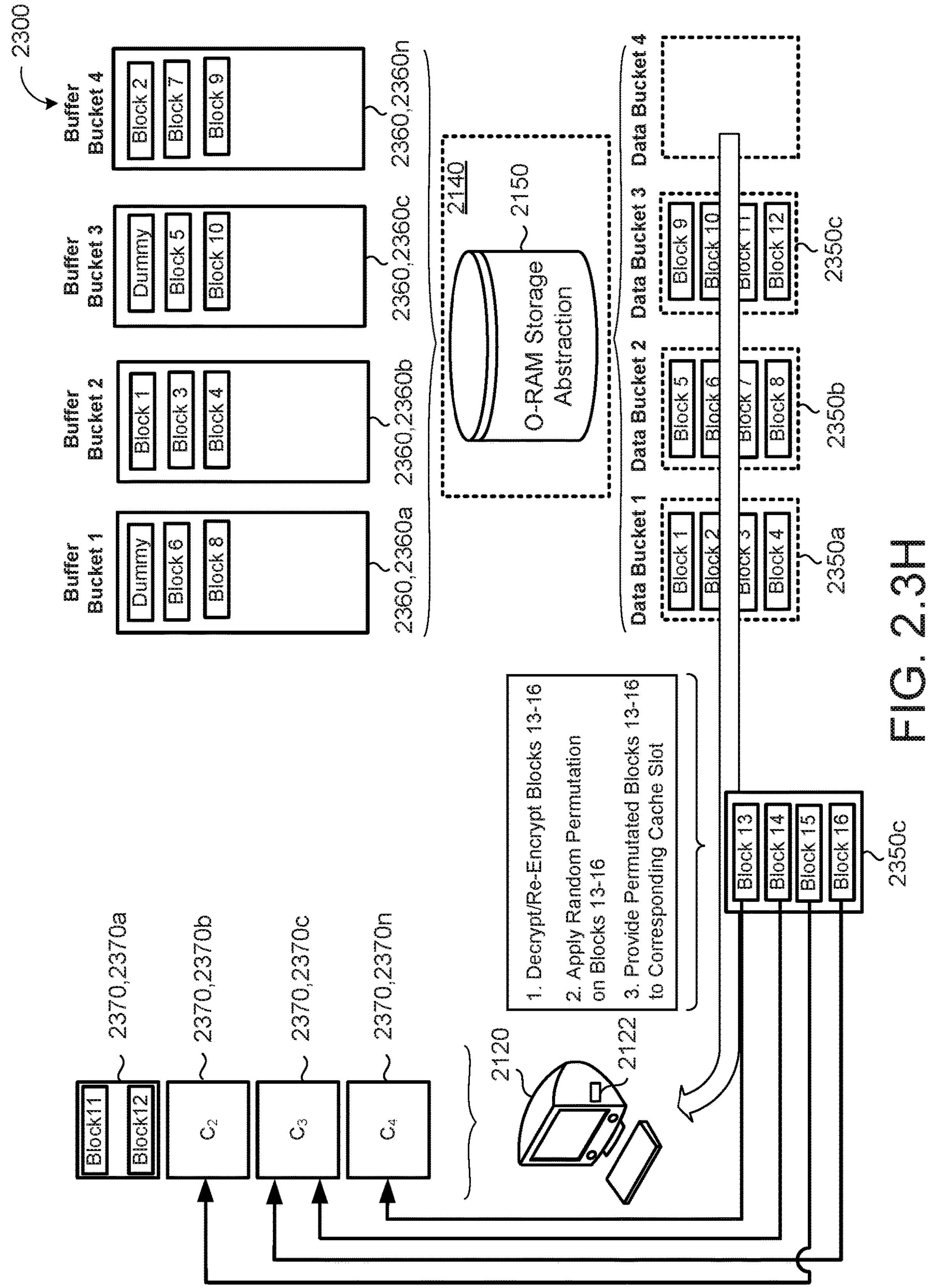
FIG. 2.3H

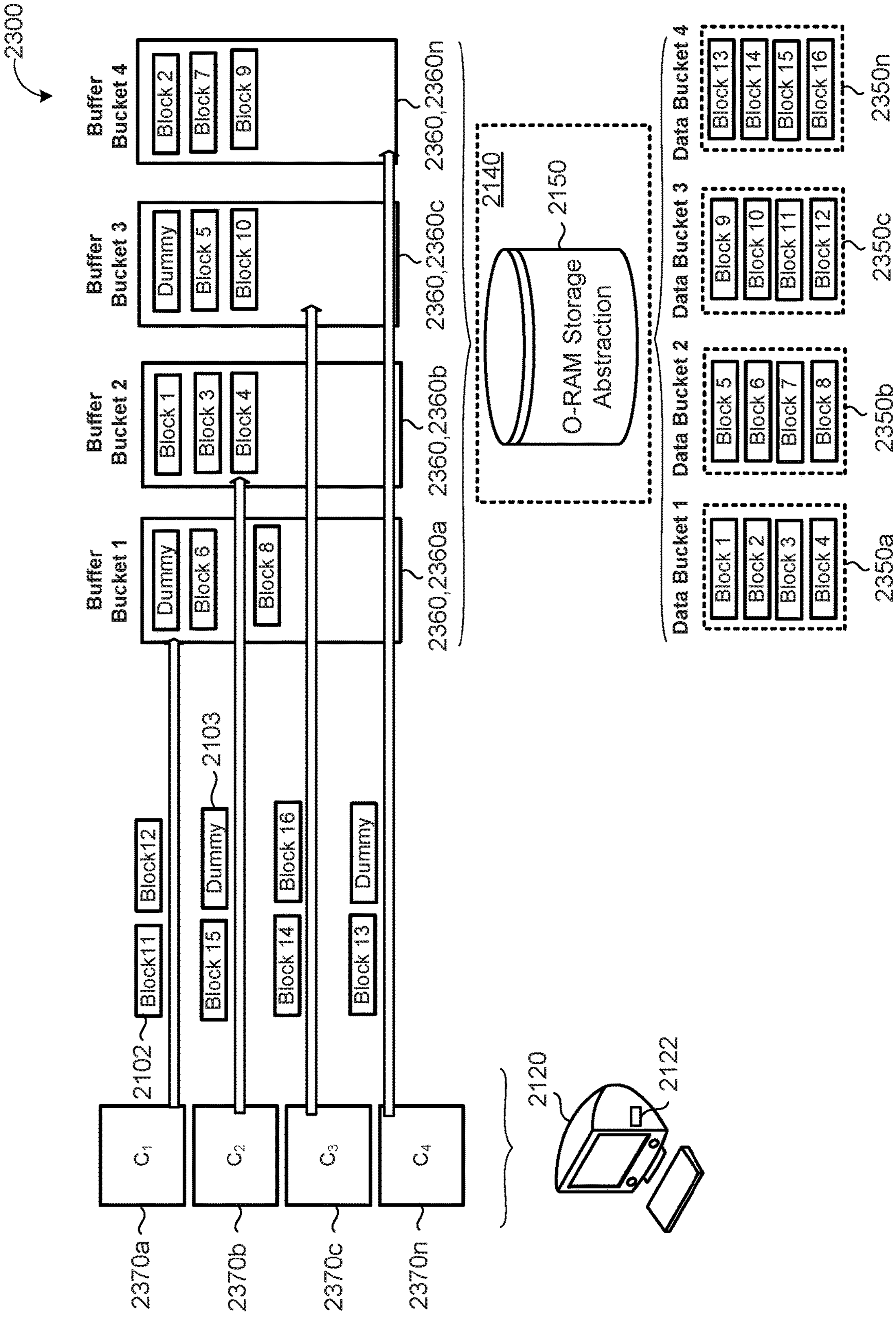
FIG. 2.3I

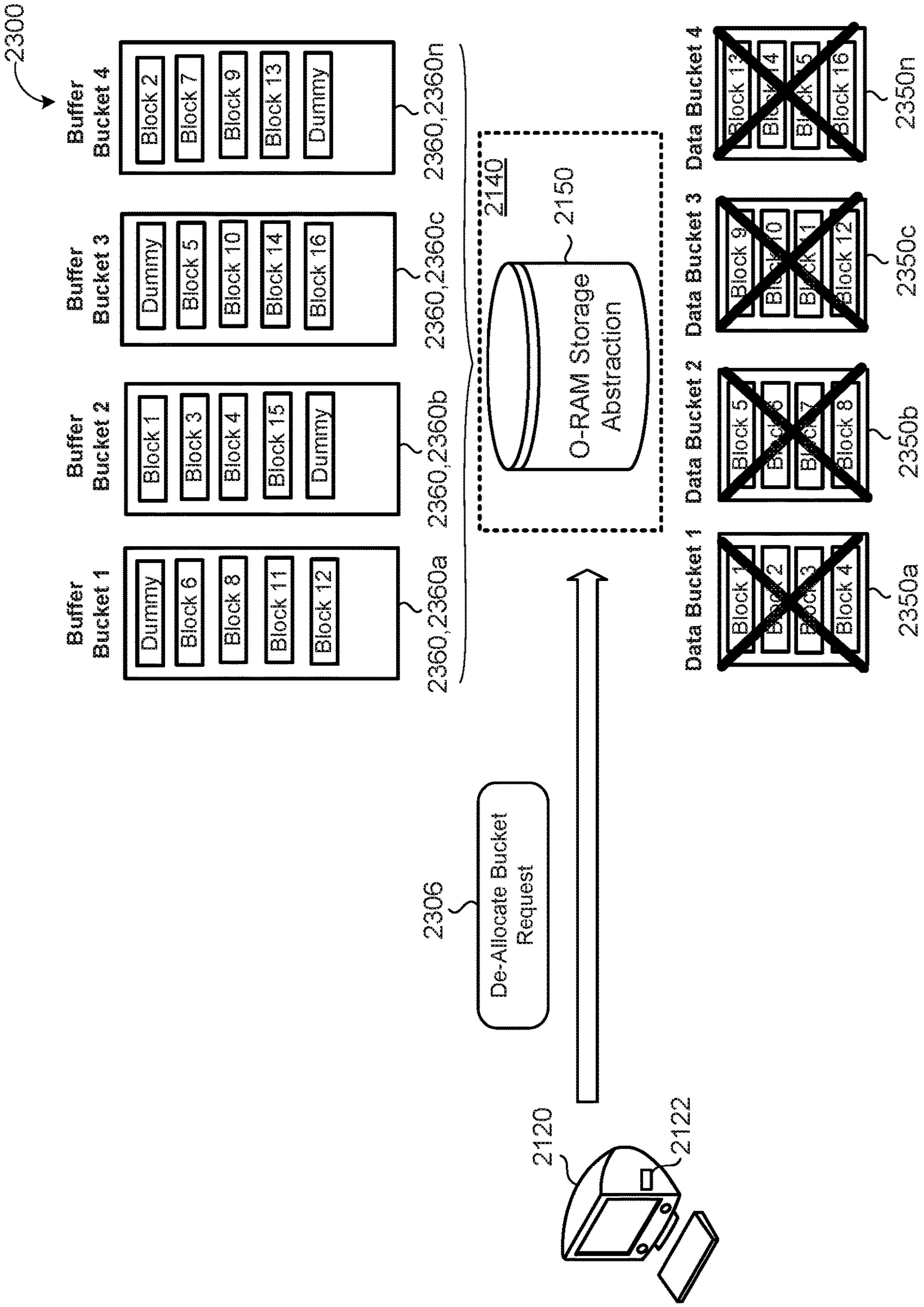
FIG. 2.3J

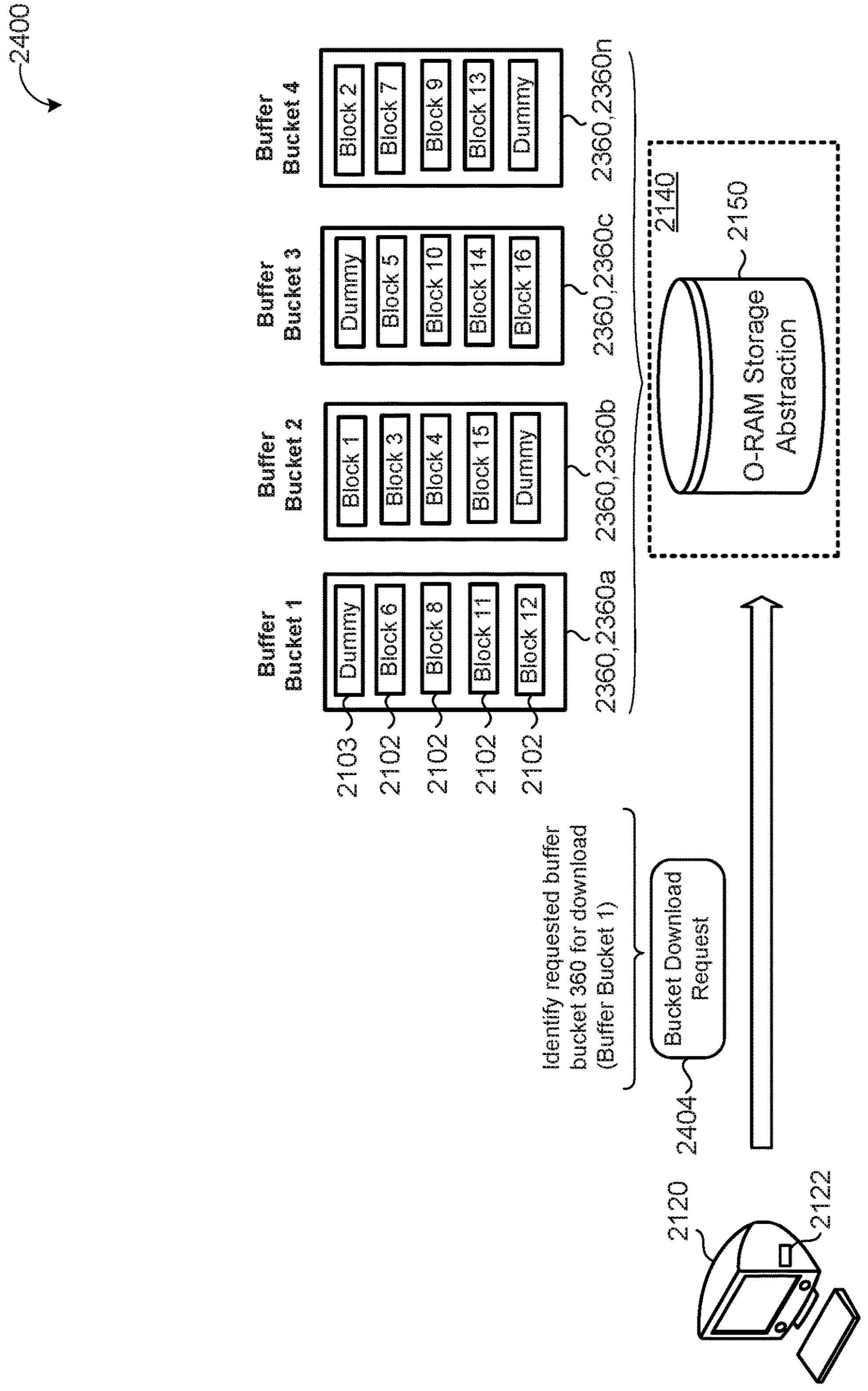
FIG. 2.4A

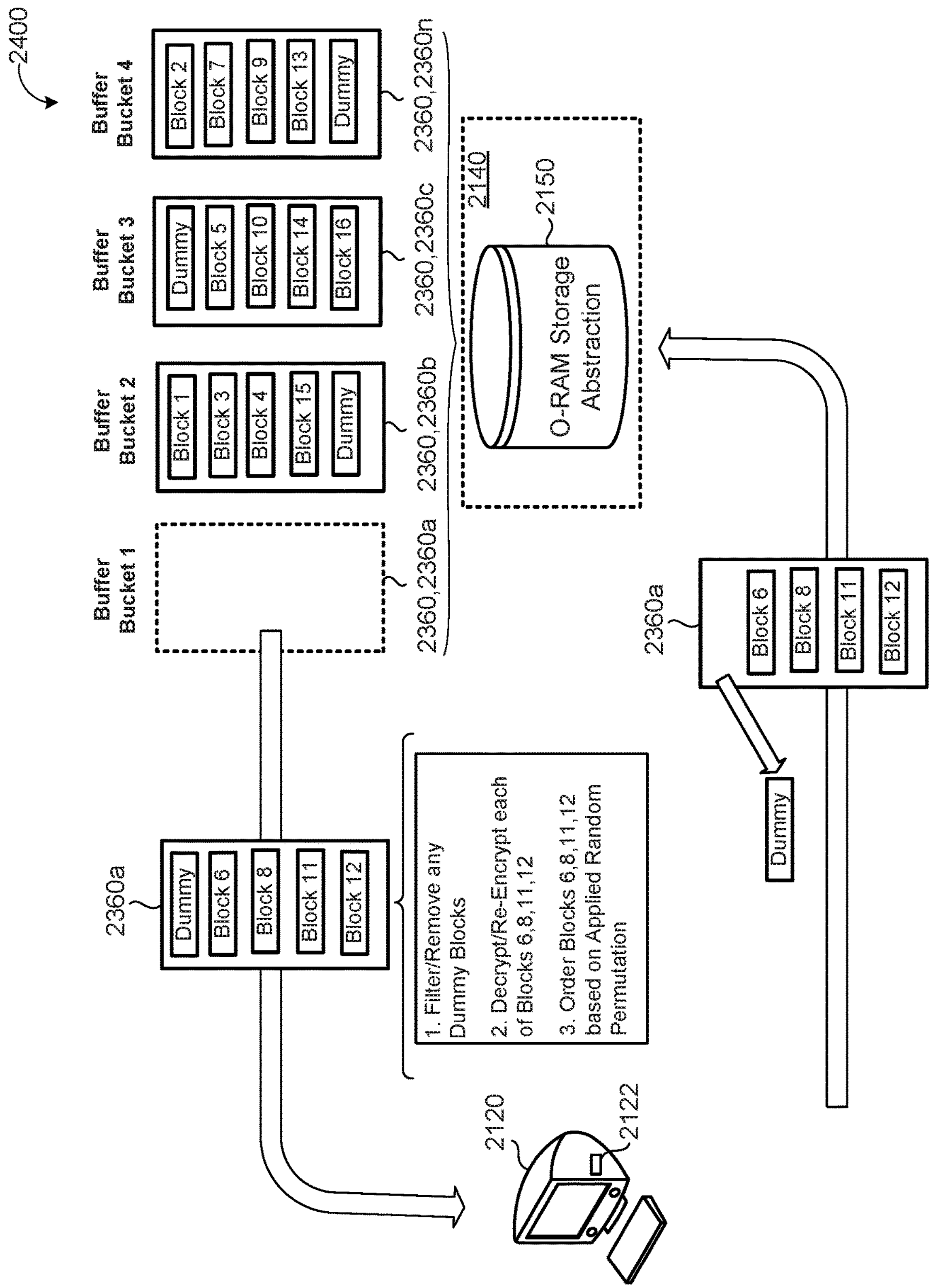
FIG. 2.4B

2500

ObvShuffle$(A, c, \delta)$

1. Generate a random permutation $\pi$ over $[N]$.
2. Run ObvPerm$(\pi, c, \delta)$.

ObvPerm$(\pi, A, c, \delta)$

1. Divide the $N$ items in $A$ into $n$ buckets of size $n$ each. Bucket 1, $A_1$, will contain the items $1, \ldots, n$, bucket 2, $A_2$, will contain the items $n+1, \ldots, 2n$, and so on.
2. Initialize caches $C_1, \ldots, C_n$ to be empty.
3. Initialize $B_1, \ldots, B_n$ new buckets on the server.
4. For each $i = 1, \ldots, n$, run Spray$(\pi, A_i, C_1, \ldots, C_n, c, \delta)$.
5. For each $i = 1, \ldots, n$, run Recalibrate$(\pi, B_i, C_i)$.

Spray$(\pi, A_i, B_1, \ldots, B_n, C_1, \ldots, C_n, c, \delta)$

1. Download $A_i$ from the server.
2. For each $a \in A_i$, compute $\pi(a)$. Furthermore, compute $bucket(a) = \lceil \frac{\pi(a)}{n} \rceil$, the new bucket that $a$ will go into. Enqueue $a$ into $C_{bucket(a)}$.
3. Run a random process to generate $k \in \{\lfloor c \rfloor, \lceil c \rceil\}$ such that $\mathbb{E}[k] = c$.
4. For each $j = 1, \ldots, n$, dequeue $k$ items from $C_j$. Decrypt and re-encrypt all $k$ items. If there are less than $k$ items, create fake items to make up the difference. Upload all $k$ items to $B_j$ on the server.
5. If $|C_1| + \ldots + |C_n| > \delta\sqrt{N}$, then the algorithm fails.

Recalibrate$(\pi, B_i, C_i)$

1. Download $B_i$ from the server.
2. Remove all fake items from $B_i$. Combine all real entries of $B_i$ with $C_i$ and order them correctly according $\pi$.
3. Decrypt and re-encrypt all real items of $B_i$.
4. Upload the correctly ordered $B_i$ back to the server.

FIG. 2.5

2600

RecursiveObvShuffle($A, n, c, \delta$)

1. Generate random permutation $\pi$ over $[N]$.
2. Run RecursiveObvPerm($\pi, A, n, c, \delta$).

RecursiveObvPerm($\pi, A, n, c, \delta$)

1. If $n^2 \geq |A|$, then run ObvPerm($\pi, A, c, \delta$) and terminate.
2. Let $r = \frac{|A|}{n}$ be the number of rounds. For ease, we will assume $n$ divides $|A|$. If not, we can pad enough fake blocks to make it divisible.
3. Split $A$ into $s$ buckets each consisting of $n$ blocks, denoted $A_1, \ldots, A_r$.
4. Initialize caches $C_1, \ldots, C_n$ to be empty.
5. Initialize $B_1, \ldots, B_n$ new buckets on the server of $r$ blocks each.
6. For each $i = 1, \ldots, r$, run RecursiveSpray($\pi, A_i, B_1, \ldots, B_n, C_1, \ldots, C_n, c, \delta$).
7. Run Cleanup($B_1, \ldots, B_n, n, C_1, \ldots, C_n$).
8. For each $i = 1, \ldots, n$, run RecursiveObvPerm($\pi, B_i, n, c, \delta$).

RecursiveSpray($\pi, A_i, B_1, \ldots, B_n, C_1, \ldots, C_n, c, \delta$)

1. Download $A_i$ from the server.
2. Remove all fake blocks from $A_i$.
3. For each $a \in A_i$, compute $\pi(a)$. Furthermore, compute $bucket(a) = \lceil \frac{\pi(a)}{s} \rceil$, the new bucket that $a$ will go into. Enqueue $a$ into $C_{bucket(a)}$.
4. Run a random process to generate $k \in \{\lfloor c \rfloor, \lceil c \rceil\}$ such that $\mathbb{E}[k] = c$.
5. For each $j = 1, \ldots, n$, dequeue $k$ items from $C_j$. Decrypt and re-encrypt all $k$ items. If there are less than $k$ items in $C_j$, create fake items to make up the difference. Upload all $k$ items to $B_j$ on the server.
6. If $|C_1| + \ldots + |C_n| > \delta n$, then the algorithm fails.

Cleanup($B_1, \ldots, B_n, n, C_1, \ldots, C_n$)

1. If any $|C_i| > \log^2 N$, then our algorithm fails.
2. For each $i = 1, \ldots, n$, dequeue $\log^2 N$ items from $C_i$. Decrypt and re-encrypt all $k$ items. If there are less than $k$ items, create fake items to make up the difference. Upload all $\log^2 N$ items to $B_i$ on the server.

FIG. 2.6

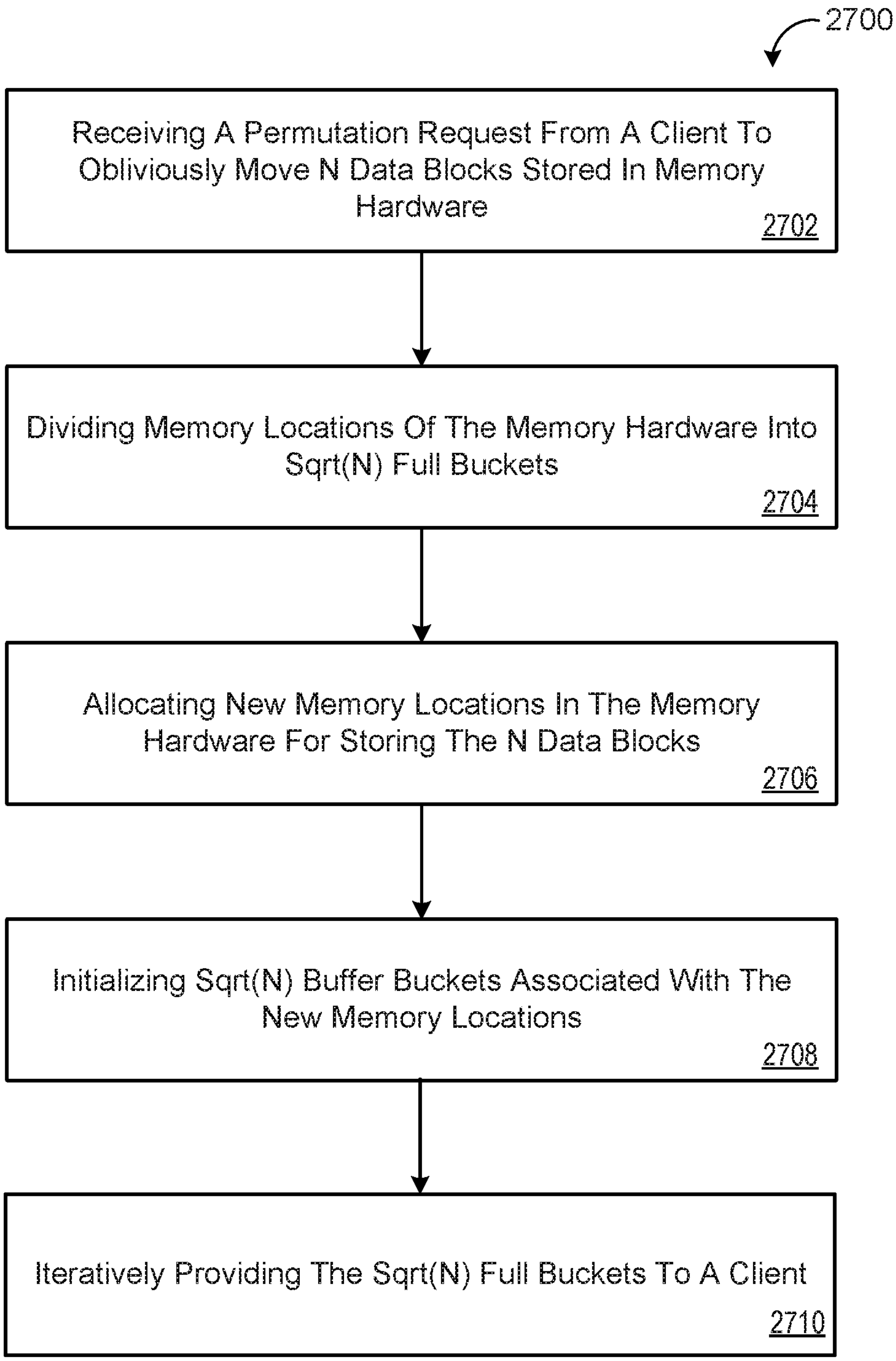
FIG. 2.7

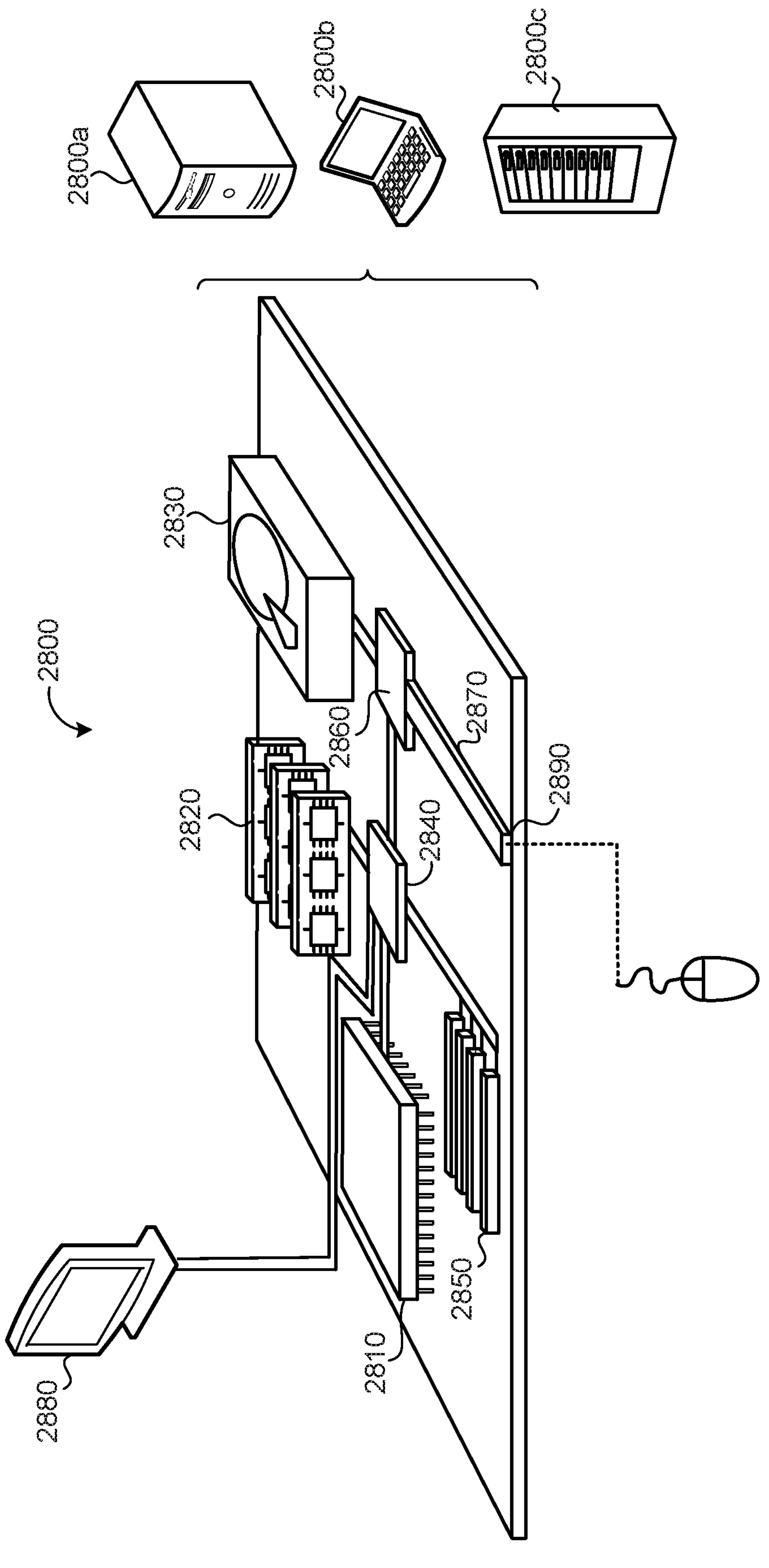
FIG. 2.8

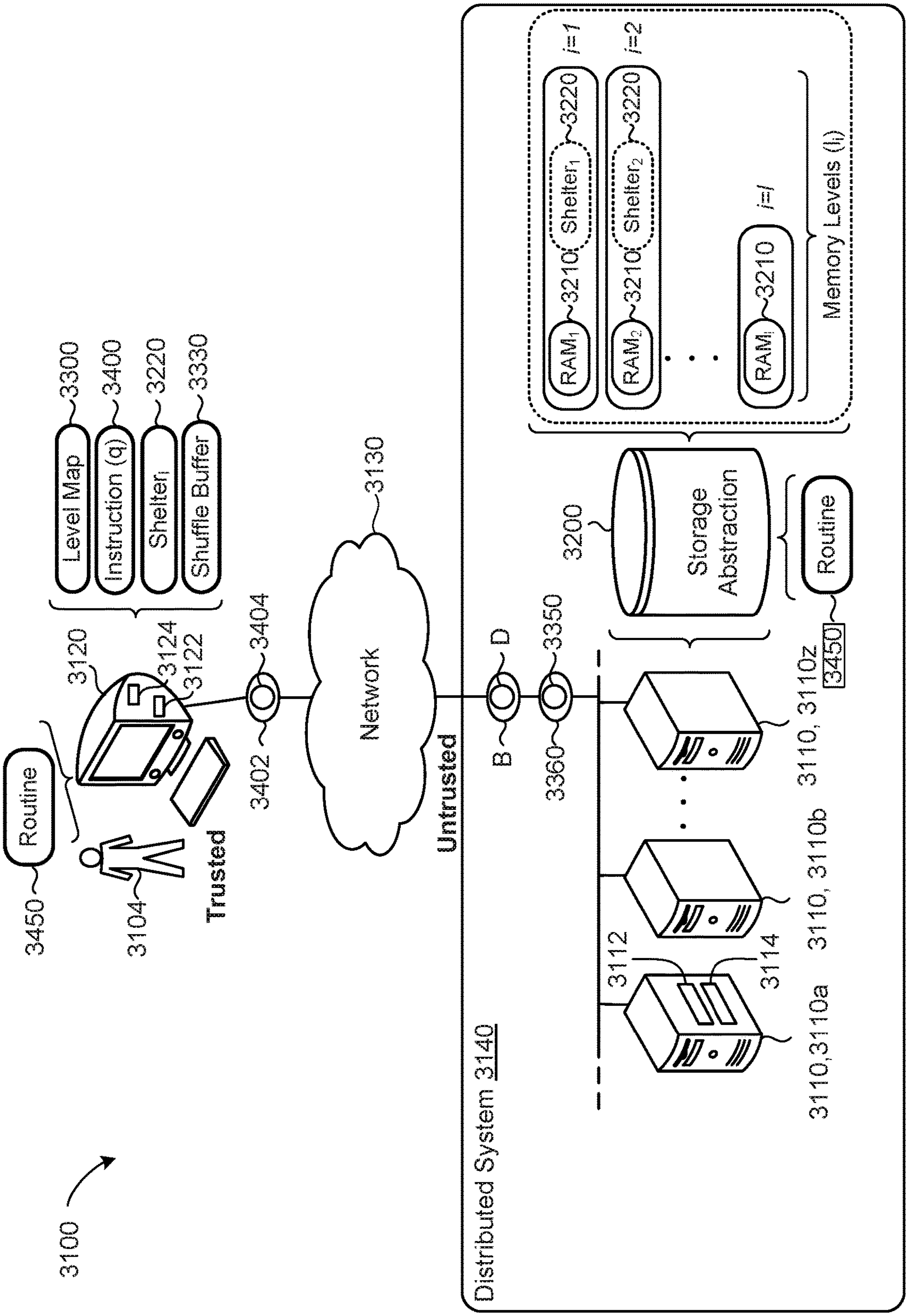
FIG. 3.1A

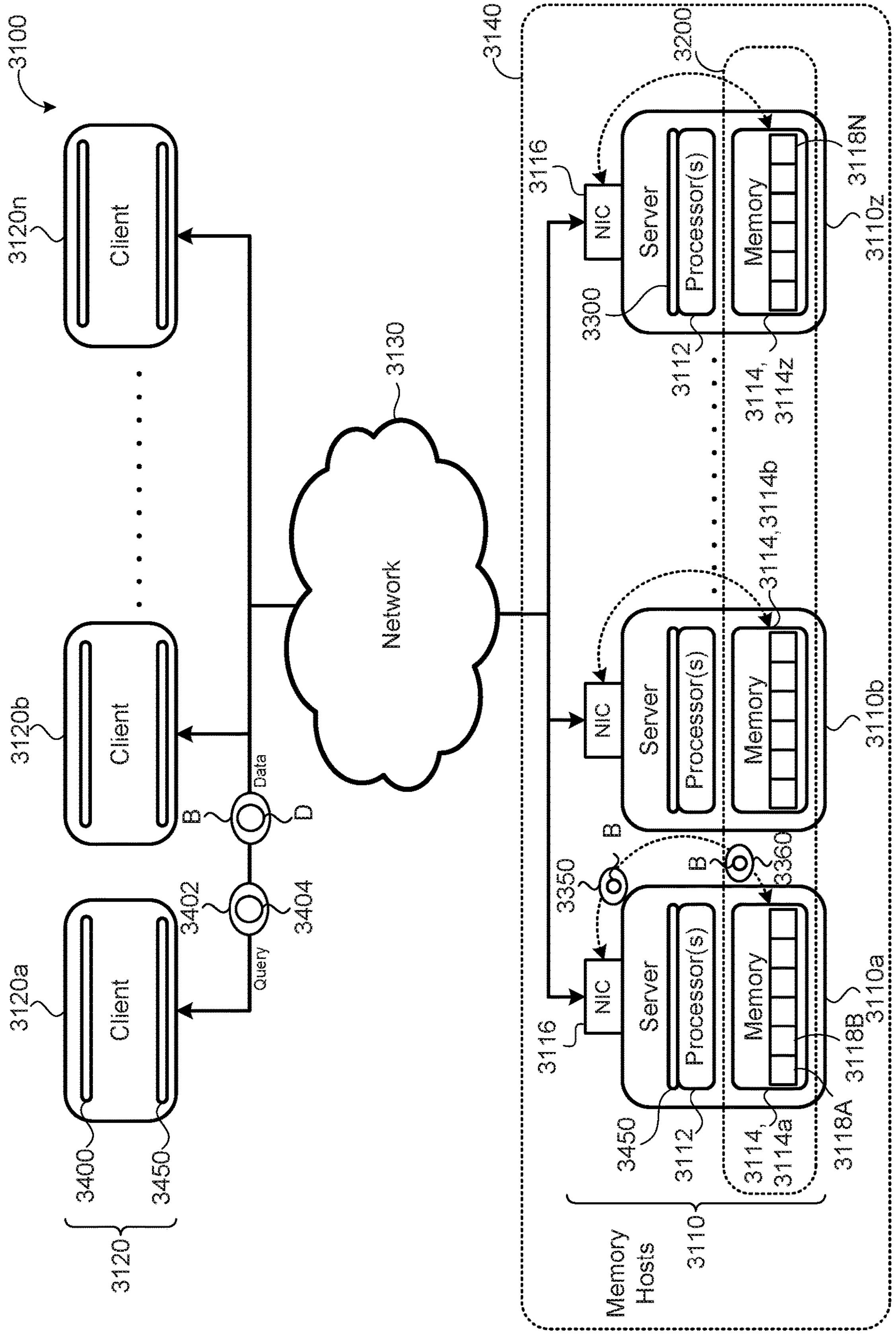
FIG. 3.1B

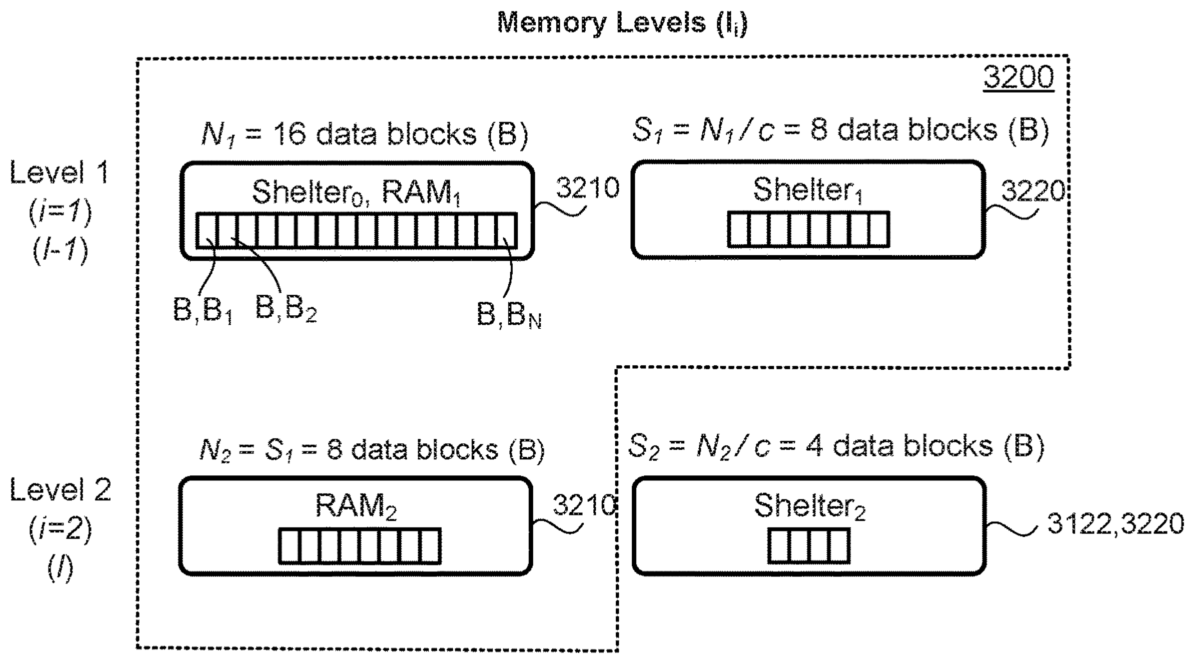
FIG. 3.2

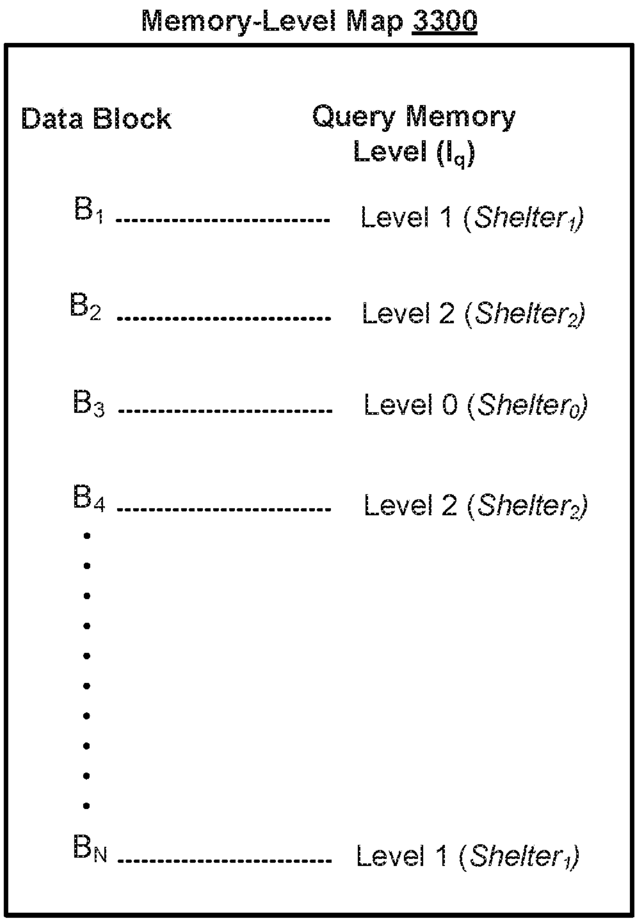
FIG. 3.3

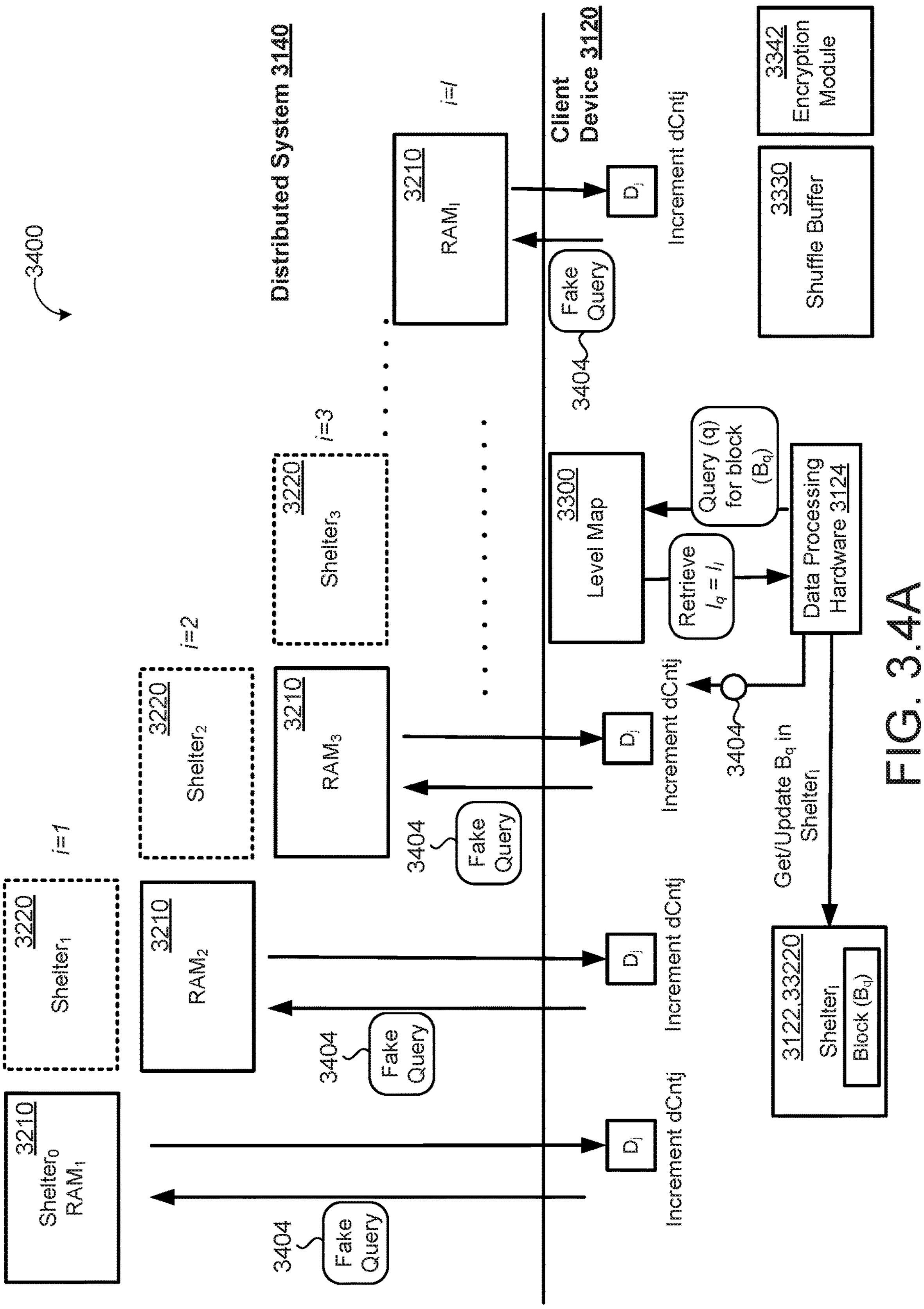
FIG. 3.4A

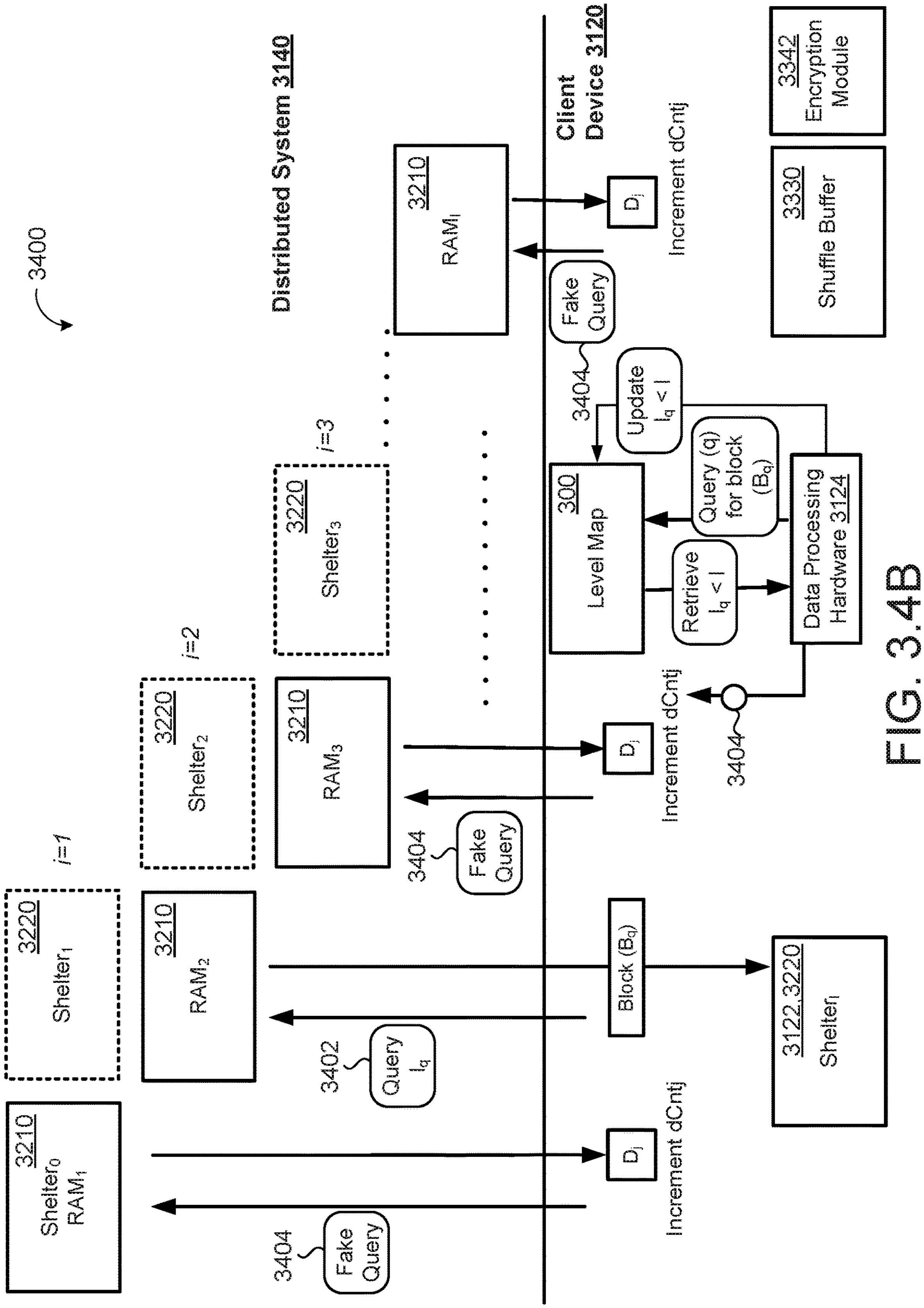
FIG. 3.4B

3500

Init$(N, c, l)$

1. For all $i = 0, \ldots, l-1$, initialize $c_i = 0$, which represents the number of queries since the last shuffle of $M_i$. Therefore, each $c_i$ will be modulus $\frac{N}{c^i}$.
2. For all $i = 0, \ldots, l-1$, initialize $\mathtt{dCnt}_i = 0$, which represents the index of the next dummy block that can be used in $\mathsf{Shelter}_i$.
3. For all $i = 1, \ldots, N$, initialize $l_i = 1$, where $l_i$ is the entry of memory location $i$ in the level map.
4. For all $i = 0, \ldots, l-1$, randomly generate $\pi_i$, representing how the data is currently permuted at $\mathsf{Shelter}_i$. Note, that $\pi_i$ is a permutation over $N_i$ real blocks and $S_i$ dummy blocks.
5. For all $i = 1, \ldots, N_1$, initialize $\mathsf{Shelter}_0[\pi_1(i)]$ to be a real empty data block.
6. For all $i = N_1 + 1, \ldots, N_1 + S_1$, initialize $\mathsf{Shelter}_0[\pi_1(i)]$ to be a dummy block.
7. For all $i = 1, \ldots, l-1$, and for all $j = 1, \ldots, N_i + S_i$, initialize $\mathsf{Shelter}_i[j]$ to be a dummy block.
8. Initialize $\mathsf{Shelter}_l = \emptyset$.

FIG. 3.5

3600

Query($q$)

1. Retrieve $(l_q, p_q)$ from the level map on the client.
2. If $l_q = l$.
   (a) Retrieve $\mathsf{Shelter}_l[q]$ and update $\mathsf{Shelter}_l[q]$ if necessary.
   (b) For all $i = 0, \ldots, l-1$, query $\pi_i(\mathtt{dCnt}_i)$ in $\mathsf{Shelter}_i$.
   (c) For all $i = 0, \ldots, l-1$, increment $\mathtt{dCnt}_i$ by one.
3. If $l_q \neq l$.
   (a) For all $i = 0, \ldots, l_q - 1, l_q + 1, \ldots, l-1$, query $\mathsf{Shelter}_i$ for $\pi_i(\mathtt{dCnt}_i)$.
   (b) Query $\pi_{l_q}(p_q)$ from $\mathsf{Shelter}_{l_q}$.
   (c) For all $i = 0, \ldots, l_q - 1, l_q + 1, \ldots, l-1$, increment $\mathtt{dCnt}_i$ by one.
   (d) Place the retrieve data block from $\mathsf{Shelter}_{l_q}$ into location $q$ in $\mathsf{Shelter}_l$. If the entry already exists, overwrite the old version.
   (e) Update the position map such that $l_q = l, p_q = q$.
4. For all $i = 0, \ldots, l-1$, increment $c_i$ by one.
5. Pick the smallest $i$ such that $c_i = 0$. If none exists, terminate.
6. For each $q$ such that $l_q \in \{i, \ldots, l\}$, update $l_q = i$.
7. For all $j = l-1, \ldots, i$, perform ObliviousShuffle($\mathsf{Shelter}_j, \mathsf{Shelter}_{j+1}$).

FIG. 3.6

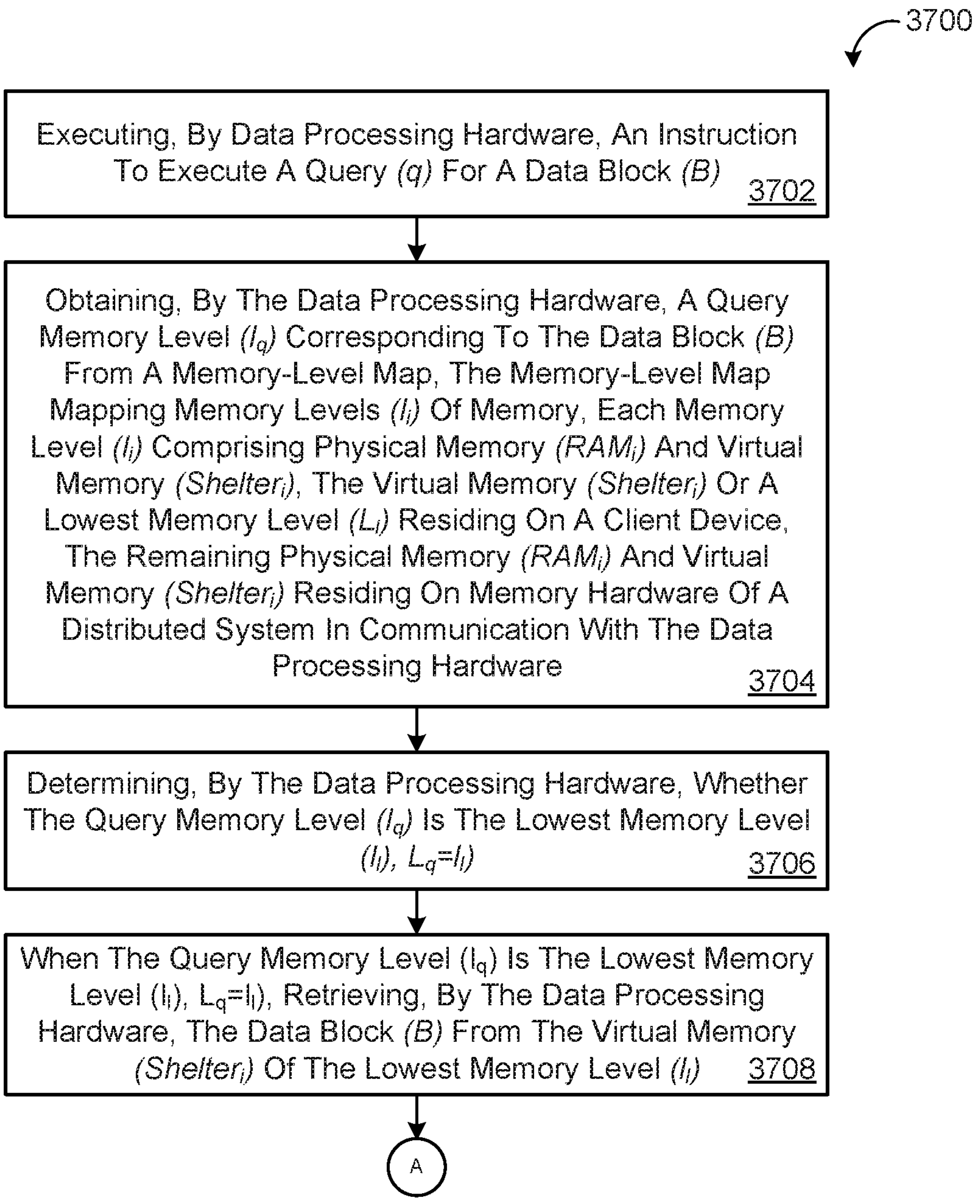
FIG. 3.7A

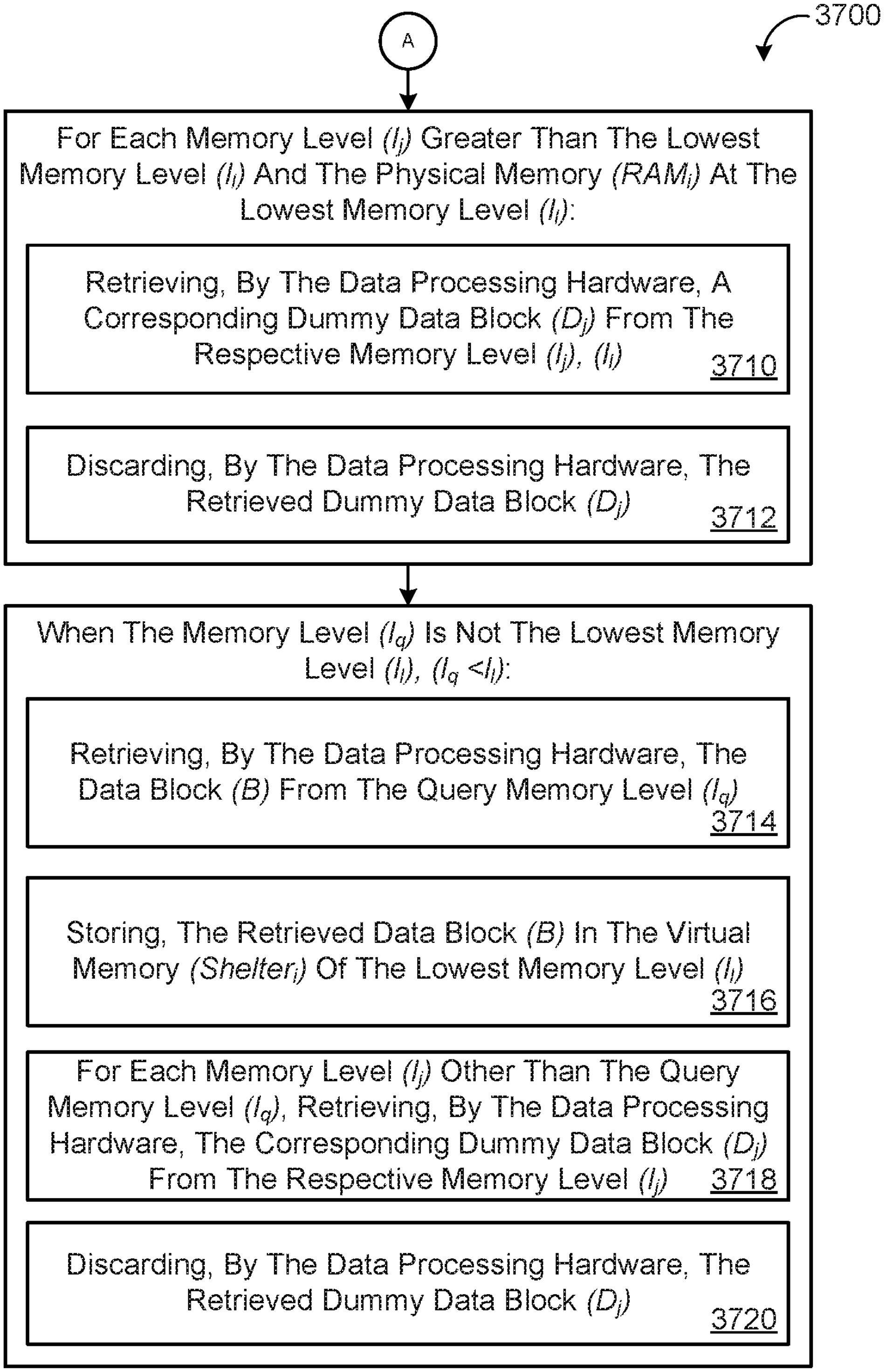
FIG. 3.7B

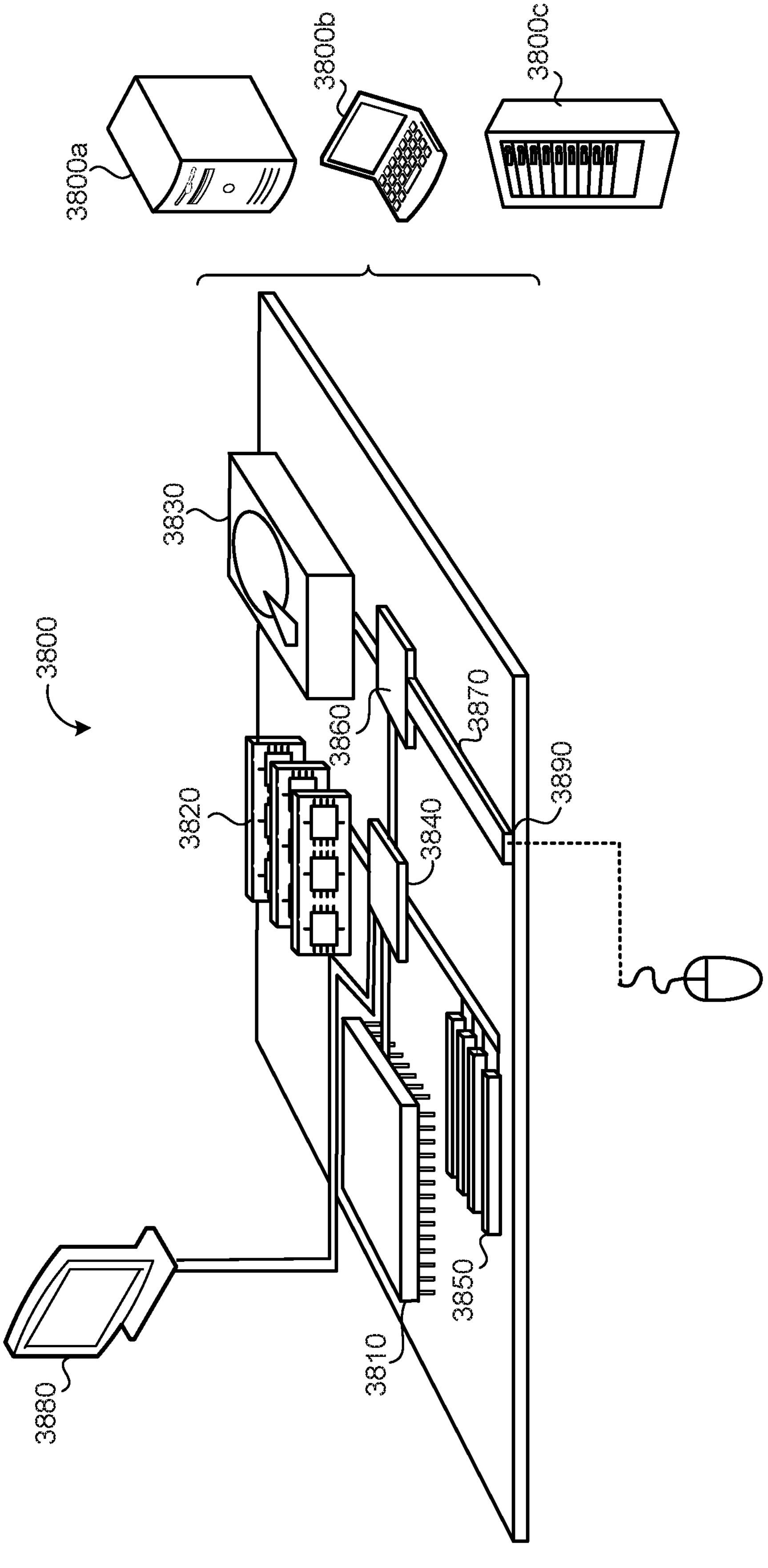
FIG. 3.8

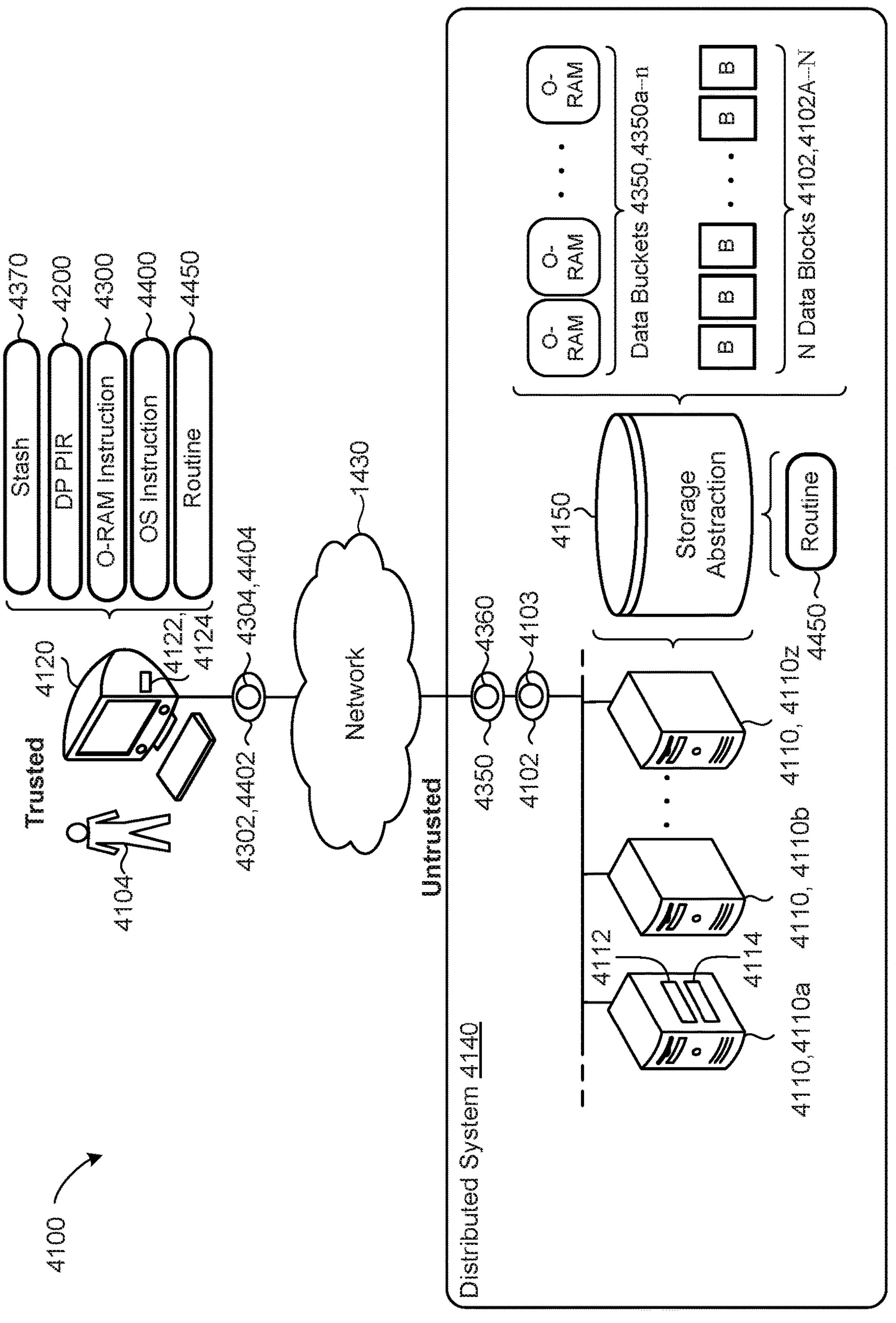
FIG. 4.1A

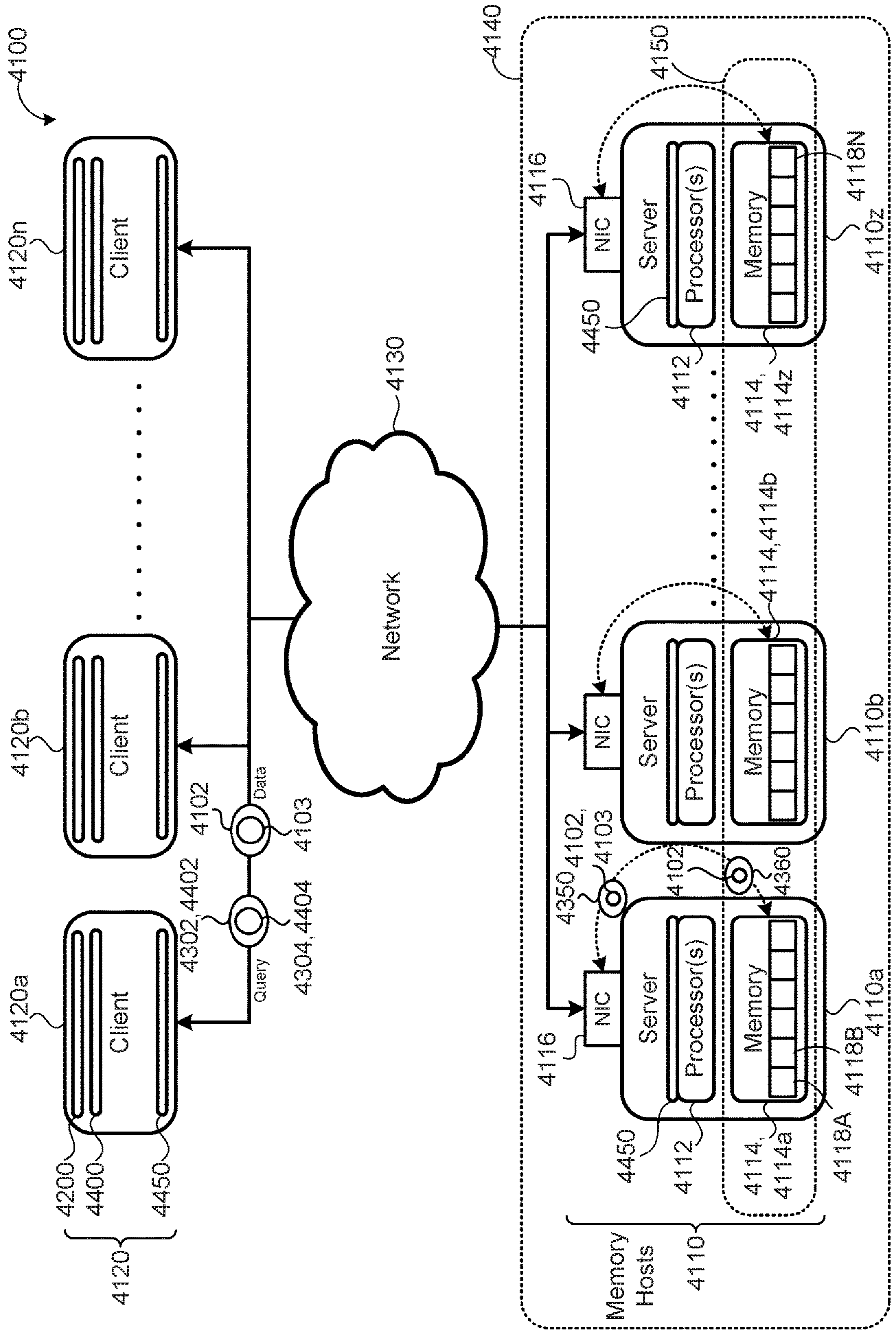
FIG. 4.1B

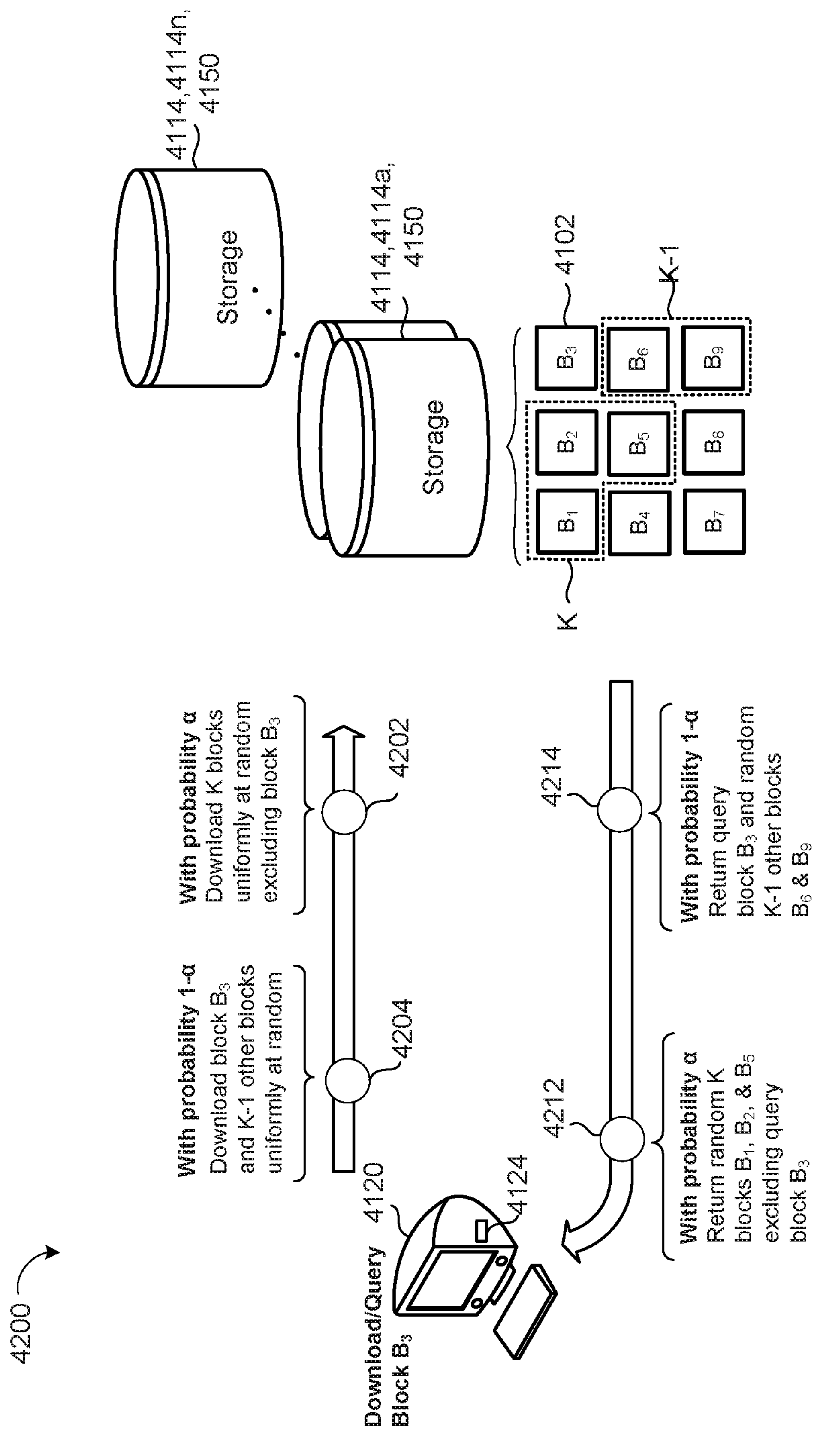
FIG. 4.2A

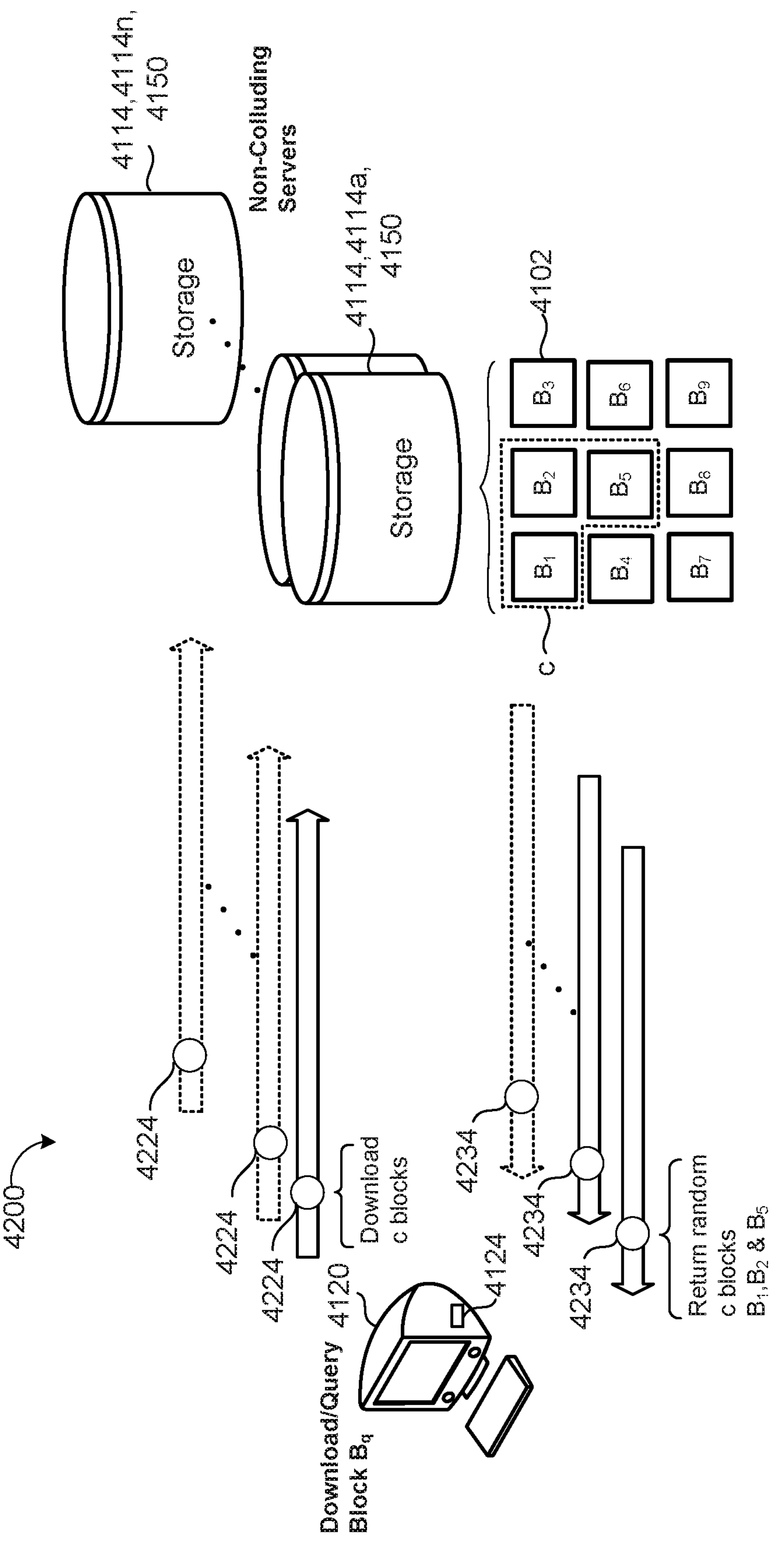
FIG. 4.2B

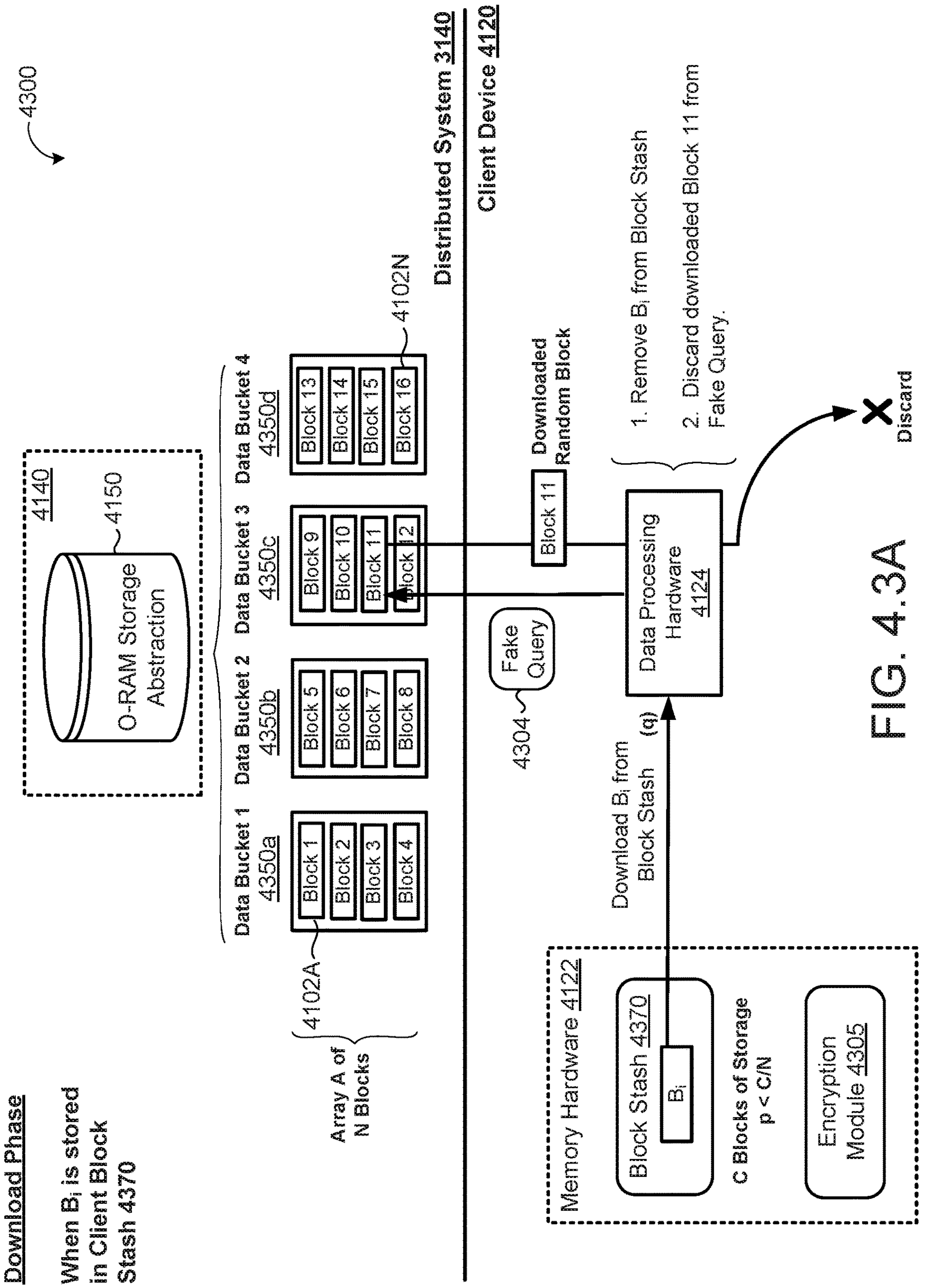
FIG. 4.3A

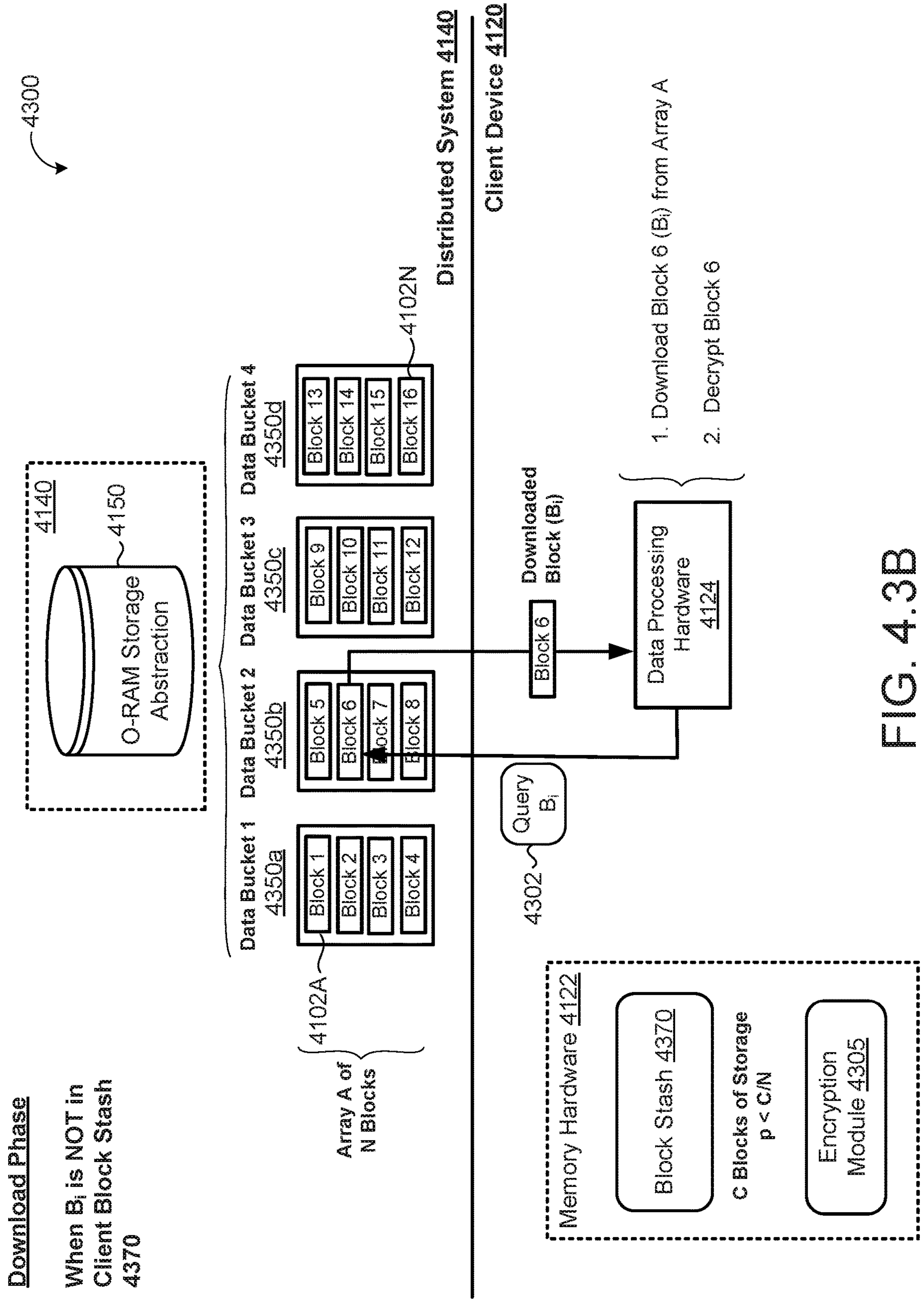
FIG. 4.3B

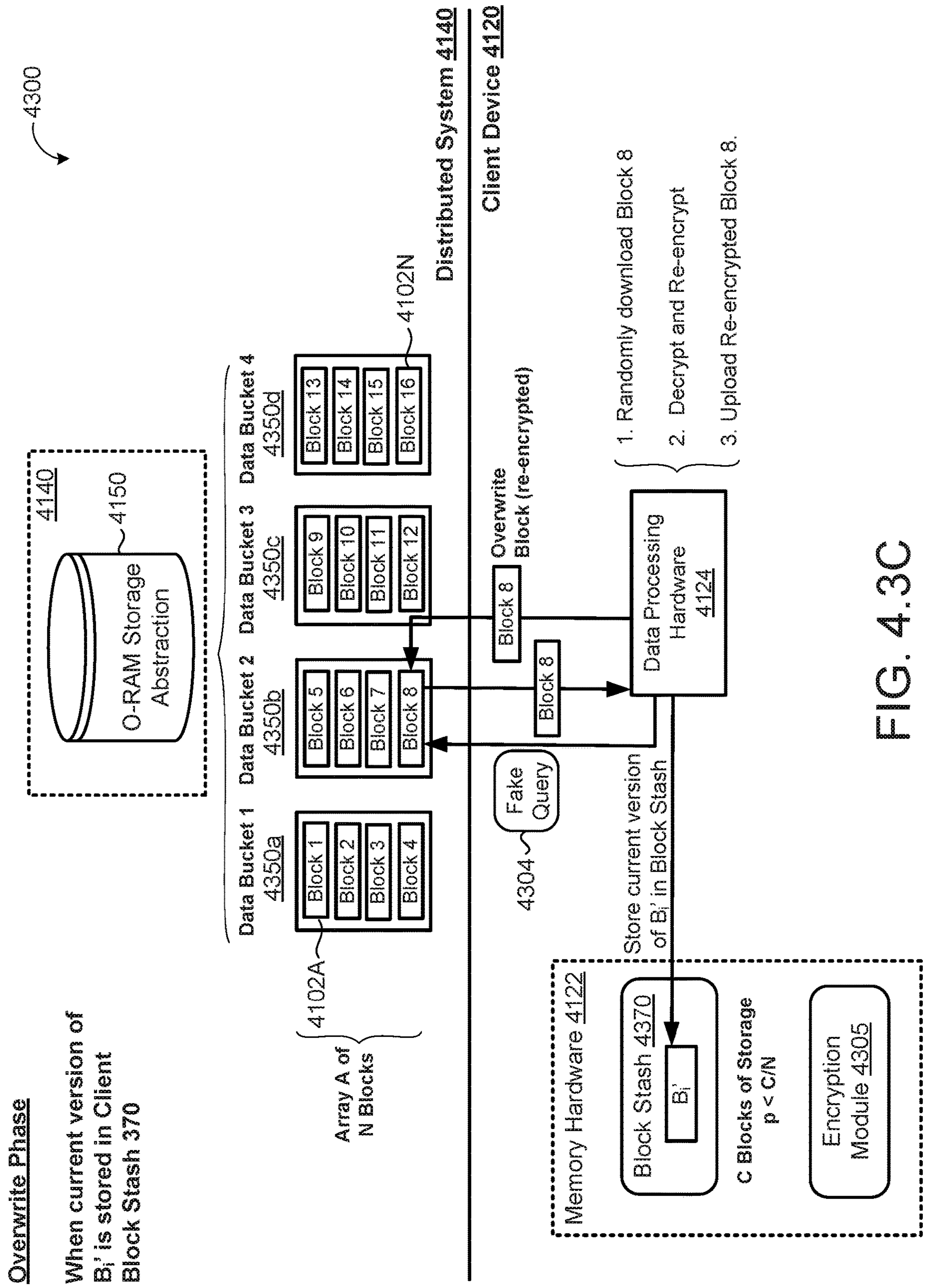
FIG. 4.3C

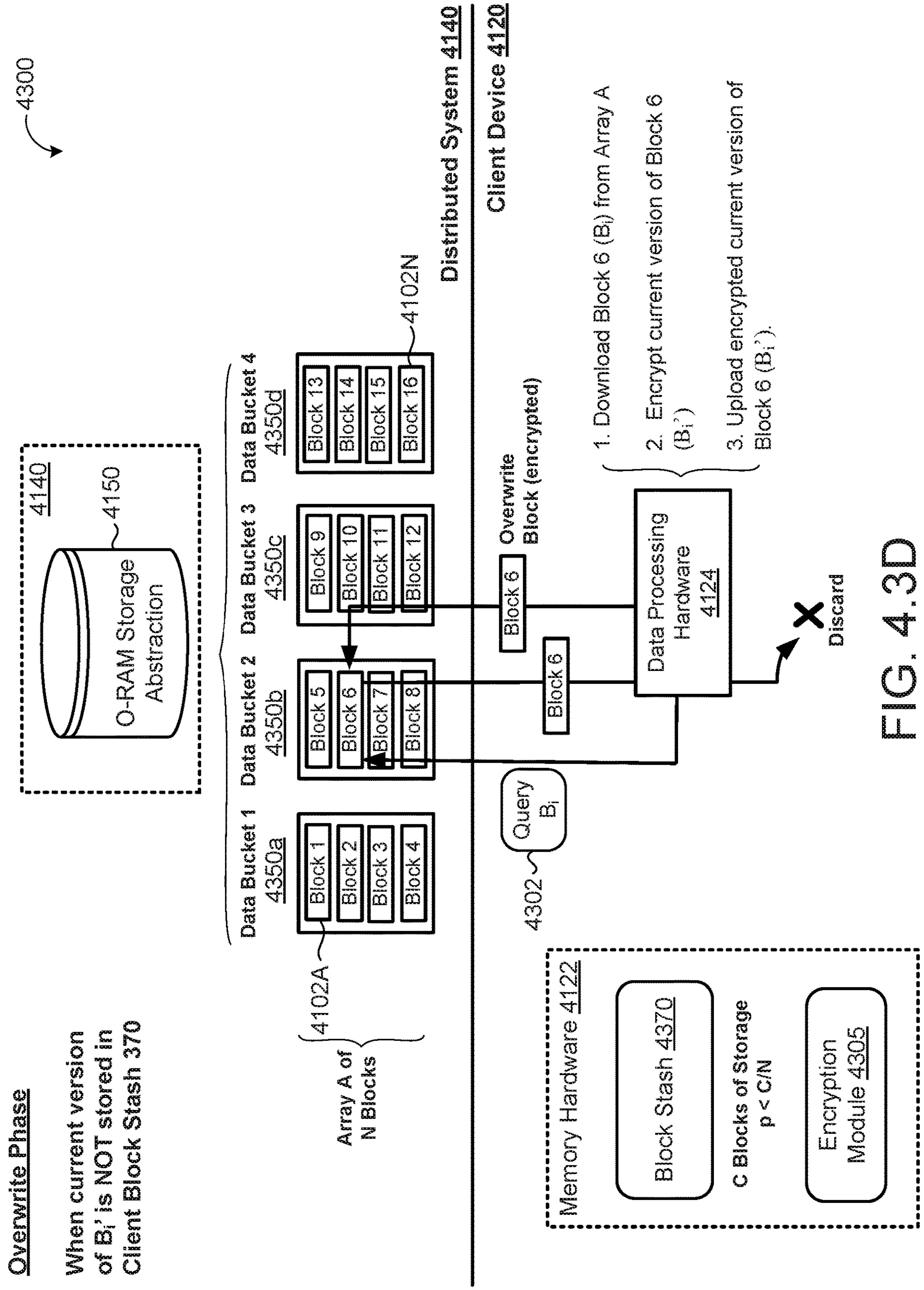
FIG. 4.3D

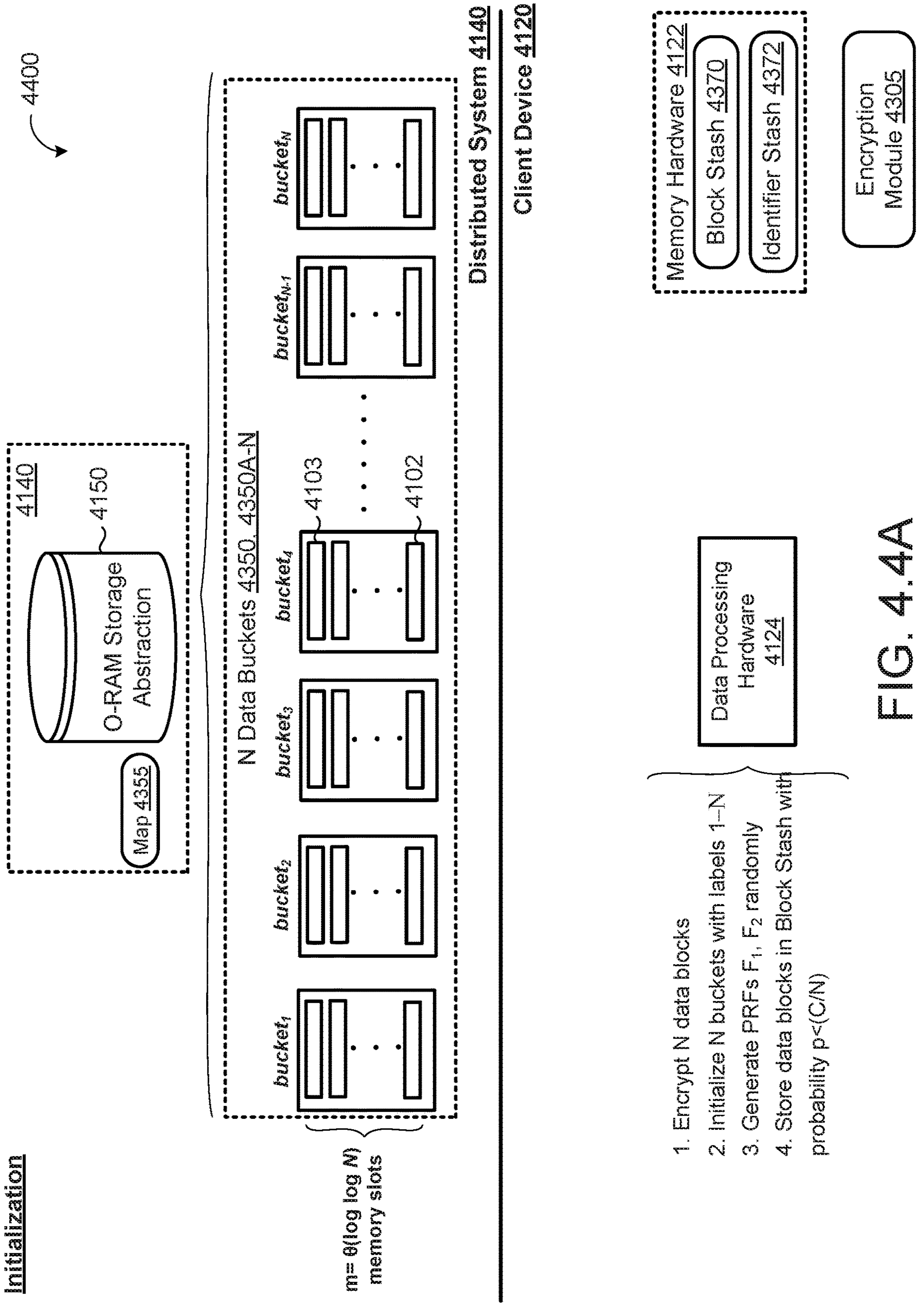
FIG. 4.4A

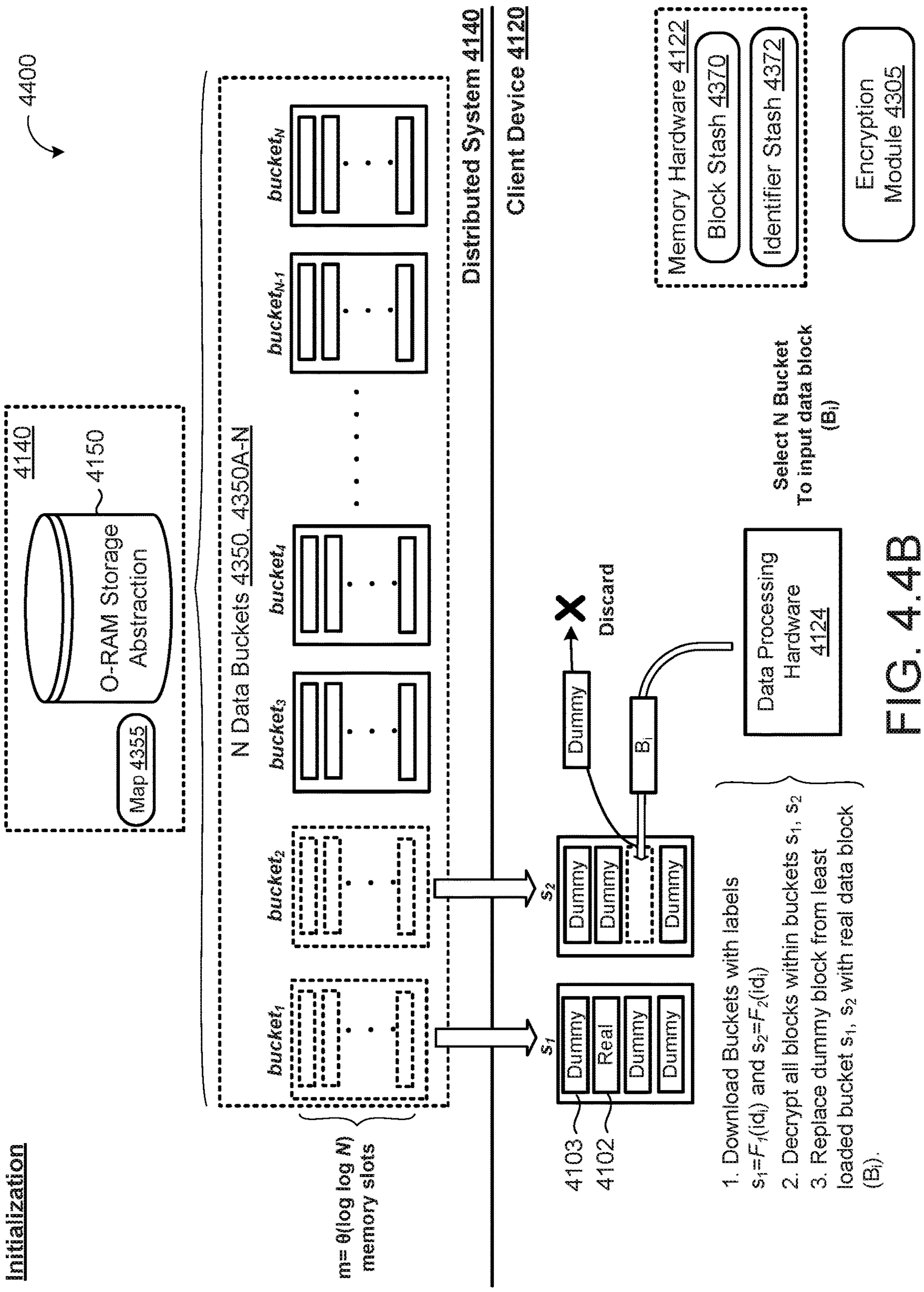
FIG. 4.4B

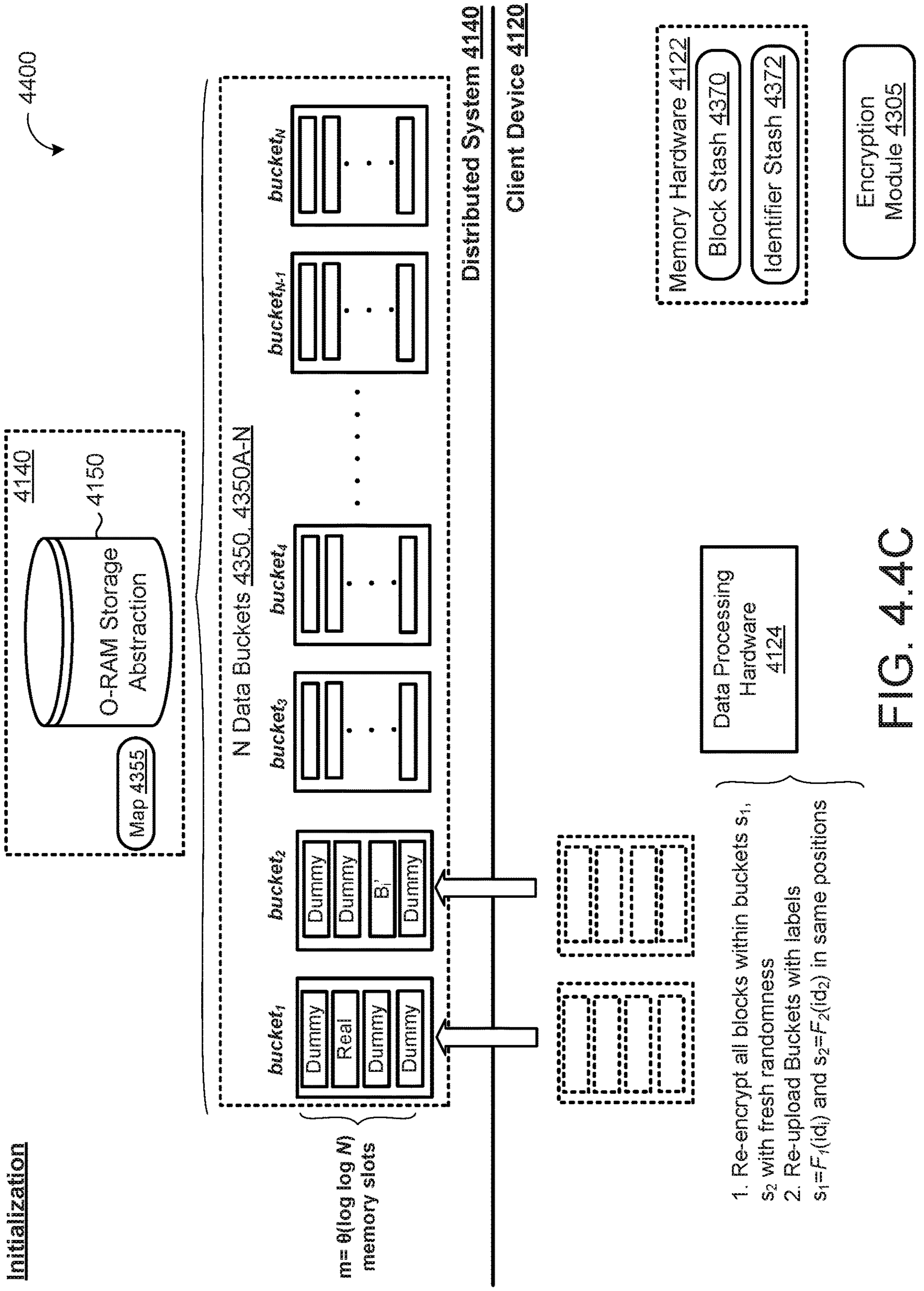
FIG. 4.4C

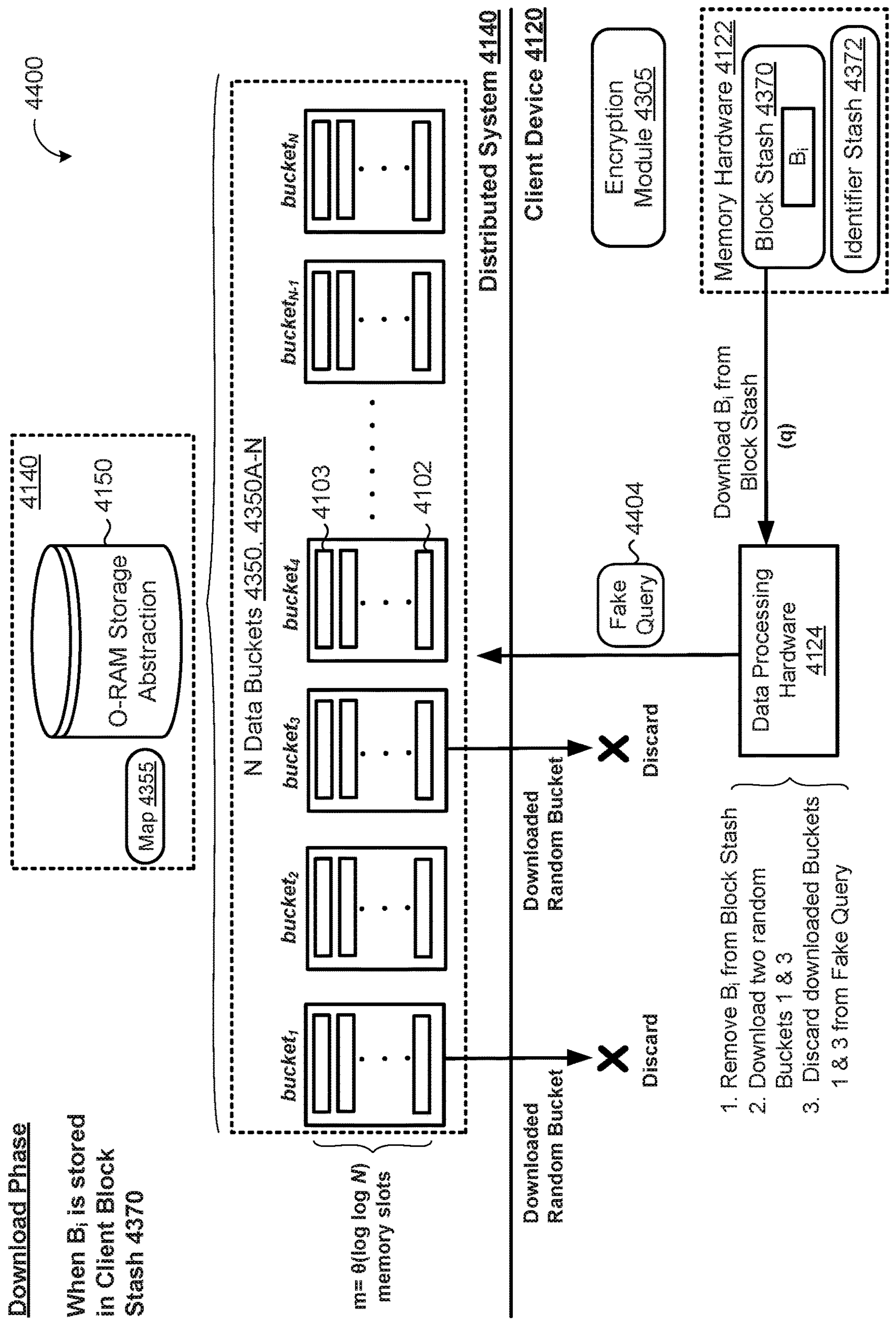
FIG. 4.5A

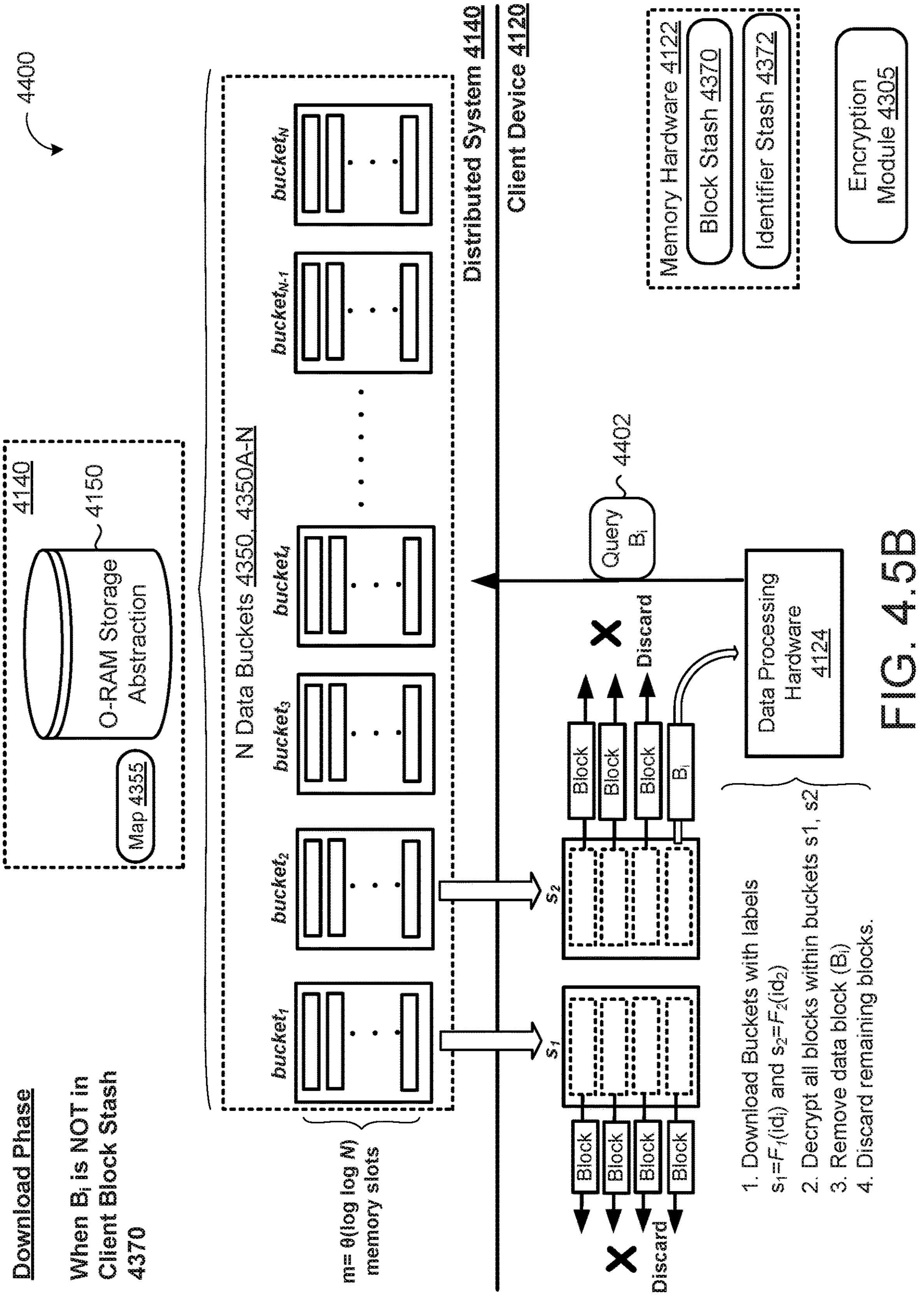
FIG. 4.5B

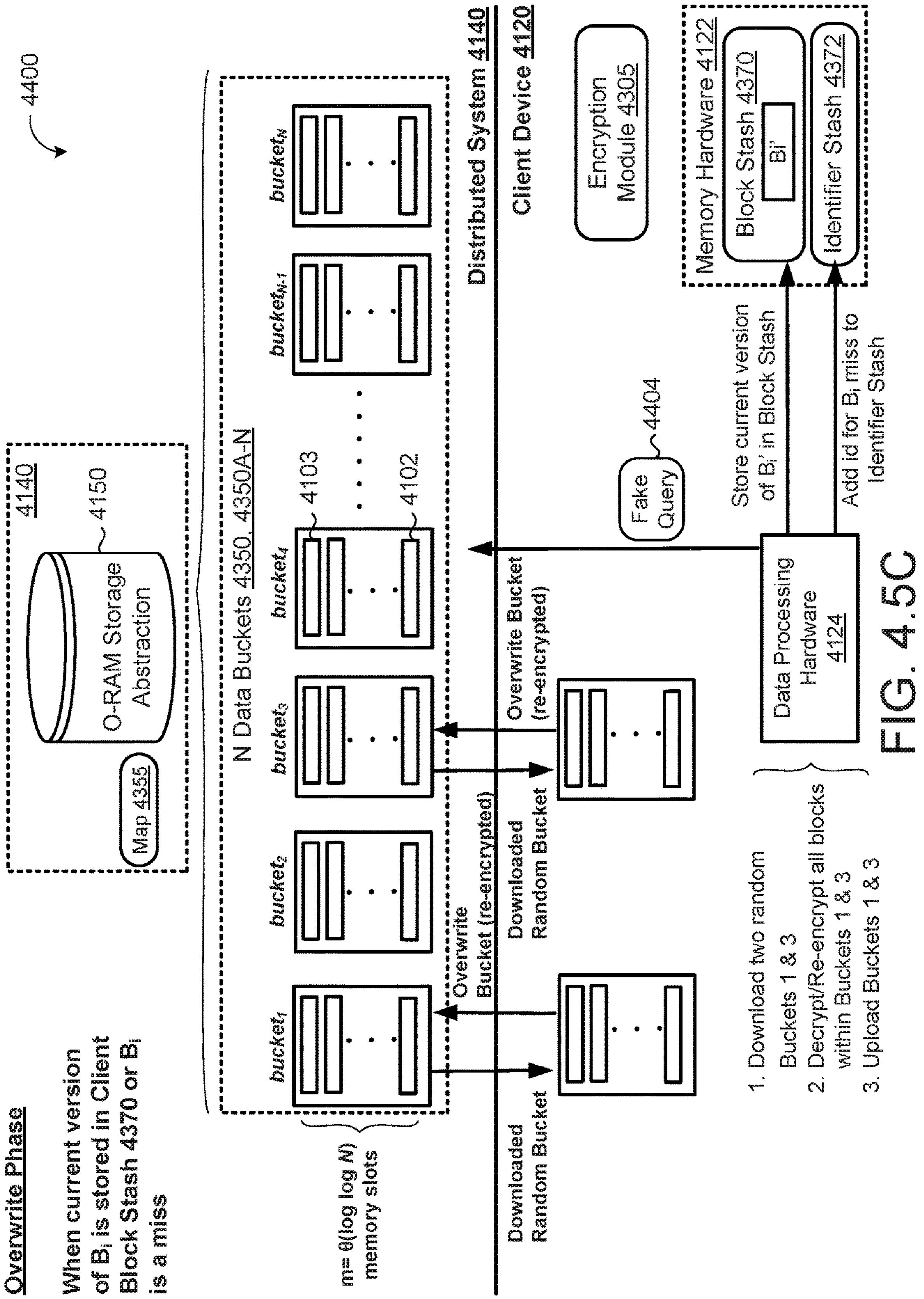
FIG. 4.5C

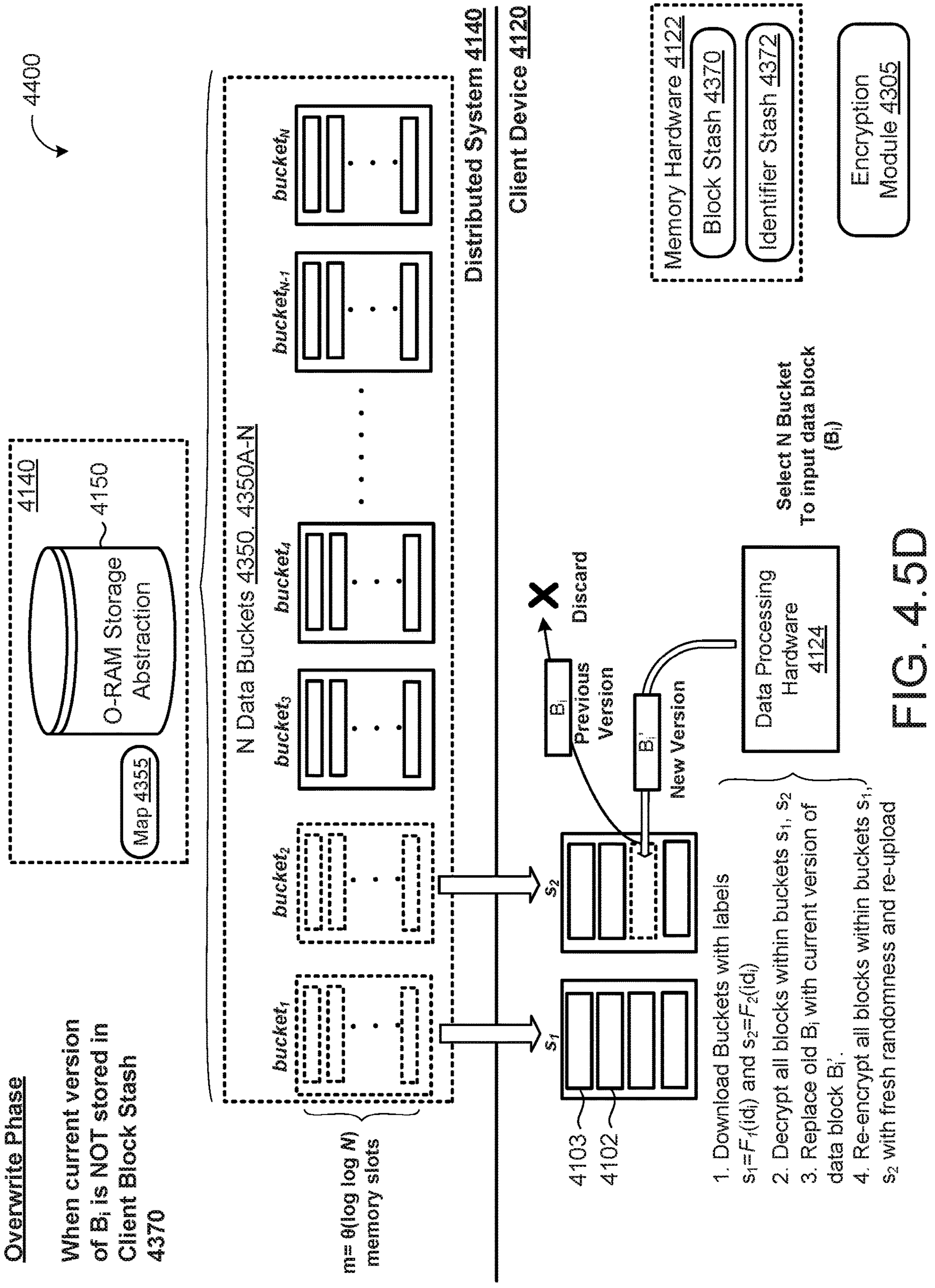
FIG. 4.5D

4600

We use a hash function $H_K : \mathcal{K} \to [L]$ with a randomly chosen key $K$. For each $i \in [N]$, block $B_i$ is inserted into bucket $H_K(k_i)$. Insertion into bucket $H_K(k_i)$ is performed as follows:

1. Bucket $H_K(k_i)$ is downloaded. That is, all blocks stored in nodes on the unique path from the root to the $H_K(k_i)$-th leaf. Decrypt all blocks.
2. If no dummy block remains in bucket $H_K(k_i)$, then block $B_i$ is placed into the stash. If the stash is completely full already, then the algorithm fails.
3. When there is a dummy block in bucket $H_K(k_i)$, the dummy block occupying the smallest level (closest to the leaf) is removed and replaced by $B_i$.
4. Encrypt all blocks of bucket $H_K(k_i)$ and place them back into their corresponding locations on the tree.

To query for block $B_i$, the client simply computes $H_K(k_i)$ and retrieves bucket $H_K(k_i)$. All blocks are decrypted and the corresponding block is found either in the decrypted blocks or in the client stash.

FIG. 4.6

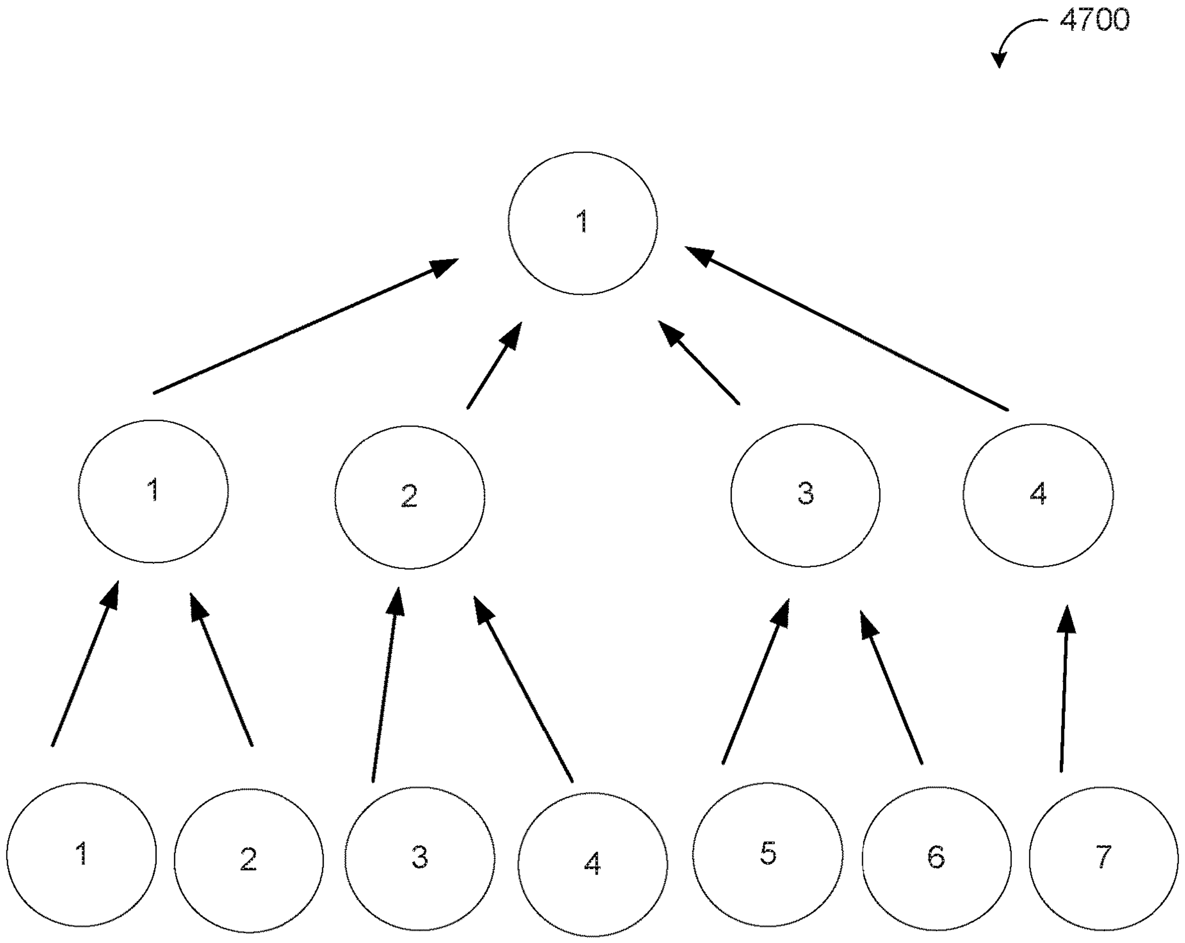
FIG. 4.7

4800

We use $D$ hash functions $H_K : \mathcal{K} \rightarrow [N]$ with $D$ randomly chosen keys $K_1, \ldots, K_D$. To insert block $B_i$ with identifier $k_i$ is done as follows:

1. All $D$ buckets $H_{K_1}(k_i), \ldots, H_{K_D}(k_i)$ are downloaded. That is, all blocks stored in nodes on the unique path from the root to the $H_{K_1}(k_i), \ldots, H_{K_D}(k_i)$-th leaf. Decrypt all blocks.
2. If no dummy block remains in any $D$ buckets, then block $B_i$ is placed into the stash. If the stash is completely full already, then the algorithm fails.
3. When there is a dummy block in any of the $D$ buckets, the dummy block occupying the smallest level (closest to the leaf) is removed and replaced by $B_i$.
4. Encrypt all blocks of all $D$ buckets and place them back into their corresponding locations on the tree.

To query block $B_i$, we simply download all the $D$ buckets, $H_{K_1}(k_i), \ldots, H_{K_D}(k_i)$. Decrypt all blocks in all $D$ buckets. Afterwards, we check any of the $D$ buckets or the stash for block $B_i$.

FIG. 4.8

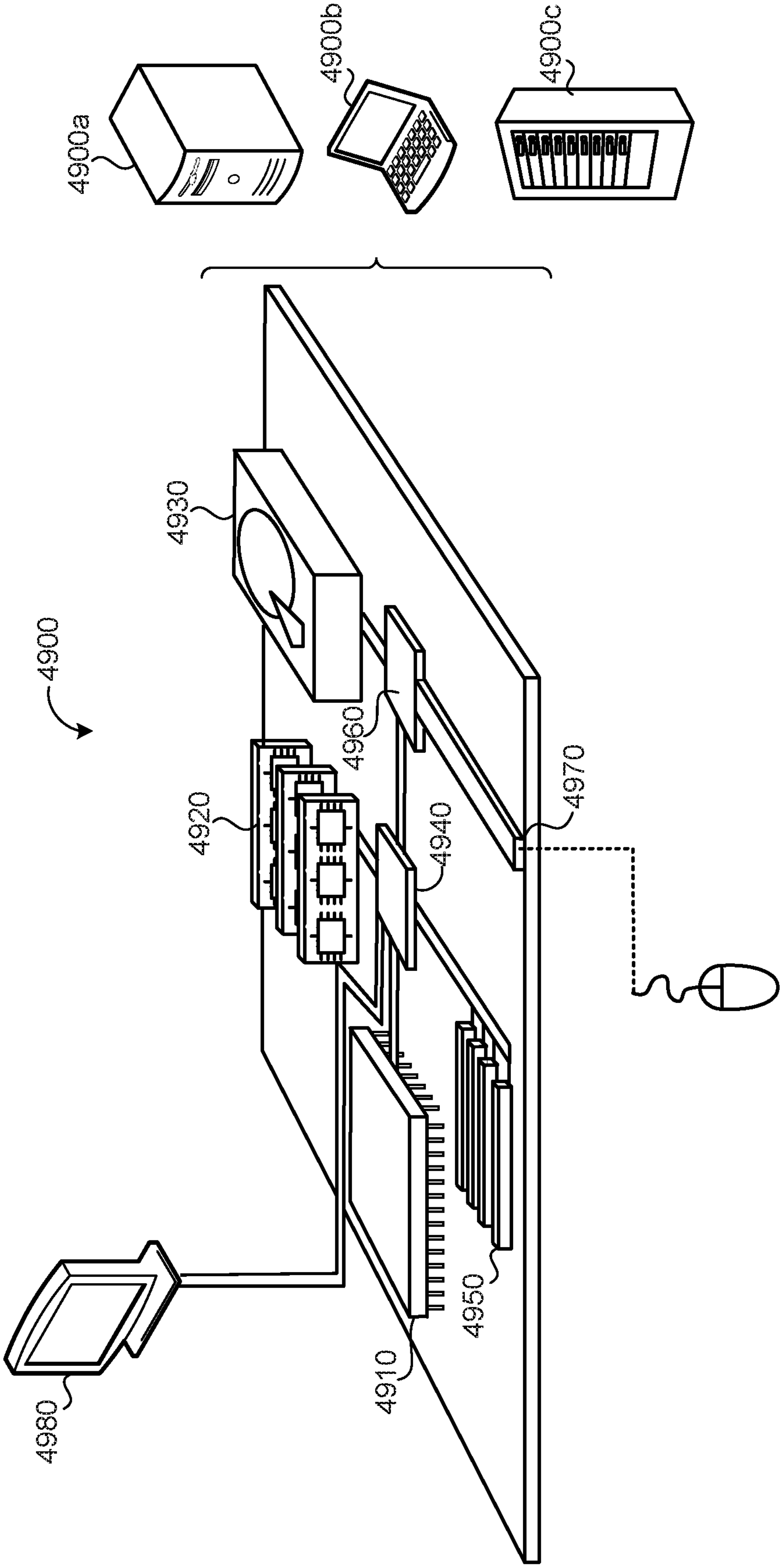
FIG. 4.9

ENCRYPTED SEARCH CLOUD SERVICE WITH CRYPTOGRAPHIC SHARING

CROSS REFERENCE TO RELATED APPLICATIONS

This U.S. patent application is a continuation of, and claims priority under 35 U.S.C. § 120 from, U.S. patent application Ser. No. 18/159,674, filed on Jan. 25, 2023, which is a continuation of U.S. patent application Ser. No. 17/446,456, filed on Aug. 30, 2021, which is a continuation of U.S. patent application Ser. No. 16/781,169, filed on Feb. 4, 2020, now U.S. Pat. No. 11,126,742, which is a continuation of U.S. patent application Ser. No. 15/878,871, filed on Jan. 24, 2018, now U.S. Pat. No. 10,592,685, which claims priority under 35 U.S.C. § 119(e) to: U.S. Provisional Application No. 62/490,804, filed on Apr. 27, 2017; U.S. Provisional Application No. 62/508,374, filed on May 18, 2017; U.S. Provisional Application No. 62/508,523, filed on May 19, 2017; and U.S. Provisional Application No. 62/597,781, filed on Dec. 12, 2017. The disclosures of these prior applications are considered part of the disclosure of this application and are hereby incorporated by reference in their entireties.

TECHNICAL FIELD

This disclosure relates to providing search functionality with cryptographic sharing over encrypted items stored on a distributed system.

BACKGROUND

Enterprises and individual users are using distributed storage systems (i.e., cloud storage services) to store data on memory overlying multiple memory locations. Many of these enterprises and individuals encrypt their data before uploading the data onto the distributed storage system. In order to use essential functionalities offered by the cloud storage services, such as performing search queries on stored data, enterprises are required to provide plaintext access to the cloud storage services. As a result, some government and sensitive private sectors, such as health, finance, and legal may be reluctant to use cloud storage services, despite their increased convenience and cost advantages. Additionally, encryption alone may not suffice for ensuring data privacy, as the mere knowledge of data access patterns can provide a significant amount of information about the data without ever needing to decrypt the data.

SUMMARY

Section A: Encrypted Search Cloud Service with Cryptographic Sharing

One aspect of the disclosure provides a method for sharing read access. The method includes receiving, at data processing hardware, a shared read access command from a sharor sharing read access to a sharee for a document stored on memory hardware in communication with the data processing hardware. The shared read access command includes an encrypted value and a first cryptographic share value based on a write key for the document, a read key for the document, a document identifier identifying the document, and a sharee identifier identifying the sharee. The method also includes receiving, at the data processing hardware, a shared read access request from the sharee and multiplying, by the data processing hardware, the first cryptographic share value and the second cryptographic share value to determine a cryptographic read access value. The shared read access request includes the sharee identifier, the document identifier, and a second cryptographic share value based on the read key for the document and a sharee cryptographic key associated with the sharee. The cryptographic read access value authorizes read access to the sharee for the document. The method further includes storing, by the data processing hardware, a read access token for the sharee including the cryptographic read access value and the encrypted value in a user read set of the memory hardware. The user read set includes a list of sharee identifiers associated with sharees having read access to the document.

Implementations of the disclosure may include one or more of the following optional features. In some implementations, the sharor is configured to: send the read key for the document to the sharee over a secure and authenticated communication link; create metadata for the document; compute the encrypted value by encrypting the metadata for the document using the read key; and send the shared read access command to the data processing hardware. The first cryptographic share value may be calculated based on a function of the write key and the document identifier divided by a function of the read key and the sharee identifier. The second cryptographic share value may be calculated based on a function of the read key and the sharee identifier divided by a function of the sharee cryptographic key and the document identifier.

In some examples, the method includes receiving, at the data processing hardware, a revoke read access command from the sharor revoking read access from the sharee for the document stored on the memory hardware and removing, by the data processing hardware, the read access token for the sharee from the user read set. In response to receiving the revoke read access command, the method may include determining, by the data processing hardware, whether a corresponding write access token exists for the sharee in a user write set of the memory hardware. When the corresponding write access token exists, the method may include removing, by the data processing hardware, the write access token from the memory hardware.

After storing the read access token for the sharee, the method may include receiving, at the data processing hardware, a search query for a keyword in the document from the sharee. The search query may include the sharee identifier, the document identifier and a cryptographic search value based on the read key for the document, the keyword, and the sharee cryptographic key associated with the sharee. The method may also include retrieving, by the data processing hardware, the read access token for the sharee from the user read set of the memory hardware and computing, by the data processing hardware, a cryptographic word set token based on the received cryptographic search value and the retrieved read access token for the sharee. The method may further include determining, by the data processing hardware, whether the computed cryptographic word set token matches a corresponding cryptographic word set token of a word set stored in the memory hardware. When the computed cryptographic word set token matches the corresponding cryptographic word set token of the word set, the method may include retrieving, by the data processing hardware, encrypted word metadata of the document associated with the keyword from the memory hardware and sending, by the data processing hardware, a search result set to the sharee. The query response may include the encrypted document metadata and the encrypted word metadata. The sharee may be configured to decrypt the encrypted document metadata using the read key and decrypt the encrypted word metadata using the read key.

In some implementations, the method includes receiving, at the data processing hardware, a write access token from the sharee based on the write key for the document, the document identifier, the sharee identifier and the sharee cryptographic key. The method may also include storing, by the data processing hardware, the write access token in a user write set of the memory hardware, the user write set including a list of sharee identifiers associated with sharees having write access to the document. The sharee may be configured to receive the write key for the document from the sharor over a secure and authenticated communication link. The method may further include receiving, at the data processing hardware, a revoke write access command from the sharor revoking write access from the sharee for the document stored on the memory hardware and removing, by the data processing hardware, the write access token for the sharee from the user write set.

Another aspect of the disclosure provides a second method for sharing write access. The method includes receiving, at a sharee device associated with a sharee, shared write access permissions from a sharor sharing write access to the sharee for a document stored on a distributed storage system. The shared write access permissions include a read key for the document, a write key for the document and encrypted metadata for the document. The method also includes determining, at the sharee device, a cryptographic write access value based on the write key for the document, a document identifier identifying the document, a sharee identifier identifying the sharee, and a sharee cryptographic key associated with the sharee. The cryptographic write access value authorizes write access to the sharee for the document. The method further includes sending a write access token for the sharee from the sharee device to the distributed storage system. The write access token including the cryptographic write access value. In response to receiving the write access token, the distributed storage system is configured to store the write access token in a user write set. The user write set includes a list of sharee identifiers associated with sharees having write access to the document.

Implementations of the disclosure may include one or more of the following optional features. In some implementations, the sharor may be configured to revoke write access from the sharee for the document stored on the distributed storage system (e.g., after sending the write access token for the sharee) by sending a revoke write access command to the distributed storage system. In response to receiving the revoke write access command, the distributed storage system is configured to remove the write access token for the sharee from the user write set. The method may also include determining, at the sharee device, a cryptographic read access value based on the write key for the document, the document identifier, and the sharee cryptographic key. The cryptographic read access value may authorize read access to the sharee for the document. Sending a read access token for the sharee may include the cryptographic read access value and the encrypted metadata for the document to the distributed storage system. The distributed storage system in response to receiving the read access token, may be configured to store the read access token in a user read set. The user read set may include a list of sharee identifiers associated with sharees having read access to the document.

The sharor may be configured to revoke read access from the sharee for the document stored on the distributed storage system (e.g., after sending the read access token for the sharee) by sending a revoke read access command to the distributed storage system. In response to receiving the revoke read access command, the distributed storage system may be configured to remove the write access token for the sharee from the user write set and remove the read access token for the sharee from the user read set. The sharor may be configured to, prior to receiving the shared write access permissions from the sharor: create the metadata for the document; encrypt the metadata for the document using the read key; and send the shared write access permissions to the sharee over a secure and authenticated communication link. Receiving the shared write access permissions from the sharor may include receiving the shared write access permissions from the sharor over a secure and authenticated communication link.

After sending the write access token for the sharee to the distributed storage system, the method may include creating, by the user device, word metadata for the document associated with a word in the document to be edited and encrypting, by the user device, the word metadata using the read key for the document. The method may also include computing, by the user device, a cryptographic edit value based on the read key for the document, a word identifier associated with the word in the document to be edited, the sharee cryptographic key associated with the sharee, the sharee identifier and the write key for the document. The method may further include sending an edit operation request including the cryptographic edit value, the sharee identifier, the document identifier, and the encrypted word metadata to the distributed storage system. The edit operation request may request the distributed storage system to process an edit operation on the word in the document to be edited.

In response to receiving the edit operation request from the user device, the distributed storage system may be configured to retrieve the write access token from the user write set and compute a cryptographic word set token based on the cryptographic edit value and the retrieved write access token for the sharee. When the edit operation requested by the edit operation request includes a delete operation, the distributed storage system may process the delete operation by removing a corresponding cryptographic word set token of a word set stored by the distributed storage system.

In response to receiving the edit operation request, the distributed storage system may be configured to retrieve the write access token from the user write set and compute a cryptographic word set token based on the cryptographic edit value and the retrieved write access token for the sharee. When the edit operation requested by the edit operation request includes an overwrite operation, the distributed storage system may process the overwrite operation by overwriting a corresponding cryptographic word set token of a word set stored by the distributed storage system with the computed cryptographic word set token and the encrypted word metadata.

In response to receiving the edit operation request from the user device, the distributed storage system may be configured to retrieve the write access token from the user write set and compute a cryptographic word set token based on the cryptographic edit value and the retrieved write access token for the sharee. When the edit operation requested by the edit operation request includes an add operation, the distributed storage system may process the add operation by adding the computed cryptographic word set token and the encrypted word metadata to a word set stored by the distributed storage system.

Yet another aspect of the disclosure provides a system for sharing read access to a document. The system includes a sharor device, a sharee device, data processing hardware of the storage system in communication with the sharor device and the sharee device, and memory hardware in communication with the data processing hardware. The sharor device is configured to create metadata for a document on stored on a storage system and encrypts the metadata using a read key for the document and calculate a first cryptographic share value for the document. The first cryptographic share value is based on a write key for the document, a read key for the document, a document identifier identifying the document, and a sharee identifier identifying a sharee to receive shared read access to the document. The sharee device is associated with the sharee and is configured to receive the read key for the document from the sharor device over a secure and authenticated communication channel and calculate a second cryptographic share value for the document. The second cryptographic share value may be based on the read key for the document and a sharee cryptographic key associated with the sharee. The memory hardware stores instructions that when executed on the data processing hardware cause the data processing hardware to perform operations. The operations include receiving a shared read access command from the sharor device sharing read access to the sharee. The shared read access command includes the encrypted metadata for the document and the first cryptographic share value. The operations also include receiving a shared read access request from the sharee device, the shared read access request including the sharee identifier, the document identifier, and the second cryptographic share value. The operations also include determining a cryptographic read access value based on the first cryptographic share value and the second cryptographic share value, the cryptographic read access value authorizing read access to the sharee for the document. The operations further include storing a read access token for the sharee including the cryptographic read access value and the encrypted value in a user read set of the memory hardware, the user read set including a list of sharee identifiers associated with sharees having read access to the document.

Implementations of the disclosure may include one or more of the following optional features. In some implementations, determining the cryptographic read access value includes multiplying the first cryptographic share value and the second cryptographic share value. The operations may also include receiving a revoke read access command from the sharor device revoking read access from the sharee for the document stored on the storage system and removing the read access token for the sharee from the user read set. In response to receiving the revoke read access command, the operations may include determining whether a corresponding write access token exists for the sharee in a user write set of the memory hardware and when the corresponding write access token exists, removing, by the data processing hardware, the write access token from the memory hardware.

After storing the read access token for the sharee, the operations may include receiving a search query for a keyword in the document from the sharee device. The search query may include the sharee identifier, the document identifier and a cryptographic search value based on the read key for the document, the keyword, and the sharee cryptographic key associated with the sharee. The operations may also include retrieving the read access token for the sharee from the user read set of the memory hardware, computing a cryptographic word set token based on the received cryptographic search value and the retrieved read access token for the sharee, and determining whether the computed cryptographic word set token matches a corresponding cryptographic word set token of a word set stored in the memory hardware. When the computed cryptographic word set token matches the corresponding cryptographic word set token of the word set, the method may include retrieving encrypted word metadata of the document associated with the keyword from the memory hardware and sending a search result set to the sharee device, the query response including the encrypted document metadata and the encrypted word metadata. The sharee may be configured to decrypt the encrypted document metadata using the read key and decrypt the encrypted word metadata using the read key.

Yet another aspect of the disclosure provides a second system for sharing write access to a document. The system includes a sharor device associated with a creator of a document stored on a distributed storage system, a sharee device in communication with the sharor device over a secure and authenticated communication channel, data processing hardware of the distributed storage system in communication with the sharor device and the sharee device, and memory hardware in communication with the data processing hardware. The sharee device is configured to receive shared write access permissions from the sharor device sharing write access for a document stored on the distributed storage system, determine a cryptographic write access value based on the write key for the document, a document identifier identifying the document, a sharee identifier identifying the sharee, and a sharee cryptographic key associated with the sharee and determine a cryptographic read access value based on the write key for the document, the document identifier, and the sharee cryptographic key. The shared write access permissions include a read key for the document, a write key for the document and encrypted metadata for the document. The cryptographic write access value authorizes write access to the sharee for the document. The memory hardware stores instructions that when executed on the data processing hardware cause the data processing hardware to perform operations. The operations include receiving a write access token for the sharee device including the cryptographic write access value from the sharee device and storing the write access token in a user write set. The user write set includes a list of sharee identifiers associated with sharee devices having write access to the document. The operations also include receiving a read access token for the sharee device including the cryptographic read access value and the encrypted metadata for the document from the sharee device and storing the read access token in a user read set. The user read set includes a list of sharee identifiers associated with sharee devices having read access to the document.

Implementations of the disclosure may include one or more of the following optional features. In some implementations, the operations include receiving a revoke write access command from the sharor device to revoke write access from the sharee device for the document stored on the distributed storage system. In response to receiving the revoke write access command, the operations may include removing the write access token for the sharee device from the user write set. The operations may also include receiving a revoke read access command from the sharor device to revoke read access from the sharee device for the document stored on the distributed storage system. In response to receiving the revoke read access command, the operations may also include removing the write access token for the sharee device from the user write set and removing the read access token for the sharee device from the user read set.

Section B: Efficient Oblivious Permutation

One aspect of the disclosure provides a method for obliviously moving data blocks to new memory locations on memory hardware. The method includes receiving, at data processing hardware, a permutation request from a client to obliviously move N data blocks stored in memory hardware in communication with the data processing hardware. Each N data block is associated with the client and stored at a corresponding memory location of the memory hardware. In response to receiving the permutation request, the method includes dividing, by the data processing hardware, the memory locations of the memory hardware into $\sqrt{N}$ data buckets. Each data bucket contains $\sqrt{N}$ data blocks. The method also includes allocating, by the data processing hardware, new memory locations in the memory hardware for storing the N data blocks and initializing, by the data processing hardware, $\sqrt{N}$ buffer buckets associated with the new memory locations. Each buffer bucket is associated with a corresponding cache slot initialized at the client. The method further includes iteratively providing the $\sqrt{N}$ data buckets from the data processing hardware to the client. In response to receiving each data bucket, the client is configured to: apply a random permutation on the $\sqrt{N}$ data blocks within the corresponding data bucket to determine the corresponding new memory location of the memory hardware and the corresponding buffer bucket associated with each permutated data block; provide each permutated data block into the corresponding cache slot, spray up to a threshold value of the permutated data blocks from each cache slot into the corresponding buffer buckets; and store any remaining permuted data blocks in the corresponding cache slots.

Implementations of the disclosure may include one or more of the following optional features. In some examples, substantially $\sqrt{N}$ encompasses a range of values, such as between $N^{0.1}$ and $N^{0.75}$. Other ranges are possible as well. In additional examples, substantially $\sqrt{N}$ includes: $N^{0.5}$, which provides an algorithm with one round-trip); $N^{1/3}$, which provides an algorithm with 2 round-trips; and $N^{0.20}$, which provides an algorithm with 4 round-trips. Relatively smaller values, may be less useful, since N could be impractically large. For relatively larger values, the gain in the algorithm may be less useful as well. In some implementations, the client applies the random permutation on the $\sqrt{N}$ data blocks within the corresponding data bucket by: decrypting each of the $\sqrt{N}$ data blocks received within the corresponding data bucket; re-encrypting each of the $\sqrt{N}$ data blocks; and applying the random permutation on the re-encrypted $\sqrt{N}$ data blocks. The random permutation may include shuffling the re-encrypted $\sqrt{N}$ data blocks at the client using random bits hidden from the data processing hardware based on an Advanced Encryption Standard key randomly selected by the client.

In some examples, the threshold value of the permutated data blocks sprayed from each cache slot is randomly selected independent of the number of permuted data blocks currently stored within the corresponding cache slots. The threshold value of the permutated data blocks sprayed from at least one of the cache slots may be different during at least one iteration. The client may spray a number of the permutated data blocks equal to the threshold value from a corresponding client cache when the corresponding cache slot contains at least the threshold value of the permutated data blocks.

In some implementations, the client is further configured to: after the client provides each permutated data block into the corresponding cache slot, identify at least one cache slot containing a number of the permutated data blocks less than the threshold value; and spray a number of dummy blocks into the corresponding buffer bucket based on a difference between the threshold value and the number of permutated data blocks within the corresponding cache slot. The client may encrypt each dummy block prior to spraying each dummy block into the corresponding buffer bucket.

In some examples, iteratively providing the V data buckets from the data processing hardware to the client includes: iteratively receiving a bucket download request from the client requesting one of the data buckets for download; and in response to receiving each bucket download request, uploading the corresponding data bucket to the client. After the client sprays all of the permutated data blocks from all of the cache slots into the corresponding buffer buckets, the method may include de-allocating, by the data processing hardware, all of the data buckets from the memory hardware. After the client sprays all of the permutated data blocks from all of the cache slots into the corresponding buffer buckets, the method may include: de-allocating, by the data processing hardware, all of the data buckets from the memory hardware; and iteratively providing the buffer buckets from the data processing hardware to the client. In response to receiving each buffer bucket, the client may be configured to: remove any dummy blocks from the corresponding buffer bucket; re-order the data blocks within the corresponding buffer bucket; and upload the buffer bucket to the distributed system.

Another aspect of the disclosure provides a system for obliviously moving data blocks to new memory locations on memory hardware. The system includes a client device, data processing hardware of a distributed system in communication with the client device, and memory hardware in communication with the data processing hardware. The memory hardware stores instructions that when executed on the data processing hardware cause the data processing hardware to perform operations. The operations include receiving a permutation request from the client device to obliviously move N data blocks stored in memory hardware in communication with the data processing hardware, each N data block associated with the client device and stored at a corresponding memory location of the memory hardware. In response to receiving the permutation request, the operations include dividing the memory locations of the memory hardware into $\sqrt{N}$ data buckets. Each data bucket contains $\sqrt{N}$ data blocks. The operations also include allocating new memory locations in the memory hardware for storing the N data blocks and initializing $\sqrt{N}$ buffer buckets associated with the new memory locations. Each buffer bucket is associated with a corresponding cache slot initialized at the client device. The operations also include iteratively providing the N data buckets to the client device. In response to receiving each data bucket, the client device is configured to: apply a random permutation on the $\sqrt{N}$ data blocks within the corresponding data bucket to determine the corresponding new memory location of the memory hardware and the corresponding buffer bucket associated with each permutated data block; provide each permutated data block into the corresponding cache slot; spray up to a threshold value of the permutated data blocks from each cache slot into the corresponding buffer buckets; and store any remaining permuted data blocks in the corresponding cache slots.

This aspect may include one or more of the following optional features. In some implementations the client device applies the random permutation on the $\sqrt{N}$ data blocks within the corresponding data bucket by: decrypting each of the $\sqrt{N}$ data blocks received within the corresponding data bucket; re-encrypting each of the $\sqrt{N}$ data blocks, and applying the random permutation on the re-encrypted $\sqrt{N}$ data blocks. The random permutation may include shuffling the re-encrypted $\sqrt{N}$ data blocks at the client device using random bits hidden from the data processing hardware based on an Advanced Encryption Standard key randomly selected by the client device.

In some examples, the threshold value of the permutated data blocks sprayed from each cache slot is randomly selected independent of the number of permuted data blocks currently stored within the corresponding cache slots. The threshold value of the permutated data blocks sprayed from at least one of the cache slots may be different during at least one iteration. The client device may spray a number of the permutated data blocks equal to the threshold value from a corresponding client cache when the corresponding cache slot contains at least the threshold value of the permutated data blocks.

In some implementations the client device is further configured to: after the client device provides each permutated data block into the corresponding cache slot, identify at least one cache slot containing a number of the permutated data blocks less than the threshold value; and spray a number of dummy blocks into the corresponding buffer bucket based on a difference between the threshold value and the number of permutated data blocks within the corresponding cache slot. The client device may also be configured to encrypt each dummy block prior to spraying each dummy block into the corresponding buffer bucket.

In some examples, iteratively providing the N data buckets to the client device includes: iteratively receiving a bucket download request from the client device requesting one of the data buckets for download, and in response to receiving each bucket download request, uploading the corresponding data bucket to the client device. The operations may further include, after the client device sprays all of the permutated data blocks from all of the cache slots into the corresponding buffer buckets, de-allocating all of the data buckets from the memory hardware. The operations may further include, after the client device sprays all of the permutated data blocks from all of the cache slots into the corresponding buffer buckets: de-allocating all of the data buckets from the memory hardware; and iteratively providing the $\sqrt{N}$ buffer buckets to the client. In response to receiving each buffer bucket, the client may be configured to: remove any dummy blocks from the corresponding buffer bucket; re-order the data blocks within the corresponding buffer bucket; and upload the buffer bucket to the distributed system.

Another aspect of the disclosure provides a method for obliviously moving N data blocks stored in memory hardware in communication with data processing hardware. Each N data block is associated with a client and stored at a corresponding memory location of the memory hardware. The method includes organizing, by the data processing hardware, the memory locations of the memory hardware into substantially $\sqrt{N}$ data buckets. Each data bucket contains substantially $\sqrt{N}$ data blocks. The method also includes allocating, by the data processing hardware, substantially $\sqrt{N}$ buffer buckets associated with new memory locations in the memory hardware. Each buffer bucket is associated with a corresponding cache slot allocated at the client for storing cached permutated data blocks. The method further includes iteratively providing the substantially $\sqrt{N}$ data buckets from the data processing hardware to the client. In response to receiving each data bucket, the client is configured to apply a random permutation on the substantially $\sqrt{N}$ data blocks within the corresponding data bucket to generate permutated data blocks and determine a corresponding buffer bucket and a corresponding cache slot for each permutated data block. For each buffer bucket, the client is configured to determine a quantity of data blocks to be sprayed into the buffer bucket and a strategy for selecting data blocks to be sprayed into the buffer bucket from at least one of: corresponding permutated data blocks: cached permutated data blocks from the corresponding cache slot; or dummy data blocks. The client is further configured to: spray the selected data blocks into the buffer buckets according to the strategy; store any unselected permutated data blocks in their corresponding cache slots; and remove any selected cached permutated data blocks from their corresponding cache slots.

Implementations of the disclosure may include one or more of the following optional features. In some implementations, the client applies the random permutation on the substantially $\sqrt{N}$ data blocks within the corresponding data bucket by: decrypting each of the substantially $\sqrt{N}$ data blocks received within the corresponding data bucket; re-encrypting each of the substantially $\sqrt{N}$ data blocks; and applying the random permutation to the re-encrypted substantially $\sqrt{N}$ data blocks. The random permutation may include shuffling the re-encrypted substantially $\sqrt{N}$ data blocks at the client using a cryptographically secure random key hidden from the data processing hardware.

In some examples, the quantity of data blocks to be sprayed into a buffer bucket is determined independently from the number of permuted data blocks corresponding to the buffer bucket. The quantity of data blocks to be sprayed into one buffer bucket may be different than the quantity of data blocks to be sprayed into another bucket during the same iteration. The quantity of data blocks to be sprayed into one buffer bucket may be different than the quantity of data blocks to be sprayed into another bucket between separate iterations. Selecting data blocks to be sprayed into the buffer bucket may follow a strict priority order including: first, selecting from the corresponding permutated data blocks; second, selecting from the cached permutated data blocks from the corresponding cache slot; and third, selecting dummy data blocks. The client may encrypt each dummy block prior to spraying each dummy block into the corresponding buffer bucket.

In some implementations, iteratively providing the substantially $\sqrt{N}$ data buckets from the data processing hardware to the client includes: iteratively receiving a bucket download request from the client requesting one of the data buckets for download; and in response to receiving each bucket download request, sending the corresponding data bucket to the client. After the client sprays all of the permutated data blocks from all of the cache slots into the corresponding buffer buckets, the method may include de-allocating, by the data processing hardware, all of the data buckets from the memory hardware. After the client sprays all of the permutated data blocks from all of the cache slots into the corresponding buffer buckets, the method may also include iteratively providing the substantially $\sqrt{N}$ buffer buckets from the data processing hardware to the client. In response to receiving each buffer bucket, the client may be configured to: remove any dummy blocks from the corresponding buffer bucket; order the data blocks within the corresponding buffer bucket; and upload the buffer bucket to the data processing hardware.

Another aspect of the disclosure provides a system for obliviously moving N data blocks in a distributed system. Each N data block is associated with a client and stored at a corresponding memory location of the distributed system.

The system includes a client device associated with the client, data processing hardware of the distributed system in communication with the client device and memory hardware in communication with the data processing hardware. The memory hardware stores instructions that when executed on the data processing hardware cause the data processing hardware to perform operations. The operations include organizing the memory locations of the memory hardware into substantially $\sqrt{N}$ data buckets, allocating substantially $\sqrt{N}$ buffer buckets associated with new memory locations in the memory hardware, and iteratively providing the substantially $\sqrt{N}$ data buckets from the data processing hardware to the client device. Each data bucket contains substantially $\sqrt{N}$ data blocks. Each buffer packet is associated with a corresponding cache slot allocated at the client device for storing cached permutated data blocks. In response to receiving each data bucket, the client is configured to apply a random permutation on the substantially $\sqrt{N}$ data blocks within the corresponding data bucket to generate permutated data blocks and determine a corresponding buffer bucket and a corresponding cache slot for each permutated data block. For each buffer bucket, the client is configured to determine a quantity of data blocks to be sprayed into the buffer bucket and a strategy for selecting data blocks to be sprayed into the buffer bucket from at least one of: corresponding permutated data blocks; cached permutated data blocks from the corresponding cache slot; or dummy data blocks. The client is also configured to: spray the selected data blocks into the buffer buckets according to the strategy; store any unselected permutated data blocks in their corresponding cache slots; and remove any selected cached permutated data blocks from their corresponding cache slots.

This aspect may include one or more of the following optional features. In some implementations, the client device applies the random permutation on the substantially $\sqrt{N}$ data blocks within the corresponding full bucket by: decrypting each of the substantially $\sqrt{N}$ data blocks received within the corresponding data bucket; re-encrypting each of the substantially $\sqrt{N}$ data blocks; and applying the random permutation to the re-encrypted substantially $\sqrt{N}$ data blocks. The random permutation may include shuffling the re-encrypted substantially $\sqrt{N}$ data blocks at the client using a cryptographically secure random key hidden from the data processing hardware.

In some examples, the quantity of data blocks to be sprayed into a buffer bucket is determined independently from the number of permuted data blocks corresponding to the buffer bucket. The quantity of data blocks to be sprayed into one buffer bucket may be different than the quantity of data blocks to be sprayed into another bucket during the same iteration. The quantity of data blocks to be sprayed into one buffer bucket may be different than the quantity of data blocks to be sprayed into another bucket between separate iterations. Selecting data blocks to be sprayed into the buffer bucket may follow a strict priority order including: first, selecting from the corresponding permutated data blocks; second, selecting from the cached permutated data blocks from the corresponding cache slot; and third, selecting dummy data blocks. The client device may further be configured to encrypt each dummy block prior to spraying each dummy block into the corresponding buffer bucket.

In some examples, iteratively providing the substantially N data buckets from the data processing hardware to the client device includes: iteratively receiving a bucket download request from the client requesting one of the data buckets for download; and in response to receiving each bucket download request, sending the corresponding data bucket to the client. The operations may also include after the client device sprays all of the permutated data blocks from all of the cache slots into the corresponding buffer buckets, de-allocating all of the data buckets from the memory hardware. The operations may further include after the client device sprays all of the permutated data blocks from all of the cache slots into the corresponding buffer buckets, iteratively providing the substantially $\sqrt{N}$ buffer buckets to the client device. In response to receiving each buffer bucket, the client device may be configured to: remove any dummy blocks from the corresponding buffer bucket; order the data blocks within the corresponding buffer bucket; and upload the buffer bucket to the data processing hardware.

Section C: Efficient Oblivious Cloud Storage

One aspect of the disclosure provides a method obliviously executing queries for data blocks. The method includes executing, at data processing hardware, an instruction to execute a query (q) for a data block (B), obtaining, by the data processing hardware, a query memory level ($l_q$) corresponding to the data block (B) from a memory-level map, and determining, by the data processing hardware, whether the query memory level ($l_q$) is the lowest memory level ($l_l$), ($l_q$=$l_l$). The memory-level map maps memory levels ($l_i$) of memory, each memory level (l) including physical memory ($RAM_i$) and virtual memory ($Shelter_i$). The virtual memory ($Shelter_l$) of a lowest memory level ($l_l$) resides on a client device and the remaining physical memory ($RAM_i$) and virtual memory ($Shelter_i$) reside on memory hardware of a distributed system in communication with the data processing hardware. When the query memory level ($l_q$) is the lowest memory level ($l_l$), ($l_q$=$l_l$), the method includes retrieving, by the data processing hardware, the data block (B) from the virtual memory ($Shelter_l$) of the lowest memory level ($l_l$). For each memory level ($l_j$) greater than the lowest memory level ($l_l$) and the physical memory ($RAM_l$) at the lowest memory level ($l_l$), the method includes retrieving, by the data processing hardware, a corresponding dummy data block ($D_j$) from the respective memory level ($l_j$), ($l_l$) and discarding, by the data processing hardware, the retrieved dummy data block ($D_j$). When the memory level ($l_q$) is not the lowest memory level ($l_l$), ($l_q$<$l_l$), the method includes retrieving, by the data processing hardware, the data block (B) from the query memory level ($l_q$) and storing the retrieved data block (B) in the virtual memory ($Shelter_l$) of the lowest memory level ($l_l$). For each memory level ($l_j$) other than the query memory level ($l_q$), the method includes retrieving, by the data processing hardware, the corresponding dummy data block ($D_j$) from the respective memory level ($l_j$) and discarding, by the data processing hardware, the retrieved dummy data block ($D_j$).

Implementations of the disclosure may include one or more of the following optional features. In some implementations, for each memory level ($l_i$), the physical memory ($RAM_i$) has a defined first size to hold $N_i$ data blocks (B) and the virtual memory ($Shelter_i$) has a defined second size to hold $S_i$ data blocks (B), wherein $S_i$=$N_i$/c and c is a constant greater than one. The corresponding dummy data block ($D_j$) of the respective memory level ($l_j$) includes a permutation ($\pi_j$) of a pointer ($dCnt_j$) to a respective data block ($N_j$) at the respective memory level ($l_j$). The method may also include incrementing, by the data processing hardware, the pointer ($dCnt_j$).

In some examples, when the memory level ($l_q$) is not the lowest memory level ($l_l$), the method includes updating, by the data processing hardware, the level map to indicate that the retrieved data block is stored in the virtual memory (Shelter$_l$) of the lowest memory level ($l_l$). The distributed system may be configured to initialize at least one data block ($N_i$) of the corresponding virtual memory (Shelter$_i$) of at least one memory level ($l_i$) as a respective dummy data block ($D_i$). The respective dummy data block ($D_i$) may include a permutation of a size of the corresponding data block ($N_i$), an index of the corresponding data block ($N_i$), or a memory level number of the corresponding memory level ($l_i$).

In some implementations, the method includes obliviously shuffling, by the data processing hardware, the corresponding virtual memory (Shelter$_i$) of each memory level ($l_i$). The method may also include obliviously shuffling, by the data processing hardware, the virtual memory (Shelter$_l$) of the lowest memory level ($l_l$) with the virtual memory (Shelter$_{l-1}$) of a next memory level ($l_i$) greater than the lowest memory level ($l_l$). Obliviously shuffling may further include: selecting a random permutation on the data blocks (B) from the virtual memory (Shelter$_l$), (Shelter$_{l-1}$); decrypting each of the data blocks (B) from the virtual memory (Shelter$_l$), (Shelter$_{l-1}$); re-encrypting each of the data blocks (B) from the virtual memory (Shelter$_l$), (Shelter$_{l-1}$); and shuffling the re-encrypted data blocks (B) using the random permutation on the re-encrypted data blocks (B).

Another aspect of the disclosure provides a client device for obliviously executing queries for data blocks. The client device includes data processing hardware and memory hardware in communication with the data processing hardware. The memory hardware stores instructions that when executed on the data processing hardware cause the data processing hardware to perform operations. The operations include executing, at data processing hardware, an instruction to execute a query (q) for a data block (B), obtaining a query memory level ($l_q$) corresponding to the data block (B) from a memory-level map, the memory-level map mapping memory levels ($l_i$) of memory, and determining whether the query memory level ($l_q$) is the lowest memory level ($l_l$), ($l_q$=$l_l$). Each memory level ($l_i$) includes physical memory (RAM$_i$) and virtual memory (Shelter$_i$). The virtual memory (Shelter$_l$) of a lowest memory level ($l_l$) resides on the memory hardware of the client device and the remaining physical memory (RAM$_i$) and virtual memory (Shelter$_i$) reside on memory hardware of a distributed system in communication with the data processing hardware. When the query memory level ($l_q$) is the lowest memory level ($l_l$), ($l_q$=$l_l$), the operations include retrieving the data block (B) from the virtual memory (Shelter$_l$) of the lowest memory level ($l_l$). For each memory level ($l_j$) greater than the lowest memory level ($l_l$) and the physical memory (RAM) at the lowest memory level ($l_l$), the operations include retrieving a corresponding dummy data block ($D_j$) from the respective memory level ($l_j$), ($l_l$) and discarding the retrieved dummy data block ($D_j$). When the memory level ($l_q$) is not the lowest memory level ($l_l$), ($l_q$<$l_l$), the operations include retrieving the data block (B) from the query memory level ($l_q$) and storing the retrieved data block (B) in the virtual memory (Shelter$_l$) of the lowest memory level ($l_l$). For each memory level ($l_j$) other than the query memory level ($l_q$), the operations include retrieving the corresponding dummy data block ($D_j$) from the respective memory level ($l_j$) and discarding the retrieved dummy data block ($D_j$).

This aspect may include one or more of the following optional features. In some implementations, for each memory level ($l_i$), the physical memory (RAM$_i$) has a defined first size to hold $N_i$ data blocks (B) and the virtual memory (Shelter$_i$) has a defined second size to hold $S_i$ data blocks (B), wherein $S_i$=$N_i$/c and c is a constant greater than one. The corresponding dummy data block ($D_j$) of the respective memory level ($l_j$) may include a permutation ($\pi_j$) of a pointer (dCnt$_j$) to a respective data block ($N_j$) at the respective memory level ($l_j$). The operations may also include incrementing the pointer (dCnt$_j$).

When the memory level ($l_q$) is not the lowest memory level ($l_l$), the operations may include updating the level map to indicate that the retrieved data block is stored in the virtual memory (Shelter$_l$) of the lowest memory level ($l_l$). The distributed system may be configured to initialize at least one data block ($N_i$) of the corresponding virtual memory (Shelter$_i$) of at least one memory level ($l_i$) as a respective dummy data block ($D_i$). The respective dummy block may include a permutation of a size of the corresponding data block ($N_i$), an index of the corresponding data block ($N_i$), or a memory level number of the corresponding memory level ($l_i$).

In some examples, the operations include obliviously shuffling the corresponding virtual memory (Shelter$_i$) of each memory level ($l_i$). The operations may also include obliviously shuffling the virtual memory (Shelter$_l$) of the lowest memory level ($l_l$) with the virtual memory (Shelter$_{l-1}$) of a next memory level ($l_i$) greater than the lowest memory level ($l_l$). Obliviously shuffling may further include: selecting a random permutation for the data blocks (B) from the virtual memory (Shelter$_l$), (Shelter$_{l-1}$); decrypting each of the data blocks (B) from the virtual memory (Shelter$_l$), (Shelter$_{l-1}$); re-encrypting each of the data blocks (B) from the virtual memory (Shelter$_l$), (Shelter$_{l-1}$); and shuffling the re-encrypted data blocks (B) using the random permutation on the re-encrypted data blocks (B).

Section D: Oblivious Access with Differential Privacy

One aspect of the disclosure provides a method for oblivious access with differential privacy. The method includes executing, by data processing hardware of a client device, an instruction to execute a query (q) for a data block. The method also includes, during a download phase, determining, by the data processing hardware, whether the data block is stored in a block stash on memory hardware residing at the client device. When the data block is stored in the block stash, the method further includes: removing, by the data processing hardware, the data block from the block stash; sending, by the data processing hardware, a fake query to a distributed system in communication with the data processing hardware; and discarding, by the data processing hardware, the random data block retrieved from the distributed system. The fake query retrieves a random data block stored in memory of the distributed system. During an overwrite phase, the method also includes executing, by the data processing hardware, a read or write operation on the data block removed from the block stash or retrieved from the memory of the distributed system. The method further includes determining, by the data processing hardware, whether to store a current version of the data block in the block stash on the memory hardware residing at the client device or on the memory of the distributed system based on a probability. When the current version of the data block is stored in the block stash, the method includes: sending, by the data processing hardware, a fake query to the distributed system to retrieve another random data block stored in the memory of the distributed system; decrypting, by the data processing hardware, the retrieved random data block; re-encrypting, by the data processing hardware, the random data block with fresh randomness; and re-uploading, by the data processing hardware, the re-encrypted random data block onto the memory of the distributed system.

Implementations of the disclosure may include one or more of the following optional features. In some implementations, when the data block is not stored in the block stash during the download phase, the method includes sending, by the data processing hardware, a real query to the distributed system to retrieve the data block from the memory of the distributed system. When executing the read or write operation on the data block during the overwrite phase, the method may also include executing a write operation by updating the data block with a new version of the data block. In some configurations, the probability is less than (C/N), where C is a storage capacity of the block stash and N is a number of data blocks outsourced by the data processing hardware for storage on the distributed system.

In some examples, when the current version of the data block is not stored in the block stash during the overwrite phase, the method also includes the following: sending, by the data processing hardware, a real query to the distributed system to retrieve the data block from the memory of the distributed system; encrypting, by the data processing hardware, the current version of the data block; and uploading, by the data processing hardware, the encrypted current version of the data block onto the memory of the distributed system. Here, the method may further include discarding the data block retrieved from the memory of the distributed system.

Another aspect of the disclosure provides a method for oblivious access with differential privacy. The method includes executing, by data processing hardware of a client device, an instruction to execute a query (q) for a data block. During a download phase, the method includes determining, by the data processing hardware, whether the data block is stored in a block stash on memory hardware residing at the client device. When the data block is stored in the block stash, the method also includes: removing, by the data processing hardware, the data block from the block stash; sending, by the data processing hardware, a fake query to a distributed system in communication with the data processing hardware; and discarding, by the data processing hardware, the random data buckets retrieved from the distributed system. The fake query downloads two random data buckets stored in memory of the distributed system and each of the data buckets includes multiple data blocks. During an overwrite phase, the method further includes executing, by the data processing hardware, a read or write operation on the data block removed from the block stash or obtained from a corresponding data bucket retrieved from memory of the distributed system. The method also includes determining, by the data processing hardware, whether to store a current version of the data block in the block stash or on the memory of the distributed system based on a probability. When the current version of the data block is stored in the block stash, the method includes: sending, by the data processing hardware, a fake query to the distributed system to download another two random data buckets stored in the memory of the distributed system, each data bucket including multiple data blocks, decrypting, by the data processing hardware, all of the data blocks within the random data buckets; re-encrypting, by the data processing hardware, the data blocks within the random data buckets with fresh randomness; and re-uploading, by the data processing hardware, the random data buckets including the re-encrypted data blocks onto the memory of the distributed system.

Implementations of the disclosure may include one or more of the following optional features. In some configurations, when the data block is not stored in the block stash during the download phase, the method includes sending, by the data processing hardware, a real query to the distributed system to download a pair of data buckets from the memory of the distributed system; decrypting, by the data processing hardware, all of the data blocks within the two data buckets; and determining, by the data processing hardware, whether one of the two data buckets includes the data block. Here, each of the data buckets downloaded from the distributed system in response to the real query includes multiple data blocks and a corresponding cryptographic identifier associated with an identifier of the data block. In these configurations, when one of the data buckets includes the data block, the method further includes: removing, by the data processing hardware, the data block from the corresponding data bucket; and discarding, by the data processing hardware, the remaining data blocks from the data buckets.

In some examples, the identifier of the data block includes a string. Executing the read or write operation on the data block during the overwrite phase may also include executing a write operation by updating the data block with a new version of the data block. The probability may be less than (C/N), where C is a storage capacity of the block stash and N is a number of data blocks outsourced by the data processing hardware for storage on the distributed system.

In some implementations, when the current version of the data block is not stored in the block stash during the overwrite phase, the method includes sending, by the data processing hardware, a real query to the distributed system to download a pair of data buckets from the memory of the distributed system. Here, each of the data buckets downloaded from the distributed system in response to the real query includes multiple data blocks and a corresponding cryptographic identifier associated with an identifier of the data block. In this implementation, when the current version of the data block is not stored in the block stash during the overwrite phase, the method also includes: decrypting, by the data processing hardware, all of the data blocks within the data buckets; replacing, by the data processing hardware, a previous version of the data block within one of the data buckets with the current version of the data block; re-encrypting, by the data processing hardware, all of the data blocks including the current version of the data block within the data buckets; and uploading, by the data processing hardware, the data buckets including the re-encrypted data blocks onto the memory of the distributed system.

Yet another aspect of the disclosure provides a method for oblivious access with differential privacy. The method include executing, by data processing hardware of a client device, an instruction to execute a query (q) for a data block stored on a server. The method also includes sending a first download request for K blocks stored on the server, the K blocks excluding the queried data block and sending a second download request for the queried data block and K−1 other blocks. The method further includes receiving a first download sequence for the K blocks of the first download request from the server and receiving a second download sequence for the queried data block and the K−1 other blocks of the second download request from the server.

Implementations of the disclosure may include one or more of the following optional features. In some examples, the server is untrusted and stores a plurality of publically available data blocks that are un-encrypted. The method may include discarding, by the data processing hardware, the K blocks of first download sequence received from the server. Additionally or alternatively, the method may also include discarding, by the data processing hardware, the K−1 other blocks of the second download sequence received from the server. The value for K may be based on a security parameter and an error probability greater than zero.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 1.1 is a schematic view of an example system for sharing read and/or write access to one or more documents stored on a distributed storage system.

FIG. 1.2A is a schematic view of an example read access token stored in a user read set.

FIG. 1.2B is a schematic view of an example write access token stored in a user write set.

FIG. 1.3A is a schematic view of an example system for a sharor sharing read access to a sharee for a document stored on a distributed storage system.

FIG. 1.3B is a schematic view of an example system for a sharing revoking read access from a sharee for a document stored on a distributed storage system.

FIG. 1.4A is a schematic view of an example system for a sharor sharing write access to a sharee for a document stored on a distributed storage system.

FIG. 1.4B is a schematic view of an example system for a sharing revoking write access from a sharee for a document stored on a distributed storage system.

FIGS. 1.5A and 1.5B are schematic views of a user sending a search query to a searchable symmetric encryption manager for a keyword in an encrypted document stored in a data store.

FIG. 1.5C provides an example algorithm for a user performing a search for a keyword over a set of documents that the user has read access to.

FIGS. 1.6A and 1.6B are schematic views of a user sending an edit operation request to a searchable symmetric encryption manager for processing an edit operation on a word in an encrypted document stored in a data store.

FIG. 1.6C provides an example algorithm for a user performing an edit operation on a word in a document that the user has write access to.

FIG. 1.7 is a flowchart of an example method for sharing read access to a document.

FIG. 1.8 is a flow chart of an example method for sharing write access to a document.

FIG. 1.9 is a schematic view of an example computing device.

FIG. 2.1 is a schematic view of an example system for obliviously moving data blocks stored on non-transitory data storage of a distributed system.

FIG. 2.2 is a schematic view of an example system for allowing one or more clients to obliviously move data blocks stored on non-transitory data storage of a distributed storage system.

FIGS. 2.3A-2.3J are schematic views of an example oblivious permutation routine for obviously moving data blocks stored on memory hardware.

FIGS. 2.4A and 2.4B are schematic views of an example recalibration process for recalibrating buffer buckets stored on memory hardware.

FIG. 2.5 is an example algorithm for applying obliviously shuffling at a client device.

FIG. 2.6 is an example algorithm for applying obliviously shuffling at a client device.

FIG. 2.7 is a schematic view of an example arrangement of operations for a method of obliviously moving data blocks stored on memory hardware.

FIG. 2.8 is a schematic view of an example computing device executing an oblivious permutation routine.

FIG. 3.1A is a schematic view of an example system for obliviously executing queries for data blocks stored on non-transitory data storage of a distributed system.

FIG. 3.1B is a schematic view of an example system for allowing one or more clients to obliviously execute queries for data blocks stored on non-transitory data storage of a distributed storage system.

FIG. 3.2 provides a schematic view of example memory levels including two levels of non-transitory memory.

FIG. 3.3 provides a schematic view of an example memory-level map for mapping memory levels of non-transitory memory.

FIGS. 3.4A and 3.4B provide an example instruction executing on a client device to execute a query for a data block.

FIG. 3.5 provides an example algorithm for initializing memory levels of non-transitory memory.

FIG. 3.6 provides an example algorithm for execution of an instruction at a client device to execute a query for a data block FIGS. 3.7A and 3.7B illustrate a method for obliviously executing queries for data blocks.

FIG. 3.8 is a schematic view of an example computing device executing a query for a data block.

FIG. 4.1A is a schematic view of an example system for obliviously executing queries for data blocks stored on non-transitory data storage of a distributed system.

FIG. 4.1B is a schematic view of an example system for allowing one or more clients to obliviously execute queries for data blocks stored on non-transitory data storage of a distributed storage system.

FIGS. 4.2A and 4.2B are schematic views of an example differentially private (DP) private information retrieval (PIR) routine for obliviously executing queries stored on non-transitory data storage of a single server or of multiple servers.

FIGS. 4.3A-4.3D are schematic views of an example DP oblivious random access memory (O-RAM) routine for obliviously executing queries stored on non-transitory data storage of a distributed system.

FIGS. 4.4A-4.4C are schematic views of an example DP oblivious storage routine for obliviously inputting data blocks in encrypted form onto non-transitory data storage of a distributed system.

FIGS. 4.5A-4.5D are schematic views of an example DP oblivious storage instruction executing on a client device to execute a query for a data block.

FIG. 4.6 provides an example algorithm initializing the binary tree by inputting data blocks in encrypted form into corresponding buckets and executing a query for a data block.

FIG. 4.7 is a schematic view of an example reverse exponential tree.

FIG. 4.8 provides an example algorithm initializing a reverse exponential tree by inputting the data blocks in encrypted form into corresponding N buckets and executing a query for a data block.

FIG. 4.9 is a schematic view of an example computing device that may be used to implement the systems and methods described herein.

Like reference symbols in the various drawings indicate like elements.

DETAILED DESCRIPTION

Figure 14A:
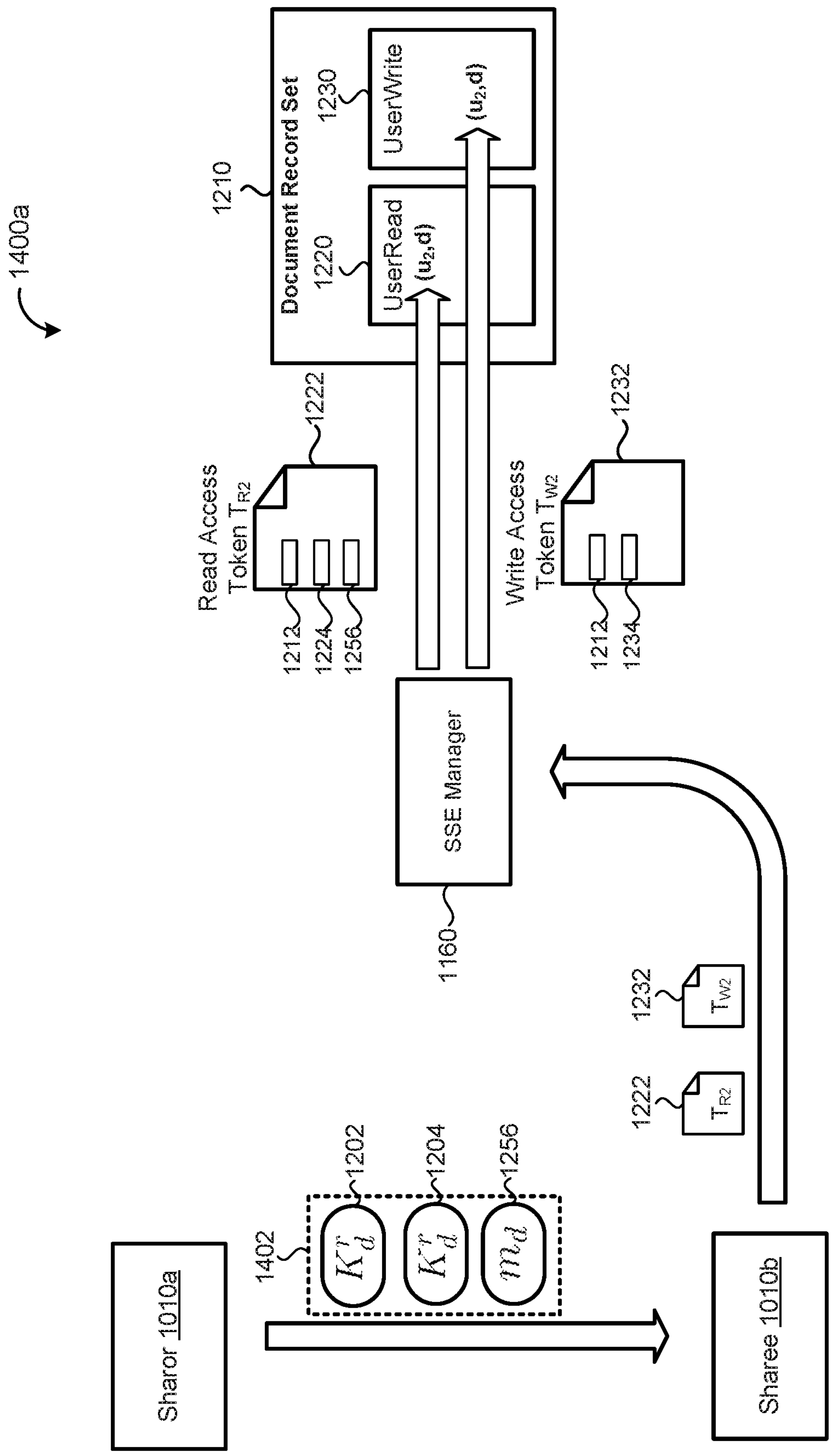
Figure 14B:
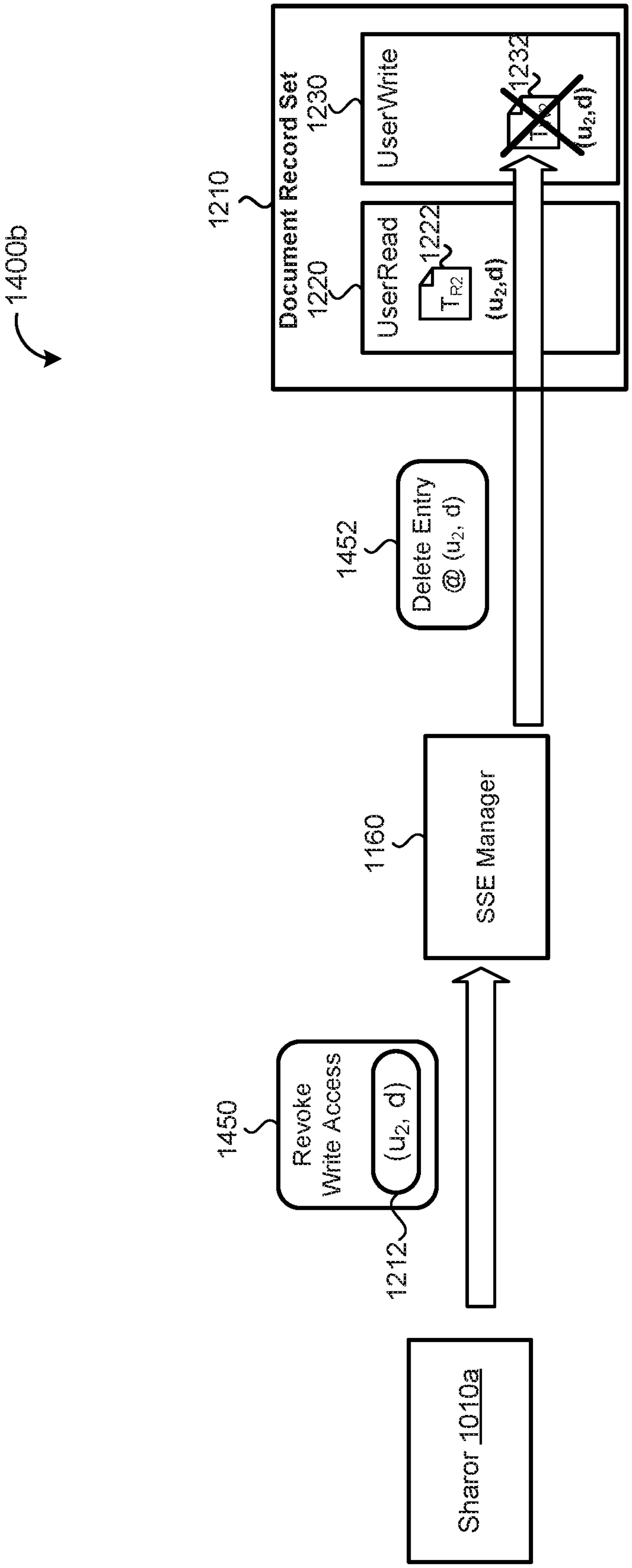

Section 1: Encrypted Search Cloud Service with Cryptographic Sharing

Searchable Symmetric Encryption schemes are tailored to allow a cloud storage provider to provide search functionality over a set of encrypted items (e.g., documents, emails, calendar events, notes, database entries, etc.) uploaded and stored at the cloud storage provider. Implementations herein are directed toward allowing customers (e.g., enterprises) to encrypt their data locally with customer side keys before uploading the data to the cloud service provider and without giving the cloud service provider plaintext access to the encrypted data. Namely, the cloud storage provider stores a cryptographic read access token in a user read set for each user authorized by the customer for read access to a corresponding document stored at the cloud storage provider. The cloud storage provider also stores a cryptographic write access token in a user write set for each user authorized by the customer for write access to the corresponding document stored at the cloud storage system. The cryptographic read/write access tokens provide the cloud storage provider with evidence that a corresponding user locally possesses the necessary keys for accessing the document, without requiring the user to expose the keys to the cloud storage provider. Implementations further include recording a cryptographic word set token in a word set for each unique pair of words and documents where a word appears in a corresponding document. Here, the cloud storage provider requires users to provide evidence of having correct permissions to access any cryptographic word set tokens in the word set via their cryptographic read/write access tokens in the user read/write sets. Accordingly, the cloud storage provider is capable of offering cryptographic guarantees on revoking/granting read/write access without the ability to ever determine the values of any cryptographic tokens stored in the user read/write sets and the word sets.

Referring to FIG. 1.1, in some implementations, a system 1100 includes one or more user devices 1110, 1110*a-n* associated with one or more users 1010, 1010*a-n*, who may communicate, via a network 1130, with a remote system 1140. The user devices 1110 may also communicate with one another via a secure and authenticated channel 1120 without revealing any data or private information to the distributed system 1140. The remote system 1140 may be a distributed system (e.g., cloud environment) having scalable/elastic resources 1142. The resources 1142 include computing resources 1144 and/or storage resources 1146. In some implementations, the remote system 1140 includes data storage 1150 (e.g., a distributed storage system or a data store) configured to store one or more documents 1200, 1200*a-n* within memory hardware. The data store 1150 stores encrypted documents 1200 that may be modified (e.g., adding/deleting/editing) by users 1010 having write access and/or searchable by users 1010 having read access. As used herein, a document 1200 may refer to any encrypted item uploaded onto the remote system 1140 for storage within the data store 1150, such as, without limitation, emails, calendar events, notes, database entries, etc. In some examples, the remote system 1140 executes a Searchable Symmetric Encryption (SSE) manager 1160 for managing access to the encrypted documents 1200 within the data storage 1150.

The user devices 1110 can be any computing devices that are capable of communicating with the SSE manager 1160 through the network 1130 and/or with one another through the secure and authenticated channel 1120. In the example shown, the user 1010*a* is associated with a creator/sharor of one or more documents 1200 encrypted and stored in the data storage 1150 and the user 1010*n* may be associated with a sharee that the creator/sharor 1010 shares at least one of write access or read access to any of the encrypted documents 1200 stored in the data store 1150. Read access provides the sharee 1010*n* with search functionality over each document 1200 the sharee 1010*n* has read access, while write access provides the sharee 1010*n* with the ability to modify/edit the search results for each document 1200 the sharee 1010*n* has write access. Users 1010 without read/write access to encrypted documents 1200 are unable to learn anything about those encrypted documents 1200. The creator/sharor 1010*a* has both read/write access to each document 1200 the sharor 1010*a* creates and stores in the data store 1150 of the remote system 1150. In some examples, the creator/sharor 1010*a* revokes previously shared read and/or write access for a document 1200 from a sharee 1010*n*.

In some implementations, the data store 1150 stores a document record set 1210, 1210*a-n* for each encrypted document 1200. The creator 1010 of each document 1200 may generate a secure random document identifier d. Each document record set 1210 includes a user read set (UserRead) 1220, a user write set (UserWrite) 1230, and a document word set 1240. The user read set 1220 includes a set of user identifiers $u_1, u_2, \ldots, u_n$ associated with users 1010 having (or not having) read access to the corresponding document 1200 of the document record set 1210. For instance, location ($u_1$, d) 1212 and location ($u_n$, d) 1212 of the user read set 1220 each include a corresponding read access token $T_{R1}$, $T_{Rn}$ 1222 authorizing read access to the users 1010 associated with user identifiers $u_1$, $u_n$ for the document 1200 associated with the document identifier d. Conversely, as location ($u_2$, d) 1212 of the user read set 1220 does not include a corresponding read access token $T_R$ 1222, the user 1010 associated with the user identifier $u_2$ does not have read access for the document 1200. Specifically, the user 1010 associated with the user identifier $u_2$ does not possess the cryptographic primitives required by the SSE Manager 1160 to authorize read access for the document 1200.

The user write set 1230 includes a set of user identifiers $u_1, u_2, \ldots, u_n$ associated with users 1010 having (or not having) write access to the corresponding document 1200 of the document record set 1210. For instance, location ($u_1$, d) 1212 of the user write set 1230 includes a corresponding write access token $T_{W1}$ 1232 authorizing write access to the user 1010 associated with the user identifier $u_1$ for the document 1200 associated with the document identifier d. By contrast, location ($u_2$, d) 1212 and location ($u_n$, d) 1212 of the user write set 1230 do not include corresponding write access tokens $T_W$ 1232, and therefore, the users 1010 associated with user identifiers $u_2$, $u_n$ do not have write access for the document 1200. Specifically, the users 1010 associated with the user identifiers $u_2$, $u_n$ do not possess the cryptographic primitives required by the SSE Manager 1160 to authorize write access for the document. Accordingly, the user 1010 associated with the user identifier $u_n$ has read access for the document 1200 (i.e., location ($u_n$, d) 1212 of the user read set 1220 includes the corresponding read access token $T_{Rn}$ 1222), but does not have write access for the document 1200 (i.e., location ($u_n$, d) 1212 of the user write set 1230 does not include a corresponding write access token $T_W$ 1232.

The word set 1240 includes a set of words $w_1, w_2, w_3, \ldots, w_n$ each appearing in the corresponding document 1200 associated with the document identifier d. For each unique word-document pair ($w_1$, d), ($w_2$, d), ($w_3$, d), . . . , ($w_n$, d) in which a corresponding word w appears in the document 1200 associated with the document identifier d, the word set 1240 may record a corresponding cryptographic word token $z_d$ (FIG. 1.5A) and corresponding encrypted word metadata $m_w$ 1556 (FIG. 1.5B) for the word w. The encrypted word metadata $m_w$ includes the encryption of word metadata $M_d$(w) for the document d associated with the word w. The word metadata $M_d$(w) may include a ranking, extensions, snippets, etc. associated with the word w within the document 1200. A user 1010 must have correct permissions to access any of the cryptographic word tokens in the word set 1240. For instance, a user 1010 may use a corresponding read access token $T_R$ to determine a value of a cryptographic word token.

With continued reference to FIG. 1.1, the user device 1110*a* associated with the creator/sharor 1010*a* may generate a cryptographic user key $K_u$ 1112 associated with the sharor 1010*a*, a cryptographic read key $$K_d^r$$

202 for the document d 1200, a cryptographic write key $$K_d^w$$

204 for the document d 1200, and metadata $M_d$ 1206 associated with the document d 1200. The $M_d$ 1206 may include a title of the document 1200 and/or other information associated with the document. The user device 1110*a* may compute encrypted metadata $m_d$ 1256 associated with the document d 1200 by encrypting the $M_d$ 1206 using the read key $$K_d^r$$

202. In some examples, the user device 1110*a* generates a read access token $T_R$ 1222*a* associated with the creator/sharor 1010*a* locally and sends the read access token $T_R$ 1222*a* to the SSE manager 1160 for input to the user read set 1220. Similarly, the user device 1110*a* may generate a write access token Tw 1232*a* associated with the creator/sharor 1010*a* locally and send the write access token $T_W$ 1232*a* to the SSE manager 1160 for input to the user write set 1230.

The creator/sharor 1010*a* may attain full control of the keys $K_u$ 1112, $$K_d^r$$

202, $$K_d^w$$

204 and keep the keys private/secret from the remote system 1140. For instance, the creator/sharor 1010*a* may provide the SSE manager 1160 the read access token 1222*a* to demonstrate that the sharor 1010*a* locally possesses the user key $K_u$ 1112 and the read key $$K_d^r$$

202 for read access to the encrypted document 1200 stored in the data store 1150. Similarly, the creator/sharor 1010*a* may provide the SSE manager 1160 the write access token 1232*a* to demonstrate that the sharor 1010*a* locally possesses the user key $K_u$ 1112 and the write key $$K_d^w$$

204 for write access to the encrypted document 1200 stored in the data store 1150. Accordingly, the creator/sharor 1010*a* does not have to provide any of the sensitive keys $K_u$ 1112, $$K_d^r$$

202, $$K_d^w$$

204 to a service provider of the data store 1150 when accessing encrypted documents 1200 stored therein.

Referring to FIG. 1.2A, a read access token 1222 includes a corresponding location (u, d) 1212 in the user read set 1220, a cryptographic read access value 1224, and the encrypted metadata $m_d$ 1256. In some examples, a user 1010 possessing the write key $$K_d^w$$

204 and the encrypted metadata $m_d$ 1256 may generate the read access token 1222 locally and send the read access token 1222 to the SSE manager 1160 for input to the user read set 1220 at the corresponding location (u, d) 1212. In other examples, when the user 1010 corresponds to a sharee possessing only the read key $$K_d^r$$

202, the SSE manager 1160 (e.g., data processing hardware) may generate the read access token 1222 for the user 1010 and insert the read access token 1222 into the user read set 1220 at the corresponding location (u, d) 1212. In the example shown, the cryptographic read access value 1224 includes a quotient of a pseudorandom function F of the write key $$K_d^w$$

204 and the document identifier d divided by a pseudorandom function F of the user key $K_u$ 1112 and the document identifier d. For instance, the cryptographic read access value 1224 may be calculated as follows.

$$\text{Cryptographic Read Access Value} = \frac{F(K_d^w, d)}{F(K_u, d)} \quad (1)$$

Referring to FIG. 1.2B, a write access token 1232 includes a corresponding location (u, d) 1212 in the user write set 1230 and a cryptographic write access value 1234. A user device 1110 associated with a user 1010 in possession of the write key $K_d^w$

204 may generate the write access token 1232 for the user 1010 locally and send the write access token 1232 to the SSE manager 1160 for input to the user write set 1230 at the corresponding location (u, d) 1212. In the example shown, the cryptographic write access value 1234 includes a quotient of a pseudorandom function F of the write key $K_d^w$

204 and the document identifier d divided by a pseudorandom function F of the write key $K_d^w$

204 and the user identifier u multiplied by a pseudorandom function F of the user key $K_u$ 1112 and the user identifier u. For instance, the cryptographic write access value 1234 may be calculated as follows.

$$\text{Cryptographic Write Access Value} = \frac{F(K_d^w, d)}{F(K_d^w, u)F(K_u, u)} \quad (2)$$

In some implementations, the creator/sharor 1010*a* shares read access to at least one sharee 1010*n* for a document 1200 stored in the data store 1150 (e.g., memory hardware) by sending a shared read access command 1250 over the network 1130 to the SSE manager 1160. The shared read access command 1250 includes the encrypted metadata $m_d$ 1256 and a first cryptographic share value $S_1$ 252 based on the read key $K_d^r$

202, the write key $K_d^w$

204, the document identifier d, and a user/sharee identifier $u_n$ identifying the sharee 1010*n*. The creator/sharor 1010*a* additionally provides the read key $K_d^r$

202 for the document 1200 to the at least one sharee 1010*n*. In the example shown, the creator/sharor 1010*a* provides the read key $K_d^r$

202 by sending the read key $K_d^r$

202 over the secure and authenticated communication link 1120. Accordingly, the read key $K_d^r$

202 is kept private from the remote system 1140 and only provided to users 1010 having read access.

In order to attain read access to the document 1200, the user device 1110*n* associated with the sharee 1010*n* sends a read access request 1260 to the SSE Manager 1160. The read access request 1260 includes the sharee identifier $u_n$, the document identifier d, and a second cryptographic share value $S_2$ 262 based on the read key $K_d^r$

202 and a user key $K_{un}$ 1112 associated with the sharee 1010*n*. In some implementations, the user device 1110 associated with the sharee 1010*n* computes the second cryptographic share value $S_2$ 262 in response to receiving the read key $K_d^r$

202 from the sharor 1010*a*. The SSE manager 1160 computes a corresponding read access token $T_{Rn}$ 1222 for the sharee 1010*n* using the first cryptographic share value $S_1$ 252 received from the sharor 1010*n* in the shared read access command 1250 and the second cryptographic share value $S_2$ 262 received from the sharee 1010*a*. Thereafter, the SSE manager 1160 stores/records the read access token $T_{Rn}$ 1222 for the sharee 1010*n* in the user read set 1220 at the location 1212 ($u_n$, d).

In some implementations, the sharor 1010*a* shares write access to at least one sharee 1010*n* for the document 1200 in the data store 1150 by sending shared write access permissions 1402 (FIG. 1.4A) to the sharee 1010*n* over the secure and authenticated communication link 1120. In the example shown, the shared write access permissions include the read key $K_d^r$

202, the write key $$K_d^w$$

204, and the encrypted metadata $m_d$ 1256. In response to receiving the shared write access permissions 1402, the sharee 1010*n* computes a corresponding write access token $T_W$ 1232 for the sharee 1010*n* and sends the write access token $T_W$ 1232 to the SSE manager 1160 for input to the user write set 1230 at the corresponding location 1212 ($u_n$, d). As write access implies read access, the sharee 1010*n* further computes the corresponding read access token $T_R$ 1222 for the sharee 1010*n* and sends the read access token $T_R$ 1222 to the SSE manager 1160 for input to the user read set 1220 at the corresponding location 1212 ($u_n$, d).

FIGS. 1.3A and 1.3B show schematic views 1300*a*, 1300*b* of an example SSE manager 1160 authorizing/revoking read access for a document 1200 to/from a sharee 1010*b*. Referring to FIG. 1.3A, the SSE manager 1160 receives the shared read access command 1250 from the sharor 1010*a* sharing read access to the sharee 1010*b* for the document 1200 stored in the data store 1150 (e.g., memory hardware). The shared access read command 1250 includes the first cryptographic share value $S_1$ 252 and the encrypted metadata $m_d$ 1256 associated with the document 1200. In the example shown, the first cryptographic share value $S_1$ 252 includes a quotient of a pseudorandom function F of the write key $$K_d^w$$

204 and the document identifier d divided by a pseudorandom function F of the read key $$K_d^r$$

202 and the user/sharee identifier $u_2$ identifying the sharee 1010*b*. For instance the first cryptographic share value $S_1$ 252 may be calculated as follows.

$$S_1 = \frac{F(K_d^w, d)}{F(K_d^r, u_2)} \tag{3}$$

In response to receiving the read key $$K_d^r$$

202 from the sharor 1010*a*, the sharee 1010*b* computes the second cryptographic share value $S_2$ 262 based on the read key $$K_d^r$$

202 and a user key $K_{u2}$ 1112 associated with the sharee 1010*b*. In the example shown, the second cryptographic share value $S_2$ 262 includes a quotient of a pseudorandom function F of the read key $$K_d^r$$

202 and the user identifier $u_2$ identifying the sharee 1010*b* divided by a pseudorandom function F of the user key $K_{u2}$ 1112 and the document identifier d identifying the document 1200. For instance the second cryptographic share value $S_2$ 262 may be calculated as follows.

$$S_2 = \frac{F(K_d^r, u_2)}{F(K_{u2}, d)} \tag{4}$$

The SSE manager 1160 also receives the read access request 1260 from the sharee 1010*b* that includes the second cryptographic share value $S_2$ 262 and the location 1212 associated with the user identifier $u_2$ and the document identifier d. In some implementations, the SSE manager 1160 determines the cryptographic read access value 1224 for the sharee 1010*b* based on the first and second cryptographic share values $S_1$, $S_2$ 252, 262 received from the corresponding one of the sharor 1010*a* or the sharee 1010*b*. The cryptographic read access value 1224 authorizes read access to the sharee 1010*b* for the document 1200. In some examples, the SSE manager 1160 determines the cryptographic read access value 1224 for the sharee 1010*b* by multiplying the first cryptographic share value $S_1$ 252 and the second cryptographic share value $S_2$ 262. Thereafter, the SSE manager 1160 stores/records a read access token $T_{R2}$ 1222 for the sharee 1010*b* in the user read set 1220 at the location 1212 ($u_2$, d). The read access token $T_{R2}$ 1222 includes the computed cryptographic read access value 1224 and the encrypted metadata $m_d$ 1256.

Referring to FIG. 1.3B, the SSE manager 1160 receives a revoke read access command 1350 from the sharor 1010*a* revoking read access from the sharee 1010*b* for the document 1200 stored in the data store 1150. In the example shown, the sharor 1010*a* corresponds to a creator of the document 1200 and is the only individual permitted to revoke read access (and also write access) from any sharees 1010 having read access permissions. In other configurations, the sharor 1010*a* may correspond to a writer of the document 1200 having the ability to share/revoke read access for the document 1200 to/from sharees 1010. The revoke read access command 1350 may identify the location 1212 ($u_2$, d) that includes the read access entry (e.g., read access token 1222) to be removed from the corresponding sharee 1010*b* in the user read set 1220. In response to receiving the revoke read access command 1350, the SSE manager 1160 may send a revoke read access input 1352 (e.g., "Delete Entry") to the data record set 1210 to remove the read access token $T_{R2}$ 1222 from the user read set 1220. Accordingly, with the token $T_{R2}$ 1222 removed from the location 1212 ($u_2$, d) in the user read set 1220, the sharee 1010*b* no longer has read access permissions to the document 1200.

In some examples, the SSE manager 1160 also determines whether a corresponding write access token $T_{W2}$ 1232 exists for the sharee 1010*b* at the location 1212 ($u_2$, d) in the user write set 1230, and when the write access token $T_{W2}$ 1232 exists, the SSE manager 1160 also removes the write access token $T_{W2}$ 1232 from the user write set 1230. For instance, the SSE manager 1160 may send a revoke write access input 1452 (FIG. 1.4B) to the data record set 1210 to remove the write access token $T_{R2}$ 1222 from the user write set 1230.

FIGS. 1.4A and 1.4B show schematic views 1400*a*, 1400*b* of an example SSE manager 1160 authorizing/revoking write access for a document 1200 to/from a sharee 1010*b*. Referring to FIG. 1.4A, the sharee 1010*b* (i.e., via the user device 1110*b* (FIG. 1.1)) receives the write access permissions 1402 from the sharor 1010*a* sharing write access to the sharee 1010*b* for the document 1200 stored in the data store 1160. The sharee 1010*b* may receive the write access permissions 1402 over the secure and authenticated communication link 1120. The shared write access permissions 1402 include the read key $$K_d^r$$

202, the write key $$K_d^w$$

204, and the encrypted metadata $m_d$ 1256.

Using the write access permissions 1402, the sharee 1010*b* computes both a read access token $T_{R2}$ 1222 for the sharee 1010*b* and a write access token $T_{W2}$ 1232 for the sharee 1010*b* since having write access permissions also includes read access permissions. For instance, the sharee 1010*b* may compute the cryptographic read access value 1224 using Equation 1 and send the read access token $T_{R2}$ 1222 including the cryptographic read access value 1224 and the encrypted metadata $m_d$ 1256 to the SSE manager 1160. Similarly, the sharee 1010*b* may compute the cryptographic write access value 1234 using Equation 2 and send the write access token $T_{W2}$ 1232 including the cryptographic write access value 1234 to the SSE manager 1160. The sharee 1010*b* may send the tokens 1222, 1232 to the SSE manager separately or simultaneously.

In the example shown, the SSE manager 1160 stores/records the write access token $T_{W2}$ 1232 for the sharee 1010*b* in the user write set 1230 at the location 1212 ($u_2$, d) in response to receiving the write access token $T_{W2}$ 1232 from the sharee 1010*b*. Accordingly, the entry of the write access token $T_{W2}$ 1232 in the user write set 1230 at the location 1212 ($u_2$, d) authorizes write access to the sharee 1010*b* for editing (e.g., delete/overwrite/add) the document 1200 stored in the data store 1160 without providing any private keys to the remote system 1140.

SSE manager 1160 also stores/records the read access token $T_{R2}$ 1222 for the sharee 1010*b* in the user read set 1220 at the location 1212 ($u_2$, d) in response to receiving the read access token $T_{R2}$ 1222 from the sharee 1010*b*. Accordingly, the entry of the read access token $T_{R2}$ 1222 in the user read set 1220 at the location 1212 ($u_2$, d) authorizes read access to the sharee 1010*b* for the document 1200 stored in the data store 1160 without providing any private keys to the remote system 1140.

Referring to FIG. 1.4B, the SSE manager 1160 receives a revoke write access command 1450 from the sharor 1010*a* revoking write access from the sharee 1010*b* for the document 1200 stored in the data store 1150. In the example shown, the sharor 1010*a* corresponds to a creator of the document 1200 and is the only individual permitted to revoke write access (and also read access) from any sharees 1010 having write access permissions. In other configurations, the sharor 1010*a* may correspond to a writer of the document 1200 having the ability to share/revoke write access for the document 1200 to/from sharees 1010. The revoke write access command 1450 may identify the location 1212 ($u_2$, d) that includes the write access entry (e.g., write access token 1232) to be revoked from the corresponding sharee 1010*b* in the user write set 1230. In response to receiving the revoke write access command 1450, the SSE manager 1160 may send the revoke write access input 1452 (e.g., "Delete Entry") to the data record set 1210 to remove the write access token $T_{W2}$ 1232 from the user write set 1230. Accordingly, with the token $T_{W2}$ 1232 removed from the location 1212 ($u_2$, d) in the user write set 1230, the sharee 1010*b* no longer has write access permissions to the document 1200. In the example of FIG. 1.4B, the read access token $T_{R2}$ 1222 will remain as a valid entry in the user read set 1220 at location 1212 ($u_2$, d) unless the SSE manager 1160 receives a revoke read access command 1350 (FIG. 1.3B) from the sharor 1010*b*. Document owners 1010 may assume the role of the SSE manager 1160 for granting/revoking access.

FIGS. 1.5A and 1.5B show schematic views 1500*a*, 1500*b* of an example user 1010, via the user device 1110, sending a search query 1550 to the SSE manager 1160 for a keyword w in an encrypted document 1200 stored in the data store 1150. The SSE manager 1160 may correspond to an owner of the document in some scenarios. In the example shown, the user 1010 has read access to the encrypted document 1200 and may correspond to a creator 1010*a* of the document 1200 or a sharee 1010*a* having shared read access for the document 1200. In the example shown, the search query 1550 includes the user identifier u, the document identifier d, and a cryptographic search value $x_d$ 1552 based on the read key $$K_d^r$$

202 and the user key $K_u$ 1112 associated with the user 1010. In some implementations, the cryptographic search value $x_d$ 1552 includes a generator g to the power of a pseudorandom function F of the read key $$K_d^r$$

202 and the keyword w multiplied by a pseudorandom function F of the user key $K_u$ 1112 and the document identifier d identifying the document 1200. For instance, the cryptographic search value $x_d$ 1552 may be calculated as follows.

$$x_d = g^{F(K_d^r, w)F(K_u, d)} \tag{5}$$

In some examples, the generator g corresponds to a group where Diffie-Hellman is hard. The cryptographic search value $x_d$ 1552 allows the SSE manager 1160 to determine that the user 1010 has access to both the cryptographic read key $$K_d^r$$

202 and the cryptographic user key $K_u$ 1112 without requiring the user 1010 to provide either of the keys 1112, 202 to the SSE manager 1160.

In some implementations, the user 1010 sends the search query 1550 for the keyword w over a set of documents $U_r(u)$ 1200 the user 1010 has read access. Accordingly, the user 1010 may compute $x_d, x_{d1}, \ldots, x_{dn}$ using Equation (5) for each corresponding document 1200 among the set of documents $U_r(u)$ 1200 and include each value of $x_d, x_{d1}, \ldots, x_{dn}$ and each corresponding document identifier d, $d_1, \ldots, d_n$ in the search query 1550 sent to the SSE manager 1160. The user device 1110 associated with the user 1010 may keep track of each document 1200 that the user 1010 has read access permission and include those documents 1200 within the set of documents $U_r(u)$ 1200.

In response to receiving the search query 1550 from the user 1010, the SSE manager 1160 queries 1560 the document record set 1210 to retrieve the read access token $T_R$ 1222 for the user 1010 from the user read set 1220 of the document record set 1210 at the location 1212 (*u, d*). The SSE manager 1160 may query 1560 each document record set 1210, 1210*a-n* when the received search query 1550 from the user 1010 is associated with the set of documents $U_r(u)$ 1200. The read access token $T_R$ 1222 retrieved by the SSE manager 1160 from the user read set 1220 includes a corresponding cryptographic read access value $y_d$ 1224 and the encrypted metadata $m_d$ 1256.

Referring to FIG. 1.5B, in some implementations, the SSE manager 1160 (e.g., data processing hardware) computes a cryptographic word set token $z_d$ based on the cryptographic search value $x_d$ 1552 received from the user 1010 in the search query 1550 and the cryptographic read access value $y_d$ 1224 of the read access token $T_R$ 1222 retrieved from the user read set 1220. For instance, the SSE manager 1160 may compute the cryptographic word set token $z_d$ as follows.

$$z_d = x_d^{y_d} \tag{6}$$

Thereafter, the SSE manager 160 determines whether or not the computed cryptographic word set token $z_d$ matches at least one corresponding cryptographic word set token $z_d$ recorded/stored in the word set 1240 for the corresponding document 1200. Here, the SSE manager 1160 is determining whether or not the recently computed token $z_d$ appears in the word set 1240 associated with the corresponding document 1200. In the example shown, the SSE manager 1160 queries 1570 the word set 1240 using the cryptographic word set token $z_d$. When the query 1570 identifies the corresponding cryptographic word set token $z_d$, the SSE manager 1160 retrieves the corresponding encrypted word metadata $m_w$ 1556 for the word w at the location (w, d) in the word set 1240 associated with the matching token $z_d$.

In some implementations, the SSE manager 1160 returns a result set 1580 including the document identifier d identifying the corresponding document 1200, the encrypted metadata mad 1256 for the document 1200, and the encrypted word metadata $m_w$ 1556. The SSE manager 1160 may return a corresponding result set 1580 for each document the user 1010 has read access to. Using the read key $$K_d^r$$

202, the user 1010 (i.e., via the user device 1110) may decrypt the encrypted metadata $m_d$ 1256 to provide the metadata $M_d$ and decrypt the encrypted word metadata to provide the word metadata $M_d(w)$ for the document d associated with the word w. In some examples, the user device 1110 uses the metadata Ma and the word metadata $M_d(w)$ for the document d associated with the word w to sort and display search results on a display of the user device 1110. For instance, the word metadata $M_d(w)$ may include snippets, rankings, extensions, etc. that may be used to sort the search results on the display of the user device 1110. FIG. 1.5C provides an example algorithm for a user 1010 performing a search for a keyword w over a set of documents Ur(u) 1200 that the user has read access.

FIGS. 1.6A and 1.6B show schematic views 1600*a*, 1600*b* of an example user 1010, via the user device 1110, sending an edit operation request 1650 to the SSE manager 1160 to edit a word w within an encrypted document 1200 stored in the data store 1150. The SSE manager 1160 may correspond to an owner of the document in some scenarios. In the example shown, the user 1010 has write access permission to the encrypted document 1200 and may correspond to a creator 1010*a* of the document 1200 or a sharee 1010*n* having shared write access for the document 1200. An edit operation 1654 requested by the edit operation request 1650 may include one of a delete, overwrite, or add operation on the keyword w in the document 1200. In the example shown, the user 1010 creates word metadata $M_d(w)$ for the document d associated with the word identifier w identifying the word to be edited. The word metadata $M_d(w)$ may include a ranking, extensions, snippets, etc. associated with the word identifier w identifying the word within the document 1200 to be edited. The user may encrypt the word metadata $M_d(w)$ using read key $$K_d^r$$

202 to provide word metadata $m_w$ 1556. In some implementations, the user 1010, via the user device 1110 computes a cryptographic edit value x 1652 based on the read key $$K_d^r$$

202, the write key $$K_d^w$$

204, and the user key $K_u$ 1112 associated with the user 1010.

In the example shown, the edit operation request 1650 includes the user identifier u, the document identifier d, the edit operation 1654, encrypted word metadata $m_w$ 1556, and a cryptographic edit value x 1652 based on the read key $$K_d^r$$

202, the write key $$K_d^w$$

204, the user key $K_u$ 1112, the word identifier w, and the user identifier u identifying the user 1010. In some implementations, the cryptographic edit value x 1652 includes a generator g to the power of a pseudorandom function F of the read key $$K_d^r$$

202 and the keyword w multiplied by a pseudorandom function F of the user key $K_u$ 1112 and the user identifier u multiplied by a pseudorandom function F of the write key $$K_d^w$$

204 and the user identifier u. For instance, the cryptographic edit value x 1652 may be calculated as follows.

$$x = g^{F(K_d^r, w)F(K_u, u)F(K_d^w, u)} \quad (7)$$

In some examples, the generator g corresponds to a group where Diffie-Hellman is hard. The cryptographic edit value x 1652 allows the SSE manager 1160 to determine that the user 1010 has access to the cryptographic read key $$K_d^r$$

202, the cryptographic write key $$K_d^w$$

204, and the cryptographic user key $K_u$ 1112 without requiring the user 1010 to provide any of the keys 1112, 202, 204 to the SSE manager 1160.

In response to receiving the edit operation request 1650 from the user 1010, the SSE manager 1160 queries 1660 the document record set 1210 to retrieve the write access token $T_w$ 1232 for the user 1010 from the user write set 1230 at the location 1212 (u, d). The write access token $T_W$ 1222 retrieved by the SSE manager 1160 from the user write set 1230 includes a corresponding cryptographic write access value y 1234.

Referring to FIG. 1.6B, in some implementations, the SSE manager 1160 (e.g., data processing hardware) computes a cryptographic word set token z based on the cryptographic edit value x 1652 received from the user 1010 in the edit operation request 1650 and the cryptographic write access value y 1234 of the write access token $T_W$ 1232 retrieved from the user write set 1230. For instance, the SSE manager 1160 may compute the cryptographic word set token z as follows.

$$z = x^y \quad (8)$$

Thereafter, the SSE manager 1160 processes 1670 the edit operation 1654 requested by the edit operation request 1650 on a corresponding cryptographic word set token z recorded/stored in the word set 1240 for the corresponding document 1200. For instance, when the edit operation 1654 includes a delete operation, the SSE manager 1160 may process the delete operation by deleting/removing the corresponding cryptographic word set token z from the word set 1240. In some examples, when the edit operation 1654 includes an overwrite operation, the SSE manager 1160 processes 1670 the overwrite operation by replacing the corresponding cryptographic word set token z in the word set 1240 with the computed cryptographic word set token z and the encrypted word metadata $m_d$ 1556. In yet another example, when the edit operation 1654 includes an add operation (e.g., when z does not exist in the word set 1240), the SSE manager 1160 processes the add operation by adding the computed cryptographic word set token z and the encrypted word metadata m. 1556 into the word set 1240 at the location (w, d). FIG. 1.6C provides an example algorithm for a user 1010 performing a search for a keyword w over a set of documents Ur(u) 1200 that the user has read access.

FIG. 1.7 is a flowchart of an example method 1700 of a sharor 1010*a* sharing read access to a sharee 1010*b* for a document 1200 stored in a data store 1150. The flowchart starts at operation 1702 when the SSE manager 1160 (e.g., data processing hardware) receives a shared read access command 1250 from the sharor 1010*a*. The shared read access command 1250 includes first cryptographic share value $S_1$ 252 and the encrypted metadata $m_d$ 1256 associated with the document 1200. The first cryptographic share value $S_1$ 252 may be based on a write key $$K_d^w$$

204 for the document, a read key $$K_d^r$$

202, a document identifier d identifying the document, and a sharee identifier $u_2$ identifying the sharee 1010*b*. For instance, the first cryptographic share value $S_1$ 252 may be calculated using Equation (3).

At operation 1704, the method 1700 includes the SSE manager 1160 receiving a shared read access request 1260 from the sharee 1010*b* that includes a second cryptographic share value $S_2$ 262 and a location 1212 associated with the sharee identifier $u_2$ and the document identifier d. In some examples, the sharee 1010*b* computes the second cryptographic share value $S_2$ 262 based on the read key $$K_d^r$$

202 and a user key $K_{u2}$ 1112 associated with the sharee 1010*b*. For instance, the second cryptographic share value $S_2$ 262 may be calculated using Equation (4).

At operation 1706, the method 1700 includes the SSE manager 1160 determining a cryptographic read access value 1224 for the sharee 1010*b* based on the first cryptographic share value $S_1$ 252 and the second cryptographic share value $S_2$ 262. For instance, the SSE manager 1160 may multiply the first cryptographic share value $S_1$ 252 received in the shared read access command 1250 from the sharor 1010*a* by the second cryptographic share value $S_2$ 262 received in the shared read access request 1260 from the sharee 1010*b* to determine the cryptographic read access value 1224 for the sharee 1010*b*. The cryptographic read access value 1224 may be used by the SSE manager 1160 to authorize read access to the sharee 1010*b* for the document 1200 stored in the memory hardware.

At operation 1708, the method includes the SSE manager 1160 storing a read access token 1222 including the cryptographic read access value 1224 and the encrypted metadata $m_d$ 1256 in a user read set 1220 of the memory hardware. The user read set 1220 includes a list of sharee identifiers $u_1$-$u_n$ associated with sharees having read access to the document 1200.

FIG. 1.8 is a flowchart of an example method 1800 of a sharor 1010*a* sharing write access to a sharee 1010*b* for a document 1200 stored on a distributed storage system 1150. The flowchart starts at operation 1802 when a sharee device 1110 associated with the sharee 1010*b* receives shared write access permissions 1402 from a sharor 1010*b* sharing write access to the sharee 1010*b* for the document stored on the distributed storage system. The write access permissions 1402 include a read key $$K_d^r$$

202 for the document 1200, a write key $$K_d^w$$

204 for the document 1200, and encrypted metadata $m_d$ 1256 for the document 1200. The sharee device 1110 may receive the write access permissions 1402 from the sharor 1010*a* over a secure and authenticated communication channel.

At operation 1804, the method 1800 includes the sharee device 1110 determining a cryptographic write access value 1234 based on the write key $$K_d^w$$

204, a document identifier d identifying the document 1200, a sharee identifier u identifying the sharee 1010*b*, and a sharee cryptographic key $K_U$ 1112 associated with the sharee 1010*b*. The cryptographic write access value 1234 may be calculated using Equation (2). The cryptographic write access value 1234 authorizes write access to the sharee 1010*b* for the document 1200.

At operation 1804, the method 1800 includes sending a write access token 1232 for the sharee 1010*b* that includes the cryptographic write access value 1234 to the distributed storage system 1150. In response to receiving the write access token 1232, the distributed storage system 1150 is configured to store the write access token in a user write set 1230. The user write set 1230 includes a list of sharee identifiers associated with sharees 1010 having write access to the document 1200.

As write access implies read access, the method 1800 may further include the sharee device 1110 determining a cryptographic read access value 1224 based on the write key $$K_d^w$$

204, the document identifier d, and the sharee cryptographic key $K_U$ 1112. The cryptographic read access value 1224 may be calculated using Equation (1). The cryptographic read access value authorizes read access to the sharee 1010*b* for the document 1200. The method 1800 may further include the sharee device 1110 sending a read access token 1222 for the sharee 1010*b* to the distributed storage system 1150. The read access token 1222 may include the cryptographic read access value 1224 and the encrypted metadata $m_d$ 1256.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

FIG. 1.9 is schematic view of an example computing device 1900 that may be used to implement the systems and methods described in this document. The computing device 1900 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit the various implementations described and/or claimed in this document.

The computing device 1900 includes a processor 1910, memory 1920, a storage device 1930, a high-speed interface/controller 1940 connecting to the memory 1920 and high-speed expansion ports 1950, and a low speed interface/controller 1960 connecting to low speed bus 1970 and storage device 1930. Each of the components 1910, 1920, 1930, 1940, 1950, and 1960, are interconnected using various busses, and may be mounted on a common motherboard or in other manners as appropriate. The processor 1910 can process instructions for execution within the computing device 1900, including instructions stored in the memory 1920 or on the storage device 1930 to display graphical information for a graphical user interface (GUI) on an external input/output device, such as display 1980 coupled to high speed interface 1940. In other implementations, multiple processors and/or multiple buses may be used, as appropriate, along with multiple memories and types of memory. Also, multiple computing devices 1900 may be connected, with each device providing portions of the necessary operations (e.g., as a server bank, a group of blade servers, or a multi-processor system).

The memory 1920 stores information non-transitorily within the computing device 1900. The memory 1920 may be a computer-readable medium, a volatile memory unit(s), or non-volatile memory unit(s). The non-transitory memory 1920 may be physical devices used to store programs (e.g., sequences of instructions) or data (e.g., program state information) on a temporary or permanent basis for use by the computing device 1900. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 1930 is capable of providing mass storage for the computing device 1900. In some implementations, the storage device 1930 is a computer-readable medium. In various different implementations, the storage device 1930 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 1920, the storage device 1930, or memory on processor 1910.

The high speed controller 1940 manages bandwidth-intensive operations for the computing device 1900, while the low speed controller 1960 manages lower bandwidth-intensive operations. Such allocation of duties is exemplary only. In some implementations, the high-speed controller 1940 is coupled to the memory 1920, the display 1980 (e.g., through a graphics processor or accelerator), and to the high-speed expansion ports 1950, which may accept various expansion cards (not shown). In some implementations, the low-speed controller 1960 is coupled to the storage device 1930 and low-speed expansion port 1970. The low-speed expansion port 1970, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 1900 may be implemented in a number of different forms, as shown in the figure. For example, it may be implemented as a standard server 1900*a* or multiple times in a group of such servers 1900*a*, as a laptop computer 1900*b*, or as part of a rack server system 1900*c*. In some implementations, the computing device 1900 implements the SSE manager 1160.

Section 2: Efficient Oblivious Permutation

Implementations herein are directed toward using oblivious random access memory (O-RAM) to conceal client access patterns to client-owned and client-encrypted data stored on untrusted memory. The untrusted memory may include a storage abstraction overlaid across multiple memory locations of a distributed system. The untrusted memory may be divided into multiple buckets each containing an equal number of data blocks and the client may iteratively download one bucket at a time from the untrusted memory and apply a random permutation on the data blocks residing in the downloaded bucket. The random permutation may assign each of the data blocks from the downloaded bucket a new memory location on the untrusted memory that is oblivious to a service provider of the untrusted memory (e.g., a cloud service provider). Moreover, the client may further decrypt and encrypt the data blocks locally using client-side keys without giving the service provider plain text access to the data. Implementations further include initializing cache slots in local memory at the client for storing the permutated data blocks before uploading the data blocks to their new memory locations. Each cache slot may serve as an extension to the new memory locations of the untrusted memory, and therefore reduce a level of overhead and bandwidth required for uploading permutated data blocks from the client to the untrusted memory.

FIG. 2.1 depicts an example system 2100 for storing data blocks 2102 owned by a client 2104 on a distributed system 2140 and obliviously moving the data blocks 2102 around the distributed system 2140 to conceal access patterns while preserving search functionalities on the data blocks 2102 by the client 2104. A client device 2120 (e.g., a computer) associated with the client 2104 communicates, via a network 2130, with the distributed system 2140 having a scalable/elastic non-transitory storage abstraction 2150. The client device 2120 may include associated memory hardware 2122. The storage abstraction 2150 (e.g., key/value store, file system, data store, etc.) is overlain on the storage resources 2114 to allow scalable use of the storage resources 2114 by one or more client devices 2120.

In some implementations, the distributed system 2140 executes a computing device 2112 that manages access to the storage abstraction 2150. For instance, the client device 2120 may encrypt and store the data blocks 2102 on the storage abstraction 2150, as well as retrieve and decrypt the data blocks 2102 from the storage abstraction 2150. While the example shown depicts the system 2100 having a trusted side associated with the client device 2120 in communication, via the network 2130, with an untrusted side associated with the distributed system 2140, the system 2100 may be alternatively implemented on a large intranet having a trusted computing device(s) (CPU) and untrusted data storage.

In some implementations, the distributed system 2100 includes resources 2110, 2110*a-z*. The resources 2110 may include hardware resources 2110 and software resources 2110. The hardware resources 2110 may include computing devices 2112 (also referred to as data processing devices and data processing hardware) or non-transitory memory 2114 (also referred to as memory hardware). The software resources 2110 may include software applications, software services, application programming interfaces (APIs) or the like. The software resources 2110 may reside in the hardware resources 2110. For example, the software resources 2110 may be stored in the memory hardware 2114 or the hardware resources 2110 (e.g., the computing devices 2112) may be executing the software resources 2110.

A software application (i.e., a software resource 2110) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The memory hardware 2114, 2122 may be physical devices used to store programs (e.g., sequences of instructions) or data (e.g., program state information) on a temporary or permanent basis for use by a computing device 2112 and/or a client device 2120. The memory hardware 2114, 2122 may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), oblivious random access memory (ORAM), dynamic random access memory (DRAM), static random access memory (SRAM), phase change memory (PCM) as well as disks or tapes.

The network 2130 may include various types of networks, such as local area network (LAN), wide area network (WAN), and/or the Internet. Although the network 2130 may represent a long range network (e.g., Internet or WAN), in some implementations, the network 2130 includes a shorter range network, such as a local area network (LAN). In some implementations, the network 2130 uses standard communications technologies and/or protocols. Thus, the network 2130 can include links using technologies, such as Ethernet, Wireless Fidelity (WiFi) (e.g., 802.11), worldwide interoperability for microwave access (WiMAX), 3G, Long Term Evolution (LTE), digital subscriber line (DSL), asynchronous transfer mode (ATM), InfiniBand, PCI Express Advanced Switching, Bluetooth, Bluetooth Low Energy (BLE), etc. Similarly, the networking protocols used on the network 2132 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 2130 can be represented using technologies and/or formats including the hypertext markup language (HTML), the extensible markup language (XML), etc. In addition, all or some of the links can be encrypted using conventional encryption technologies, such as secure sockets layer (SSL), transport layer security (TLS), virtual private networks (VPNs), Internet Protocol security (IPsec), etc. In other examples, the network 2130 uses custom and/or dedicated data communications technologies instead of, or in addition to, the ones described above.

The data blocks 2102 correspond to atomic units of data and each have size B bytes each. For example, a typical value for B for storage on a distributed system may be 64 KB to 256 B. A notation N denotes a total number of the data blocks 2102 associated with the client 2104 and stored on the storage abstraction 2150 using Oblivious Random Access Memory (O-RAM). Thus, N may refer to the capacity of the O-RAM on the storage abstraction 2150. Each of the N data blocks 2102 is stored at a corresponding memory location 2118, 2118A-N (FIG. 2.2) of the storage abstraction 2150 overlain across the memory hardware 2114.

While traditional encryption schemes provide confidentiality, the traditional encryption schemes are ineffective at hiding data access patterns which may reveal very sensitive information to the untrusted distributed system 2140. Moreover, the traditional encryption schemes allow the client 2104 to search for encrypted data 2102 stored on the distributed system 2140 only if the client 2104 provides plain text access for the data 2102 to the distributed system 2140. As the client device 2120 originates the data 2102, the client device 2120 is considered trusted. In some implementations, the client device 2120 and the distributed system 2140 execute an oblivious permutation routine 2300 for oblivious moving the encrypted data blocks 2102 around the storage abstraction 2150 to completely hide data access patterns (which data blocks 2102 were read/written) from the distributed system 2140.

Execution of the oblivious permutation routine 2300 requires $(4+\varepsilon)N$ block accesses while only requiring $O(\sqrt{N})$ storage capacity at the client memory 2122. The routine 2300 may achieve a bandwidth of about 2.2N to provide an amortized cost equal to about $2.2\sqrt{N}$ accesses (e.g., a read access or a write access) to the data stored on the storage abstraction 2150.

At the untrusted side, the distributed system 2140 may receive an oblivious permutation request 2302 from the trusted client device 2120 to initiate the oblivious permutation routine 2300. For instance, the oblivious permutation routine 2300 may cause the distributed system 2140 to allocate new memory locations 2118 of the storage abstraction 2150 for storing re-permutated data blocks 2102 and organize/divide/partition the storage abstraction 2150 into multiple data buckets 2350, 2350*a-n*. In some implementations, the oblivious permutation routine 2300 organizes the storage abstraction 2150 into n data buckets 2350 each containing n data blocks 2102, whereby the value n is equal to the square root of the N data blocks 2102 (i.e., $n=\sqrt{N}$). For instance, the routine may organize the storage abstraction 2150 by dividing the memory locations 2118 into the substantially n data buckets 2350 each containing substantially n data blocks 2102. In some examples, the n data blocks 2102 are randomly assigned to each data bucket 2350 by permutations performed at the client device 2120 during a previous oblivious permutation routine 2300. Accordingly, the division of the storage abstraction 2150 into the n data buckets 2350 is obscure/oblivious to the untrusted distributed system 2140. The smaller data buckets 2350 subdivide the O-RAM of the storage abstraction 2150 to increase bandwidth when the distributed system 2140 and the client device 2120 are performing permutation operations during execution of the oblivious permutation routine 2300. Moreover, the oblivious permutation routine 2300 may allocate substantially n buffer buckets 2360, 2360*a-n* associated with the new memory locations 2118.

In some examples, substantially $\sqrt{N}$ encompasses a range of values, such as between $N^{0.1}$ and $N^{0.75}$. Other ranges are possible as well. In additional examples, substantially $\sqrt{N}$ includes: $N^{0.5}$, which provides an algorithm with one round-trip); $N^{1/3}$, which provides an algorithm with 2 round-trips; and $N^{0.20}$, which provides an algorithm with 4 round-trips. Relatively smaller values, may be less useful, since N could be impractically large. For relatively larger values, the gain in the algorithm may be less useful as well.

At the trusted side, the client device 2120 may iteratively download each of the n data buckets 2350 one at a time from the distributed system 2140 and allocates substantially n cache slots 2370, 2370*a-n* on the memory hardware 2122 while executing the oblivious permutation routine 2300. Each cache slot 2370 is associated with a corresponding buffer bucket 2360 allocated by the routine 2300 at the distributed system 2140. For each data bucket 2350 received, the client device 2120 applies a random permutation on the n data blocks 2102 within the corresponding data bucket 2350 to generate permutated data blocks and determines a corresponding buffer bucket 2360 and a corresponding cache slot for each permutated data block 2102. The client device 2120 may provide each of the permutated data blocks 2102 into the corresponding cache slot 2370 associated with the corresponding buffer bucket 2360. Here, the cache slots 2370 may temporarily store the recently permutated data blocks 2102 at the memory hardware 2122 of the client device 2120 until the data blocks 2102 are uploaded/sent to the distributed system 2140 for storage at the new memory locations 2118. Some of the data blocks 2102 may upload from their respective cache slot 2370 to the corresponding new memory location 2118 before preceding to the next iteration of downloading a subsequent data bucket 2350. In some examples, the cache slots 2370 collectively provide a storage capacity of n permutated data blocks 2102 at any given time. However, the memory hardware 2122 at the client device 2120 may additionally store miscellaneous states and information, such as cryptographic keys for authentication, encryption, and pseudo-random permutations.

During the current iteration, for each buffer bucket 2360, the client device 2120 is further configured to determine a quantity of data blocks to be sprayed into the buffer bucket 2360 and a strategy for selecting data blocks to be sprayed into the buffer bucket 2360 from at least one of: corresponding permutated data blocks 2102, cached permutated data blocks 2102 from the corresponding cache slot 2370; or dummy data blocks 2103. Subsequently, the client device 2120 may spray/evict (i.e., upload) the selected data blocks into the buffer buckets 2360 according to the strategy, store any unselected permutated data blocks in their corresponding cache slots, and remove any selected cached permutated data blocks 2102 from their corresponding cache slots 2370. In some implementations, the strategy for selecting the quantity of data blocks to be sprayed into each corresponding buffer bucket 2360 follows a strict priority order that includes: first, selecting from the corresponding permutated data blocks 2102; second, selecting from the cached permutated data blocks 2102 from the corresponding cache slot 2370; and third, selecting dummy data blocks 2103.

In some examples, the quantity of data blocks to be sprayed into a buffer bucket 2360 corresponds to a threshold value k that may be any value independent from the number of permutated data blocks corresponding to the buffer bucket 2360. Thus, the threshold value k may be any value independent of the number of data blocks 2102 currently residing at the client device 2120 (i.e., stored in the cache slots 2370). The threshold value k must be large enough so that the client device 2120 is never storing more than n data blocks 2102 at any given point in time. However, the threshold value k must also be small enough to have unselected data blocks 2102 leftover from spray iterations and stored in the corresponding cache slots 2370. For instance, larger threshold values k (e.g., k>O(log N/log log N)) result in all data blocks 2102 being selected after permutation and sprayed with a very high probability (but not guaranteed) of not having leftover/unselected blocks stored in the client cache slots 2370. The threshold value k may change during each iteration or may change every $i^{th}$ iteration in a repeating or non-repeating fashion. Any unselected data blocks 2102 are not sprayed during the current spray iteration and may be stored in their corresponding cache slots 2370 until a subsequent spray iteration (i.e., after the client device 2120 subsequently downloads one or more data buckets 2350). In some examples, the quantity of data blocks to be sprayed (i.e., selected data blocks) into one buffer bucket 2360 is different than the quantity of data blocks to be sprayed into another buffer bucket 2360 during the same iteration. Moreover, the quantity of data blocks to be sprayed into one buffer bucket 2360 may be different than the quantity of data blocks to be sprayed into another bucket 2360 between separate iterations.

In some examples, when a cache slot 2370 includes zero data blocks 2102 or a number of data blocks 2102 less than the threshold value k, the routine 2300 causes the client device 2120 to spray the one or more dummy blocks 2103 to make up the difference between k and the number of data blocks 2102 within the corresponding cache slot 2370. Thus, the "quantity of data blocks" sprayed may include all permutated data blocks 2102, all dummy blocks 2103, or a combination of one or more permutated data blocks 2102 and one or more dummy blocks 2103. In some examples, the client device 2120 sprays up to the threshold value k over a series of two or more spray iterations. For instance, the client device 2120 may spray one (1) data block 2102 (e.g., or a dummy block 2103 when the data block 2102 is not available) during three (3) consecutive spray iterations and then spray two (2) data blocks 2102 (e.g., or at least one dummy block 2102 if less than two data blocks 2102 are available) during a fourth iteration when the threshold value of k is equal to a value of 1.25. Similarly, a threshold value of k equal to 1.5 may result in client device 2120 spraying one (1) data block 2102 and then two (2) data blocks 2102 every other iteration. The client device 2120 may tag or pre-pend the data blocks 2102 and/or the dummy blocks 2103 so that dummy blocks 2103 can be identified for removal during a recalibration stage 2400 (FIGS. 2.4A and 2.4B).

Upon applying the random permutation on the n data blocks 2102 from the corresponding downloaded bucket 2350, selecting data blocks to be sprayed into each buffer bucket according to the strategy, spraying the selected data buckets into their corresponding buffer buckets 2360, and storing any unselected permutated data blocks 2102 at the cache slots 2370, the client device 2120 may download the next n data bucket 2350 and repeat the application of the random permutation and spraying/storing as set forth above during the next iteration. After downloading the last n data bucket 2350 and applying the random permutation on the n data blocks 2102 associated therewith, the client device 2120 sprays the quantity of selected data blocks 2102 according to the strategy into their corresponding buffer buckets 2360. With all of the N data blocks now randomly assigned to their corresponding new memory locations 2118 allocated in the memory 2114 and residing within the corresponding buffer buckets 2360, the oblivious permutation routine 2300 may cause the distributed system 2140 to de-allocate the data buckets 2350 associated with the old/stale memory locations 2118.

During each spray iteration, the number of data blocks 2102 and/or dummy blocks 2103 within each of the buffer buckets 2360 increases. After the last spray iteration (i.e., the $n^{th}$ spray iteration), the capacity of each of the n buffer buckets 2360 includes the n data blocks 2102 as well as any dummy blocks 2103 sprayed to compensate for iterations when the number of data blocks 2102 within a corresponding cache slot 2370 is less than the threshold value k. In some implementations, the oblivious permutation routine 2300 includes a recalibration stage 2400 (FIGS. 2.4A and 2.4B) whereby the client device 2120 iteratively downloads each of the n buffer buckets 2360 one at a time from the distributed system 2140. Accordingly, the recalibration stage 2400 includes n iterations or rounds. In some examples, the client device 2120 filters and removes all of the dummy blocks 2103 contained within the corresponding buffer bucket 2360 downloaded from the distributed system 2140 during the current iteration. Additionally, the client device 2120 may again decrypt and re-encrypt each of the data blocks 2102 within the corresponding buffer bucket 2360 and then order the data blocks 2102 correctly before uploading the corresponding buffer bucket 2360 back to the distributed system 2140. Upon recalibrating each buffer bucket 2360, the oblivious permutation routine 2300 has successfully permutated the N items without revealing any portion of the permutation to the distributed system 2140. Thus, re-encrypting of the data blocks 2102 prevents the distributed system 2140 from the ability to link the data blocks 2102 based on their content.

Referring to FIG. 2.2, in some implementations, the distributed storage system 2140 includes loosely coupled memory hosts 2110, 2110*a-z* (e.g., computers or servers), each having a computing resource 2112 (e.g., one or more processors or central processing units (CPUs)) in communication with storage resources 2114 (e.g., memory hardware, memory hardware, flash memory, dynamic random access memory (DRAM), phase change memory (PCM), and/or disks) that may be used for caching data. The storage abstraction 2150 overlain on the storage resources 2114 allows scalable use of the storage resources 2114 by one or more user devices 2120, 2120*a-n*. The user devices 2120 may communicate with the memory hosts 2110 through the network 2130 (e.g., via remote procedure calls (RPC)).

In some implementations, the distributed storage system 2140 is "single-sided," eliminating the need for any server jobs for responding to RPC from user devices 2120 to oblivious move data blocks 2102 around the storage abstraction 2150 when executing the oblivious permutation routine 2300. "Single-sided" refers to the method by which most of the request processing on the memory hosts 2110 may be done in hardware rather than by software executed on CPUs 2112 of the memory hosts 2110. Additional concepts and features related to a single-sided distributed caching system can be found in U.S. Pat. No. 9,164,2702, which is hereby incorporated by reference in its entirety.

The distributed system 2140 may obliviously move data blocks 2102 around the storage resources 2114 (e.g., memory hardware) of the remote memory hosts 2110 (e.g., the storage abstraction 2150) and get the data blocks 2102 from the remote memory hosts 2110 via RPCs or via remote direct memory access (RDMA)-capable network interface controllers (NIC) 2116. A network interface controller 2116 (also known as a network interface card, network adapter, or LAN adapter) may be a computer hardware component that connects a computing device/resource 2112 to the network 2130. Both the memory hosts 2110*a-z* and the user device 2120 may each have a network interface controller 2116 for network communications. The oblivious permutation routine 2300 executing on the physical processor 2112 of the hardware resource 2110 registers a set of remote direct memory accessible regions/locations 2118A-N of the memory 2114 with the network interface controller 2116. Each memory location 2118 is configured to store a corresponding data block 2102. The routine 2300 further allocates new memory locations 2118 to store each corresponding data block 2102 permutated by the client device 2120. Once all the data blocks 2102 are re-permutated and dummy blocks 2103 are filtered out and removed, the routine 2300 may de-allocate the stale memory locations 2118 from which the re-permutated data blocks 2102 were obviously moved from. For instance, the client device 2120 may tag the data blocks 2102 and/or the dummy blocks 2103 when spraying into the corresponding buffer buckets 2360 so that the dummy blocks 2103 can be identified for removal during the recalibration stage 2400.

In some implementations, the client device 2120 transmits an oblivious permutation request 2302 to instruct the data processing hardware 2112 of the hardware resource 2110 to execute the oblivious permutation routine 2300 for obliviously moving the data blocks 2102 stored at the memory 2114 to new memory locations 2118. The routine 2300 may divide the new memory locations 2118 into the n data buckets 2350 each containing n data blocks 2102 and the client device 2120 may issue a bucket download request 2304 over the distributed system 2140 to download each data bucket 2350 one at a time. The NIC 2116 may retrieve the requested data bucket 2350 and the corresponding n data blocks 2102 from the storage abstraction 2150 and provide the requested data bucket 2350 to the client device 2120. Downloading the data buckets 2350 in isolation allows the client device 2120 to apply the random permutation on only n data blocks 2102 at a time to reduce the load on the client device 2120 as well as reduce the amount of data stored at the client memory hardware 2122 (i.e., within the cache slots 2370). During each spray iteration, the client device 2120 may spray up to the threshold value k of data blocks 2102 and/or dummy blocks 2103 into the corresponding buffer buckets 2360 associated with the new memory locations 2118 at the distributed system 2140.

FIGS. 2.3A-2.3J provide an example oblivious permutation routine 2300 executing on the client device 2120 and the distributed system 2140 to obliviously move data blocks 2102 stored on the distributed system 2140. Referring to FIG. 2.3A, the client device 2120 transmits the oblivious permutation request 2302 to the distributed system 2140 for obliviously moving data blocks 2102A-N stored on the O-RAM storage abstraction 2150 overlain on the memory hardware 2114 of the distributed system 2140. The data blocks 2102A-N may be owned and encrypted by the client device 2120 using client-side keys and searchable, via queries, without giving a service provider of the distributed system 2140 plain text access to the stored data. For simplicity, the N data blocks 2102 is equal to sixteen (16). In some examples, the client 2104 corresponds to an enterprise or an employee of the enterprise. The distributed system 2140 divides/partitions the current memory locations 2118 of the storage abstraction 2150 into n data buckets 2350*a*, 2350*b*, 2350*c*, 2350*n* that each contain n data blocks 2102. Thus, the current memory locations 2118 are divided/partitioned into four (4) data buckets 2350*a*-2350*n* each containing four (4) data blocks 2102. In the example shown, data blocks 1-4 reside in the first data bucket 2350*a*, data blocks 5-8 reside in the second data bucket 2350*b*, data blocks 9-12 reside in the third data bucket 2350*c*, and data blocks 13-16 reside in the fourth data bucket 2350*n*. The distributed system 2140 further allocates new memory locations 2118 in the storage abstraction 2150 for storing the N blocks 2102 after permutation and initializes n buffer buckets 2360*a*, 2360*b*, 2360*c*, 2360*d* associated with the new memory locations 2118. The client device 2120 simultaneously allocates/initializes n cache slots 2370*a*, 2370*b*, 2370*c*, 2370*n* in the client memory hardware 2122 each associated with a corresponding buffer bucket 2360*a*, 2360*b*, 2360*c*, 2360*n* of the storage abstraction 2150. The client device 2120 may transmit a bucket download request 2304 to the distributed system 2140 requesting to download one of the data buckets 2350 and apply the random permutation on the n data blocks 2102 residing in the requested data bucket 2350. The client device 2120 may iteratively send the bucket download request 2304 each time the client device 2120 is ready to apply the random permutation on the n data blocks 2102 residing in the next data bucket 2350.

The client device 2120 may execute an encryption module 2305 or access the encryption module 2305 to randomly select an Advanced Encryption Standard (AES) key for use in applying the random permutation on the data blocks 2102 as well as encrypting, decrypting, and re-encrypting the data blocks 2102. Accordingly, the encryption module 2305 may provide a randomly generated key (e.g., an AES key) for obliviously moving the data blocks 2102 to new memory locations 2118 of the storage abstraction 2150 without revealing the permutation to the distributed system 2140. In some examples, the randomly generated key is temporary and new keys are randomly generated each time the data blocks 2102 are re-permutated.

Referring to FIG. 2.3B, the distributed system 2140 provides the first data bucket 2350*a* to the client device 2120 in response to receiving the bucket download request 2304. In the example shown, the data bucket 2350*a* contains n data blocks 2102 (Blocks 1-4). In response to receiving the data bucket 2350*a* from the distributed system 2140, the client device 2120 applies a random permutation on the n data blocks 2102 (Blocks 1-4) to determine the corresponding new memory location 2118A-N and the corresponding buffer bucket 2360*a-n* associated with each permutated data block 2102. In some examples, the client device 2120 applies the random permutation by decrypting and re-encrypting each of the n data blocks 2102 received within the first data bucket 2350*a*, and applying the random permutation on the re-encrypted n data blocks 2102. For instance, the client device 2120 may use the randomly generated key (i.e., AES key) provided from the encryption module 2305 (FIG. 2.3A) to obfuscate the permutation from the distributed system 2140. In some examples, the random permutation applied by the client device 2120 includes shuffling the re-encrypted n data blocks (Blocks 1-4) using a cryptographically secure random key hidden from the distributed system 2140.

Moreover, the client device 2120 randomly selects the threshold value k for use in spraying the re-permutated data blocks 2102 into their assigned buffer buckets 2360 of the memory hardware 2114 at the distributed system 2140. The threshold value k may be randomly selected independent of the data currently stored at the client device 2120, i.e., independent of the load of each cache slot 2370, and independent of the number of permutated data blocks 2102 corresponding to each buffer bucket 2360. For each buffer bucket 2360, the client device 2120 may execute a separate process/routine to determine a quantity of data blocks (e.g., threshold value k) to be sprayed into the buffer bucket and a strategy for selecting data blocks to be sprayed into the buffer bucket from at least one of: corresponding permutated data blocks; cached permutated data blocks from the corresponding cache slot; or dummy data blocks. In some examples, the client device 2120 executes the separate process/routine for determining the quantity of data blocks to be sprayed into each buffer bucket 2360 when the client device 2120 applies the random permutation on the re-encrypted data blocks 2102. The threshold value k must be large enough to prevent the number of data blocks 2102 locally stored at the cache slots 2370 of the client memory hardware 2122 from exceeding the value n (i.e., n=4 data blocks 2102 in the example shown). In the example oblivious permutation routine 2300 of FIGS. 2.3A-2.3J, the threshold value k is equal to 1.25 such that the sequence of data blocks 2102 and/or dummy blocks 2103 sprayed into the buffer buckets 2360 during the n spray iterations (i.e., n=4) is 1, 1, 1, 2. However, any sequence achieving the threshold value k equal to 1.25 during the n iterations may be used.

After the data blocks 2102 (Blocks 1-4) are permutated, the client device 2120 provides each permutated data block 2102 into the corresponding cache slot 2370 of the client memory hardware 2122. In the example shown, the second cache slot $C_2$ 2370*b* receives Blocks 1, 3 and 4 and the fourth cache slot $C_4$ 2370*n* receives Block 2. The first cache slot $C_1$ 2370*a* and the third cache slot $C_3$ 2370*c* do not receive any data blocks 2102 during the current iteration as the random permutation applied to the first data bucket 2350*a* did not assign any of the data blocks 2102 to any of the new memory locations 2118 associated with the first and third buffer buckets 2360*a*, 2360*c*.

Referring to FIG. 2.3C, the client device 2120 executes a first spray iteration (also referred to as a spray round) to spray/evict up to the threshold value k of the permutated data blocks 2102 (Blocks 1-4) from each cache slot 2370 into the corresponding buffer buckets 2360. As the threshold value k is equal to 1.25 in the example, the client device 2120 will spray up to one (1) data block 2102 from each cache slot 2370*a*, 2370*b*, 2370*c*, 2370*n* during the first spray iteration (and also the second and third spray iterations (FIGS. 2.3E and 2.3G)). In some examples, the client device 2120 sprays a number of the permutated data blocks 2102 equal to the threshold value k (i.e., the selected quantity of data blocks) from a corresponding cache slot 2370 when the corresponding cache slot 2370 contains at least the threshold value k of the permutated data blocks. For instance, the client device 2120 sprays/evicts one (1) data block 2102 (Block 1) from the second cache slot $C_2$ 2370*b* into the second buffer bucket 2360*b* since the second cache slot $C_2$ 2370*b* is presently storing three data blocks 2102. Likewise, the client device 2120 sprays/evicts one (1) data block 2102 (Block 2) from the fourth cache slot $C_4$ 370*d* into the fourth buffer bucket 2360*n* since the fourth cache slot $C_4$ 370*d* is presently storing one data blocks 2102.

In some implementations, the permutation routine 2300 also identifies any cache slots 2370 containing a number of permutated data blocks 2102 less than the threshold value k, and sprays/evicts a number of dummy blocks 2103 into the corresponding buffer bucket 2360 based on a difference between the threshold value k and the number of permutated data blocks 2102 within the corresponding cache slot 2370. Thus, the dummy blocks 2103 represent meaningless data blocks to not reveal to the distributed system 2140 that a cache slot 2370 is empty during a current iteration. Since the first cache slot $C_1$ 2370*a* and the third cache slot $C_3$ 2370*c* are not presently storing any data blocks 2102, the client device 2120 sprays/evicts one dummy block 2103 into each of the first and third buffer buckets 2360*a*, 2360*c*. The client device 2120 may encrypt the dummy blocks 2103 similar to the data blocks 2102. The dummy blocks 2103 may reside in the cache slots 2370 or may be generated by the client device during each spray iteration as needed. The sending of dummy blocks 2103 is a security measure to conceal the age of data blocks 2102 stored in the storage abstraction 2150 from the untrusted distributed system 2140. Additionally, the sending of encrypted dummy blocks 2103 conceals which cache slots 2370 contain data blocks 2102 and which cache slots 2370 are empty during each spray iteration as a security measure to linkability attacks on the distributed system 2140.

The cache slots 2370 allow recently permutated data blocks 2102 each associated with an assigned buffer bucket 2360 to be temporarily stored locally at the client device 2120 until the routine 2300 is ready to spray/evict the data blocks 2102 into their corresponding buffer buckets 2360. The cache slots 2370*a-n* collectively provide a queue for the client device 2120 that maps each permutated data block 2102 to the corresponding new memory location 2118 at the storage abstraction 2150 of the distributed system 2140. Accordingly, each data block 2102 currently residing in one of the cache slots 2370 corresponds to an up-to-date version associated with a new memory location 2118 that is oblivious to the distributed system 2140.

Referring to FIG. 2.3D, the distributed system 2140 provides the second data bucket 2350*b* to the client device 2120 for the next iteration in response to receiving a next bucket download request 2304 from the client device 2120. In the example shown, the first and third buffer buckets 2360*a*, 2360*c* contain dummy blocks 2103, the second buffer bucket 2360*b* contains the data block 2102 (Block 1), and the fourth buffer bucket 2360*d* contains the data block 2102 (Block 2) evicted from the client cache slots 2370 during the previous spray iteration. Moreover, the client device 2120 is configured to store any remaining permutated data blocks 2102 in their corresponding cache slots 2370 that are left over after one or more previous spray iterations. In the example shown, the second cache slot $C_2$ 2370*b* is temporarily storing two permutated data blocks 2102 (Blocks 3 and 4) left over from the previous spray iteration.

The downloaded second bucket 2350*b* contains n data blocks 2102 (Blocks 5-8). As with the first bucket 2350*a*, the permutation routine 2300 causes the client device 2120 to apply a random permutation on the n data blocks 2102 (Blocks 5-8) to determine the corresponding new memory location 2118A-N and the corresponding buffer bucket 2360*a-n* associated with each permutated data block 2102. Here, the client device 2120 decrypts and re-encrypts each data block (Blocks 5-8) and applies the random permutation on the re-encrypted data blocks 2102 by locally shuffling the order of the re-encrypted data blocks 2102 using random bits hidden from the distributed system based on the previous or a new randomly generated key (i.e., AES key). Thereafter, the client device 2120 provides each permutated data block 2102 into the corresponding cache slot 2370 of the client memory hardware 2122. In the example shown, the first cache slot $C_1$ 2370*a* receives Blocks 6 and 8, the third cache slot $C_3$ 2370*c* receives Block 5, and the fourth cache slot $C_4$ 2370*n* receives Block 7. The second cache slot $C_2$ 2370*b* does not receive any data blocks 2102 during the current iteration as the random permutation applied to the second data bucket 2350*b* did not assign any of the data blocks 2102 to any of the new memory locations 2118 associated with the second buffer bucket 2360*b*.

Referring to FIG. 2.3E, the client device 2120 executes a second spray iteration to spray/evict up to the threshold value k of the permutated data blocks 2102 (Blocks 3-8) from each cache slot 2370 into the corresponding buffer buckets 2360. As the threshold value k is equal to 1.25 in the example to provide the iterative spray sequence of 1, 1, 1, 2, the client device 2120 will spray up to one (1) data block from each cache slot 2370*a*, 2370*b*, 2370*c*, 2370*n* during the current second spray iteration. For instance, the client device 2120 sprays/evicts data block (Block 6) from the first cache slot $C_1$ 2370*a* into the first buffer bucket 2360*b*, data block (Block 3) from the second cache slot $C_2$ 2370*b* into the second buffer bucket 2360*b*, data block 2102 (Block 5) from the third cache slot $C_3$ 2370*c* into the third buffer bucket 2360*c*, and data block 2102 (Block 7) from the fourth cache slot $C_4$ 2370*n* into the fourth buffer bucket 2360*n*.

Referring to FIG. 2.3F, the distributed system 2140 provides the third data bucket 2350*c* to the client device 2120 for the next iteration (i.e., 3$^{rd}$ iteration) in response to receiving a next bucket download request 2304 from the client device 2120. The first buffer bucket 2360*a* contains one dummy block 2103 and one data block (Block 6), the second buffer bucket 2360*b* presently contains two data blocks (Blocks 1 and 3), the third buffer bucket 2360*c* contains one dummy block 2103 and one data block (Block 5), and the fourth buffer bucket 2360*n* contains two data blocks (Blocks 2 and 7). Moreover, the client device 2120 is configured to store any remaining permutated data blocks 2102 in their corresponding cache slots 2370 that are left over after one or more previous spray iterations. In the example shown, the first cache slot $C_1$ 2370*a* temporarily stores one data block 2102 (Block 8) and the second cache slot $C_2$ 2370*b* temporarily stores one data block 2102 (Block 4) left over from one or more previous spray iterations.

In response to receiving the downloaded third bucket 2350*c* containing n data blocks 2102 (Blocks 9-12), the permutation routine 2300 causes the client device 2120 to apply a random permutation on the n data blocks 2102 (Blocks 9-12) to determine the corresponding new memory location 2118A-N and the corresponding buffer bucket 2360*a-n* associated with each permutated data block 2102. Here, the client device 2120 decrypts and re-encrypts each data block (Blocks 9-12) and applies the random permutation on the re-encrypted data blocks 2102 by locally shuffling the order of the re-encrypted data blocks 2102 using a cryptographically secure random key hidden from the the distributed system based on the previous or a new randomly generated key (i.e., AES key). Thereafter, the client device 2120 provides each permutated data block 2102 into the corresponding cache slot 2370 of the client memory hardware 2122. In the example shown, the first cache slot $C_1$ 2370*a* receives Blocks 11 and 12, the third cache slot $C_3$ 2370*c* receives Block 10, and the fourth cache slot $C_4$ 2370*n* receives Block 9. As with the second iteration (by coincidence and example only), the second cache slot $C_2$ 2370*b* does not receive any data blocks 2102 during the current third iteration as the random permutation applied to the third data bucket 2350*c* did not assign any of the data blocks 2102 to any of the new memory locations 2118 associated with the second buffer bucket 2360*b*.

Referring to FIG. 2.3G, the client device 2120 executes a third spray iteration to spray/evict up to the threshold value k of the permutated data blocks 2102 (e.g., Blocks 4, and 8-12) from each cache slot 2370 into the corresponding buffer buckets 2360. As the threshold value k is equal to 1.25 in the example to provide the iterative spray sequence of 1, 1, 1, 2, the client device 2120 will spray up to one (1) data block from each cache slot 2370*a*, 2370*b*, 2370*c*, 2370*n* during the current third spray iteration. For instance, the client device 2120 sprays/evicts data block (Block 8) from the first cache slot $C_1$ 2370*a* into the first buffer bucket 2360*a*, data block (Block 4) from the second cache slot $C_2$ 2370*b* into the second buffer bucket 2360*b*, data block 2102 (Block 10) from the third cache slot $C_3$ 2370*c* into the third buffer bucket 2360*c*, and data block 2102 (Block 9) from the fourth cache slot $C_4$ 2370*n* into the fourth buffer bucket 2360*n*. The client device 2120 may select to spray one of the most recent permutated data blocks 2102 (Block 11 or Block 12) into the first buffer bucket 2360*a* instead of the cached permutated data block 2102 (Block 8) from the first cache slot $C_1$ 2370*a*.

Referring to FIG. 2.3H, the distributed system 2140 provides the fourth and final data bucket 2350*c* to the client device 2120 for the last iteration (i.e., $4^{th}$ iteration) in response to receiving a next bucket download request 2304 from the client device 2120. The first buffer bucket 2360*a* contains one dummy block 2103 and two data block (Blocks 6 and 8), the second buffer bucket 2360*b* presently contains three data blocks (Blocks 1, 3, and 4), the third buffer bucket 2360*c* contains one dummy block 2103 and two data blocks (Blocks 5 and 10), and the fourth buffer bucket 2360*n* contains three data blocks (Blocks 2, 7 and 9). Moreover, the client device 2120 is configured to store any remaining permutated data blocks 2102 in their corresponding cache slots 2370 that are left over after one or more previous spray iterations. In the example shown, the first cache slot $C_1$ 2370*a* temporarily stores two data block 2102 (Blocks 11 and 12) left over from the previous spray iteration. Thus, Blocks 11 and 12 correspond to previously unselected data blocks according to the strategy.

In response to receiving the downloaded fourth bucket 2350*n* containing n data blocks 2102 (Blocks 13-16), the permutation routine 2300 causes the client device 2120 to apply a random permutation on the n data blocks 2102 (Blocks 13-16) to determine the corresponding new memory location 2118A-N and the corresponding buffer bucket 2360*a-n* associated with each permutated data block 2102. Here, the client device 2120 decrypts and re-encrypts each data block (Blocks 13-16) and applies the random permutation on the re-encrypted data blocks 2102 by locally shuffling the order of the re-encrypted data blocks 2102 using a cryptographically secure random key hidden from the distributed system based on the previous or a new randomly generated key (i.e., AES key). Thereafter, the client device 2120 provides each permutated data block 2102 into the corresponding cache slot 2370 of the client memory hardware 2122. In the example shown, the second cache slot $C_2$ 2370*b* receives Block 15, the third cache slot $C_3$ 2370*c* receives Blocks 14 and 16, and the fourth cache slot $C_4$ 2370*n* receives Block 13. The first cache slot $C_1$ 2370*a* does not receive any data blocks 2102 during the current fourth iteration as the random permutation applied to the fourth data bucket 2350*n* did not assign any of the data blocks 2102 to any of the new memory locations 2118 associated with the first buffer bucket 2360*a*.

Referring to FIG. 2.31, the client device 2120 executes a final fourth spray iteration to spray/evict up to the threshold value k of the permutated data blocks 2102 (e.g., Blocks 11-14) from each cache slot 2370 into the corresponding buffer buckets 2360. As the threshold value k is equal to 1.25 in the example to provide the iterative spray sequence of 1, 1, 1, 2, the client device 2120 will spray up to two (2) data blocks from each cache slot 2370*a*, 2370*b*, 2370*c*, 2370*n* during the current fourth spray iteration. For instance, the client device 2120 sprays/evicts data blocks (Block 11 and 12) from the first cache slot $C_1$ 2370*a* into the first buffer bucket 2360*b*, data block (Block 15) from the second cache slot $C_2$ 2370*b* into the second buffer bucket 2360*b*, data blocks 2102 (Block 14 and 16) from the third cache slot $C_3$ 2370*c* into the third buffer bucket 2360*c*, and data block 2102 (Block 13) from the fourth cache slot $C_4$ 2370*n* into the fourth buffer bucket 2360*n*. In the example shown, the permutation routine 2300 identifies, during the fourth iteration, that each of the second cache slot $C_2$ 2370*b* and the fourth cache slot $C_4$ 2370*n* each contain one data block 2102, and therefore requires the current spray iteration to spray dummy blocks 2103 to make up the difference from the threshold value k which is equal to "2" during the last spray iteration. Accordingly, the routine 2300 causes the client device 2120 to spray/evict one dummy block 2103 with the one data block (Block 15) into the second buffer bucket 2360*b* and one dummy block 2103 with the one data block (Block 13) into the fourth buffer bucket 2360*n*. Accordingly, the dummy blocks 2103 obfuscate the fact that the cache slots 2370*b*, 2370*n* only contain one data block 2102 each from the distributed system 2140.

After the final spray iteration, all of the data blocks 2102 permutated by the oblivious permutation routine 2300 executing on the client device 2120 are evicted from the cache slots 2370 of the client memory hardware 2122 and now reside in their corresponding buffer buckets 2360. However, other examples may include the cache slots 2370 still storing some permutated data blocks 2102 after the last spray iteration. In these examples, any remaining permutated data blocks 2102 leftover and stored at their corresponding cache slots 2370 may be combined with the data blocks 2102 previously sprayed into the corresponding buffer bucket 2360 during the recalibration stage 2400. FIG. 2.3J shows the permutation routine 2300 causing the client device 2120 to send/transmit a de-de-allocate bucket request 2306 to the distributed system 2140 to de-allocate each of the stale/old data buckets 2350*a*-2350*n* from the O-RAM storage abstraction 2150 overlain on the memory hardware 2114 of the distributed system 2140. In the example shown, each of the buffer buckets 2360*a-n* contain n permutated data blocks 2102 (e.g., n=4) and one or more dummy blocks 2103. The oblivious permutation routine 2300 may further include a recalibration process 2400 (FIGS. 2.4A and 2.4B) that iteratively recalibrates each of the virtual buckets 2360*a-n* on an individual basis to filter out and remove all any dummy blocks and order the data blocks 2102 according to the applied permutation.

FIGS. 2.4A and 2.4B provide an example recalibration process 2400 executing on the client device 2120 and the distributed system 2140 to re-calibrate the virtual buckets 2360*a-n* containing the most recent permutations of the data blocks 2102. Referring to FIG. 2.4A, the client device 2120 may transmit a buffer bucket download request 2404 to the distributed system 2140 requesting to download one of the buffer buckets 2360 filled with permutated data blocks 2102 and at least one dummy block 2103 during the permutation routine 2300 and recalibrate the requested buffer bucket 2360 to include only the assigned data blocks 2104 ordered according to the applied permutation. The client device 2120 may iteratively send the buffer bucket download request 2404 each time the client device 2120 is ready to recalibrate the next buffer bucket 2360. Accordingly, each request 2404 may identify the requested buffer bucket 2360 for download from the distributed system 2140. In the example shown, the client device 2120 sends the bucket download request 2404 to download the first buffer bucket 2360*a* for download during a first recalibration iteration of the recalibration process.

Referring to FIG. 2.4B, the recalibration process 2400 causes the distributed system 2140 to provide the first buffer bucket 2360*a* to the client device 2120 in response to receiving the buffer bucket download request 2404 from the client device 2120 requesting the first buffer bucket 2360*a*. The buffer bucket 2360*a* includes n data blocks 2102 (Blocks 6, 8, 11, 12) and one dummy block 2103 sprayed/evicted from the first client cache slot $C_1$ 2370*a* during the n spray iterations of the oblivious permutation routine 2300 of FIGS. 2.3A-2.3J. In response to receiving the buffer bucket 2360*a* from the distributed system 2140, the client device 2120 recalibrates the buffer bucket 2360*a* by first filtering out and removing any dummy blocks 2103 and then decrypting/re-encrypting each of the n data blocks 2102 (Blocks 6, 8, 11, 12) received within corresponding buffer bucket 2360*a*. With the dummy block(s) 2103 removed and the n data blocks 2102 again re-encrypted, the client device 2120 may order the re-encrypted data blocks (Blocks 6, 8, 11, 12) according to the random permutation applied during execution of the oblivious permutation process 2300 to complete the recalibration of the buffer bucket 2360*a*. Thereafter, the client device 2120 uploads the recalibrated buffer bucket 2360*a* including only the n data blocks 2102 to the O-RAM storage abstraction 2150 of the distributed system 2140 for storage on each corresponding new memory location 2118A-N of the memory hardware 2114. The client device 2120 may then iteratively send/transmit the next buffer bucket download request 2404 to the distributed system 2140 for iteratively recalibrating each of the remaining buffer buckets 2360*b*, 2360*c*, 2360*n* on an individual basis.

The oblivious permutation process 2300 of FIGS. 2.3A-2.3J requires the client memory hardware 2122 to have O(n) blocks of storage. FIG. 2.5 provides an example algorithm 2500 for applying obliviously shuffling when the client memory hardware 2122 as the capacity of O(n) blocks of storage. In some implementations, the permutation process 2300 executes in recursive manner to thereby eliminate the requirement of the client memory hardware 2122 to have O(n) blocks of storage. As used herein the "O" is a notation for asymptotic complexity. Here, the capacity/size of the data buckets 2350 may be increased to decrease the total number of data buckets 2350 at the storage abstraction 2150 and decrease the storage capacity required at the client memory hardware 2122. For instance, assuming that the client memory hardware 2122 has a capacity of $n=\log N\cdot\omega(1)$ and given an input of $|A|$ items to recursively and obliviously shuffle (RecursiveObvShuffle), the routine 2300 may split A into $$r = \frac{|A|}{n}$$

buckets each containing n data blocks 2102 and split the buffer buckets 2360 into n buffer buckets each of r items. Thereafter, the client device 2120 may iteratively spray data block. However, the recalibration process 2400 may not execute since r is greater than n (r>n) and therefore the client device 2120 is unable to download all items from a single buffer bucket 2360. Instead, knowing that all of the items are sprayed into the appropriate buffer bucket 2360, the client device may execute the RecursiveObvShuffle on the smaller instance of size equal to r. The client may repeat as a many times until the instance is small enough for download. FIG. 2.6 provides an example algorithm 2600 for applying obliviously shuffling when the client memory hardware 2122 as the capacity of $n=\log N\cdot\omega(1)$. Additionally, using smaller values of the threshold value k (but still greater than zero) increases the client storage capacity such that less data blocks 2102 are sprayed into their corresponding buffer buckets 2360 during each spray iteration and the cache slots 2370 grow larger.

FIG. 2.7 illustrates a method 2700 for obliviously moving data blocks 2102 to new memory locations 2118 on memory hardware 2114. At block 2702, the method 2700 includes receiving, at data processing hardware 2112, a permutation request from a client (i.e., client device 2120) to obliviously move N data blocks 2102 stored in memory hardware 2114 in communication with the data processing hardware 2112. Each N data block 2102 is associated with the client 2104 and stored at a corresponding memory location 2118, 2118A-N of the memory hardware 2114.

At block 2704, the method 2700 includes organizing, by the data processing hardware 2112, the memory locations 2118 of the memory hardware 2114 into n data buckets 2350, 2350*a-n*. Here, $n=\sqrt{N}$ and each data bucket 2350 contains n data blocks 2102. At block 2706, the method 2700 includes allocating, by the data processing hardware 2112, new memory locations 2118 in the memory hardware 2114 for storing the N data blocks 2102. At block 2708, the method includes initializing, by the data processing hardware 2112, buffer buckets 2360, 2360*a-n* associated with the new memory locations 2118. Each buffer bucket 2360 is associated with a corresponding cache slot 2370, 2370*a-n* initialized at the client device 2120.

At block 2710, the method includes iteratively providing the n data buckets from the data processing hardware 2112 to the client device 2120. For instance, the client device 2120 may send a bucket download request 2304 for each data bucket 2350. In response to receiving each data bucket 2350, the client device 2120 is configured to (1) apply a random permutation on the n data blocks 2102 within the corresponding data bucket 2350 to determine the corresponding new memory location 2118 and the corresponding buffer bucket 2360 associated with each permutated data block 2102; provide each permutated; provide each permutated data block 2102 into the corresponding cache slot 2370; spray up to a threshold value k of the permutated data blocks 2102 from each cache slot 2370 into the corresponding buffer buckets 2360; and store any remaining permutated data blocks 2102 in the corresponding cache slots 2370.

FIG. 2.8 is schematic view of an example computing device 2800 that may be used to implement the systems and methods described in this document. The computing device 2800 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit the various implementations described and/or claimed in this document.

The computing device 2800 includes a processor 2810 (e.g., data processing hardware 2112), memory 2820, a storage device 2830, a high-speed interface/controller 2840 connecting to the memory 2820 and high-speed expansion ports 2850, and a low speed interface/controller 2860 connecting to low speed bus 2870 and storage device 2830. The computing device 2800 may reside at the client device 2120 and/or the distributed system 2140. Each of the components 2810, 2820, 2830, 2840, 2850, and 2860, are interconnected using various busses, and may be mounted on a common motherboard or in other manners as appropriate. The processor 2810 can process instructions for execution within the computing device 2800, including instructions stored in the memory 2820 or on the storage device 2830 to display graphical information for a graphical user interface (GUI) on an external input/output device, such as display 2880 coupled to high speed interface 2840. In other implementations, multiple processors and/or multiple buses may be used, as appropriate, along with multiple memories and types of memory. Also, multiple computing devices 2800 may be connected, with each device providing portions of the necessary operations (e.g., as a server bank, a group of blade servers, or a multi-processor system).

The memory 2820 (e.g., memory hardware) stores information non-transitorily within the computing device 2800. The memory 2820 may be a computer-readable medium, a volatile memory unit(s), or non-volatile memory unit(s). The non-transitory memory 2820 may be physical devices used to store programs (e.g., sequences of instructions) or data (e.g., program state information) on a temporary or permanent basis for use by the computing device 2800. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 2830 is capable of providing mass storage for the computing device 2800. In some implementations, the storage device 2830 is a computer-readable medium. In various different implementations, the storage device 2830 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 2820, the storage device 2830, or memory on processor 2810.

The high speed controller 2840 manages bandwidth-intensive operations for the computing device 2800, while the low speed controller 2860 manages lower bandwidth-intensive operations. Such allocation of duties is exemplary only. In some implementations, the high-speed controller 2840 is coupled to the memory 2820, the display 2880 (e.g., through a graphics processor or accelerator), and to the high-speed expansion ports 2850, which may accept various expansion cards (not shown). In some implementations, the low-speed controller 2860 is coupled to the storage device 2830 and low-speed expansion port 2870. The low-speed expansion port 2870, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 2800 may be implemented in a number of different forms, as shown in the figure. For example, it may be implemented as a standard server 2800*a* or multiple times in a group of such servers 2800*a*, as a laptop computer 2800*b*, or as part of a rack server system 2800*c*.

Section 3: Efficient Oblivious Cloud Storage

FIGS. 3.1A and 3.1B depict an example system 3100 for storing N data blocks (B) owned by a client 3104 on a distributed system 3140 and obliviously moving the data blocks (B) around the distributed system 3140 to conceal access patterns while preserving search functionalities on the data blocks by the client 3104. A client device 3120 (e.g., a computer) associated with the client 3104 communicates, via a network 3130, with the distributed system 3140 having a scalable/elastic non-transitory storage abstraction 3200. The client device 3120 may include associated memory hardware 3122 and associated data processing hardware 3124. The storage abstraction 3200 (e.g., key/value store, file system, data store, etc.) is overlain on storage resources 3114 to allow scalable use of the storage resources 3114 by one or more client devices 3120.

In some implementations, the distributed system 3140 executes a computing device 3112 that manages access to the storage abstraction 3200. For instance, the client device 3120 may encrypt and store the data blocks (B) on the storage abstraction 3200, as well as retrieve and decrypt the data blocks (B) from the storage abstraction 3200. While the example shown depicts the system 3100 having a trusted side associated with the client device 3120 in communication, via the network 3130, with an untrusted side associated with the distributed system 3140, the system 3100 may be alternatively implemented on a large intranet having a trusted computing device(s) (CPU) and untrusted data storage.

In some implementations, the distributed system 3100 includes resources 3110, 3110*a-z*. The resources 3110 may include hardware resources 3110 and software resources 3110. The hardware resources 3110 may include computing devices 3112 (also referred to as data processing devices and data processing hardware) or non-transitory memory 3114 (also referred to as memory hardware and storage resources). The software resources 3110 may include software applications, software services, application programming interfaces (APIs) or the like. The software resources 3110 may reside in the hardware resources 3110. For example, the software resources 3110 may be stored in the memory hardware 3114 or the hardware resources 3110 (e.g., the computing devices 3112) may be executing the software resources 3110.

A software application (i.e., a software resource 3110) may refer to computer software that causes a computing device to perform a task. In some examples, a software application may be referred to as an “application,” an “app,” or a “program.” Example applications include, but are not limited to, system diagnostic applications, system management applications, system maintenance applications, word processing applications, spreadsheet applications, messaging applications, media streaming applications, social networking applications, and gaming applications.

The memory hardware 3114, 3122 may be physical devices used to store programs (e.g., sequences of instructions) or data (e.g., program state information) on a temporary or permanent basis for use by a computing device 3112 and/or a client device 3120 (i.e., the data processing hardware 3124 of the client device 3120). The memory hardware 3114, 3122 may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), oblivious random access memory (ORAM), dynamic random access memory (DRAM), static random access memory (SRAM), phase change memory (PCM) as well as disks or tapes.

The network 3130 may include various types of networks, such as local area network (LAN), wide area network (WAN), and/or the Internet. Although the network 3130 may represent a long range network (e.g., Internet or WAN), in some implementations, the network 3130 includes a shorter range network, such as a local area network (LAN). In some implementations, the network 3130 uses standard communications technologies and/or protocols. Thus, the network 3130 can include links using technologies, such as Ethernet, Wireless Fidelity (WiFi) (e.g., 802.11), worldwide interoperability for microwave access (WiMAX), 3G, Long Term Evolution (LTE), digital subscriber line (DSL), asynchronous transfer mode (ATM), InfiniBand, PCI Express Advanced Switching, Bluetooth, Bluetooth Low Energy (BLE), etc. Similarly, the networking protocols used on the network 3130 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 3130 can be represented using technologies and/or formats including the hypertext markup language (HTML), the extensible markup language (XML), etc. In addition, all or some of the links can be encrypted using conventional encryption technologies, such as secure sockets layer (SSL), transport layer security (TLS), virtual private networks (VPNs), Internet Protocol security (IPsec), etc. In other examples, the network 3130 uses custom and/or dedicated data communications technologies instead of, or in addition to, the ones described above.

The data blocks (B) correspond to atomic units of data and each have size B bytes each. For example, a typical value for B for storage on a distributed system may be 64 KB to 256 B. A notation N denotes a total number of the data blocks (B) associated with the client 3104 and stored on the storage abstraction 3200 using Oblivious Random Access Memory (O-RAM). Each of the N data blocks is stored at a corresponding memory location 3118, 3118A-N (FIG. 3.1B) of the storage abstraction 3200 overlain across the memory hardware 3114.

While traditional encryption schemes provide confidentiality, the traditional encryption schemes are ineffective at hiding data access patterns which may reveal very sensitive information to the untrusted distributed system 3140. Moreover, the traditional encryption schemes allow the client 3104 to search for encrypted data (represented by data blocks (B, $B_1$-$B_N$) stored on the distributed system 3140 only if the client 3104 provides plain text access for the data to the distributed system 3140. As the client device 3120 originates the data, the client device 3120 is considered trusted.

In some implementations, the client device 3120 and the distributed system 3140 execute an oblivious permutation routine 3450 for obliviously moving the encrypted data blocks (B) around the storage abstraction 3200 to completely hide data access patterns (which data blocks (B) were read/written) from the distributed system 3140. For instance, the oblivious permutation routine 3450 may cause the distributed system 3140 to allocate new memory locations 3118 of the storage abstraction 3200 for storing re-permutated data blocks (B) and organize/divide/partition the storage abstraction 3200 into multiple data buckets 3350. In some implementations, the oblivious permutation routine 3450 organizes the storage abstraction 3200 into n data buckets 3350 each containing n data blocks (B), whereby the value n is equal to the square root of the N data blocks (i.e., $n=\sqrt{N}$). At the trusted side, the client device 3120 may iteratively download each of the n data buckets 3350 one at a time from the distributed system 3140 and allocates substantially n cache slots on the memory hardware 3122 while executing the oblivious permutation routine 3450. For each data bucket 3350 received, the client device 3120 applies a random permutation on the n data blocks (B) within the corresponding data bucket 3350 to generate permutated data blocks and determines a corresponding buffer bucket 3360 and a corresponding cache slot for each permutated data block (B). Here, the cache slots may temporarily store the recently permutated data blocks (B) at the memory hardware 3122 of the client device 3120 until the data blocks (B) are uploaded/sent to the distributed system 3140 for storage at the new memory locations 3118. Additional details executing the oblivious permutation routine for obliviously moving the encrypted data blocks (B) around the storage abstraction 3200 can be found in U.S. Patent Application 62/490,804, filed on Apr. 27, 2017, which is hereby incorporated by reference in its entirety.

In some implementations, when the client device 3120 needs to access (read/write) an encrypted data block (B) stored on the storage abstraction 3200, the data processing hardware 3124 at the client device 3120 executes an instruction 3400 to execute a query (q) for the data block (B). By executing the instruction 3400, the client device 3120 is able to retrieve the data block (B) without revealing the contents of the data block (B) as well as the sequence of the query (q) executed by the client device 3120 to the distributed system 3140. Further, execution of the instruction 3400 completely hides data access patterns (which data blocks (B) were read/written) from the distributed system 3140. Execution of the instruction 3400 only requires a single roundtrip between the client device 3120 and the distributed system 3140 when the client device 3120 executes the corresponding query (q) for the data block (B). For instance, all operations that require writing back to the server are sent with the query. Similarly, all read operations can also be sent with the query. All data can also be sent back to the distributed system 3140 with the query results.

Referring to FIG. 3.1B, in some implementations, the distributed storage system 3140 includes loosely coupled memory hosts 3110, 3110*a-z* (e.g., computers or servers), each having a computing resource 3112 (e.g., one or more processors or central processing units (CPUs)) in communication with storage resources 3114 (e.g., memory hardware, memory hardware, flash memory, dynamic random access memory (DRAM), phase change memory (PCM), and/or disks) that may be used for caching data. The storage abstraction 3200 overlain on the storage resources 3114 allows scalable use of the storage resources 3114 by one or more client devices 3120, 3120*a-n*. The client devices 3120 may communicate with the memory hosts 3110 through the network 3130 (e.g., via remote procedure calls (RPC)).

In some implementations, the distributed storage system 3140 is "single-sided," eliminating the need for any server jobs for responding to real and/or fake queries 3402, 3404 from client devices 3120 to retrieve data blocks (B) and/or dummy blocks (D) from the storage abstraction 3200 when the client device executes instructions 3400 to execute queries (q) for data blocks (B). "Single-sided" refers to the method by which most of the request processing on the memory hosts 3110 may be done in hardware rather than by software executed on CPUs 3112 of the memory hosts 3110. Additional concepts and features related to a single-sided distributed caching system can be found in U.S. Pat. No. 9,164,3702, which is hereby incorporated by reference in its entirety.

The distributed system 3140 may obliviously move data blocks (B) around the storage resources 3114 (e.g., memory hardware) of the remote memory hosts 3110 (e.g., the storage abstraction 3200) and get the data blocks (B) from the remote memory hosts 3110 via RPCs or via remote direct memory access (RDMA)-capable network interface controllers (NIC) 3116. A network interface controller 3116 (also known as a network interface card, network adapter, or LAN adapter) may be a computer hardware component that connects a computing device/resource 3112 to the network 3130. Both the memory hosts 3110*a-z* and the client device 3120 may each have a network interface controller 3116 for network communications. The oblivious permutation routine 3450 executing on the physical processor 3112 of the hardware resource 3110 registers a set of remote direct memory accessible regions/locations 3118A-N of the memory 3114 with the network interface controller 3116. Each memory location 3118 is configured to store a corresponding data block (B).

In some implementations, when the client device 3120 executes the instruction 3400 to execute the query (q) for a data block (B) and determines that the data block (B) is stored locally at the memory hardware 3122 of the client device 3120, the client device 3120 retrieves the data block (B) from the memory hardware 3122 and sends one or more fake queries 3404 to the NIC 3116 for retrieving corresponding dummy blocks (D) to conceal the retrieval of the data block (B) from the local memory hardware 3122. The client device 3120 may discard each retrieved dummy block (D). On the other hand, if the client device 3120 determines that the data block (B) is stored on the storage abstraction 3200, the client device 3120 may send a real query 3402 to the NIC 3116 for retrieving the corresponding data block (D) from the storage abstraction 3200.

The client device 3120 stores a memory-level map 3300 locally in the memory hardware 3122 that maps memory levels ($l_i$) of memory 3118, 3122, 3200. The sizes and number of memory levels ($l_i$) may be selected based on query and shuffling costs, in addition to the amount of storage capacity required at each of the client device 3120 and the storage abstraction 3200. Each memory level ($l_i$) includes physical memory (RAM) 3210 and virtual memory ($Shelter_i$) 3220. As shown in FIG. 3.1A, the virtual memory ($Shelter_l$) 3220 of a lowest memory level ($l_l$) resides on the client device 3120 (i.e., within the memory hardware 3122), while the remaining physical memory ($RAM_i$) 3210 and virtual memory ($Shelter_i$) 3220 resides on the storage abstraction 3200 (e.g., memory hardware 3114) of the distributed system 3140.

FIG. 3.2 provides a schematic view of example memory levels ($l_i$) including two levels of memory 3122, 3200. The two levels may be extended to log N levels yielding a slowdown of O(log N) and client storage O(N/B) for a RAM capacity of N data blocks (B) of size B. The first level (Level 1) (i=1) includes physical memory ($RAM_1$) 3210 and virtual memory ($Sheller_1$) 3220. In the example shown, the physical memory ($RAM_1$) 3210 of the first level (Level 1) may correspond to virtual memory ($Shelter_0$) that initially stores all of the N data blocks (B). The physical memory ($RAM_1$) 3210 and virtual memory ($Shelter_0$, $Shelter_1$) 3220 each reside on the storage abstraction 3200 of the distributed system 3140. The $RAM_1$ includes a size of $N_1$ data blocks (B) and the $Shelter_1$ includes a size of $S_1$ data blocks (B), whereby the $S_1$ is equal to the value of $N_1$ divided by a constant c (i.e., $S_1=N_1/c$). The constant c may be any value greater than one (1) so that the size/capacity of $S_1$ data blocks (B) associated with $Sheller_1$ decreases from the size/capacity of $N_1$ data blocks (B) stored in the $RAM_1$. In the example shown, the value for $N_1$ is equal to 16 data blocks (B), ($B_1$-$B_N$) stored in $RAM_1$ and the constant c is equal to two (2). Accordingly, the virtual memory ($Shelter_1$) 3220 of the first level (Level 1) includes a value of $S_1$ equal to eight (8) data blocks (B).

The second level (Level 2), (i=2) includes physical memory ($RAM_2$) 3210 and virtual memory ($Shelter_2$) 3220. As the memory levels ($l_i$) include two levels, the second level (Level 2) corresponds to a lowest memory level ($l_l$), and therefore, the physical memory ($RAM_2$) 3210 resides on the storage abstraction 3200 and the virtual memory ($Shelter_2$) 3220 resides on the memory hardware 3122 at the client device 3120. The $RAM_2$ includes a size of $N_2$ data blocks (B) and the $Shelter_2$ includes a size of $S_2$ data blocks (B), whereby the value of $N_2$ is equal to the value of $S_1$ associated with $Shelter_1$ of the first level (l−1). Thus, $Shelter_1$ of the first level may correspond to new data blocks (B) stored in the $RAM_2$ at the second level of size $N_2=S_1$ (e.g., $N_2$=eight (8) data blocks (B)). Additionally, the value for $S_2$ of the $Shelter_2$ is equal to the value of $N_2$ divided by the constant c (i.e., $S_2=N_2/c$). In the example shown, the value for $N_2$ is equal to 8 data blocks (B) stored in $RAM_1$ and the constant c is equal to two (2). Accordingly, the virtual memory ($Shelter_1$) 3220 of the lowest level ($l_l$) residing on the memory hardware 3122 of the client device 3120 includes a value for $S_2$ equal to four (4) data blocks (B).

FIG. 3.3 provides a schematic view of an example memory-level map 3300 residing at the client device 3120 for mapping the memory levels ($l_i$) of the memory 3122, 3200. In the example shown, the example memory-level map 3300 maps the two memory levels ($l_i$) of FIG. 3.2. The memory-level map 3300 maps each data block (B), ($B_1$-$B_N$) to a corresponding query memory level ($l_q$) associated with a lowest one of the memory levels ($l_i$) at which the corresponding data block (B) of the executed query (q) is stored. For instance, data blocks ($B_1$, $B_N$) each include a corresponding query memory level ($l_q$) equal to Level 1 indicating that the data blocks ($B_1$, $B_N$) are stored in $Shelter_1$. Thus, if the client device 3120 executes a query (q) for either of the data blocks ($B_1$, $B_N$), the client device 3120 will send a real query 3402 to $RAM_2$, which corresponds to $Shelter_1$, residing at the storage abstraction 3200 to retrieve the requested data blocks ($B_1$, $B_N$). Data block ($B_3$) includes a corresponding query memory level ($l_q$) equal to Level 0 indicating that the data block ($B_3$) is stored in Shelter0 corresponding to $RAM_1$. Thus, if the client device 3120 executes a query (q) for the data blocks ($B_3$), the client device 3120 will send a real query 3402 to $RAM_1$ residing at the storage abstraction 3200 to retrieve the requested data blocks ($B_3$).

In some implementations, when query memory level ($l_q$) is not the lowest memory level ($l_l$) (i.e., $lq \neq l_l$), the client device 3120 updates the memory-level map 3300 to indicate that the retrieved data block (B) is now stored at the client device 3120 in the virtual memory ($Shelter_l$) of the lowest memory level ($l_l$). In the example shown, when the client device 3120 retrieves a data block (B) from the storage abstraction 3200 (e.g., $RAM_1$ or $RAM_2$) having a corresponding query memory level ($l_q$) less than the lowest memory level ($l_l$), the client device 3120 stores the retrieved data block (B) locally in the Shelter: of the memory hardware 3122 and updates the level map 3300 to indicate that the retrieved data block (B) now includes a corresponding query memory level ($l_q$) equal to Level 2, i.e., the lowest memory level ($l_l$).

Referring back to FIG. 3.1A, the client device 3120 may further initialize a shuffle buffer 3330 in the local memory hardware 3122 for shuffling the virtual memory ($Shelter_i$) 3220 of the memory levels ($l_i$). To avoid overflow in the virtual memory ($Shelter_l$) of the lowest memory level ($l_l$) residing at the client device 3120, the shuffle buffer 3330 may shuffle $Shelter_l$ with $Shelter_{l-1}$. $Shelter_{l-1}$ is the shelter of the next highest level from the lowest memory level ($l_l$), and thus, resides on the storage abstraction 3200. Here, the client device 3120 may download the data blocks (B) of shelters $Shelter_l$ and $Shelter_{l-1}$ and decrypt/re-encrypt the data blocks (B) before shuffling the re-encrypted data blocks (B) according to a new randomly selected permutation. Thereafter, the client device 3120 uploads the re-permutated data blocks (B) into $Shelter_{l-1}$ on the storage abstraction 3200.

FIGS. 3.4A and 3.4B provide an example instruction 3400 executing on the client device 3120 to execute a query (q) for a data block ($B_q$). The data block ($B_q$) may be stored either at the client device 3120 or the storage abstraction 3200 using full recursive square root O-RAM. In the example shown, each of the multiple memory levels ($l_i$) include physical memory ($RAM_i$) 3210 and virtual memory ($Shelter_i$) 3220, whereby the virtual memory ($Shelter_l$) 3220 of the lowest memory level ($l_l$) resides on the client device 3120 (e.g., in the memory hardware 3122) and the remaining physical memory ($RAM_i$) 3210 and virtual memory ($Shelter_i$) 3220 reside on the memory hardware 3114 (e.g., storage abstraction 3200) of the distributed system 3140. Thus, $RAM_1$-$RAM_l$ and $Shelter_0$-$Shelter_{l-1}$ reside on the memory hardware 3114 of the distributed system 3140 and $Shelter_l$ resides on the client device 3120.

In some implementations, the virtual memory ($Shelter_l$) 3220 occupies a space/size on the client device 3120 of $S_l$ equal to O(1). Additionally, each physical memory ($RAM_i$) 3210 occupies a space/size on the storage abstraction 3200 of $N_i$, whereby $N_i$ is equal to the value of $N_1$ divided by the constant c to the power i (i.e., $N_i=N_1/c^i$). Similarly, each virtual memory ($Shelter_i$-$Shelter_{l-1}$) 3220 occupies a space/size on the storage abstraction 3200 of $S_i$, whereby $S_i$ is equal to the value of $N_i$ divided by the constant c (i.e., $S_i=N_i/c$).

In some examples, the distributed system 3140 is configured to initialize at least one data block ($B_i$) of the corresponding virtual memory ($Shelter_i$) of at least one memory level ($l_i$) as a respective dummy data block ($D_i$). Here, the respective dummy data block ($D_i$) may include a permutation of a size of the corresponding data block ($B_i$), an index ($N_i$) of the corresponding data block ($B_i$), or a memory level number of the corresponding memory level ($l_i$).

FIG. 3.4A shows the data processing hardware 3124 of the client device 3120 retrieving a query memory level ($l_q$) corresponding to the data block ($B_q$) from the memory-level map 3300 when the data processing hardware 3124 executes the query (q) for the data block ($B_q$). The data processing hardware 3124 determines that the query memory level ($l_q$) is the lowest memory level ($l_l$), ($l_q=l_l$) and subsequently retrieves the data block ($B_q$) from the virtual memory ($Shelter_l$) 3220 of the lowest memory level ($l_l$) residing on the client device 3120. For instance, the data processing hardware may retrieve the data block ($B_q$) to perform a get/read operation or to perform an update/write operation on the data block ($B_q$). Additionally, for each memory level ($l_j$) greater than the lowest memory level ($l_1$) and the physical memory ($RAM_l$) at the lowest memory level ($l_l$), the data processing hardware 3124 sends a corresponding fake query 3404 to each respective memory level ($l_j$), ($l_l$) to retrieve a corresponding dummy data block ($D_j$) therefrom. In the example shown, the data processing hardware 3124 retrieves the corresponding dummy data block ($D_j$) from each of the $RAM_1$-$RAM_l$. The client device 3120 retrieves the dummy data blocks ($D_j$) to obfuscate the retrieval of the data block ($B_q$) from the virtual memory ($Sheler_1$) 3220 on the memory hardware 3122 at the client device 3120. In some examples, the data processing hardware 3124 discards the retrieved dummy data blocks ($D_j$).

In some examples, each corresponding dummy data block ($D_j$) of the respective memory level ($l_j$) includes a permutation ($\pi_j$) of a pointer ($dCnt_j$) to a respective data block ($N_j$) at the respective memory level ($l_j$). The data processing hardware 3124 may increment the corresponding pointer ($dCnt_j$) when the corresponding dummy block ($D_j$) is retrieved from the respective memory level ($l_j$) to prevent the data processing hardware 3124 from retrieving the same dummy block ($D_j$) twice.

FIG. 3.4B shows the data processing hardware 3124 of the client device 3120 retrieving a query memory level ($l_q$) corresponding to the data block ($B_q$) from the memory-level map 3300 and determining that the retrieved query memory level ($l_q$) is not the lowest memory level ($l_l$), ($l_q<l_l$). Here, the memory-level map 3300 indicates that the data block ($B_q$) is not currently stored on the virtual memory ($Shelter_l$) 3220 of the lowest memory level ($l_l$) residing on the client device 3120. In the example shown, the retrieved query memory level ($l_q$) is equal to level 1 indicating that the corresponding data block ($B_q$) is stored on the physical memory ($RAM_2$) 3210 at the storage abstraction 3200 of the distributed system 3140. Accordingly, data processing hardware 3124 sends a real query 3402 to the physical memory ($RAM_2$) 3210 associated with the query memory level ($l_q$) to retrieve the data block ($B_q$). The data processing hardware 3124 stores the retrieved data block ($B_q$) in the virtual memory ($Shelter_l$) 3220 of the lowest memory level ($l_l$) residing on the client device 3120. Thereafter, the data processing hardware 3124 may update the memory-level map 3300 to indicate that the retrieved data block ($B_q$) is stored in the virtual memory ($Shelter_l$) 3220 of the lowest memory level ($l_l$).

Moreover, for each memory level ($l_j$) other than the query memory level ($l_q$) (e.g., $RAM_2$), the data processing hardware 3124 sends a corresponding fake query 3404 to each respective memory level ($l_j$) to retrieve a corresponding dummy data block ($D_j$) therefrom. In the example shown, the data processing hardware 3124 retrieves the corresponding dummy data block ($D_j$) from each of the $RAM_1$ and $RAM_3$-$RAM_l$. In some examples, the data processing hardware 3124 discards the retrieved dummy data blocks ($D_j$). FIG. 3.4B also shows the data processing hardware 3124 incrementing the corresponding pointer ($dCnt_j$) when the corresponding dummy block ($D_j$) is retrieved from the respective memory level ($l_j$) to prevent the data processing hardware 3124 from retrieving the same dummy block ($D_j$) twice.

Referring to FIGS. 3.4A and 3.4B, in some implementations, the data processing hardware 3124 initializes the shuffle buffer 3330 to obliviously shuffle a corresponding virtual memory ($Shelter_i$) 3220 of each memory level ($l_i$). In order to obliviously shuffle the corresponding virtual memory ($Shelter_i$) 3220, the shuffle buffer 3330 must also shuffle each of the shelters $Shelter_{i+1}$, $Shelter_{i+2}$, . . . , $Shelter_l$. Accordingly, the shuffle buffer 3330 initially shuffles $Shelter_{l-1}$ by incorporating $Shelter_l$ into $Shelter_{l-1}$ and shuffling $Shelter_{l-1}$ and $Shelter_l$ together. Here, the client device 3120 may download the data blocks (B) of shelters $Shelter_l$ and $Shelter_{l-1}$ and decrypt/re-encrypt the data blocks (B) before shuffling the re-encrypted data blocks (B) according to a new randomly selected permutation. Thereafter, the client device 3120 uploads the re-permutated data blocks (B) into $Shelter_{l-1}$ on the storage abstraction 3200. Next, to obliviously shuffle $Shelter_{l-2}$, the shuffle buffer 3330 incorporates $Shelter_{l-1}$ into $Shelter_{l-2}$ and shuffles $Shelter_{l-2}$ and $Shelter_{l-1}$ together. The shuffle buffer 3330 repeats this process until $Shelter_i$ is obliviously shuffled.

Generally, for any $Shelter_i$, an oblivious shuffle must be complete after each $S_i$ queries. Additionally, the last $S_i$ queries must be available to the client in $Shelter_i$. Since a given $Shelter_i$ consists of $Shelter_{i+1}$, . . . , $Shelter_l$, the $S_i$ queries may appear anywhere in $Shelter_i$, . . . , $Shelter_l$. In some implementations, the obliviously shuffling of $Shelter_i$ occurs over a period of $S_i/2$ queries and the shuffle buffer 3330 stores two shuffle buffers having a size of $S_i/2$ data blocks (B). During a collection phase, the shuffle buffer 3330 may just store the queried data block ($B_q$). During a work phase, a constant number of steps of obliviously shuffling will complete with each query, e.g., oblivious shuffling will terminate before all queries $S_i/2$ occur. The obliviously shuffling will occur on data that was recently shuffled by the last instance of obliviously shuffling and the corresponding shuffle buffer 3330. For the very first instance of obliviously shuffling, the shuffle buffer 3330 may use the original data for $Shelter_0$ and a dummy set of data for all other shelters. After the completion of the obliviously shuffling, $Bufer1_i$ of the shuffle buffer 3330 can be emptied to be used again. Simultaneously, the collection phase of a second shuffle occurs and all queries are stored in $Buffer2_i$ as the first shuffle is complete. Accordingly, the shuffled data from the first shuffle is available during the work phase of the second shuffle. This pattern may repeat as more queries arrive.

In some examples, the shuffle buffer 3330 contains multiple versions of the same data block (B). For instance, the client device 3120 can query the same data block ($B_q$) multiple times. However, the shuffle buffer 3330 may require at most one updated version of each data block (B). To resolve the issue of multiple versions of the same data, older data block accesses may be denoted as dummy data blocks and may be discarded. However, no data blocks (B) are ever discarded from $Shelter_0$.

In some examples, the total cost of shuffling is calculated as follows.

$$l \cdot N_2 + \sum_{i=1}^{l} \frac{N_2}{N_{i+1}} 5N_i \tag{9}$$

An amortized cost may be calculated by dividing the total cost by $N_2$ as follows.

$$l + \sum_{i=1}^{l} 5\frac{N_i}{N_{i+1}} \tag{10}$$

As shown in FIGS. 3.4A and 3.4B, the client device 3120 may execute an encryption module 3342 or access the encryption module 3342 to randomly select an Advanced Encryption Standard (AES) key for use in applying the random permutation on the data blocks (B) as well as encrypting, decrypting, and re-encrypting the data blocks (B). Accordingly, the encryption module 3342 may provide a randomly generated key (e.g., an AES key) for obliviously moving the data blocks (B) to new memory locations 3118 of the storage abstraction 3200 without revealing the permutation to the distributed system 3140. In some examples, the randomly generated key is temporary and new keys are randomly generated each time the data blocks (B) are re-permutated.

FIG. 3.5 provides an example algorithm 3500 initializing the memory levels ($l_i$) of the memory hardware 3114, 3122. FIG. 3.6 provides an example algorithm 3600 for execution of the instruction 3400 at the client device 3120 to execute a query (q) for a data block ($B_q$).

FIGS. 3.7A and 3.7B illustrate a method 3700 for obliviously executing queries for data blocks (B). At block 3702, the method 3700 includes executing, by data processing hardware 3124, an instruction 3400 to execute a query (q) for a data block (B). At 704, the method 3700 includes obtaining, by the data processing hardware 3124, a query memory level ($l_q$) corresponding to the data block (B) from a memory-level map 3300. The memory-level map 3300 maps memory levels ($l_i$) of memory 3114, 3112, each memory level ($l_i$) including physical memory ($RAM_i$) 3210 and virtual memory ($Shelter_i$) 3220. The virtual memory ($Shelter_l$) 3220 of a lowest memory level ($l_l$) resides on a client device 3120 and the remaining physical memory ($RAM_i$) 3210 and virtual memory ($Shelter_i$) 3220 reside on memory hardware 3114 of a distributed system 3140 in communication with the data processing hardware 3124.

At block 3706, the method 3700 includes determining, by the data processing hardware 3124, whether the query memory level ($l_q$) is the lowest memory level ($l_l$), ($l_q=l_l$). At block 3708, when the query memory level ($l_q$) is the lowest memory level ($l_l$), ($l_q=l_l$), the method 3700 includes retrieving, by the data processing hardware 3124, the data block (B) from the virtual memory ($Shelter_l$) 3220 of the lowest memory level ($l_l$). For each memory level ($l_j$) greater than the lowest memory level ($l_l$) and the physical memory ($RAM_l$) 3210 at the lowest memory level ($l_l$), the method 3700 includes, at block 3710, retrieving, by the data processing hardware 3124, a corresponding dummy data block ($D_j$) from the respective memory level ($l_j$), ($l_l$) and, at block 712, discarding, by the data processing hardware 3124, the retrieved dummy data block ($D_j$).

On the other hand, when the query memory level ($l_q$) is not lowest memory level ($l_l$), ($l_q=l_l$), the method 3700 includes, at block 3714, retrieving, by the data processing hardware 3124, the data block (B) from the query memory level ($l_q$) and, at block 3716, storing the retrieved data block (B) in the virtual memory ($Shelter_l$) 3220 of a lowest memory level ($l_l$).

At block 3718, for each memory level ($l_i$) other than the query memory level ($l_q$), the method 3700 includes retrieving, by the data processing hardware 3124, the corresponding dummy block ($D_j$) from the respective memory level ($l_j$). At block 3720, the method includes discarding, by the data processing hardware 3124, the retrieved dummy data block ($D_j$).

FIG. 3.8 is schematic view of an example computing device 3800 that may be used to implement the systems and methods described in this document. The computing device 3800 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit the various implementations described and/or claimed in this document.

The computing device 3800 includes a processor 3810 (e.g., data processing hardware 3112), memory 3820, a storage device 3830, a high-speed interface/controller 3840 connecting to the memory 3820 and high-speed expansion ports 3850, and a low speed interface/controller 3860 connecting to low speed bus 3870 and storage device 3830. The computing device 3800 may reside at the client device 3120 and/or the distributed system 3140. Each of the components 3810, 3820, 3830, 3840, 3850, and 3860, are interconnected using various busses, and may be mounted on a common motherboard or in other manners as appropriate. The processor 3810 can process instructions for execution within the computing device 3800, including instructions stored in the memory 3820 or on the storage device 3830 to display graphical information for a graphical user interface (GUI) on an external input/output device, such as display 3880 coupled to high speed interface 3840. In other implementations, multiple processors and/or multiple buses may be used, as appropriate, along with multiple memories and types of memory. Also, multiple computing devices 3800 may be connected, with each device providing portions of the necessary operations (e.g., as a server bank, a group of blade servers, or a multi-processor system).

The memory 3820 (e.g., memory hardware) stores information non-transitorily within the computing device 3800. The memory 3820 may be a computer-readable medium, a volatile memory unit(s), or non-volatile memory unit(s). The non-transitory memory 3820 may be physical devices used to store programs (e.g., sequences of instructions) or data (e.g., program state information) on a temporary or permanent basis for use by the computing device 3800. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 3830 is capable of providing mass storage for the computing device 3800. In some implementations, the storage device 3830 is a computer-readable medium. In various different implementations, the storage device 3830 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 3820, the storage device 3830, or memory on processor 3810.

The high speed controller 3840 manages bandwidth-intensive operations for the computing device 3800, while the low speed controller 3860 manages lower bandwidth-intensive operations. Such allocation of duties is exemplary only. In some implementations, the high-speed controller 3840 is coupled to the memory 3820, the display 3880 (e.g., through a graphics processor or accelerator), and to the high-speed expansion ports 3850, which may accept various expansion cards (not shown). In some implementations, the low-speed controller 3860 is coupled to the storage device 3830 and low-speed expansion port 3870. The low-speed expansion port 3870, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 3800 may be implemented in a number of different forms, as shown in the figure. For example, it may be implemented as a standard server 3800*a* or multiple times in a group of such servers 3800*a*, as a laptop computer 3800*b*, or as part of a rack server system 3800*c*.

Section 4: Oblivious Access with Differential Privacy

While oblivious random access memory (O-RAM) may conceal client access patterns to client-owned and client-encrypted data stored on untrusted memory, widespread deployment of O-RAM is restricted due the large bandwidth overhead and/or large client storage requirements associated with O-RAM. In many scenarios, security guarantees of O-RAM that ensure that data contents and access patterns remain completely hidden, are too strong. For example, it may be pointless to conceal information about an access pattern that may have been leaked through other channels (e.g., a priori knowledge about the user/client of the data). Thus, if only a small set of queries are in fact sensitive, hiding the entire access sequence is also unnecessary. Implementations herein are directed toward using differentially private access to data blocks stored on untrusted memory in order to achieve exponentially smaller bandwidth overhead by relaxing some unnecessary security requirements. Differentially private access may be used with O-RAM and oblivious storage (OS) for obliviously executing queries for data blocks stored on untrusted memory managed by a service provider. The untrusted memory may induce a storage abstraction overlaid across multiple memory locations of a distributed system (e.g., cloud environment) and a client may store encrypted data blocks across the memory locations. The untrusted memory may also store publically-known data blocks that is not encrypted. In these scenarios, differentially private access may be used with private information retrieval (PIR) to conceal the access patterns of the publically-known and un-encrypted data from the untrusted memory.

FIGS. 4.1A and 4.11B depict an example system 4100 for storing N data blocks (B) 4102 owned by a client 4104 on a distributed system 4140 and using differentially private access to oblivious execute queries for the data blocks (B) 4102 to conceal access patterns while preserving search functionalities on the data blocks 4102 by the client 4104. A client device 4120 (e.g., a computer) associated with the client 4104 communicates, via a network 4130, with the distributed system 4140 having a scalable/elastic non-transitory storage abstraction 4150. The client device 4120 may include associated memory hardware 4122 and associated data processing hardware 4124. The storage abstraction 4150 (e.g., key/value store, file system, data store, etc.) is overlain on storage resources 4114 to allow scalable use of the storage resources 4114 by one or more client devices 4120.

The system 4100 may optionally store publically-known and un-encrypted N data blocks 4102 across one or more storage resource 4114. Thus, the client device 4120 may not own the data blocks 4102 and the content of the data blocks 4102 are available to the public in configurations. However, the use of differentially private access may similarly hide access patterns when the data blocks 4102 are retrieved from the one or more storage resource 4114.

In some implementations, the distributed system 4140 executes a computing device 4112 that manages access to the storage abstraction 4150. For instance, the client device

4120 may encrypt and store the data blocks 4102 on the storage abstraction 4150, as well as retrieve and decrypt the data blocks 4150 from the storage abstraction 4150. While the example shown depicts the system 4100 having a trusted side associated with the client device 4120 in communication, via the network 4130, with an untrusted side associated with the distributed system 4140, the system 4100 may be alternatively implemented on a large intranet having a trusted computing device(s) (CPU) and untrusted data storage. The untrusted side associated with the distributed system 4140 or data storage is considered "honest-but-curious", in that the computing device 4112 follows the protocol honestly but may perform any probabilistically polynomial time algorithm using information leaked by the distributed system 4140 to gain additional insight.

In some implementations, the distributed system 4100 includes resources 4110, 4110*a-z*. The resources 4110 may include hardware resources and software resources. The hardware resources 4110 may include computing devices 4112 (also referred to as data processing devices and data processing hardware) or non-transitory memory 4114 (also referred to as memory hardware and storage resources). The software resources 4110 may include software applications, software services, application programming interfaces (APIs) or the like. The software resources 4110 may reside in the hardware resources 4110. For example, the software resources 4110 may be stored in the memory hardware 4114 or the hardware resources 4110 (e.g., the computing devices 4112) may be executing the software resources 4110.

A software application (i.e., a software resource 4110) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The memory hardware 4114, 4122 may be physical devices used to store programs (e.g., sequences of instructions) or data (e.g., program state information) on a temporary or permanent basis for use by a computing device 4112 and/or a client device 4120 (i.e., the data processing hardware 4124 of the client device 4120). The memory hardware 4114, 4122 may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), oblivious random access memory (ORAM), dynamic random access memory (DRAM), static random access memory (SRAM), phase change memory (PCM) as well as disks or tapes.

The network 4130 may include various types of networks, such as local area network (LAN), wide area network (WAN), and/or the Internet. Although the network 4130 may represent a long range network (e.g., Internet or WAN), in some implementations, the network 4130 includes a shorter range network, such as a local area network (LAN). In some implementations, the network 4130 uses standard communications technologies and/or protocols. Thus, the network 4130 can include links using technologies, such as Ethernet, Wireless Fidelity (WiFi) (e.g., 802.11), worldwide interoperability for microwave access (WiMAX), 3G, Long Term Evolution (LTE), digital subscriber line (DSL), asynchronous transfer mode (ATM), InfiniBand, PCI Express Advanced Switching, Bluetooth, Bluetooth Low Energy (BLE), etc. Similarly, the networking protocols used on the network 4130 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 4130 can be represented using technologies and/or formats including the hypertext markup language (HTML), the extensible markup language (XML), etc. In addition, all or some of the links can be encrypted using conventional encryption technologies, such as secure sockets layer (SSL), transport layer security (TLS), virtual private networks (VPNs), Internet Protocol security (IPsec), etc. In other examples, the network 4130 uses custom and/or dedicated data communications technologies instead of, or in addition to, the ones described above.

The data blocks 4102 correspond to atomic units of data and each have size B bytes each. For example, a typical value for B for storage on a distributed system may be 64 KB to 256 B. A notation N denotes a total number of the data blocks 4102 associated with the client 4104 (or associated with the storage resource(s) 4114 in private information retrieval) and stored on the storage abstraction 4150 using Oblivious Random Access Memory (O-RAM) or Oblivious Storage (OS). Described in greater detail below, OS may use the same framework (i.e., transcript and security definition) as O-RAM except that OS considers a natural extension where the data blocks 4102 are identified by unique string identifiers instead of simple index identifiers as used by O-RAM. Thus, N may refer to the capacity of the O-RAM or the OS on the storage abstraction 4150. Each of the N data blocks 4102 is stored at a corresponding memory location 4118, 4118A-N (FIG. 4.1B) of the storage abstraction 4150 overlain across the memory hardware 4114. In some implementations, the N data blocks 4102 are associated with private information retrieval (PIR) storage whereby the N data blocks 4102 are stored on one or more storage resources 4114 and are un-encrypted and available to the public.

While traditional encryption schemes provide confidentiality, the traditional encryption schemes are ineffective at hiding data access patterns which may reveal very sensitive information to the untrusted distributed system 4140. Moreover, the traditional encryption schemes allow the client 4104 to search for encrypted data 4102 stored on the distributed system 4140 only if the client 4104 provides plain text access for the data 4102 to the distributed system 4140. As the client device 4120 originates the data 4102, the client device 4120 is considered trusted.

In some implementations, the client device 4120 and the distributed system 4140 execute an oblivious permutation routine 4450 for oblivious moving the encrypted data blocks 4102 around the storage abstraction 4150 to completely hide data access patterns (which data blocks 4102 were read/written) from the distributed system 4140. For instance, the oblivious permutation routine 4450 may cause the distributed system 4140 to allocate new memory locations 4118 of the storage abstraction 4150 for storing re-permutated N data blocks 4102 arranged in an array, A, and/or organize/divide/partition the storage abstraction 4150 into multiple data buckets 4350. In some implementations, the oblivious permutation routine 4450 organizes the storage abstraction 4150 into N data buckets 4350 each containing θ(log log N)

memory locations 4118 such that each data bucket 4350 can store both one or more real data blocks 4102 and one or more dummy data blocks 4103. In these implementations, the storage abstraction 4150 includes a total capacity equal to θ(N log log N).

At the trusted side, the client device 4120 may iteratively download two data buckets 4350 at a time from the distributed system 4140 using a pair of pseudorandom functions $F_1$, $F_2$ and corresponding identifiers id and allocates a block stash 4370 on the memory hardware 4122 while executing the oblivious permutation routine 4450. For each data bucket 4350 received, the client device 4120 decrypts and applies a random permutation on the data blocks 4102 within the corresponding data bucket 4350 to generate permutated data blocks and determines a corresponding buffer bucket 4360 for each permutated data block 4102. Additional details executing the oblivious permutation routine for obliviously moving the encrypted data blocks 4102 around the storage abstraction 4150 can be found in U.S. Patent Application 62/490,804, filed on Apr. 27, 2017, which is hereby incorporated by reference in its entirety. In some implementations, the client device 4120 further initializes an oblivious shuffle in the local memory hardware 4122 by downloading the data blocks 4102 from the pair of buckets 4350 and decrypt/re-encrypt the data blocks 4102 before shuffling the re-encrypted data blocks 4102 accordingly to a new randomly selected permutation using newly selected pseudorandom functions $F'_1$, $F'_2$. Thereafter, the client device 4120 uploads the re-permutated data blocks 4102 to the corresponding buffer buckets 4360 based on the newly selected pseudorandom functions $F'_1$, $F'_2$. The old buckets 4350 may be deleted after the shuffle is complete. This oblivious shuffle may occur when the oblivious permutation routine 4450 executes on the client device 4120 and the distributed system 4140. Additional details of obliviously shuffling N data blocks 4102 around the storage abstraction 4150 can be found in U.S. Patent Application 62/508,523, filed on May 19, 2017, which is hereby incorporated by reference in its entirety.

In some implementations, when the client device 4120 needs to access (read/write) an encrypted data block 4102 stored on the storage abstraction 4150, the data processing hardware 4124 at the client device 4120 executes an instruction 4300, 4400 to execute a query (q) for the data block 4102. By executing the instruction 4300, 4400, the client device 4120 is able to retrieve the data block 4102 without revealing the contents of the data block 4102 as well as the sequence of the query (q) executed by the client device 4120 to the distributed system 4140. The query (q) consists of two phases: (1) a download phase; and (2) an overwrite phase so that the distributed system 4140 is unaware whether the corresponding operation is a read or write. Further, execution of the instruction 4300, 4400 obviates which data blocks 4102 were read/written from the distributed system 4140. Execution of the instruction 4300, 4400 requires two roundtrips between the client device 4120 and the distributed system 4140 when the client device 4120 executes the corresponding query (q) for the data block 4102. For instance, since each query (q) includes the download phase and the overwrite phase, the contents of an overwrite block associated with a write operation does not depend on the content of a downloaded block during a download phase. Hence, the two blocks can be requested using one round-trip and the second round-trip may be used to upload the overwrite block back to storage abstraction 4150.

Referring to FIG. 4.11B, in some implementations, the distributed storage system 4140 includes loosely coupled memory hosts 4110, 4110*a-z* (e.g., computers or servers), each having a computing resource 4112 (e.g., one or more processors or central processing units (CPUs)) in communication with storage resources 4114 (e.g., memory hardware, memory hardware, flash memory, dynamic random access memory (DRAM), phase change memory (PCM), and/or disks) that may be used for caching data. The storage abstraction 4150 overlain on the storage resources 4114 allows scalable use of the storage resources 4114 by one or more client devices 4120, 4120*a-n*. The client devices 4120 may communicate with the memory hosts 4110 through the network 4130 (e.g., via remote procedure calls (RPC)).

In some implementations, the distributed storage system 4140 is "single-sided," eliminating the need for any server jobs for responding to real and/or fake queries 4302, 4402/4304, 4404 from client devices 4120 to retrieve data blocks 4102 and/or dummy data blocks 4103 from the storage abstraction 4150 when the client device 4120 executes instructions 4300, 4400 to execute queries (q) for data blocks 4102. "Single-sided" refers to the method by which most of the request processing on the memory hosts 4110 may be done in hardware rather than by software executed on CPUs 4112 of the memory hosts 4110. Additional concepts and features related to a single-sided distributed caching system can be found in U.S. Pat. No. 9,164,702, which is hereby incorporated by reference in its entirety.

The distributed system 4140 may obliviously move data blocks 4102 around the storage resources 4114 (e.g., memory hardware) of the remote memory hosts 4110 (e.g., the storage abstraction 4200) and get the data blocks 4102 from the remote memory hosts 4110 via RPCs or via remote direct memory access (RDMA)-capable network interface controllers (NIC) 4116. A network interface controller 4116 (also known as a network interface card, network adapter, or LAN adapter) may be a computer hardware component that connects a computing device/resource 4112 to the network 4130. Both the memory hosts 4110*a-z* and the client device 4120 may each have a network interface controller 4116 for network communications. The instructions 4300, 4400 and/or the oblivious permutation routine 4450 executing on the physical processor 4112 of the hardware resource 4110 registers a set of remote direct memory accessible regions/locations 4118A-N of the memory 4114 with the network interface controller 4116. Each memory location 4118 is configured to store a corresponding data block 4102.

In some implementations, when the client device 4120 executes the instruction 4300, 4400 to execute the query (q) for a data block 4102 and determines that the data block 4102 is stored locally on the block stash 4370 at the memory hardware 4122 of the client device 4120, the client device 4120 retrieves the data block 4102 from the block stash 4370 and sends a fake query 4304, 4404 to the NIC 4116 for retrieving a random block 4102 (or random data buckets 4350 including real and/or fake blocks 4102, 4103) to conceal the retrieval of the data block 4102 from the block stash 4370 at the local memory hardware 4122. The client device 4120 may discard the random block 4102 downloaded from the fake query 4304, 4404. On the other hand, if the client device 4120 determines that the data block 4102 is stored on the storage abstraction 4150, the client device 4120 may send a real query 4302, 4402 to the NIC 4116 for retrieving the corresponding data block 4102 from the storage abstraction 4150.

FIGS. 4.2A and 4.2B provide an example differentially private-information information retrieval (DP-IR) instruction 4200 executing on the client device 4120 to execute a download request 4202, 4204 for a data block 4102 stored on one or more colluding storage resources 4114 (FIG. 4.2A) or one of multiple non-colluding storage resources (FIG. 4.2B). Unlike O-RAM and OS, the contents of the N data blocks 4102 are assumed to be known by all parties including any adversaries. In this case, the untrusted server generates the N data blocks before providing access to client devices 4120. Typically, PIR client devices 4120 are stateless since the data blocks 4102 are un-encrypted and their memory locations are publically-available.

For a single server 4110 (e.g., single storage resource 4114) generating and storing the N data blocks 4102, FIG. 4.2A shows the client device 4120 executing the DP-IR instruction 4200 to download block $B_3$ 4102 from the storage resource 4114*a*. Here, block $B_3$ corresponds to one of nine N blocks $B_1$-$B_9$ stored on the single storage resource 4114*a*. The client device 4120 may call out the index i (e.g., i=1, 2, 3 . . . , or 9) associated with the queried block 4102. The DP-IR instruction 4200 includes differential privacy having a security parameter, ε, for a constant error probability, α, that is asymptotically tight to a lower bound. The security parameter ε may be greater than or equal to zero and the error probability α may be greater than zero. In order to conceal the access pattern for the downloaded block $B_3$, the DP PIR instruction 4200 disguises real queries by executing a download request 4202 with probability α for K blocks excluding block $B_3$ and another download request 4204 with probability 1−α for the block $B_3$ and K−1 other blocks. Hence, each download request 4202, 4204 is requesting exactly K blocks of bandwidth among the N data blocks 4102 stored on the storage resource 4114. The download requests 4202, 4204 may occur in any order to conceal the fact that block $B_3$ is the actual queried-for block $B_3$ the client device 4120 wants to download. The value of K is based on a function of the security parameter e and the error probability α. For instance, K may be expressed as follows.

$$K = K(\varepsilon, \alpha) = \frac{(1-\alpha)N}{\alpha(e^{\varepsilon}-1)} \tag{11}$$

In the single-server example, the client device 4120 receives a first download sequence 4212 associated with error probability α returning the K blocks $B_1$, $B_2$, $B_5$ excluding the queried-for block $B_3$ and a second download sequence 4214 associated with the error probability 1−α for the block $B_3$ and the K−1 other blocks $B_6$, $B_9$. The second download sequence 4214 may be received by the client device 4120 before or after receiving the first download sequence 4212. The K blocks $B_1$, $B_2$, $B_5$ returned in the first download sequence 4212 associated error probability α and the K−1 other blocks $B_6$, $B_9$ returned in the second download sequence 4214 associated with error probability 1−α may each be uniformly selected at random by the DP-IR instruction 4200 executing on the client device 4120.

In some implementations, an entity or organization operating multiple servers 4110, 4110*a-n* (e.g., two more storage resources 4114, 4114*a-n* each associated with a respective server 4110) includes one of the servers corrupting a fraction t of the servers. In this situation to conceal the access patterns by the client device 4120 when downloading data blocks 4102 from the various storage resources 4114*a-n* colluding with one another, FIG. 4.2A shows the client device 4120 executing the DP-IR instruction 4200 to download block $B_3$ (or another block $B_i$) by sending the download requests 4202, 4204 to a uniformly at random chosen storage resource 4114 instead of splitting up and evenly requesting the block $B_3$ from all of the colluding storage resources 4114*a-n*. Accordingly, in order to conceal the access pattern for the downloaded block $B_3$ in the multiple colluding server setting, the DP PIR instruction 4200 disguises real queries sent to the uniformly at random chosen storage resource 4114 by executing the download request 4202 with probability α for K blocks excluding block $B_3$ and the other download request 4204 with probability 1−α for the block $B_3$ and K−1 other blocks. In response to receiving each of the download requests 4202, 4204 from the client device, the uniformly at random chosen storage resource 4114 returns the corresponding download sequence 4212 associated with error probability α for the K blocks $B_1$, $B_2$, $B_5$ excluding the queried-for block $B_3$ and the corresponding download sequence 4214 associated with the error probability 1−α for the block $B_3$ and the K−1 other blocks $B_6$, By in the same manner as discussed above with respect to the single server setting.

Referring to FIG. 4.2B, the client device 4120 queries for a data block $B_q$ 4102 from one of multiple non-colluding servers 4110 (e.g., two or more storage resources 4114) that are mutually distrusting, and therefore do no share information with one another. For instance, the non-colluding servers 4110 may be owned by separate entities accessible to the client devices 4120 but not sharing information with one another due to contractual obligations or other reasons. Each non-colluding server 4110 may be associated with a non-interacting adversary such that each server 4110 may monitor all memory accesses patterns performed on its corresponding storage resource 4114. In order to conceal the access pattern for the downloaded block $B_q$, the DP PIR instruction 4200 disguises real queries by executing a corresponding download request 4224 sent to each of the non-colluding storage resources 4114 that requests to download exactly c random blocks of bandwidth from each storage resource 4114. For the storage resource 4114 storing the queried-for block $B_q$, the corresponding download request 4224 is for the queried-for block $B_q$ and c−1 other blocks. For the remaining storage resources 4114, each corresponding download request 4224 is for c blocks excluding the queried-for block $B_q$. The value of c for each non-colluding storage resource 4114 is based a security parameter ε, the total number of non-colluding servers D, and the corresponding number of N data blocks 4102 stored on each storage resource 4114. For instance, for each non-colluding storage resource 4114, c may be expressed as follows.

$$c = \frac{N}{e^{\varepsilon}(D-1)} \tag{12}$$

In some implementations, O-RAM allows the client device 4120 to store client-owned and client-encrypted data blocks 4102 privately on corresponding memory locations 4118 across the storage abstraction 4150 of the distributed system 4140. By contrast to the DP-IR of examples FIGS. 4.2A and 4.2B, the data blocks 4102 stored in O-RAM are encrypted by the client device 4120 using private keys and the memory location 4118 associated with each data block 4102 is hidden from the untrusted distributed system 4140. FIGS. 4.3A-4.3D show an example differentially private-oblivious random access memory (DP-ORAM) instruction 4300 executing on the client device 4120 to execute a query (q) to access (read/write) an encrypted data block 4102 stored on the storage abstraction 4150 without revealing the contents of the data block 4102 as well as the sequence of the query (q) executed by the client device 4120 to the distributed system 4140. The query (q) consists of two phases: (1) a download phase; and (2) an overwrite phase so that the distributed system 4140 is unaware whether the corresponding operation is a read or write as well as revealing a miss when a queried-for data block $B_i$ does not exist. The DP-ORAM instruction 4300 executing on the client device 4120 (e.g., on the data processing hardware 4124) may first generate private keys K, $K_1$, $K_2$ of length k using an encryption module 4305, initialize an array A on the storage abstraction 4150 of N empty block slots (e.g., empty memory locations 4118), and initialize the block stash 4370 on the memory hardware 4122 of the client device 4122. Each empty block slot of the array A may include a corresponding index $A_i$. Each empty block slot may optionally be initially filled with a dummy block (e.g., a block with encryption equal to zero).

In some examples, the client device 4120 and the distributed system 4140 execute the oblivious permutation routine 4450 to cause the distributed system 4140 to allocate new memory locations 4118 of the storage abstraction 4150 for storing permutated or re-permutated data blocks 4102 and organize/divide/partition the storage abstraction 4150 into multiple M data buckets 4350, 4350A-n. Each data bucket 4350 may store a specified number of the N data blocks 4102. In some examples, the data blocks 4102 are randomly assigned to each data bucket 4350 by pseudorandom permutations π performed at the client device 4120 during a previous oblivious permutation routine 4450 so that the division of the storage abstraction 4150 into the M data buckets 4350 is obscure/oblivious to the untrusted distributed system 4140. The smaller data buckets 4350 subdivide the O-RAM of the storage abstraction 4150 to increase bandwidth when the distributed system 4140 and the client device 4120 are performing permutation operations during execution of the oblivious permutation routine 4450 and the instruction 4300. The number of M data buckets 4350 initialized at the distributed system 4140 is tunable based on security and/or bandwidth requirements.

The block stash 4370 occupies a space/size/capacity equal to C on the memory hardware 4122 of the client device 4120 and each data block 4102 has a probability p of being stored in the block stash 4370 (in addition to the storage abstraction 4150). The capacity C of the block stash 4370 is tunable based on security and/or bandwidth requirements. For instance, increasing the capacity C of the block stash 4370 increases security at the cost of increased bandwidth. The probability p of a data block being stored in block stash 4370 may be expressed as follows.

$$p < \frac{C}{N} \tag{13}$$

The DP-ORAM instruction 4300 further causes the client device 4120 to encrypt each data block 4102 using the private keys K and iteratively upload each encrypted data block $B_i$ 4102 to a corresponding randomly selected empty block slot $A_i$ on the storage abstraction 4150 based on a permutation π so that the actual location of each encrypted data block 4102 is hidden from the distributed system 4140. Moreover, as the data blocks 4102 are encrypted on the trusted side by the client device 4120 using client-owned private keys K, the contents of the N data blocks 4102 stored on the storage abstraction 4150 are also unknown to the distributed system 4150. The client device 4120 may simply access a corresponding data block 4102 stored on the storage abstraction 4150 by applying the permutation π along with a corresponding index i associated with the requested data block 4102.

Referring to FIG. 4.3A, the data processing hardware 4124 executes the query (q) for a data block ($B_i$) 4102 during the download phase when the data block ($B_i$) 4102 is stored in the block stash 4370 on the memory hardware 4122 of the client device 4120. $B_i$ may correspond to any of the N data blocks 1-16 encrypted and stored on the array A of the storage abstraction 4150. Since the data block $B_i$ 4102 is stored in the block stash 4370 with probability p, the data processing hardware 4124 removes the requested data block ($B_i$) 4102 from the block stash 4370 and sends a fake query 4304 to the untrusted distributed system 4140 to download some random data block 4102 stored on the storage abstraction 4150 to obfuscate the retrieval of the data block ($B_i$) from the block stash 4370. In the example shown, the fake query 4304 randomly selects and downloads Block 11 from the third data bucket 4350*c* of the array A of N blocks 4102 stored on the storage abstraction 4150. Here, the fake query 4304 requests A[j] from the storage abstraction 4150, with j (e.g., j is equal "11" in the example shown) chosen uniformly at random. Upon receiving the downloaded data block (e.g., Block 11) from the fake query 4304, the data processing hardware 4124 may simply discard the data block 4102 since the client device 4120 is merely downloading the block at random to obfuscate the actual retrieval of the data block ($B_i$) from the block stash 4370. Thus, the untrusted distributed system 4140 is unaware whether or not the retrieved block (e.g., Block 11) is downloaded in response to a real query 4302 or the fake query 4304. The data processing hardware 4124 may execute a read operation or a write operation on the data block ($B_i$) retrieved from the block stash 4370 and one of store the current version of the data block ($B_i$) in the block stash 4370 with probability p or in the storage abstraction 4150 during the overwrite phase.

On the other hand, FIG. 4.3B shows the data processing hardware 4124 executing the query (q) for the data block ($B_i$) 4102 during the download phase when the data block ($B_i$) is not stored locally in the block stash 4370 on the memory hardware 4122 of the client device 4120. Since the data block $B_i$ 4102 is not stored in the block stash 4370, the data processing hardware 4124 sends a real query 4302 to the untrusted distributed system 4140 to download the data block $B_i$ stored on the storage abstraction 4150. In the example shown, $B_i$ corresponds to block 6 in the second data bucket 4350*b* of the storage abstraction 4150. Here, the real query 4302 requests A[i] from the storage abstraction 4150, with i (e.g., i is equal to "6" in the example shown) corresponding to the index/identifier of the data block ($B_i$) 4102 the client device 4120 wants to access. In response to retrieving/downloading the data block $B_i$ 4102 from the real query 4302, the data processing hardware 4124 decrypts the block $B_i$. For instance, the data processing hardware 4124 may access the private keys K stored locally on the encryption module 4305 to decrypt the contents of block 6. The client device 4120 may hold (e.g., in memory hardware 4122) the retrieved block $B_i$ (e.g., block 6).

Referring to FIG. 4.3C, the data processing hardware 4124 stores a current version of a data block ($B_i'$) in the block stash 4370 with probability p on the memory hardware 4122 of the client device 4120 during an overwrite phase. The overwrite phase follows a corresponding download phase in which the previous version of the data block ($B_i$) was retrieved either from the block stash 4370 (FIG. 4.3A)

or from the storage abstraction 4150 (FIG. 4.3B). In some examples, the client device 4124 executes a write operation on the data block ($B_i$) retrieved during the download phase to update the data block with a new version ($B_i'$). As used herein, updating the previous version of $B_i$ with the new version $B_i'$ may include replacing and discarding the previous version $B_i$ with the new version $B_i'$. In these examples, the updated new version ($B_i'$) is stored on in the block stash 4370 with probability p during the overwrite phase. In other examples, the client device 4120 simply executes a read operation on the data block ($B_i$) retrieved during the download phase. In these examples, the current version stored in the block stash 4370 is unchanged from the version retrieved during the download phase.

In order to obfuscate the storing of the current version of the data block ($B_i'$) in the block stash 4370 with probability p from the untrusted distributed system 4140, the data processing hardware 4124 sends another fake query 4304 to the untrusted distributed system 4140 to download some random data block 4102 stored on the storage abstraction 4150. In the example shown, the fake query 4304 randomly selects and downloads Block 8 from the second data bucket 4350*b* of the array A of N blocks 4102 stored on the storage abstraction 4150. Here, the fake query 4304 requests A[j] from the storage abstraction 4150, with j (e.g., j is equal "8" in the example shown) chosen uniformly at random. Upon receiving downloaded data block (e.g., Block 8) from the fake query 4304, the data processing hardware 4124 decrypts and re-encrypts the block with random freshness and then uploads the re-encrypted data block (e.g., Block 8) back onto the storage abstraction 4150 of the distributed system 4140. Here, the data processing hardware 4124 simply re-encrypts the data block (e.g., Block 8) without changing the contents so that the distributed system 4140 is unaware whether or not block was uploaded in response to a fake query 4304 or a real query 4302 for read/write access. Put another way, the data processing hardware 4124 has no way of knowing whether the re-encrypted data block 4102 includes updated content as a result of an overwrite or whether the content is unchanged.

On the other hand, when the current version of a data block ($B_i'$) is not stored in the block stash 4370, FIG. 4.3D shows the client device 4120 holding the current version of the data block ($B_i'$) (e.g., in the memory hardware 4122) while the data processing hardware 4124 sends a real query 4302 to the untrusted distributed system 4140 to retrieve the corresponding data block ($B_i$) (e.g., Block 6) from the storage abstraction 4150. Thereafter, the data processing hardware 4124 encrypts and uploads the current version of the data block ($B_i'$) to the distributed system 4140 for storage on the storage abstraction 4150 and discards the previous version of the corresponding data block ($B_i$) retrieved from the real query 4302. In some examples, the current version of the data block ($B_i'$) corresponds to a new version of Block 6 updated by the client device 4120 after executing a write operation on the previous version of data block ($B_i$) retrieved during the download phase. In other examples, when the client device 4120 only executes a read operation on the data block ($B_i$) retrieved during the download phase, the current version of the data block ($B_i'$) (e.g., Block 6) uploaded to the distributed system 4140 may remain unchanged from the corresponding discarded data block B; except with a freshly computed ciphertext (e.g., a different encryption). Thus, the untrusted distributed system 4140 is unware whether or not the contents of the uploaded current version of data block ($B_i'$) were changed since the client device 4120 freshly encrypted the data block ($B_i'$) locally using private keys.

Whereas the O-RAM construction of FIGS. 4.3A-4.3D requires each of the N data blocks 4102 outsourced by the client 4104 to have a unique block identifier i, the oblivious storage (OS) construction allows the data blocks 4102 to be identified by strings. Moreover, OS protocols must handle operations (read/write) that refer to identifiers not corresponding to any currently stored block so that an adversary cannot learn whether operations refer to currently stored data blocks 4102 on the storage abstraction 4150 or non-existing data blocks (i.e., block misses). In some implementations, the DP-ORAM construction/protocol converts to the DP-OS construction/protocol by storing a position map on the client device 4120 (e.g., in the memory hardware 4122) that assigns a unique index from [N] to each of the N blocks. Here, the position map translates each block identifier to a corresponding index to allow the rest of a query to follow exactly as the previously discussed DP-ORAM. These implementations, however, can be impractical due to a large amount of client-side storage required to store the position map. To alleviate the client from having to store a one-to-one position map of block identifiers (e.g., strings) to corresponding indexes, implementations herein are directed toward using pseudorandom functions (PRFs) to translate block identifiers to indexes from a small domain. As PRFs require storage of a single key, the storage requirements for the client are significantly reduced compared to storing a position map.

FIGS. 4.4A-4.4C show an example differentially private-oblivious storage (DP-OS) instruction 4400 executing on the client device 4120 to initialize the client device 4120 and the distributed system 4140 for storing the N data blocks 4102 in encrypted form on the storage abstraction 4150. FIGS. 4.5A-4.5D show the client device 4120 executing the DP-OS instruction 4400 to execute a query (q) to access (read/write) one of the encrypted data blocks 4102 stored on the storage abstraction 4150 without revealing the contents of the data block 4102 as well as the sequence of the query (q) executed by the client device 4120 to the distributed system 4140.

Referring to FIG. 4.4A, execution of the DP-OS instruction 4400 by the data processing hardware 4124 causes the client device 4120 to encrypt each of the N data blocks 4102 using one or more private keys obtained from the encryption module 4305, initialize the block stash 4370 on the memory hardware 4122 of the client device 4122, and store a sub-set of the encrypted data blocks 4102 in the block stash 4370 with probability p. The probability p may be expressed using EQ. 3 discussed above. As with ORAM, the block stash 4370 at the client device 4120 has a capacity of O(C) blocks of storage which may be tunable based on security and bandwidth requirements. The client device 4120 (e.g., the data processing hardware 4124), when executing the instruction 4400, additionally initializes an identifier stash 4372 for storing the unique string identifiers id corresponding to each data block 4102 stored in the block stash 4370.

Each data block 4102 includes a corresponding identifier id expressed as a string. During initialization of the DP-OS, the instruction 4400 further causes the client device 4120 to generate PRFs $F_1$, $F_2$ randomly while the distributed system 4140 initializes N buckets 4350, 4350A-N with labels 1-N each with exactly m memory slots for storing corresponding encrypted blocks 4102, 4103. In the example shown, the number of memory slots m for each bucket 4350 is expressed as follows.

$$m = \theta(\log\log N) \quad (14)$$

Accordingly, each memory slot m in a corresponding bucket 4350 stores a real data block 4102 in encrypted form or a dummy data block 4103 in encrypted form. When the N buckets 4350 are initialized, each bucket 4350 may be initially filled with dummy blocks 4103. Metadata and contents of each block 4102, 4103 will be stored together and each block 4102, 4103 may include a corresponding tag indicating whether the block is real or fake (i.e., a dummy). The distributed system 4140 may store a position map 4355 of N pairs of bucket identifiers and denote PosMap[i] as the i-th pair.

The client device 4120 is further configured to store the encryption key(s) for encrypting/decrypting the data blocks 4102 as well as the PRFs $F_1$, $F_2$ that each require the storage of additional keys $K_1$, $K_2$. For convenience, instead of using $F_1(K_1,x)$ and $F_2(K_2,x)$ the key parameter may be dropped. As will become apparent, the use of the PRFs $F_1$, $F_2$ generated by the client device 4120 and stored thereon ensure that a data block $B_i$ with identifier $id_i$ will always be in one of two buckets labelled $F_1(id_i)$ and $F_2(id_i)$ or stored in the block stash 4370. As used herein, $F(id_i)$ refers to the pair $(F_1(id_i), F_2(id_i))$ for convenience.

After encrypting the blocks, initializing the N buckets 4350A-N, and generating the PRFs $F_1$, $F_2$ at random, the instruction 4400 causes the data processing hardware 4124 to iterate through each of the N data blocks 4102 for obliviously storage on the storage abstraction 4150 of the distributed system 4140. For a current iteration corresponding to placement of data block $(B_i)$, FIG. 4.4B shows the data processing hardware 4124 using the PRFs $F_1$, $F_2$ to return/download a pair of data buckets 4350 with indices $s_1=F_1(id_1)$ and $s_2=F_2(id_i)$ and then decrypting all of the blocks 4102, 4103 within the downloaded data buckets $s_1$, $s_2$ to determine which of the two buckets is the least loaded. As used herein, a least loaded bucket refers to the data bucket having the least amount of real data blocks 4102. In the example shown, the data bucket $s_2$ is least loaded because the data bucket $s_1$ includes a greater number real data blocks 4102 (e.g., data bucket $s_1$ includes one real data block 4102 and data bucket $s_2$ includes zero real data blocks 4102). Accordingly, the data processing hardware 4124 replaces one of the dummy blocks 4103 from the least loaded bucket $s_2$ with the data block $(B_i)$ of the current iteration. The replaced dummy block 4103 may be discarded. If, on the other hand, each of the downloaded data buckets $s_1$, $s_2$ include an equal number of dummy blocks 4103, the client device 4120 may randomly choose either bucket for input of the data block $(B_i)$ 4102.

In some scenarios, and particularly in later iterations as the data buckets 4350 are becoming full of real data blocks 4102, the two buckets $s_1=F_1(id_i)$ and $s_2=F_2(id_i)$ for a present iteration may not include any dummy blocks 4103, thereby rendering the buckets completely full and equally loaded with real data blocks 4102. In these scenarios, the instruction 4400 will simply fail and terminate such that two new buckets will be downloaded to identify a least-loaded bucket for inputting the data block $(B_i)$ presently being processed.

FIG. 4.4C shows the data processing hardware 4124 re-encrypting all of the blocks 4102, 4103 within the downloaded buckets $s_1$, $s_2$ with fresh randomness and then re-uploading the buckets $s_1$, $s_2$ back to the distributed system 4140 at the same positions within the storage abstraction 4150. With probability p, $B_i$ may be stored in the block stash 4370. For the remaining probability (i.e., 1−(C/N)), $B_i$ is discarded. The distributed system 4140 may further sets the position map PosMap[i] equal to $F(id_i)$ with $F(id_i)$ referring to the pair $(F_1(id_i), F_2(id_i))$.

After initializing the DP-OS by obliviously storing the N data blocks 4102 in encrypted form on the storage abstraction 4150 and storing the subset of data blocks 4102 in the block stash 4370 with probability p, FIG. 4.5A shows the data processing hardware 4124 executing the instruction 4400 to execute the query (q) for a data block $(B_i)$ 4102 during the download phase when the data block $(B_i)$ 4102 is stored in the block stash 4370 on the memory hardware 4122 of the client device 4120. The query (q) includes the identifier id for the block $B_i$ as well as the operation (read/write) for the block. A new block representing a current version may also be included with the query (q) when the operation is a write operation. Here, the data processing hardware 4124 queries the block stash 4370 to determine the data block $B_i$ 4102 is stored therein or the data processing hardware 4124 queries the identifier stash 4372 to locate the corresponding identifier id (e.g., string) associated with the data block $B_i$ 4102. The data processing hardware 4124 removes the data block $B_i$ 4102 from the block stash 4370. Since the data block $B_i$ 4102 is stored in the block stash 4370 (and/or the id is stored in the identifier stash 4372) with probability p, the data processing hardware 4124 sends a fake query 4404 to the untrusted distributed system 4140 to download two random data buckets 4350 stored on the storage abstraction 4150 to obfuscate the retrieval of the data block $(B_i)$ from the block stash 4370. In the example shown, the fake query 4404 randomly downloads $bucket_1$ and $bucket_3$. The client device 4120 may simply discard the two randomly downloaded buckets 4350 (e.g., $bucket_1$ and $bucket_3$) and their respective contents.

On the other hand, FIG. 4.5B shows the data processing hardware 4124 executing the query (q) for the data block $(B_i)$ 4102 during the download phase when neither the data block $(B_i)$ is stored in the local block stash 4370 nor the corresponding identifier id is in identifier stash 4372 of the client device 4120. Since the data block $B_i$ 4102 is not stored in the block stash 4370 (nor is the identifier id in the identifier stash 4372), the data processing hardware 4124 sends a real query 4402 to the untrusted distributed system 4140 to download the pair of data buckets 4350 with indices $s_1=F_1(id_i)$ and $s_2=F_2(id_i)$ and then decrypts all of the blocks 4102, 4103 within the downloaded data buckets $s_1$, $s_2$ to determine if the data block $(B_i)$ is stored in one of the buckets $s_1$, $s_2$. The data processing hardware 4124 may decrypt all of the blocks 4102, 4103 within each of the buckets by accessing the private keys locally stored on the encryption module 4305. In the example shown, the data processing hardware 4124 finds and removes the data block $(B_i)$ from the downloaded bucket $s_1$. The removed data block $(B_i)$ may be temporarily stored on the client device 4120 in the memory hardware 4122 and the remaining blocks 4102, 4103 from each downloaded bucket $s_1$, $s_2$ may be discarded. In some scenarios (not shown), the query 4402 for the block $(B_i)$ results in a miss when the block $(B_i)$ is not found in the returned buckets $s_1$, $s_2$. In these scenarios, the overwrite phase includes the client device 4120 executing a fake overwrite upon two randomly chosen buckets so that the client device 4120 does not reveal the miss of the non-existent block $(B_i)$ to the untrusted distributed system 4140.

Referring to FIG. 4.5C, in some implementations, when the query 4402 for the block $(B_i)$ during the download phase of FIG. 4.5B results in the miss indicating that block $(B_i)$ does not exist, the data processing hardware 4124 adds the identifier id associated with the miss to the identifier stash 4372. In order to obfuscate the addition of the identifier id to the identifier stash 4372 and not reveal the non-existence of block ($B_i$) to the untrusted distributed system 4140, the data processing hardware 4124 sends a fake query 4404 to the untrusted distributed system 4140 to download two random data buckets 4350 (e.g., $bucket_1$ and $bucket_3$) stored on the storage abstraction 4150. The data processing hardware 4124 then decrypts and re-encrypts all of the blocks 4102, 4103 within the randomly downloaded buckets with fresh randomness before uploading the buckets (e.g., $bucket_1$ and $bucket_3$) back to the distributed system 4140 at the same positions within the storage abstraction 4150. The downloading, decrypting, and re-encrypting on the two random buckets is referred to as a fake overwrite to conceal the block miss from the distributed system 4140 because the contents of the randomly downloaded buckets (e.g., $bucket_1$ and $bucket_3$) have not been changed (except with a freshly computed ciphertext (e.g., a different encryption)). Thus, the untrusted distributed system 4140 is unaware whether or not the retrieved data buckets (e.g., $bucket_1$ and $bucket_3$) are downloaded in response to a real query 4402 or the fake query 4404.

In other implementations, when the data block ($B_i$) does exist, FIG. 4.5C also shows the data processing hardware 4124 storing a current version of the data block ($B_i$) in the block stash 4370 with probability p on the memory hardware 4122 of the client device 4120 during the overwrite phase. The overwrite phase follows a corresponding download phase in which the data block ($B_i$) was retrieved either from the block stash 4370 (FIG. 4.5A) or from the storage abstraction 4150 (FIG. 4.5B). In some examples, the client device 4124 executes a write operation on the data block ($B_i$) retrieved during the download phase to update the data block ($B_i$) with a new version of the data block ($B_i'$). In these examples, the updated new version of the data block ($B_i'$) is stored on in the block stash 4370 with probability p during the overwrite phase. In other examples, the client device 4120 simply executes a read operation on the data block ($B_i$) retrieved during the download phase. In these examples, the current version stored in the block stash 4370 is unchanged from the version retrieved during the download phase.

In order to obfuscate the storing of the current version of the data block ($B_i'$) in the block stash 4370 with probability p from the untrusted distributed system 4140, the data processing hardware 4124 sends the fake query 4404 to the untrusted distributed system 4140 to download two random data buckets 4350 (e.g., $bucket_1$ and $bucket_3$) stored on the storage abstraction 4150. The data processing hardware 4124 then decrypts and re-encrypts all of the blocks 4102, 4103 within the randomly downloaded buckets with fresh randomness before uploading the buckets (e.g., $bucket_1$ and $bucket_3$) back to the distributed system 4140 at the same positions within the storage abstraction 4150. The downloading, decrypting, and re-encrypting on the two random buckets is referred to as a fake overwrite to conceal the storing of the current version of the data block ($B_i'$) in the block stash 4370 because the contents of the randomly downloaded buckets (e.g., $bucket_1$ and $bucket_3$) have not been changed (except with a freshly computed ciphertext (e.g., a different encryption)). Thus, the untrusted distributed system 4140 is unaware whether or not the retrieved data buckets (e.g., $bucket_1$ and $bucket_3$) are downloaded in response to a real query 4402 or the fake query 4404.

On the other hand, when the current version of the data block data block ($B_i'$) is not stored in the block stash 4370 with the remaining probability 1−(C/N), FIG. 4.5D shows the client device 4120 holding the current version of the data block ($B_i'$) (e.g., in the memory hardware 4122) while the data processing hardware 4124 sends a real query 4402 to the untrusted distributed system 4140 to download the pair of data buckets 4350 with indices $s_1=F_1(id_i)$ and $s_2=F_2(id_i)$. Upon receiving the data buckets $s_1$, $s_2$, the data processing hardware 4124 decrypts all of the blocks 4102, 4103, replaces the previous version of the data block ($B_i$) in the corresponding one of the buckets $s_1$, $s_2$ with the new version of the data block (B'), and re-encrypts all of the blocks 4102, 4103 including the new version of the data block ($B_i'$) within data buckets $s_1$, $s_2$ with fresh randomness. The data processing hardware 4124 then re-uploads the buckets $s_1$, $s_2$ back to the distributed system 4140 at the same positions within the storage abstraction 4150.

In order to keep the size of the block stash 4370 small, after the DP-OS instruction 4400 executes θ(N log N) queries (q), the instruction 4400 may use a block shuffle (e.g., by executing the oblivious permutation routine 4450) to refresh the system by randomly choosing new seeds ($K'_1$, $K'_2$) (i.e., by generating to new PRFs $F_1'$, $F_2'$ and resetting the identifier stash 4372) and reallocating blocks 4102 to buffer buckets 4360 based on the new seeds. Here, the distributed system 4140 maintains a list of the keys associated with each data block 4102. Thus, for each key, the two buckets 4350 associated with keys ($K_1$, $K_2$) are downloaded, the blocks 4102, 4103 are decrypted to locate and re-encrypt the corresponding data block 4102. Thereafter, the two buffer buckets 4360 associated with keys ($K'_1$, $K'_2$) are downloaded, decrypted, and the data block 4102 is added to the least loaded of the two buckets 4350 before re-encrypting and re-uploading the two buckets 4350 back to the distributed system 4140. Accordingly, after the instruction 4400 executes N queries (q), the shuffle buffer initializes new block and identifier stashes 4370, 4372, moves all the data blocks 4102 from the old buckets 4350 into the new data buckets 4360 based on the new PRFs $F_1'$, $F_2'$, and deletes the old data buckets 4350. The client device 4120 may use the PosMap stored on the data processing hardware 4124 when executing the shuffle buffer.

In some implementations, the DP-OS uses a hashing scheme of overlapping L buckets with each of the N data blocks 4102 associated with a unique finite string identifier $k_1$-$k_n$ and hashed into one of L buckets. The L buckets may be outsourced to the untrusted distributed system 4140 and each bucket may include a same size so that no information about the values of the identifiers $k_1$-$k_n$ can be inferred by the distributed system 4140. The hashing scheme is configured to hide the values of the identifiers $k_1$-$k_n$ for the data blocks 4102. The hashing scheme may use a binary tree or a reverse exponential tree, with leaf nodes occupying level 0 and levels increasing toward a root of the tree. The root of the tree occupies the largest level of the tree.

For a binary tree with N≤L≤2N leafs, each node of the tree may store exactly one block 4102. The tree may be initially filled with dummy blocks 4103, such as blocks with encryptions of zero. The leafs of the tree can be numbered from left to right from one to L, and each leaf may correspond to one of the L buckets. Here, the i-th bucket may include all blocks stored in nodes on the unique path from the i-th leaf to the root of the tree. Additionally, the client device 4120 may optionally keep a block stash 4370 to store blocks that overflow from the tree. FIG. 4.6 provides an example algorithm 4600 initializing the binary tree by inputting the data blocks 4102 in encrypted form into corresponding L buckets and executing a query (q) for a data block ($B_i$).

A reverse exponential tree may be parameterized by the number of data blocks stored N and the number of choices D. FIG. 4.7 shows an example reverse exponential tree 4700 with N=7 data blocks and D=2 choices. The number of children at each level doubly exponentially increases when traversing up the tree. For L levels, all nodes have at most $C_1 := D$ children at level 1 and all nodes have at most $C_2 = (C_1)^2 := D^2$ children at level 2. At level i, all nodes have at most $C_i = (C_{i-1})^2 := (D^2)^{i-1}$. There will be no leaf nodes at level zero. All levels i greater than zero may be expressed as follows.

$$N_i := \left\lceil \frac{N}{D^{2^{i-1}}} \right\rceil \tag{15}$$

The tree may stop after each level has exactly one node, which occurs at level $\lceil \log_2 \log_D N \rceil$. Each node at level i is labelled left to right from 1 to $N_i$. At levels i greater than or equal to one, node $j \in \{1, \ldots, N_i\}$ will have $C_i$ children nodes labelled with $(j-1) C_i+1$ to $j \cdot C_i$ at level i+1. Each node $N_i$ at each level i greater than or equal to zero might have less than $C_i$ children due to rounding. The reverse exponential tree further includes N buckets with the i-th bucket ($1 \le i \le N$) including all nodes on the unique path from root to the leaf node labelled with i. The client device 4120 may optionally store a block stash 4370 to store overflow blocks 4102. FIG. 4.8 provides an example algorithm 4800 initializing the reverse exponential tree by inputting the data blocks 4102 in encrypted form into corresponding N buckets and executing a query (q) for a data block ($B_i$).

FIG. 4.9 is schematic view of an example computing device 4900 (e.g., data processing hardware) that may be used to implement the systems and methods described in this document. The computing device 4900 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit the various implementations described and/or claimed in this document.

The computing device 4900 includes a processor 4910, memory 4920, a storage device 4930, a high-speed interface/controller 4940 connecting to the memory 4920 and high-speed expansion ports 4950, and a low speed interface/controller 4960 connecting to low speed bus 4970 and storage device 4930. Each of the components 4910, 4920, 4930, 4940, 4950, and 4960, are interconnected using various busses, and may be mounted on a common motherboard or in other manners as appropriate. The processor 4910 can process instructions for execution within the computing device 4900, including instructions stored in the memory 4920 or on the storage device 4930 to display graphical information for a graphical user interface (GUI) on an external input/output device, such as display 4980 coupled to high speed interface 4940. In other implementations, multiple processors and/or multiple buses may be used, as appropriate, along with multiple memories and types of memory. Also, multiple computing devices 4900 may be connected, with each device providing portions of the necessary operations (e.g., as a server bank, a group of blade servers, or a multi-processor system).

The memory 4920 stores information non-transitorily within the computing device 4900. The memory 4920 may be a computer-readable medium, a volatile memory unit(s), or non-volatile memory unit(s). The non-transitory memory 4920 may be physical devices used to store programs (e.g., sequences of instructions) or data (e.g., program state information) on a temporary or permanent basis for use by the computing device 4900. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 4930 (e.g. memory hardware) is capable of providing mass storage for the computing device 4900. In some implementations, the storage device 4930 is a computer-readable medium. In various different implementations, the storage device 4930 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 4920, the storage device 4930, or memory on processor 4910.

The high speed controller 4940 manages bandwidth-intensive operations for the computing device 4900, while the low speed controller 4960 manages lower bandwidth-intensive operations. Such allocation of duties is exemplary only. In some implementations, the high-speed controller 4940 is coupled to the memory 4920, the display 4980 (e.g., through a graphics processor or accelerator), and to the high-speed expansion ports 4950, which may accept various expansion cards (not shown). In some implementations, the low-speed controller 4960 is coupled to the storage device 4930 and low-speed expansion port 4970. The low-speed expansion port 4970, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 4900 may be implemented in a number of different forms, as shown in the figure. For example, it may be implemented as a standard server **4900*a* or multiple times in a group of such servers 4900*a*, as a laptop computer 4900*b*, or as part of a rack server system 4900*c***.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A computer-implemented method when executed on data processing hardware causes the data processing hardware to perform operations comprising:
- receiving, from a first user device, encrypted data encrypted locally at the first user device by a customer side key stored on the first user device, the customer side key kept secret from the data processing hardware;
- storing, on memory hardware in communication with the data processing hardware, the encrypted data;
- receiving, from a second user device, a search query for a keyword in the encrypted data, the search query comprising a cryptographic search value based on a key for the encrypted data and the keyword;
- determining a portion of the encrypted data associated with the cryptographic search value; and
- providing the determined portion of the encrypted data to the second user device.

2. The computer-implemented method of claim 1, wherein the cryptographic search value is further based on a cryptographic key associated with the first user device.

3. The computer-implemented method of claim 2, wherein the encrypted data comprises a data identifier identifying the encrypted data.

4. The computer-implemented method of claim 1, wherein the search query further comprises a data identifier identifying the encrypted data.

5. The computer-implemented method of claim 1, wherein:
- the encrypted data comprises a set of documents; and
- the search query comprises a different cryptographic search value for each document in the set of documents.

6. The computer-implemented method of claim 1, wherein the second user device is configured to, after receiving the determined portion of the encrypted data, decrypt the determined portion of the encrypted data locally at the second user device.

7. The computer-implemented method of claim 1, wherein the encrypted data comprises one or more of:
- documents;
- emails;
- calendar events;
- notes; or
- database entries.

8. The computer-implemented method of claim 1, wherein the operations further comprise recording a cryptographic word set token in a word set for each unique pair of words that appears in the encrypted data.

9. The computer-implemented method of claim 1, wherein the operations further comprise determining that the second user device is allowed to access the encrypted data.

10. The computer-implemented method of claim 9, wherein determining that the second user device is allowed to access the encrypted data is based on a user token received from the second user device.

11. A system comprising:
- data processing hardware; and
- memory hardware in communication with the data processing hardware, the memory hardware storing instructions that when executed on the data processing hardware cause the data processing hardware to perform operations comprising:
  - receiving, from a first user device, encrypted data encrypted locally at the first user device by a customer side key stored on the first user device, the customer side key kept secret from the data processing hardware;

storing, on memory hardware in communication with the data processing hardware, the encrypted data, receiving, from a second user device, a search query for a keyword in the encrypted data, the search query comprising a cryptographic search value based on a key for the encrypted data and the keyword;

determining a portion of the encrypted data associated with the cryptographic search value; and providing the determined portion of the encrypted data to the second user device.

12. The system of claim 11, wherein the cryptographic search value is further based on a cryptographic key associated with the first user device.

13. The system of claim 12, wherein the encrypted data comprises a data identifier identifying the encrypted data.

14. The system of claim 11, wherein the search query further comprises a data identifier identifying the encrypted data.

15. The system of claim 11, wherein:

the encrypted data comprises a set of documents; and the search query comprises a different cryptographic search value for each document in the set of documents.

16. The system of claim 11, wherein the second user device is configured to, after receiving the determined portion of the encrypted data, decrypt the determined portion of the encrypted data locally at the second user device.

17. The system of claim 11, wherein the encrypted data comprises one or more of:

documents;

emails;

calendar events;

notes; or database entries.

18. The system of claim 11, wherein the operations further comprise recording a cryptographic word set token in a word set for each unique pair of words that appears in the encrypted data.

19. The system of claim 11, wherein the operations further comprise determining that the second user device is allowed to access the encrypted data.

20. The system of claim 19, wherein determining that the second user device is allowed to access the encrypted data is based on a user token received from the second user device.

* * * * *